(12) United States Patent
Shirayanagi

(10) Patent No.: US 6,789,895 B2
(45) Date of Patent: Sep. 14, 2004

(54) ASPHERICAL SPECTACLE LENS WITH PRISMATIC POWER TO CORRECT PHORIA

(75) Inventor: Moriyasu Shirayanagi, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 185 days.

(21) Appl. No.: 09/977,703

(22) Filed: Oct. 16, 2001

(65) Prior Publication Data
US 2002/0067462 A1 Jun. 6, 2002

(30) Foreign Application Priority Data
Oct. 17, 2000 (JP) .................................. 2000-317241

(51) Int. Cl.$^7$ ................................................. G02C 7/02
(52) U.S. Cl. ...................... 351/159; 351/169; 351/170
(58) Field of Search ............................. 359/159, 169, 359/170, 177, 168, 175

(56) References Cited

U.S. PATENT DOCUMENTS

| | | | |
|---|---|---|---|
| 5,050,979 A | 9/1991 | Shinohara | |
| 5,050,980 A | 9/1991 | Shinohara | |
| 5,353,072 A | 10/1994 | Tejima et al. | |
| 5,550,600 A | 8/1996 | Ueno | |
| 5,610,670 A | 3/1997 | Ueno | |
| 6,056,401 A | 5/2000 | Shirayanagi | |
| 6,089,713 A | 7/2000 | Hof et al. | |

FOREIGN PATENT DOCUMENTS

| | | |
|---|---|---|
| EP | 371460 | 6/1990 |
| WO | 97/23804 | 7/1997 |
| WO | 99/04307 | 1/1999 |

*Primary Examiner*—Hung Xuan Dang
(74) *Attorney, Agent, or Firm*—Greenblum & Bernstein, P.L.C.

(57) ABSTRACT

Disclosed is an aspherical spectacle lens having a prismatic power to correct hereophoria of an eye. The spectacle lens has front and back surfaces, one of which is a rotationally-asymmetrical aspherical surface. When the back surface is rotationally-asymmetrical, curvature of an intersection line of a plane containing the normal to the rotationally-asymmetrical surface at a framing reference point and the rotationally-asymmetrical surface at the prism base side is larger than that at the apex side. The framing reference point is coincident with a pupil position of a user when the spectacle lens is installed on a frame. On the other hand, when the front surface is rotationally-asymmetrical, the curvature of the intersection line at the prism base side is smaller than that at the apex side.

10 Claims, 93 Drawing Sheets

| h\θ | 0 | 45 | 90 | 135 | 180 | 225 | 270 | 315 |
|---|---|---|---|---|---|---|---|---|
| 0.0 | 1.35 | 1.35 | 1.35 | 1.35 | 1.35 | 1.35 | 1.35 | 1.35 |
| 5.0 | 1.35 | 1.35 | 1.35 | 1.35 | 1.35 | 1.35 | 1.35 | 1.35 |
| 10.0 | 1.35 | 1.35 | 1.35 | 1.35 | 1.35 | 1.35 | 1.35 | 1.35 |
| 15.0 | 1.35 | 1.35 | 1.35 | 1.35 | 1.35 | 1.35 | 1.35 | 1.35 |
| 20.0 | 1.35 | 1.35 | 1.35 | 1.35 | 1.35 | 1.35 | 1.35 | 1.35 |
| 25.0 | 1.35 | 1.35 | 1.35 | 1.35 | 1.35 | 1.35 | 1.35 | 1.35 |

$C_1(h, \theta)$

| h\θ | 0 | 45 | 90 | 135 | 180 | 225 | 270 | 315 |
|---|---|---|---|---|---|---|---|---|
| 0.0 | 7.36 | 7.36 | 7.35 | 7.36 | 7.36 | 7.36 | 7.35 | 7.36 |
| 5.0 | 7.21 | 7.16 | 7.14 | 7.16 | 7.21 | 7.26 | 7.28 | 7.26 |
| 10.0 | 6.81 | 6.67 | 6.61 | 6.67 | 6.81 | 6.96 | 7.02 | 6.96 |
| 15.0 | 6.30 | 6.11 | 6.03 | 6.11 | 6.30 | 6.48 | 6.56 | 6.48 |
| 20.0 | 5.81 | 5.62 | 5.54 | 5.62 | 5.81 | 6.00 | 6.08 | 6.00 |
| 25.0 | 5.42 | 5.20 | 5.12 | 5.20 | 5.42 | 5.67 | 5.79 | 5.67 |

$C_2(h, \theta)$

| h\θ | 0 | 45 | 90 | 135 | 180 | 225 | 270 | 315 |
|---|---|---|---|---|---|---|---|---|
| 0.0 | 2.44 | 2.45 | 2.45 | 2.45 | 2.44 | 2.45 | 2.45 | 2.45 |
| 5.0 | 2.56 | 2.61 | 2.64 | 2.61 | 2.56 | 2.51 | 2.49 | 2.51 |
| 10.0 | 2.84 | 3.01 | 3.08 | 3.01 | 2.84 | 2.69 | 2.62 | 2.69 |
| 15.0 | 3.16 | 3.42 | 3.53 | 3.42 | 3.16 | 2.92 | 2.83 | 2.92 |
| 20.0 | 3.39 | 3.68 | 3.80 | 3.68 | 3.39 | 3.13 | 3.03 | 3.13 |
| 25.0 | 3.48 | 3.78 | 3.91 | 3.78 | 3.48 | 3.19 | 3.07 | 3.19 |

$C_1(h, \theta)$

| h\θ | 0 | 45 | 90 | 135 | 180 | 225 | 270 | 315 |
|---|---|---|---|---|---|---|---|---|
| 0.0 | 8.46 | 8.46 | 8.46 | 8.46 | 8.46 | 8.46 | 8.46 | 8.46 |
| 5.0 | 8.46 | 8.46 | 8.46 | 8.46 | 8.46 | 8.46 | 8.46 | 8.46 |
| 10.0 | 8.46 | 8.46 | 8.46 | 8.46 | 8.46 | 8.46 | 8.46 | 8.46 |
| 15.0 | 8.46 | 8.46 | 8.46 | 8.46 | 8.46 | 8.46 | 8.46 | 8.46 |
| 20.0 | 8.46 | 8.46 | 8.46 | 8.46 | 8.46 | 8.46 | 8.46 | 8.46 |
| 25.0 | 8.46 | 8.46 | 8.46 | 8.46 | 8.46 | 8.46 | 8.46 | 8.46 |

$C_2(h, \theta)$

| h\θ | \multicolumn{8}{c}{$C_1(h, \theta)$} |
|---|---|---|---|---|---|---|---|---|
| | 0 | 45 | 90 | 135 | 180 | 225 | 270 | 315 |
| 0.0 | 2.44 | 2.44 | 2.44 | 2.44 | 2.44 | 2.44 | 2.44 | 2.44 |
| 5.0 | 2.54 | 2.54 | 2.54 | 2.54 | 2.54 | 2.54 | 2.54 | 2.54 |
| 10.0 | 2.79 | 2.79 | 2.79 | 2.79 | 2.79 | 2.79 | 2.79 | 2.79 |
| 15.0 | 3.09 | 3.09 | 3.09 | 3.09 | 3.09 | 3.09 | 3.09 | 3.09 |
| 20.0 | 3.34 | 3.34 | 3.34 | 3.34 | 3.34 | 3.34 | 3.34 | 3.34 |
| 25.0 | 3.46 | 3.46 | 3.46 | 3.46 | 3.46 | 3.46 | 3.46 | 3.46 |

| h\θ | $C_2(h, \theta)$ | | | | | | | |
|---|---|---|---|---|---|---|---|---|
| | 0 | 45 | 90 | 135 | 180 | 225 | 270 | 315 |
| 0.0 | 8.46 | 8.46 | 8.46 | 8.46 | 8.46 | 8.46 | 8.46 | 8.46 |
| 5.0 | 8.46 | 8.46 | 8.46 | 8.46 | 8.46 | 8.46 | 8.46 | 8.46 |
| 10.0 | 8.46 | 8.46 | 8.46 | 8.46 | 8.46 | 8.46 | 8.46 | 8.46 |
| 15.0 | 8.46 | 8.46 | 8.46 | 8.46 | 8.46 | 8.46 | 8.46 | 8.46 |
| 20.0 | 8.46 | 8.46 | 8.46 | 8.46 | 8.46 | 8.46 | 8.46 | 8.46 |
| 25.0 | 8.46 | 8.46 | 8.46 | 8.46 | 8.46 | 8.46 | 8.46 | 8.46 |

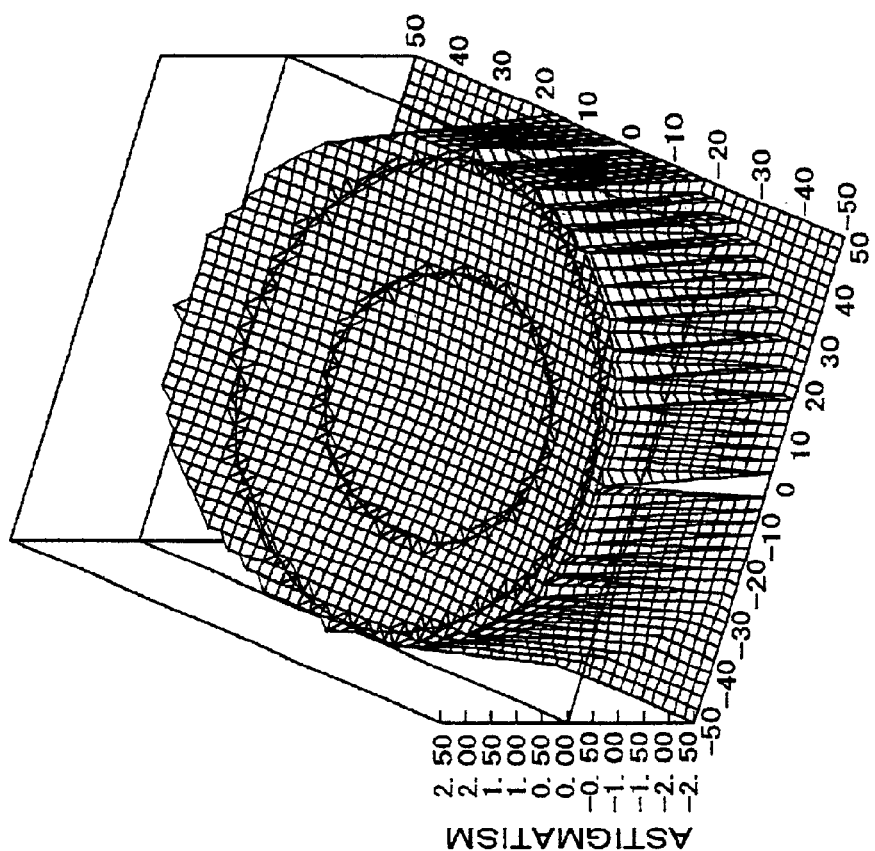
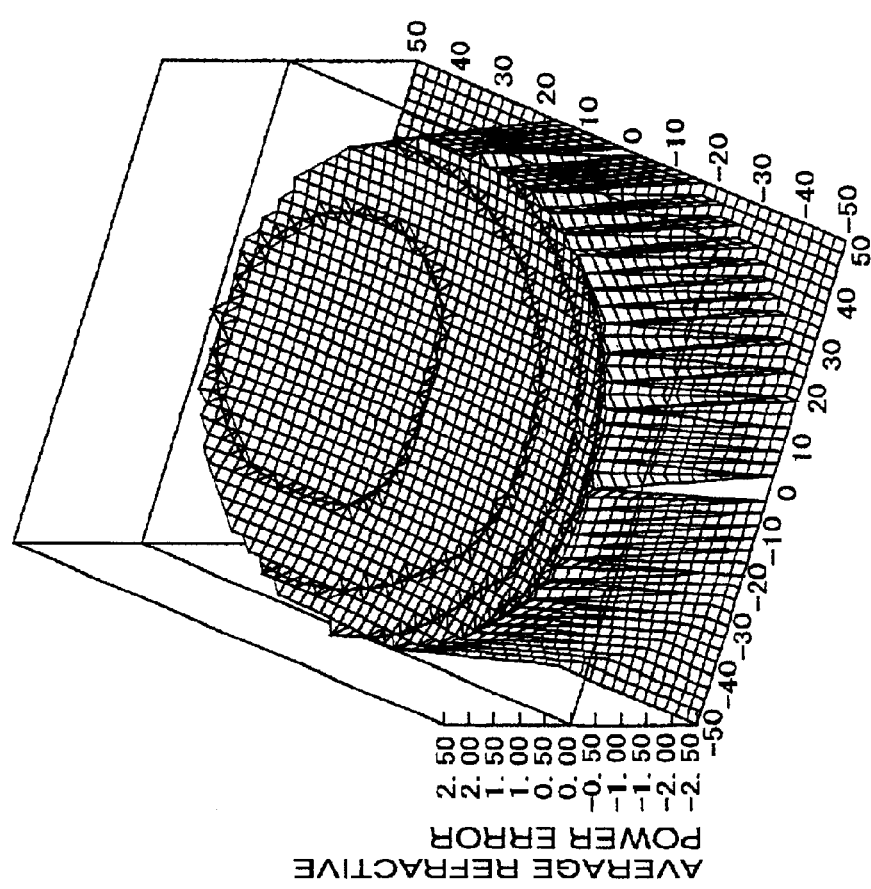

| h\θ | 0 | 45 | 90 | 135 | 180 | 225 | 270 | 315 |
|---|---|---|---|---|---|---|---|---|
| 0.0 | 1.35 | 1.35 | 1.35 | 1.35 | 1.35 | 1.35 | 1.35 | 1.35 |
| 5.0 | 1.35 | 1.35 | 1.35 | 1.35 | 1.35 | 1.35 | 1.35 | 1.35 |
| 10.0 | 1.35 | 1.35 | 1.35 | 1.35 | 1.35 | 1.35 | 1.35 | 1.35 |
| 15.0 | 1.35 | 1.35 | 1.35 | 1.35 | 1.35 | 1.35 | 1.35 | 1.35 |
| 20.0 | 1.35 | 1.35 | 1.35 | 1.35 | 1.35 | 1.35 | 1.35 | 1.35 |
| 25.0 | 1.35 | 1.35 | 1.35 | 1.35 | 1.35 | 1.35 | 1.35 | 1.35 |

$C_1(h, \theta)$

| h\θ | 0 | 45 | 90 | 135 | 180 | 225 | 270 | 315 |
|---|---|---|---|---|---|---|---|---|
| 0.0 | 7.36 | 10.36 | 13.36 | 10.36 | 7.36 | 10.36 | 13.36 | 10.36 |
| 5.0 | 7.21 | 10.14 | 13.08 | 10.14 | 7.21 | 10.28 | 13.33 | 10.28 |
| 10.0 | 6.81 | 9.62 | 12.47 | 9.62 | 6.81 | 9.96 | 13.05 | 9.96 |
| 15.0 | 6.30 | 9.05 | 11.89 | 9.05 | 6.30 | 9.47 | 12.56 | 9.47 |
| 20.0 | 5.81 | 8.55 | 11.36 | 8.55 | 5.81 | 9.06 | 12.26 | 9.06 |
| 25.0 | 5.42 | 8.23 | 11.11 | 8.23 | 5.42 | 9.08 | 12.86 | 9.08 |

$C_2(h, \theta)$

| h\θ | 0 | 45 | 90 | 135 | 180 | 225 | 270 | 315 |
|---|---|---|---|---|---|---|---|---|
| 0.0 | 2.44 | 2.45 | 2.46 | 2.45 | 2.44 | 2.45 | 2.46 | 2.45 |
| 5.0 | 2.56 | 2.64 | 2.68 | 2.64 | 2.56 | 2.50 | 2.46 | 2.50 |
| 10.0 | 2.84 | 3.06 | 3.10 | 3.06 | 2.84 | 2.67 | 2.51 | 2.67 |
| 15.0 | 3.16 | 3.43 | 3.37 | 3.43 | 3.16 | 2.90 | 2.65 | 2.90 |
| 20.0 | 3.39 | 3.59 | 3.37 | 3.59 | 3.39 | 3.04 | 2.65 | 3.04 |
| 25.0 | 3.48 | 3.57 | 3.22 | 3.57 | 3.48 | 2.95 | 2.38 | 2.95 |

$C_1(h, \theta)$

| h\θ | 0 | 45 | 90 | 135 | 180 | 225 | 270 | 315 |
|---|---|---|---|---|---|---|---|---|
| 0.0 | 8.46 | 11.47 | 14.47 | 11.47 | 8.46 | 11.47 | 14.47 | 11.47 |
| 5.0 | 8.46 | 11.47 | 14.47 | 11.47 | 8.46 | 11.47 | 14.47 | 11.47 |
| 10.0 | 8.46 | 11.47 | 14.47 | 11.47 | 8.46 | 11.47 | 14.47 | 11.47 |
| 15.0 | 8.46 | 11.47 | 14.47 | 11.47 | 8.46 | 11.47 | 14.47 | 11.47 |
| 20.0 | 8.46 | 11.47 | 14.47 | 11.47 | 8.46 | 11.47 | 14.47 | 11.47 |
| 25.0 | 8.46 | 11.47 | 14.47 | 11.47 | 8.46 | 11.47 | 14.47 | 11.47 |

$C_2(h, \theta)$

| h\θ | 0 | 45 | 90 | 135 | 180 | 225 | 270 | 315 |
|---|---|---|---|---|---|---|---|---|
| | | | | $C_1(h, \theta)$ | | | | |
| 0.0 | 2.44 | 2.44 | 2.44 | 2.44 | 2.44 | 2.44 | 2.44 | 2.44 |
| 5.0 | 2.54 | 2.54 | 2.54 | 2.54 | 2.54 | 2.54 | 2.54 | 2.54 |
| 10.0 | 2.79 | 2.79 | 2.79 | 2.79 | 2.79 | 2.79 | 2.79 | 2.79 |
| 15.0 | 3.09 | 3.09 | 3.09 | 3.09 | 3.09 | 3.09 | 3.09 | 3.09 |
| 20.0 | 3.34 | 3.34 | 3.34 | 3.34 | 3.34 | 3.34 | 3.34 | 3.34 |
| 25.0 | 3.46 | 3.46 | 3.46 | 3.46 | 3.46 | 3.46 | 3.46 | 3.46 |

| h\θ | 0 | 45 | 90 | 135 | 180 | 225 | 270 | 315 |
|---|---|---|---|---|---|---|---|---|
| | | | | $C_2(h, \theta)$ | | | | |
| 0.0 | 8.46 | 11.47 | 14.47 | 11.47 | 8.46 | 11.47 | 14.47 | 11.47 |
| 5.0 | 8.46 | 11.46 | 14.47 | 11.46 | 8.46 | 11.46 | 14.47 | 11.46 |
| 10.0 | 8.46 | 11.45 | 14.47 | 11.45 | 8.46 | 11.45 | 14.47 | 11.45 |
| 15.0 | 8.46 | 11.44 | 14.47 | 11.44 | 8.46 | 11.44 | 14.47 | 11.44 |
| 20.0 | 8.46 | 11.42 | 14.47 | 11.42 | 8.46 | 11.42 | 14.47 | 11.42 |
| 25.0 | 8.46 | 11.39 | 14.47 | 11.39 | 8.46 | 11.39 | 14.47 | 11.39 |

| h\θ | 0 | 45 | 90 | 135 | 180 | 225 | 270 | 315 |
|---|---|---|---|---|---|---|---|---|
| 0.0 | 0.68 | 0.68 | 0.68 | 0.68 | 0.68 | 0.68 | 0.68 | 0.68 |
| 5.0 | 0.68 | 0.68 | 0.68 | 0.68 | 0.68 | 0.68 | 0.68 | 0.68 |
| 10.0 | 0.68 | 0.68 | 0.68 | 0.68 | 0.68 | 0.68 | 0.68 | 0.68 |
| 15.0 | 0.68 | 0.68 | 0.68 | 0.68 | 0.68 | 0.68 | 0.68 | 0.68 |
| 20.0 | 0.68 | 0.68 | 0.68 | 0.68 | 0.68 | 0.68 | 0.68 | 0.68 |
| 25.0 | 0.68 | 0.68 | 0.68 | 0.68 | 0.68 | 0.68 | 0.68 | 0.68 |

$C_1(h, \theta)$

| h\θ | 0 | 45 | 90 | 135 | 180 | 225 | 270 | 315 |
|---|---|---|---|---|---|---|---|---|
| 0.0 | 12.71 | 12.70 | 12.69 | 12.70 | 12.71 | 12.70 | 12.69 | 12.70 |
| 5.0 | 12.51 | 12.42 | 12.39 | 12.42 | 12.51 | 12.59 | 12.62 | 12.59 |
| 10.0 | 11.99 | 11.79 | 11.71 | 11.79 | 11.99 | 12.17 | 12.24 | 12.17 |
| 15.0 | 11.30 | 11.09 | 11.00 | 11.09 | 11.30 | 11.49 | 11.57 | 11.49 |
| 20.0 | 10.62 | 10.38 | 10.29 | 10.38 | 10.62 | 10.87 | 10.98 | 10.87 |
| 25.0 | 10.19 | 9.85 | 9.75 | 9.85 | 10.19 | 10.68 | 10.92 | 10.68 |

$C_2(h, \theta)$

| h\θ | 0 | 45 | 90 | 135 | 180 | 225 | 270 | 315 |
|---|---|---|---|---|---|---|---|---|
| | | | | $C_1(h, \theta)$ | | | | |
| 0.0 | 1.73 | 1.73 | 1.73 | 1.73 | 1.73 | 1.73 | 1.73 | 1.73 |
| 5.0 | 1.67 | 1.67 | 1.67 | 1.67 | 1.67 | 1.67 | 1.67 | 1.67 |
| 10.0 | 1.49 | 1.49 | 1.49 | 1.49 | 1.49 | 1.49 | 1.49 | 1.49 |
| 15.0 | 1.19 | 1.19 | 1.19 | 1.19 | 1.19 | 1.19 | 1.19 | 1.19 |
| 20.0 | 0.77 | 0.77 | 0.77 | 0.77 | 0.77 | 0.77 | 0.77 | 0.77 |
| 25.0 | 0.23 | 0.23 | 0.23 | 0.23 | 0.23 | 0.23 | 0.23 | 0.23 |

| h\θ | 0 | 45 | 90 | 135 | 180 | 225 | 270 | 315 |
|---|---|---|---|---|---|---|---|---|
| | | | | $C_2(h, \theta)$ | | | | |
| 0.0 | 13.76 | 13.75 | 13.74 | 13.75 | 13.76 | 13.75 | 13.74 | 13.75 |
| 5.0 | 13.54 | 13.45 | 13.40 | 13.45 | 13.54 | 13.62 | 13.66 | 13.62 |
| 10.0 | 12.92 | 12.71 | 12.62 | 12.71 | 12.92 | 13.12 | 13.19 | 13.12 |
| 15.0 | 11.96 | 11.75 | 11.66 | 11.75 | 11.96 | 12.15 | 12.23 | 12.15 |
| 20.0 | 10.62 | 10.45 | 10.38 | 10.45 | 10.62 | 10.80 | 10.87 | 10.80 |
| 25.0 | 8.63 | 8.65 | 8.63 | 8.65 | 8.63 | 8.56 | 8.72 | 8.56 |

| h\θ | \multicolumn{8}{c}{$C_1(h, \theta)$} |
|---|---|---|---|---|---|---|---|---|
| | 0 | 45 | 90 | 135 | 180 | 225 | 270 | 315 |
| 0.0 | 1.73 | 1.73 | 1.73 | 1.73 | 1.73 | 1.73 | 1.73 | 1.73 |
| 5.0 | 1.81 | 1.81 | 1.81 | 1.81 | 1.81 | 1.81 | 1.81 | 1.81 |
| 10.0 | 2.04 | 2.04 | 2.04 | 2.04 | 2.04 | 2.04 | 2.04 | 2.04 |
| 15.0 | 2.33 | 2.33 | 2.33 | 2.33 | 2.33 | 2.33 | 2.33 | 2.33 |
| 20.0 | 2.59 | 2.59 | 2.59 | 2.59 | 2.59 | 2.59 | 2.59 | 2.59 |
| 25.0 | 2.77 | 2.77 | 2.77 | 2.77 | 2.77 | 2.77 | 2.77 | 2.77 |

| h\θ | \multicolumn{8}{c}{$C_2(h, \theta)$} |
|---|---|---|---|---|---|---|---|---|
| | 0 | 45 | 90 | 135 | 180 | 225 | 270 | 315 |
| 0.0 | 13.76 | 13.76 | 13.76 | 13.76 | 13.76 | 13.76 | 13.76 | 13.76 |
| 5.0 | 13.76 | 13.76 | 13.76 | 13.76 | 13.76 | 13.76 | 13.76 | 13.76 |
| 10.0 | 13.76 | 13.76 | 13.76 | 13.76 | 13.76 | 13.76 | 13.76 | 13.76 |
| 15.0 | 13.76 | 13.76 | 13.76 | 13.76 | 13.76 | 13.76 | 13.76 | 13.76 |
| 20.0 | 13.76 | 13.76 | 13.76 | 13.76 | 13.76 | 13.76 | 13.76 | 13.76 |
| 25.0 | 13.76 | 13.76 | 13.76 | 13.76 | 13.76 | 13.76 | 13.76 | 13.76 |

| h\θ | 0 | 45 | 90 | 135 | 180 | 225 | 270 | 315 |
|---|---|---|---|---|---|---|---|---|
| 0.0 | 0.68 | 0.68 | 0.68 | 0.68 | 0.68 | 0.68 | 0.68 | 0.68 |
| 5.0 | 0.68 | 0.68 | 0.68 | 0.68 | 0.68 | 0.68 | 0.68 | 0.68 |
| 10.0 | 0.68 | 0.68 | 0.68 | 0.68 | 0.68 | 0.68 | 0.68 | 0.68 |
| 15.0 | 0.68 | 0.68 | 0.68 | 0.68 | 0.68 | 0.68 | 0.68 | 0.68 |
| 20.0 | 0.68 | 0.68 | 0.68 | 0.68 | 0.68 | 0.68 | 0.68 | 0.68 |
| 25.0 | 0.68 | 0.68 | 0.68 | 0.68 | 0.68 | 0.68 | 0.68 | 0.68 |

$C_1(h, \theta)$

| h\θ | 0 | 45 | 90 | 135 | 180 | 225 | 270 | 315 |
|---|---|---|---|---|---|---|---|---|
| 0.0 | 18.72 | 15.70 | 12.69 | 15.70 | 18.72 | 15.70 | 12.69 | 15.70 |
| 5.0 | 18.60 | 15.46 | 12.39 | 15.46 | 18.60 | 15.63 | 12.62 | 15.63 |
| 10.0 | 18.26 | 14.94 | 11.71 | 14.94 | 18.26 | 15.29 | 12.24 | 15.29 |
| 15.0 | 17.88 | 14.38 | 11.00 | 14.38 | 17.88 | 14.78 | 11.57 | 14.78 |
| 20.0 | 17.72 | 13.92 | 10.29 | 13.92 | 17.72 | 14.45 | 10.98 | 14.45 |
| 25.0 | 18.68 | 13.59 | 9.75 | 13.59 | 18.68 | 16.00 | 10.92 | 16.00 |

$C_2(h, \theta)$

| h\θ | 0 | 45 | 90 | 135 | 180 | 225 | 270 | 315 |
|---|---|---|---|---|---|---|---|---|
| 0.0 | 1.01 | 1.01 | 1.01 | 1.01 | 1.01 | 1.01 | 1.01 | 1.01 |
| 5.0 | 0.95 | 0.95 | 0.95 | 0.95 | 0.95 | 0.95 | 0.95 | 0.95 |
| 10.0 | 0.77 | 0.77 | 0.77 | 0.77 | 0.77 | 0.77 | 0.77 | 0.77 |
| 15.0 | 0.47 | 0.47 | 0.47 | 0.47 | 0.47 | 0.47 | 0.47 | 0.47 |
| 20.0 | 0.05 | 0.05 | 0.05 | 0.05 | 0.05 | 0.05 | 0.05 | 0.05 |
| 25.0 | -0.49 | -0.49 | -0.49 | -0.49 | -0.49 | -0.49 | -0.49 | -0.49 |

$C_1(h, \theta)$

| h\θ | 0 | 45 | 90 | 135 | 180 | 225 | 270 | 315 |
|---|---|---|---|---|---|---|---|---|
| 0.0 | 19.05 | 16.03 | 13.02 | 16.03 | 19.05 | 16.03 | 13.02 | 16.03 |
| 5.0 | 18.87 | 15.72 | 12.66 | 15.72 | 18.87 | 15.91 | 12.89 | 15.91 |
| 10.0 | 18.35 | 14.99 | 11.80 | 14.99 | 18.35 | 15.35 | 12.32 | 15.35 |
| 15.0 | 17.42 | 13.95 | 10.70 | 13.95 | 17.42 | 14.27 | 11.17 | 14.27 |
| 20.0 | 15.76 | 12.37 | 9.22 | 12.37 | 15.76 | 12.51 | 9.50 | 12.51 |
| 25.0 | 13.54 | 9.60 | 7.19 | 9.60 | 13.54 | 10.42 | 6.67 | 10.42 |

$C_2(h, \theta)$

| | $C_1(h, \theta)$ | | | | | | | |
|---|---|---|---|---|---|---|---|---|
| h\\$\theta$ | 0 | 45 | 90 | 135 | 180 | 225 | 270 | 315 |
| 0.0 | 1.01 | 1.01 | 1.01 | 1.01 | 1.01 | 1.01 | 1.01 | 1.01 |
| 5.0 | 1.16 | 1.16 | 1.16 | 1.16 | 1.16 | 1.16 | 1.16 | 1.16 |
| 10.0 | 1.54 | 1.54 | 1.54 | 1.54 | 1.54 | 1.54 | 1.54 | 1.54 |
| 15.0 | 1.92 | 1.92 | 1.92 | 1.92 | 1.92 | 1.92 | 1.92 | 1.92 |
| 20.0 | 2.11 | 2.11 | 2.11 | 2.11 | 2.11 | 2.11 | 2.11 | 2.11 |
| 25.0 | 2.06 | 2.06 | 2.06 | 2.06 | 2.06 | 2.06 | 2.06 | 2.06 |

| | $C_2(h, \theta)$ | | | | | | | |
|---|---|---|---|---|---|---|---|---|
| h\\$\theta$ | 0 | 45 | 90 | 135 | 180 | 225 | 270 | 315 |
| 0.0 | 19.05 | 16.04 | 13.04 | 16.04 | 19.05 | 16.04 | 13.04 | 16.04 |
| 5.0 | 19.05 | 16.03 | 13.04 | 16.03 | 19.05 | 16.03 | 13.04 | 16.03 |
| 10.0 | 19.05 | 16.01 | 13.04 | 16.01 | 19.05 | 16.01 | 13.04 | 16.01 |
| 15.0 | 19.05 | 15.96 | 13.04 | 15.96 | 19.05 | 15.96 | 13.04 | 15.96 |
| 20.0 | 19.05 | 15.90 | 13.04 | 15.90 | 19.05 | 15.90 | 13.04 | 15.90 |
| 25.0 | 19.05 | 15.80 | 13.04 | 15.80 | 19.05 | 15.80 | 13.04 | 15.80 |

| h\θ | \multicolumn{8}{c}{$C_1(h, \theta)$} |
|---|---|---|---|---|---|---|---|---|
|  | 0 | 45 | 90 | 135 | 180 | 225 | 270 | 315 |
| 0.0 | 6.96 | 6.96 | 6.96 | 6.96 | 6.96 | 6.96 | 6.96 | 6.96 |
| 5.0 | 6.96 | 6.96 | 6.96 | 6.96 | 6.96 | 6.96 | 6.96 | 6.96 |
| 10.0 | 6.96 | 6.96 | 6.96 | 6.96 | 6.96 | 6.96 | 6.96 | 6.96 |
| 15.0 | 6.96 | 6.96 | 6.96 | 6.96 | 6.96 | 6.96 | 6.96 | 6.96 |
| 20.0 | 6.96 | 6.96 | 6.96 | 6.96 | 6.96 | 6.96 | 6.96 | 6.96 |
| 25.0 | 6.96 | 6.96 | 6.96 | 6.96 | 6.96 | 6.96 | 6.96 | 6.96 |

| h\θ | \multicolumn{8}{c}{$C_2(h, \theta)$} |
|---|---|---|---|---|---|---|---|---|
|  | 0 | 45 | 90 | 135 | 180 | 225 | 270 | 315 |
| 0.0 | 1.05 | 1.06 | 1.06 | 1.06 | 1.05 | 1.06 | 1.06 | 1.06 |
| 5.0 | 1.22 | 1.21 | 1.21 | 1.21 | 1.22 | 1.24 | 1.25 | 1.24 |
| 10.0 | 1.66 | 1.62 | 1.60 | 1.62 | 1.66 | 1.71 | 1.73 | 1.71 |
| 15.0 | 2.19 | 2.12 | 2.10 | 2.12 | 2.19 | 2.27 | 2.31 | 2.27 |
| 20.0 | 2.64 | 2.55 | 2.51 | 2.55 | 2.64 | 2.74 | 2.79 | 2.74 |
| 25.0 | 2.91 | 2.79 | 2.74 | 2.79 | 2.91 | 3.06 | 3.13 | 3.06 |

| h\θ | 0 | 45 | 90 | 135 | 180 | 225 | 270 | 315 |
|---|---|---|---|---|---|---|---|---|
| 0.0 | 7.16 | 7.16 | 7.16 | 7.16 | 7.16 | 7.16 | 7.16 | 7.16 |
| 5.0 | 7.07 | 7.07 | 7.07 | 7.07 | 7.07 | 7.06 | 7.06 | 7.06 |
| 10.0 | 6.84 | 6.85 | 6.86 | 6.85 | 6.84 | 6.82 | 6.81 | 6.82 |
| 15.0 | 6.59 | 6.64 | 6.65 | 6.64 | 6.59 | 6.55 | 6.53 | 6.55 |
| 20.0 | 6.48 | 6.58 | 6.62 | 6.58 | 6.48 | 6.38 | 6.34 | 6.38 |
| 25.0 | 6.63 | 6.81 | 6.89 | 6.81 | 6.63 | 6.45 | 6.38 | 6.45 |

$C_1(h, \theta)$

| h\θ | 0 | 45 | 90 | 135 | 180 | 225 | 270 | 315 |
|---|---|---|---|---|---|---|---|---|
| 0.0 | 1.26 | 1.26 | 1.26 | 1.26 | 1.26 | 1.26 | 1.26 | 1.26 |
| 5.0 | 1.32 | 1.32 | 1.32 | 1.32 | 1.32 | 1.32 | 1.32 | 1.32 |
| 10.0 | 1.50 | 1.50 | 1.50 | 1.50 | 1.50 | 1.50 | 1.50 | 1.50 |
| 15.0 | 1.80 | 1.80 | 1.80 | 1.80 | 1.80 | 1.80 | 1.80 | 1.80 |
| 20.0 | 2.22 | 2.22 | 2.22 | 2.22 | 2.22 | 2.22 | 2.22 | 2.22 |
| 25.0 | 2.75 | 2.75 | 2.75 | 2.75 | 2.75 | 2.75 | 2.75 | 2.75 |

$C_2(h, \theta)$

| h\θ | \multicolumn{8}{c}{$C_1(h, \theta)$} |
|---|---|---|---|---|---|---|---|---|
|  | 0 | 45 | 90 | 135 | 180 | 225 | 270 | 315 |
| 0.0 | 7.17 | 7.17 | 7.17 | 7.17 | 7.17 | 7.17 | 7.17 | 7.17 |
| 5.0 | 7.01 | 7.01 | 7.01 | 7.01 | 7.01 | 7.01 | 7.01 | 7.01 |
| 10.0 | 6.56 | 6.56 | 6.56 | 6.56 | 6.56 | 6.56 | 6.56 | 6.56 |
| 15.0 | 5.93 | 5.93 | 5.93 | 5.93 | 5.93 | 5.93 | 5.93 | 5.93 |
| 20.0 | 5.23 | 5.23 | 5.23 | 5.23 | 5.23 | 5.23 | 5.23 | 5.23 |
| 25.0 | 4.58 | 4.58 | 4.58 | 4.58 | 4.58 | 4.58 | 4.58 | 4.58 |

| h\θ | $C_2(h, \theta)$ | | | | | | | |
|---|---|---|---|---|---|---|---|---|
|  | 0 | 45 | 90 | 135 | 180 | 225 | 270 | 315 |
| 0.0 | 1.26 | 1.26 | 1.26 | 1.26 | 1.26 | 1.26 | 1.26 | 1.26 |
| 5.0 | 1.26 | 1.26 | 1.26 | 1.26 | 1.26 | 1.26 | 1.26 | 1.26 |
| 10.0 | 1.26 | 1.26 | 1.26 | 1.26 | 1.26 | 1.26 | 1.26 | 1.26 |
| 15.0 | 1.26 | 1.26 | 1.26 | 1.26 | 1.26 | 1.26 | 1.26 | 1.26 |
| 20.0 | 1.26 | 1.26 | 1.26 | 1.26 | 1.26 | 1.26 | 1.26 | 1.26 |
| 25.0 | 1.26 | 1.26 | 1.26 | 1.26 | 1.26 | 1.26 | 1.26 | 1.26 |

| h\θ | 0 | 45 | 90 | 135 | 180 | 225 | 270 | 315 |
|---|---|---|---|---|---|---|---|---|
| \multicolumn{9}{c}{$C_1(h, \theta)$} | | | | | | | | |
| 0.0 | 6.96 | 6.96 | 6.96 | 6.96 | 6.96 | 6.96 | 6.96 | 6.96 |
| 5.0 | 6.96 | 6.96 | 6.96 | 6.96 | 6.96 | 6.96 | 6.96 | 6.96 |
| 10.0 | 6.96 | 6.96 | 6.96 | 6.96 | 6.96 | 6.96 | 6.96 | 6.96 |
| 15.0 | 6.96 | 6.96 | 6.96 | 6.96 | 6.96 | 6.96 | 6.96 | 6.96 |
| 20.0 | 6.96 | 6.96 | 6.96 | 6.96 | 6.96 | 6.96 | 6.96 | 6.96 |
| 25.0 | 6.96 | 6.96 | 6.96 | 6.96 | 6.96 | 6.96 | 6.96 | 6.96 |

$C_2(h, \theta)$

| h\θ | 0 | 45 | 90 | 135 | 180 | 225 | 270 | 315 |
|---|---|---|---|---|---|---|---|---|
| 0.0 | 4.06 | 1.06 | 4.06 | 7.07 | 4.06 | 1.06 | 4.06 | 7.07 |
| 5.0 | 4.14 | 1.21 | 4.09 | 7.00 | 4.14 | 1.24 | 4.19 | 7.11 |
| 10.0 | 4.35 | 1.62 | 4.20 | 6.87 | 4.35 | 1.71 | 4.51 | 7.21 |
| 15.0 | 4.59 | 2.12 | 4.37 | 6.74 | 4.59 | 2.27 | 4.83 | 7.25 |
| 20.0 | 4.79 | 2.55 | 4.53 | 6.66 | 4.79 | 2.74 | 5.08 | 7.25 |
| 25.0 | 4.90 | 2.79 | 4.59 | 6.55 | 4.90 | 3.06 | 5.28 | 7.27 |

| h\θ | 0 | 45 | 90 | 135 | 180 | 225 | 270 | 315 |
|---|---|---|---|---|---|---|---|---|
| | | | | $C_1(h, \theta)$ | | | | |
| 0.0 | 5.70 | 7.16 | 5.70 | 4.23 | 5.70 | 7.16 | 5.70 | 4.23 |
| 5.0 | 5.68 | 7.07 | 5.71 | 4.31 | 5.68 | 7.06 | 5.66 | 4.25 |
| 10.0 | 5.66 | 6.85 | 5.75 | 4.52 | 5.66 | 6.82 | 5.57 | 4.32 |
| 15.0 | 5.69 | 6.64 | 5.86 | 4.84 | 5.69 | 6.55 | 5.52 | 4.50 |
| 20.0 | 5.85 | 6.58 | 6.11 | 5.25 | 5.85 | 6.38 | 5.60 | 4.78 |
| 25.0 | 6.20 | 6.81 | 6.58 | 5.77 | 6.20 | 6.45 | 5.83 | 5.15 |

| h\θ | 0 | 45 | 90 | 135 | 180 | 225 | 270 | 315 |
|---|---|---|---|---|---|---|---|---|
| | | | | $C_2(h, \theta)$ | | | | |
| 0.0 | 2.76 | 1.26 | 2.76 | 4.27 | 2.76 | 1.26 | 2.76 | 4.27 |
| 5.0 | 2.82 | 1.32 | 2.82 | 4.33 | 2.82 | 1.32 | 2.82 | 4.33 |
| 10.0 | 3.00 | 1.50 | 3.00 | 4.50 | 3.00 | 1.50 | 3.00 | 4.50 |
| 15.0 | 3.30 | 1.80 | 3.30 | 4.80 | 3.30 | 1.80 | 3.30 | 4.80 |
| 20.0 | 3.71 | 2.22 | 3.71 | 5.21 | 3.71 | 2.22 | 3.71 | 5.21 |
| 25.0 | 4.24 | 2.75 | 4.24 | 5.72 | 4.24 | 2.75 | 4.24 | 5.72 |

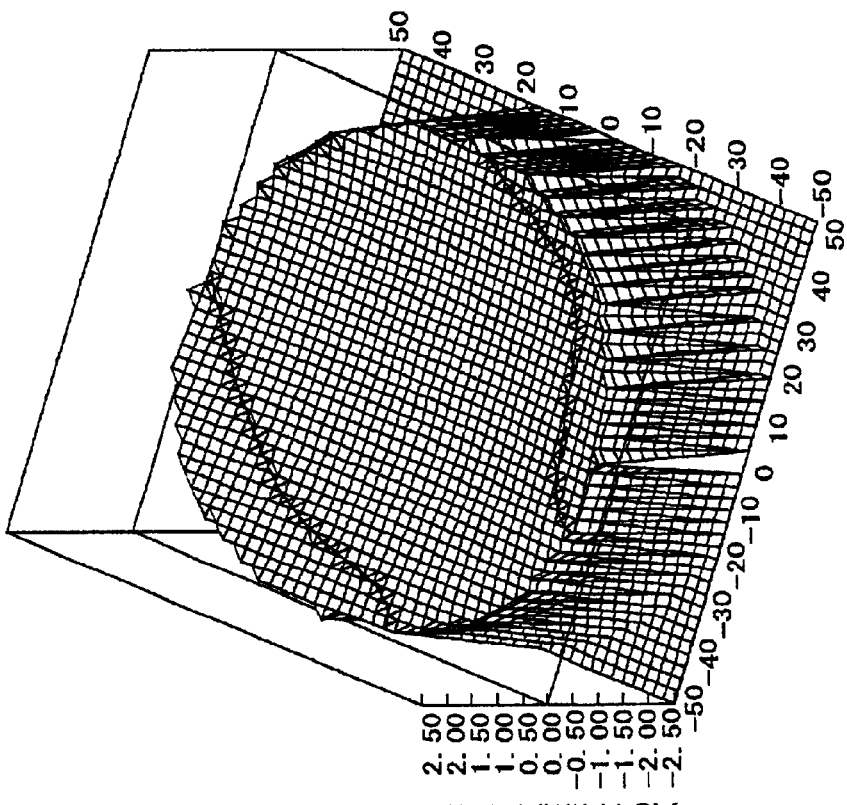
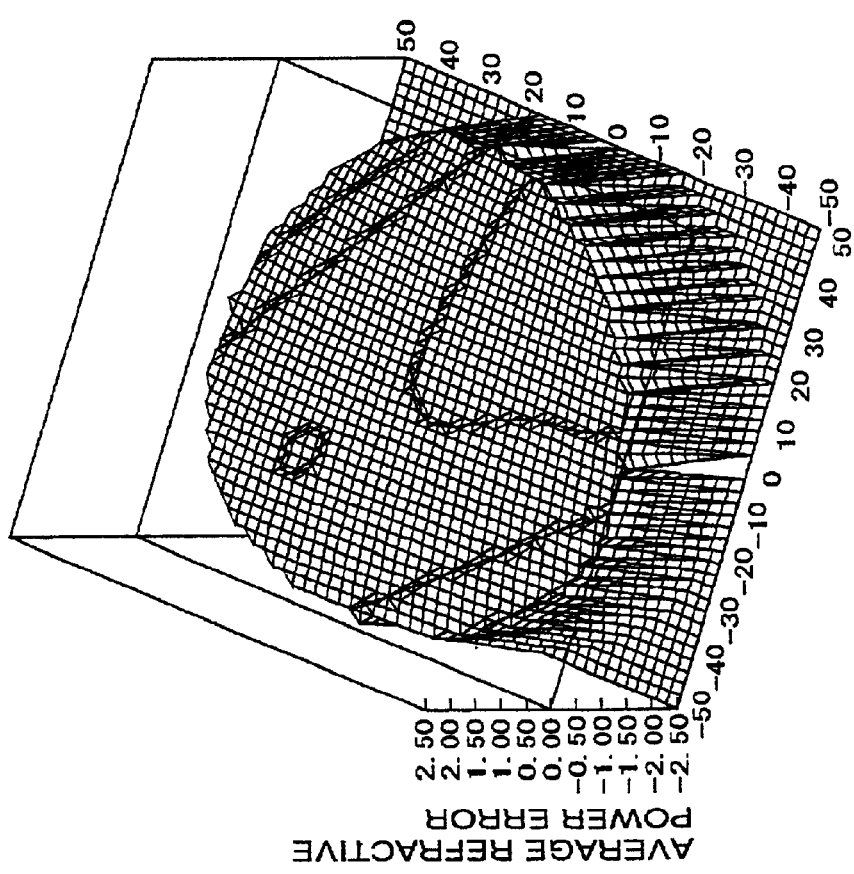

| h\θ | \multicolumn{8}{c|}{$C_1(h, \theta)$} |
|---|---|---|---|---|---|---|---|---|
|  | 0 | 45 | 90 | 135 | 180 | 225 | 270 | 315 |
| 0.0 | 7.17 | 7.17 | 7.17 | 7.17 | 7.17 | 7.17 | 7.17 | 7.17 |
| 5.0 | 7.01 | 7.01 | 7.01 | 7.01 | 7.01 | 7.01 | 7.01 | 7.01 |
| 10.0 | 6.56 | 6.56 | 6.56 | 6.56 | 6.56 | 6.56 | 6.56 | 6.56 |
| 15.0 | 5.93 | 5.93 | 5.93 | 5.93 | 5.93 | 5.93 | 5.93 | 5.93 |
| 20.0 | 5.23 | 5.23 | 5.23 | 5.23 | 5.23 | 5.23 | 5.23 | 5.23 |
| 25.0 | 4.58 | 4.58 | 4.58 | 4.58 | 4.58 | 4.58 | 4.58 | 4.58 |

| h\θ | \multicolumn{8}{c|}{$C_2(h, \theta)$} |
|---|---|---|---|---|---|---|---|---|
|  | 0 | 45 | 90 | 135 | 180 | 225 | 270 | 315 |
| 0.0 | 4.27 | 1.26 | 4.27 | 7.27 | 4.27 | 1.26 | 4.27 | 7.27 |
| 5.0 | 4.27 | 1.26 | 4.27 | 7.27 | 4.27 | 1.26 | 4.27 | 7.27 |
| 10.0 | 4.27 | 1.26 | 4.27 | 7.27 | 4.27 | 1.26 | 4.27 | 7.27 |
| 15.0 | 4.27 | 1.26 | 4.27 | 7.27 | 4.27 | 1.26 | 4.27 | 7.27 |
| 20.0 | 4.28 | 1.26 | 4.28 | 7.27 | 4.28 | 1.26 | 4.28 | 7.27 |
| 25.0 | 4.29 | 1.26 | 4.29 | 7.27 | 4.29 | 1.26 | 4.29 | 7.27 |

ASPHERICAL SPECTACLE LENS WITH PRISMATIC POWER TO CORRECT PHORIA

BACKGROUND OF THE INVENTION

The present invention relates to a single-vision spectacle lens to correct eyesight and particularly, to an aspherical lens having a prismatic power to correct heteophoria (more conventionally known as heterophoria) of an eye.

A spectacle lens for correcting heteophoria (visual axes are deviated during a resting period) has a prismatic power. A conventional aspherical lens produces the prismatic power by tilting a back surface (an eye side) with respect to a front surface (an object side).

FIGS. 113 and 114 show an example of a conventional spectacle lens having a prismatic power; FIG. 113 is a sectional view and FIG. 114 is a plan view from the front surface. A spectacle lens 21 has a rotationally-symmetrical aspherical front surface 22 and a spherical back surface 23. A framing reference point 24 is defined to be coincident with a pupil of an eye 5 of a user when the spectacle lens 21 is installed on a frame. In the drawings, a $z_1$-axis is defined to be coincident with a normal to the front surface 22 at the frame reference point 24, and $x_1$- and $y_1$-axes, which intersect at right angle, are defined in a plane that contacts with the front surface 22 and is perpendicular to the $z_1$-axis. The $y_1$-axis is direction from the base to the apex of the prism and the $x_1$-axis is perpendicular to both of the $y_1$- and $z_1$-axes in a left-hand coordinate system.

The front surface 22 does not tilt with respect to the $x_1$-$y_1$ plane, while the back surface 23 tilts with respect to the $x_1$-$y_1$ plane. As a result, the spectacle lens 21 has a prismatic power whose base setting is the minus direction of the $y_1$-axis.

However, since the above-described conventional spectacle lens is designed through the use of the front surface 22 and the back surface 23 that are originally designed for a lens having no prismatic power and it produces the prismatic power by tilting the front and back surfaces with respect to each other, although it can correct hereophoria, aberration caused by adding the prismatic power is not taken into consideration.

SUMMARY OF THE INVENTION

It is therefore an object of the present invention to provide an aspherical spectacle lens, which is capable of having a sufficient optical performance even if the lens has a prismatic power to correct hereophoria of an eye.

For the above object, the present invention is characterized in that aberration caused by adding a prismatic power is corrected by a rotationally-asymmetrical surface. The aberration caused by adding the prismatic power is rotationally-asymmetrical and therefore, it is difficult to correct the aberration with a rotationally-symmetrical surface. According to the present invention, one of front and back surfaces is formed as a rotationally-asymmetrical aspherical surface, which can correct the aberration caused by adding the prismatic power.

In the case when the back surface is rotationally-asymmetrical, it is preferable that curvature of an intersection line of a plane containing the normal to the rotationally-asymmetrical surface at a framing reference point and the rotationally-asymmetrical surface at the prism base side is larger than that at the apex side. The framing reference point is coincident with a pupil position of a user when the spectacle lens is installed on a frame, and is coincident with a prism reference point for a lens having a prismatic power. On the other hand, when the front surface is rotationally-asymmetrical, it is desirable that the curvature of the intersection line at the prism base side is smaller than that at the apex side.

In more detail, the following condition (1) is preferably satisfied within the ranges of $10 \leq h \leq 20$ and $30 \leq \theta \leq 150$;

$$C_{2-1}(h,\ \theta+180) - C_{2-1}(h,\ \theta) > 0 \qquad (1)$$

where $C_{2-1}(h, \theta) = C_2(h, \theta) - C_1(h, \theta)$;

$C_1(h, \theta)$ is curvature of an intersection line of a plane, which contains a $z_1$-axis and forms angle $\theta$ (degree) with respect to an $x_1$-axis, and the front surface at a point whose distance from a $z_1$-axis is h (mm);

$C_2(h, \theta)$ is curvature of an intersection line of a plane, which contains a $z_2$-axis and forms angle $\theta$ (degree) with respect to an $x_2$-axis, and the back surface at a point whose distance from a $z_2$-axis is h (mm);

$z_1$-axis is a normal to the front surface at the framing reference point;

$y_1$-axis is direction from the base to the apex in a plane perpendicular to the $z_1$-axis;

$x_1$-axis is perpendicular to both of the $y_1$- and $z_1$-axes in a left-hand coordinate system;

$z_2$-axis is a normal to the back surface at the framing reference point;

$y_2$-axis is direction from the base to the apex in a plane perpendicular to the $z_2$-axis; and $x_2$-axis is perpendicular to both of the $y_2$- and $z_2$-axes in a left-hand coordinate system.

Further, it is preferable that the condition (2) is satisfied when the back surface is rotationally-asymmetrical and that the condition (3) is satisfied when the front surface is rotationally-asymmetrical;

$$C_2(h,\ \theta+180) - C_2(h,\ \theta) > 0 \qquad (2)$$

$$C_1(h,\ \theta+180) - C_1(h,\ \theta) < 0 \qquad (3)$$

Further, in order to respond to various combinations of spherical power, cylindrical power, cylindrical axis direction, prismatic power and base setting, it is desirable that semifinished lens blanks whose front surfaces are finished are stockpiled and a back surface of the selected semifinished lens blank is processed according to the customer's specification in order to shorten delivery times.

DESCRIPTION OF THE ACCOMPANYING DRAWINGS

FIGS. 11A to 16B show data for the spectacle lens of a second embodiment in the same formats as FIGS. 5A to 10B;

FIGS. 17A to 22B show data for the spectacle lens of a first comparative example in the same formats as FIGS. 5A to 10B;

FIGS. 23A to 28B show data for the spectacle lens of a third embodiment in the same formats as FIGS. 5A to 10B;

FIGS. 29A to 34B show data for the spectacle lens of a fourth embodiment in the same formats as FIGS. 5A to 10B;

FIGS. 35A to 40B show data for the spectacle lens of a second comparative example in the same formats as FIGS. 5A to 10B;

FIGS. 41A to 46B show data for the spectacle lens of a fifth embodiment in the same formats as FIGS. 5A to 10B;

FIGS. 47A to 52B show data for the spectacle lens of a sixth embodiment in the same formats as FIGS. 5A to 10B;

FIGS. 53A to 58B show data for the spectacle lens of a third comparative example in the same formats as FIGS. 5A to 10B;

FIGS. 59A to 64B show data for the spectacle lens of a seventh embodiment in the same formats as FIGS. 5A to 10B;

FIGS. 65A to 70B show data for the spectacle lens of a eighth embodiment in the same formats as FIGS. 5A to 10B;

FIGS. 71A to 76B show data for the spectacle lens of a fourth comparative example in the same formats as FIGS. 5A to 10B;

FIGS. 77A to 82B show data for the spectacle lens of a ninth embodiment in the same formats as FIGS. 5A to 10B;

FIGS. 83A to 88B show data for the spectacle lens of a tenth embodiment in the same formats as FIGS. 5A to 10B;

FIGS. 89A to 94B show data for the spectacle lens of a fifth comparative example in the same formats as FIGS. 5A to 10B;

FIGS. 95A to 100B show data for the spectacle lens of an eleventh embodiment in the same formats as FIGS. 5A to 10B;

FIGS. 101A to 106B show data for the spectacle lens of a twelfth embodiment in the same formats as FIGS. 5A to 10B;

FIGS. 107A to 112B show data for the spectacle lens of a sixth comparative example in the same formats as FIGS. 5A to 10B;

DESCRIPTION OF THE EMBODIMENTS

An aspherical spectacle lens embodying the present invention will be described hereinafter. First, general constructions of spectacle lenses embodying the invention will be described with reference to FIGS. 1 to 4, and then concrete examples will be described.

Figure 1:
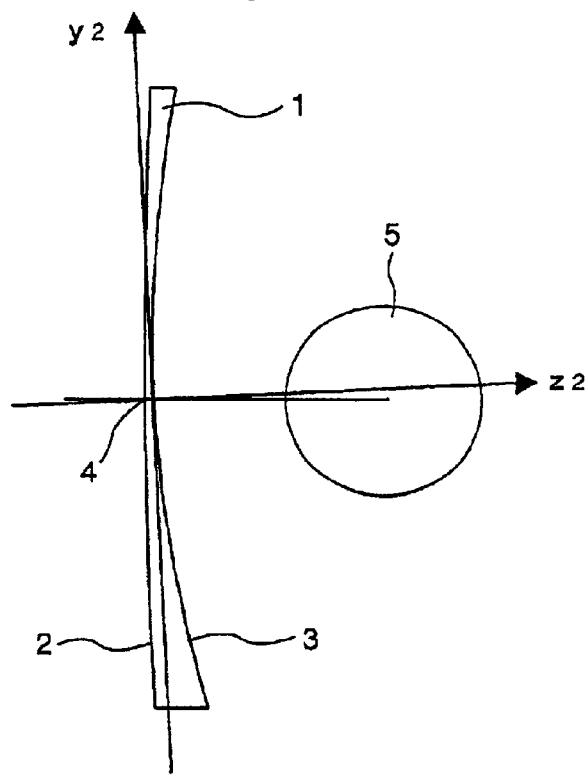
FIG. 1 is a side sectional view of a spectacle lens embodying the invention whose back surface is rotationally-asymmetrical.
Figure 2:
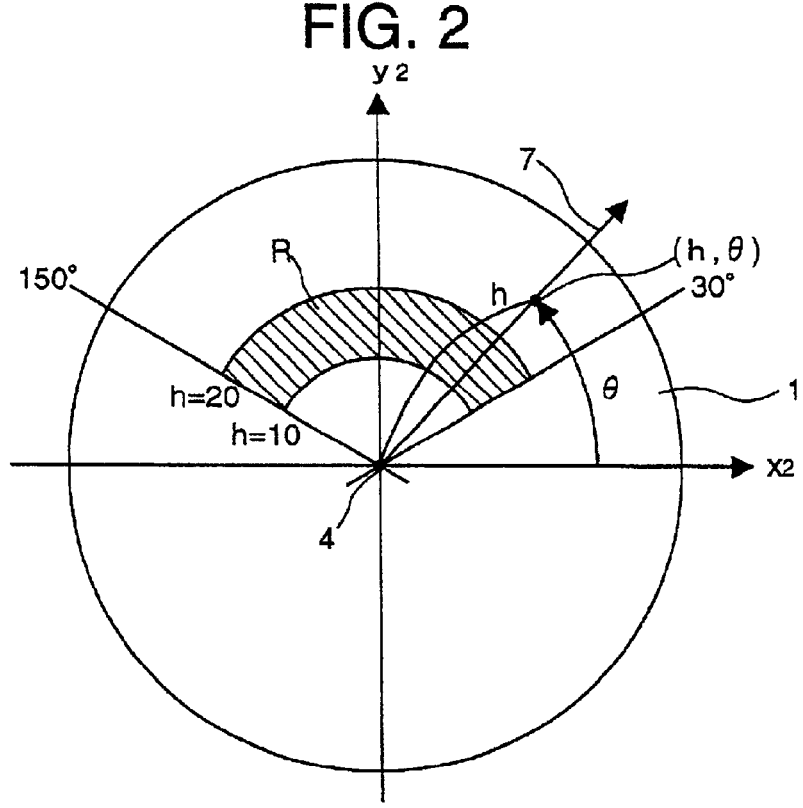
FIG. 2 is a front view of the spectacle lens of FIG. 1.

FIGS. 1 and 2 show a spectacle lens 1 whose front surface 2 is spherical and back surface 3 is rotationally-asymmetrical; FIG. 1 is a sectional view and FIG. 2 is a plane view from the front surface 2. On the spectacle lens 1, a framing reference point 4 is defined to be coincident with a pupil of an eye 5 of a user when the lens 1 is installed on a frame.

In the drawings, an $x_2$-$y_2$-$z_2$ coordinate system whose origin is coincident with the framing reference point 4 is set for defining the back surface 3. The $z_2$-axis is a normal to the back surface 3 at the framing reference point 4. The $x_2$- and $y_2$-axes intersect at right angle in a plane that is perpendicular to the $z_2$-axis and contacts with the back surface 3 at the framing reference point 4. The $y_2$-axis is a direction from the base to the apex of the prism, and the $x_2$-axis is perpendicular to both of the $y_2$- and $z_2$-axes in a left-hand coordinate system.

The back surface 3 does not tilt with respect to the $x_2$-$y_2$ plane, while the front surface 2 tilts with respect to the $x_2$-$y_2$ plane. Assuming that the $x_2$-axis is coincident with the horizontal direction and the $y_2$-axis is coincident with the vertical axis under an as-worn condition, the spectacle lens 1 contains a prism whose base is located at down-side and apex is located at up-side, which is indicated as a "base-down" prismatic power.

The aspherical spectacle lens 1 corrects aberration caused by adding the prismatic power by employing the rotationally-asymmetrical shape of the back surface 3. Namely, curvature of an intersection line 7 of a plane containing the normal to the back surface 3 at the framing reference point 4, which is the $z_2$-axis, and the back surface 3 at the prism base side (the down-side in the drawings) is larger than that at the apex side (the up-side). This setting corrects the aberration.

As shown in FIG. 2, a polar coordinate (h, θ) and curvature $C_2(h, θ)$ at the point (h, θ) are defined. $C_2(h, θ)$ is the curvature of the intersection line 7 of a plane, which contains a $z_2$-axis and forms angle θ (degree) with respect to the $x_2$-axis, and the back surface 3 at a point whose distance from the $z_2$-axis is h (mm). The angle θ of the plus direction of the $x_2$-axis equals 0° and it increases with the counter-clockwise rotation toward the apex side (the plus direction of the $y_2$-axis).

The aspherical spectacle lens 1 satisfies the condition (2) within the range of 10≦h≦20 and 30≦θ≦150 that is indicated as an area R with a hatch pattern shown in FIG. 2;

$$C_2(h, θ+180) - C_2(h, θ) > 0 \quad (2)$$

The value of $C_2(h, θ)$ is equal to a curvature at the point in the area R (the apex side) and the value of $C_2(h, θ+180)$ is equal to a curvature at the symmetric point (the base side) with respect to the origin. The condition (2) represents that the curvature at the point in the area R is smaller than the curvature at the symmetric point with respect to the origin. In the other words, it means that the curvature at the prism base side is larger than that at the apex side.

When the spectacle lens contains a cylindrical power to correct astigmatism of an eye, the addition cylindrical powers at a pair of symmetric points with respect to the origin are identical, which allows for satisfaction of the condition (2) irrespective of the cylindrical power.

For the spectacle lens 1 whose back surface 3 is rotationally-asymmetrical, the aberration caused by adding the prismatic power can be well corrected when the curvatures between the prism base side and the apex side are determined so as to satisfy the condition (2).

Figure 3:
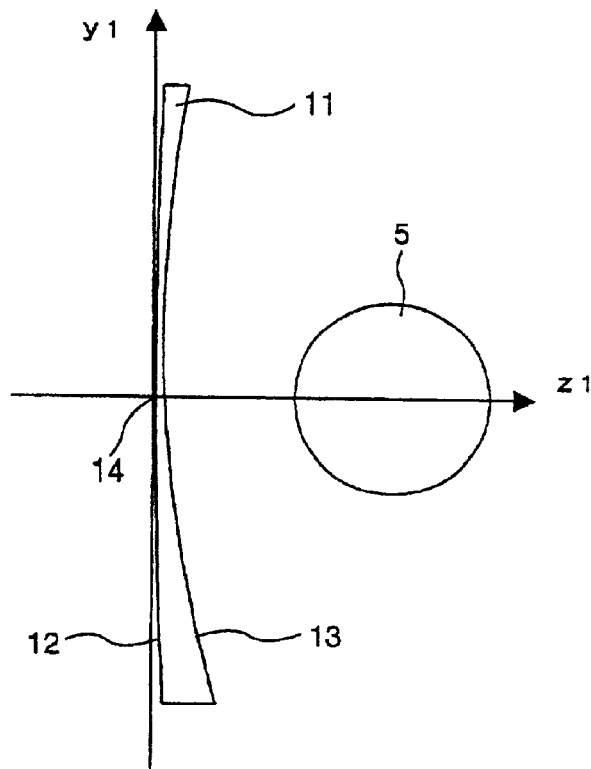
FIG. 3 is a side sectional view of a spectacle lens embodying the invention whose front surface is rotationally-asymmetrical.
Figure 4:
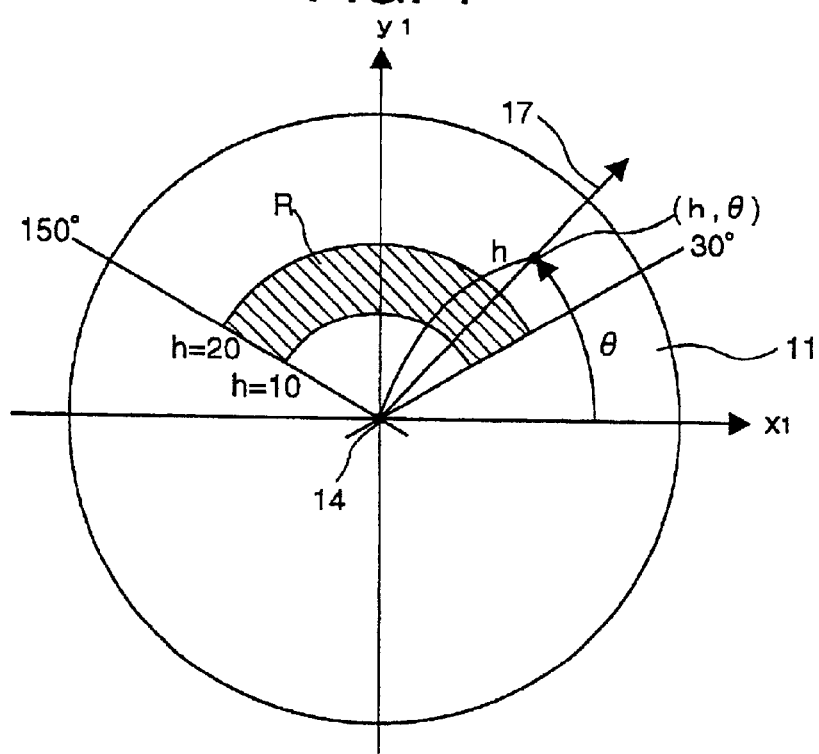
FIG. 4 is a front view of the spectacle lens of FIG. 3.

FIGS. 3 and 4 show a spectacle lens 11 whose front surface 12 is rotationally-asymmetrical and back surface 13 is spherical; FIG. 3 is a sectional view and FIG. 4 is a plane view from the front surface 12. On the spectacle lens 11, a framing reference point 14 is defined to be coincident with a pupil of an eye 5 of a user when the lens 11 is installed on a frame.

In the drawings, an $x_1$-$y_1$-$z_1$ coordinate system whose origin is coincident with the framing reference point 14 is set for defining the front surface 12. The $z_1$-axis is a normal to the front surface 12 at the framing reference point 14. The $x_1$- and $y_1$-axes intersect at right angle in a plane that is perpendicular to the $z_1$-axis and contacts with the front surface 12 at the framing reference point 14. The $y_1$-axis is a direction from the base to the apex of the prism, and the $x_1$-axis is perpendicular to both of the $y_1$- and $z_1$-axes in a left-hand coordinate system.

The front surface 12 does not tilt with respect to the $x_1$-$y_1$ plane, while the back surface 13 tilts with respect to the $x_1$-$y_1$ plane. Assuming that the $x_1$-axis is coincident with the horizontal direction and the $y_1$-axis is coincident with the vertical axis under an as-worn condition, the spectacle lens 11 contains a prism whose base is located at down-side and apex is located at up-side, which is indicated as a "base-down" prismatic power.

The aspherical spectacle lens 11 corrects aberration caused by adding the prismatic power by employing the rotationally-asymmetrical shape of the front surface 12. Namely, curvature of an intersection line 17 of a plane containing the normal to the front surface 12 at the framing reference point 14, which is the $z_1$-axis, and the front surface 12 at the prism base side (the down-side in the drawings) is smaller than that at the apex side (the up-side). This setting corrects the aberration.

As shown in FIG. 4, a polar coordinate (h, θ) and curvature $C_1$(h, θ) at the point (h, θ) are defined. $C_1$(h, θ) is the curvature of the intersection line 17 of a plane, which contains a $z_1$-axis and forms angle θ (degree) with respect to the $x_1$-axis, and the front surface 12 at a point whose distance from the $z_1$-axis is h (mm). The angle θ of the plus direction of the $x_1$-axis equals 0° and it increases with the counterclockwise rotation toward the apex side (the plus direction of the $y_1$-axis).

The aspherical spectacle lens 11 satisfies the condition (3) within the range of 10≦h≦20 and 30≦θ≦150 that is indicated as an area R with a hatch pattern shown in FIG. 4;

$$C_1(h, \theta+180) - C_1(h, \theta) < 0 \quad (3)$$

The value of $C_1$(h, θ) is equal to a curvature at the point in the area R (the apex side) and the value of $C_1$(h, θ+180) is equal to a curvature at the symmetric point (the base side) with respect to the origin. The condition (3) represents that the curvature at the point in the area R is larger than the curvature at the symmetric point with respect to the origin. In the other words, it means that the curvature at the prism base side is smaller than that at the apex side.

For the spectacle lens 11 whose front surface 12 is rotationally-asymmetrical, the aberration caused by adding the prismatic power can be well corrected when the curvatures between the prism base side and the apex side are determined so as to satisfy the condition (3).

Further, the conditions (2) and (3) can be generalized to a condition (1). That is, the spectacle lenses 1 and 11 satisfy the following condition (1) within the range of 10≦h≦20 and 30≦θ≦150;

$$C_{2-1}(h, \theta+180) - C_{2-1}(h, \theta) > 0 \quad (1)$$

where $C_{2-1}$(h, θ) = $C_2$(h, θ) − $C_1$(h, θ).

The value of $C_{2-1}$(h, θ) is equal to a curvature difference at the point in the area R (the apex side) and the value of $C_{2-1}$(h, θ+180) is equal to a curvature difference at the symmetric point with respect to the origin (the base side). The condition (1) represents that the curvature difference at the point in the area R is smaller than the curvature difference at the symmetric point with respect to the origin. In other words, it means that the curvature difference at the prism base side is larger than that at the apex side.

The aberration caused by adding the prismatic power can be well corrected when the curvature differences between the prism base side and the apex side are determined so as to satisfy the condition (1).

Next, twenty embodiments of the spectacle lens embodying the present invention will be described. In the following description, twelve embodiments and six comparative examples will be described as compared with each other. In first, third, fifth, sixth, seventh, eighth, ninth and eleventh embodiments, a back surface has a rotationally-asymmetrical component to correct aberration caused by adding a prismatic power. In second, fourth, tenth and twelfth embodiments, a front surface has the rotationally-asymmetrical component for the correction. Spectacle lenses of the comparative examples has a rotationally-symmetrical aspherical front surface and a spherical or a toric back surface. The lenses of the comparative examples produce the prismatic power by tilting the front surface with respect to the back surface in the same manner as the conventional spectacle lens.

Further, two embodiments and one comparative example are designed for the same specification. For instance, the first and second embodiments and the first comparative example are designed for the same specification, the third and fourth embodiments and the second comparative example are designed for the same specification. Refractive index of lens material equals 1.67 in all of the embodiments and the comparative examples.

First Embodiment

The spectacle lenses of the first and second embodiments and the first comparative example are designed for satisfying the specification shown in TABLE 1. Each of these lenses has a prismatic power to correct hereophoria while they do not have a cylindrical power to correct astigmatism. In TABLE, SPH denotes a vertex spherical power, CYL denotes a cylindrical power, AX denotes a direction of the cylinder axis, PRS denotes a prismatic power and BASE denotes a base setting of the prism. Unit of the prismatic power is Δ (Prism Diopter).

TABLE 1

| | |
|---|---|
| SPH | −4.00 Diopter |
| CYL | 0.00 Diopter |
| AX | — |
| PRS | 3.00 Δ |
| BASE | 270° Base Down |

Figures 5A, 5B, 6:
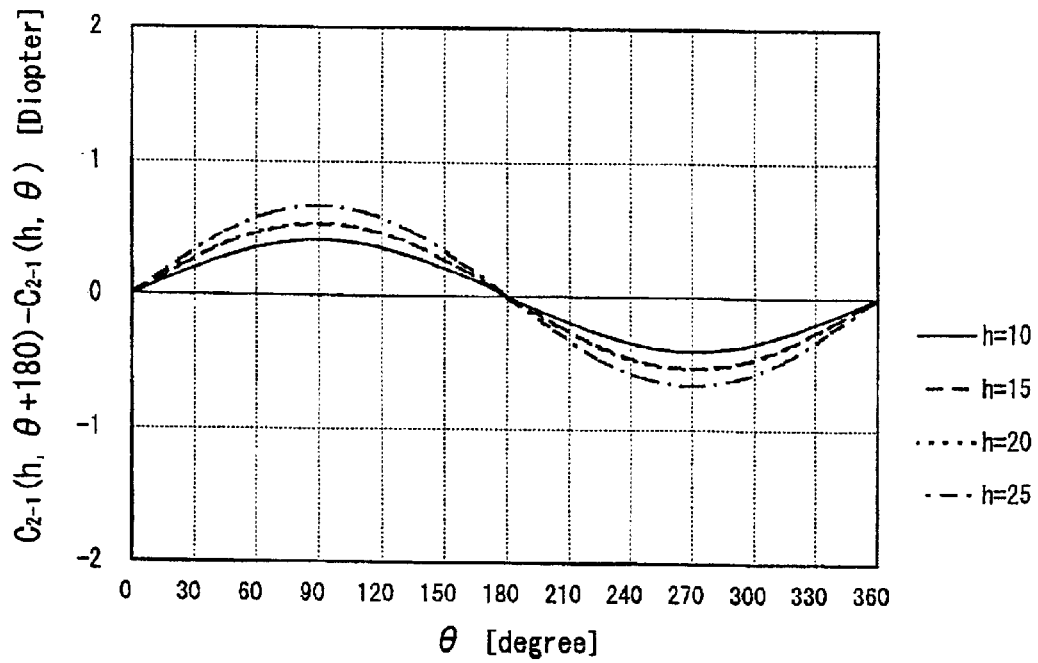
FIGS. 5A and 5B are tables showing distributions of curvature of the front and back surfaces, respectively, for the spectacle lens of a first embodiment.
FIG. 6 is a graph showing variation of values of condition (1) with respect to variation of the angle $\theta$ for the spectacle lens of the first embodiment.

The aspherical spectacle lens of the first embodiment satisfies the specification of TABLE 1, the front surface is a spherical surface that has a uniform curvature 1.35 Diopter as shown in FIG. 5A, and the back surface is a rotationally-asymmetrical aspherical surface whose curvature at the framing reference point is distributed among 7.35 to 7.36 Diopter as shown in FIG. 5B. The tables in FIGS. 5A and 5B show distributions of the curvatures $C_1(h, \theta)$ and $C_2(h, \theta)$ of the front and back surfaces in the direction of the intersection line at the polar coordinate $(h, \theta)$ where h is a distance (mm) from the origin and $\theta$ is an angle with respect to the $x_1$-axis or $x_2$-axis. The center thickness of the lens of the first embodiment is 1.10 mm.

FIG. 6 is a graph showing variation of $C_{2-1}(h, \theta+180) - C_{2-1}(h, \theta)$ that is left side of the condition (1) with respect to variation of the angle $\theta$ for the distances h=10, 15, 20 and 25 mm. In order to correct the aberration caused by adding the prismatic power, the values of the left side of the condition (1) rise to maximums at $\theta=90°$ and are reduced to minimums at $\theta=270°$ for all of the distances h=10, 15, 20 and 25 mm. The amplitude of the variation increases as the distance h becomes larger. FIG. 6 shows that the values indicated in the graph are larger than zero in the range of $30 \leq \theta \leq 150$ for all of the distances h=10, 15, 20 and 25 mm. Namely, the aspherical spectacle lens of the first embodiment satisfies the condition (1).

Figure 7:
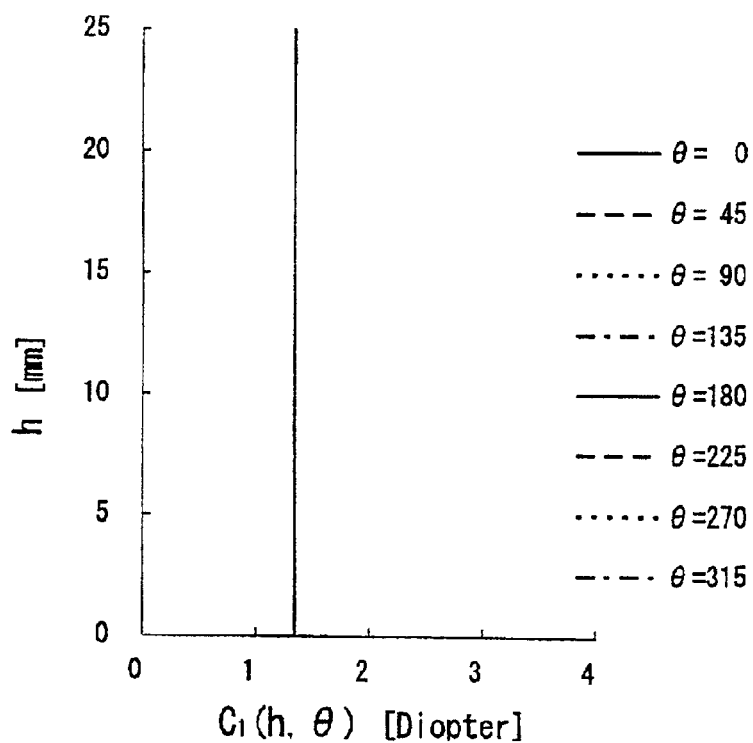
FIGS. 7A and 7B are graphs showing variations of curvatures of the front and back surfaces, respectively, with respect to variation of the distance h from the framing reference point for the spectacle lens of the first embodiment.
Figure 7:
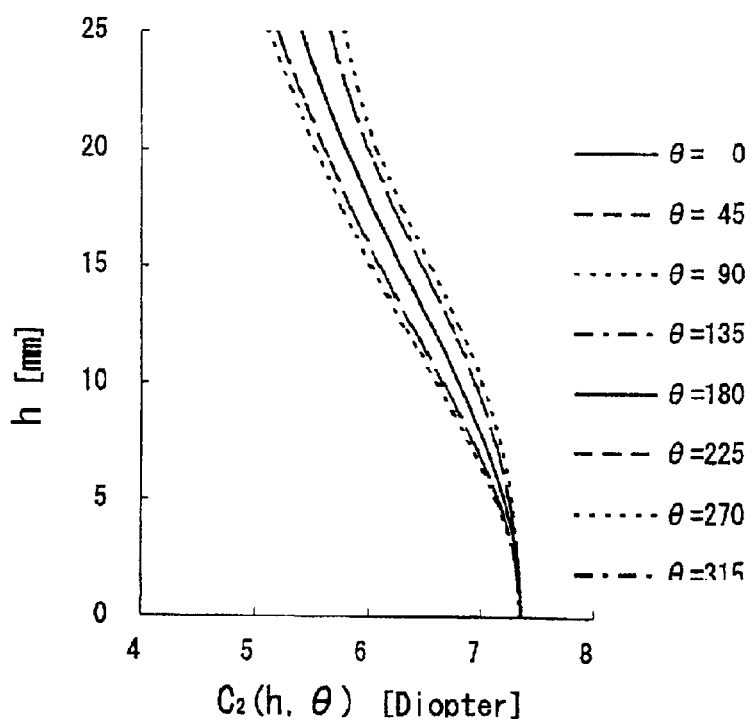

FIGS. 7A and 7B are graphs showing variations of curvatures $C_1(h, \theta)$ and $C_2(h, \theta)$ of the front and back surfaces, respectively, with respect to variation of the distance h from the framing reference point for the angle $\theta=0°$, $\theta=45°$, $\theta=90°$, $\theta=135°$, $\theta=180°$, $\theta=225°$, $\theta=270°$ and $\theta=315°$. Since the front surface is spherical, the curvature $C_1(h, \theta)$ does not vary according to variations of the distance h and the angle $\theta$, the graph of FIG. 7A shows the straight lines overlapped to each other. Since the back surface is rotationally-asymmetrical, the curvature $C_2(h, \theta)$ varies according to variations of the distance h and the angle $\theta$. In the graph of FIG. 7B, the curve of $\theta=90°$, the overlapped curves of $\theta=45°$ and $135°$, the overlapped curves of $\theta=0°$ and $180°$, the overlapped curves of $\theta=225°$ and $315°$ and the curve of $\theta=270°$ are arranged in increasing order of curvature, that is, from the left side in the graph.

Figure 8:
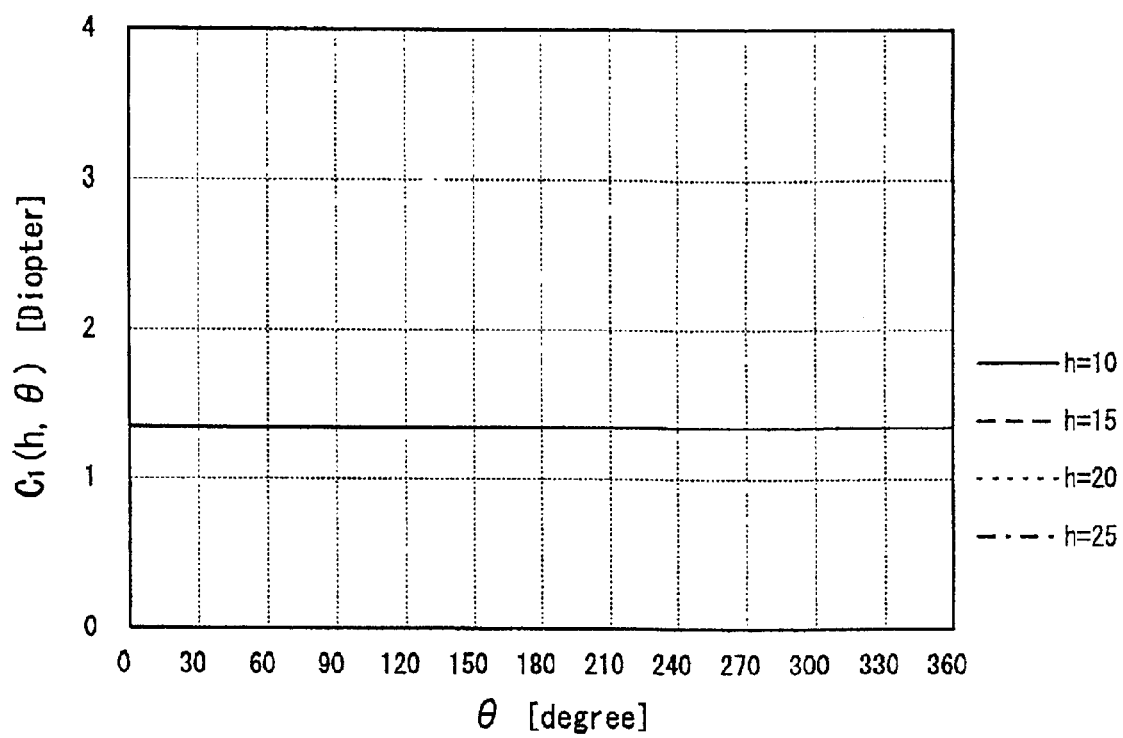
FIGS. 8A and 8B are graphs showing variations of curvatures of the front and back surfaces, respectively, with respect to variation of the angle θ for the spectacle lens of the first embodiment.
Figure 8:
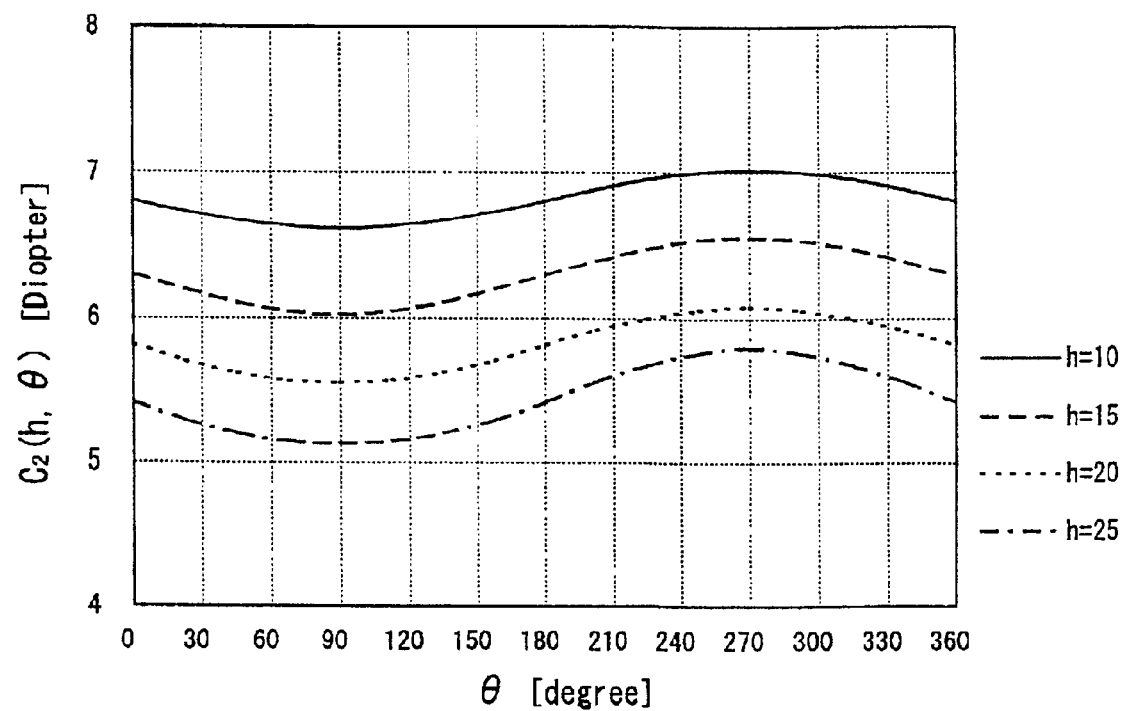

FIGS. 8A and 8B are graphs showing variations of curvatures $C_1(h, \theta)$ and $C_2(h, \theta)$ of the front and back surfaces, respectively, with respect to variation of the angle $\theta$ for the distances h=10, 15, 20 and 25 mm. Since the front surface is spherical, the curvature $C_1(h, \theta)$ does not vary according to variations of the distance h and the angle $\theta$, the graph of FIG. 8A shows the straight lines overlapped to each other. In order to correct the aberration caused by adding the base-down prismatic power, the curvatures $C_2(h, \theta)$ of the back surface are reduced to minimums at $\theta=90°$ and rise to maximums at $\theta=270°$ for all of the distances h=10, 15, 20 and 25 mm as shown in FIG. 8B. The longer the distance h is, the smaller the curvature $C_2(h, \theta)$ is.

Figure 9A:
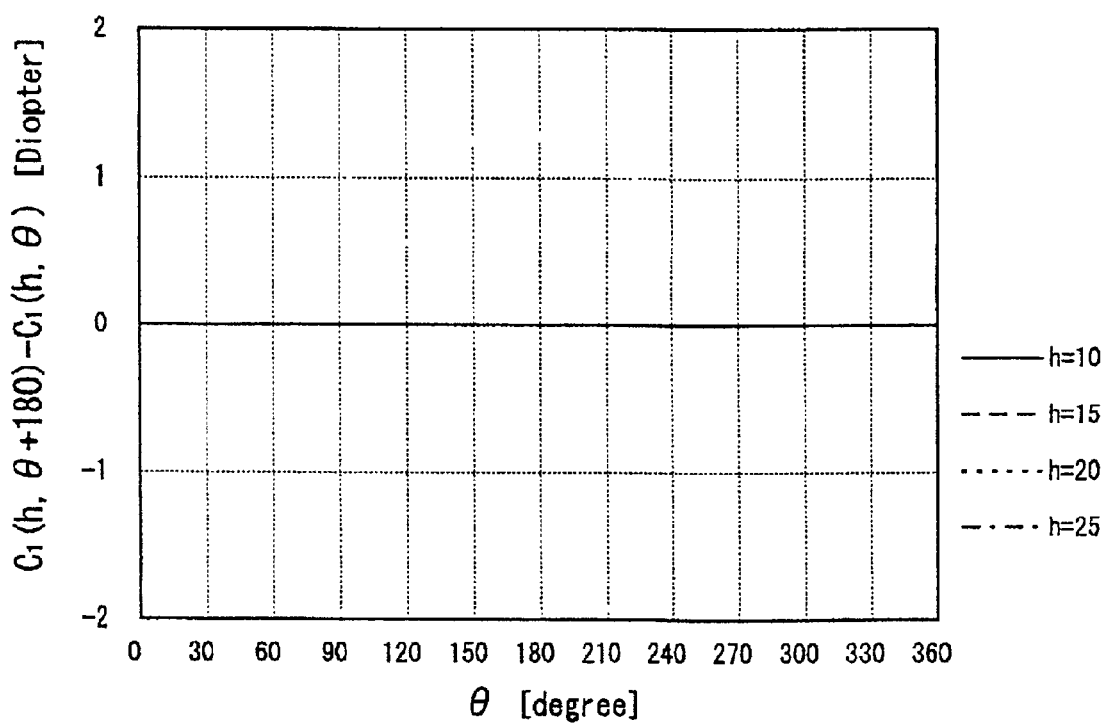
FIGS. 9A and 9B are graphs showing variations of values of the conditions (3) and (2), respectively, with respect to variation of the angle θ for the spectacle lens of the first embodiment.
Figure 9B:
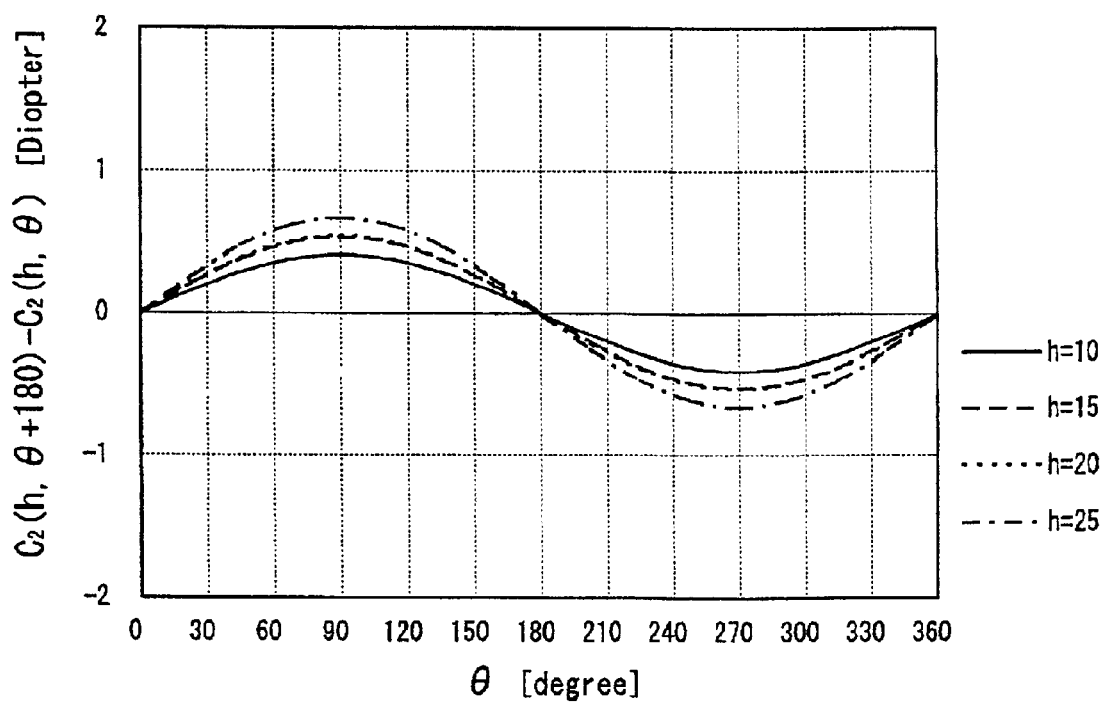

Further, FIGS. 9A and 9B are graphs showing variations of $C_1(h, \theta+180) - C_1(h, \theta)$ that is the left side of the condition (3) and $C_2(h, \theta+180) - C_2(h, \theta)$ that is the left side of the condition (2), respectively, with respect to variation of the angle $\theta$ for the distances h=10, 15, 20 and 25 mm. Since the front surface is spherical, the value of the left side of the condition (3) remains constant. The value of the left side of the condition (2) varies according to variations of the angle $\theta$ and the distance h. For example, the point at $\theta=90°$ on the curve of h=10 mm represents the value $C_2(10, 270) - C_2(10, 90)$. In view of FIG. 5B, $C_2(10, 270)=7.02$ and $C_2(10, 90)=6.61$, then $C_2(10, 270) - C_2(10, 90)=0.41$. FIG. 9B shows that the values indicated in the graph are larger than zero in the range of $30 \leq \theta \leq 150$ for all of the distances h=10, 15, 20 and 25 mm. Namely, the aspherical spectacle lens of the first embodiment satisfies the condition (2).

Figure 10B:
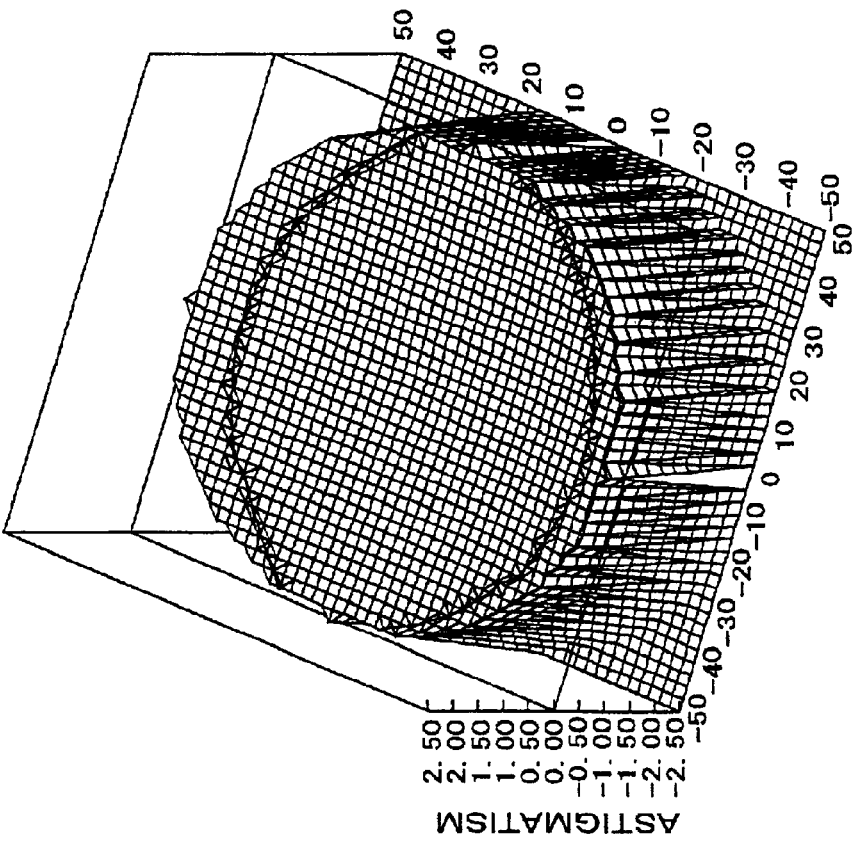
FIGS. 10A and 10B are three-dimension graphs showing an average refractive power error and astigmatism, respectively, of the spectacle lens of the first embodiment.
Figure 10A:
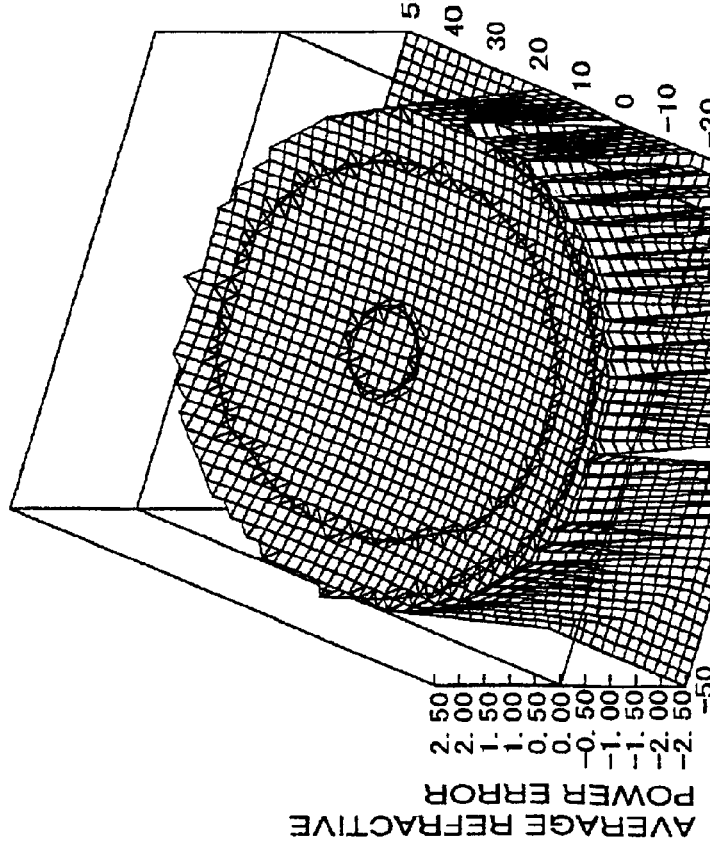

FIGS. 10A and 10B are three-dimension graphs showing transmitting optical performances of the aspherical spectacle lens of the first embodiment; FIG. 10A shows an average refractive power error and FIG. 10B shows astigmatism. In the graphs, plane coordinates represent the angle of visual axis (unit: degree) in the vertical and horizontal directions, respectively, and the vertical axis represents amount of aberration (unit: Diopter).

Second Embodiment

In the same manner as the first embodiment, the aspherical spectacle lens of the second embodiment satisfies the specification of TABLE 1, the front surface is a rotationally-asymmetrical aspherical surface whose curvature at the framing reference point is distributed among 2.44 to 2.45 Diopter as shown in FIG. 11A, and the back surface is a spherical surface that has a uniform curvature 8.46 Diopter as shown in FIG. 11B. The center thickness of the lens of the second embodiment is 1.10 mm.

Figures 11, 12:
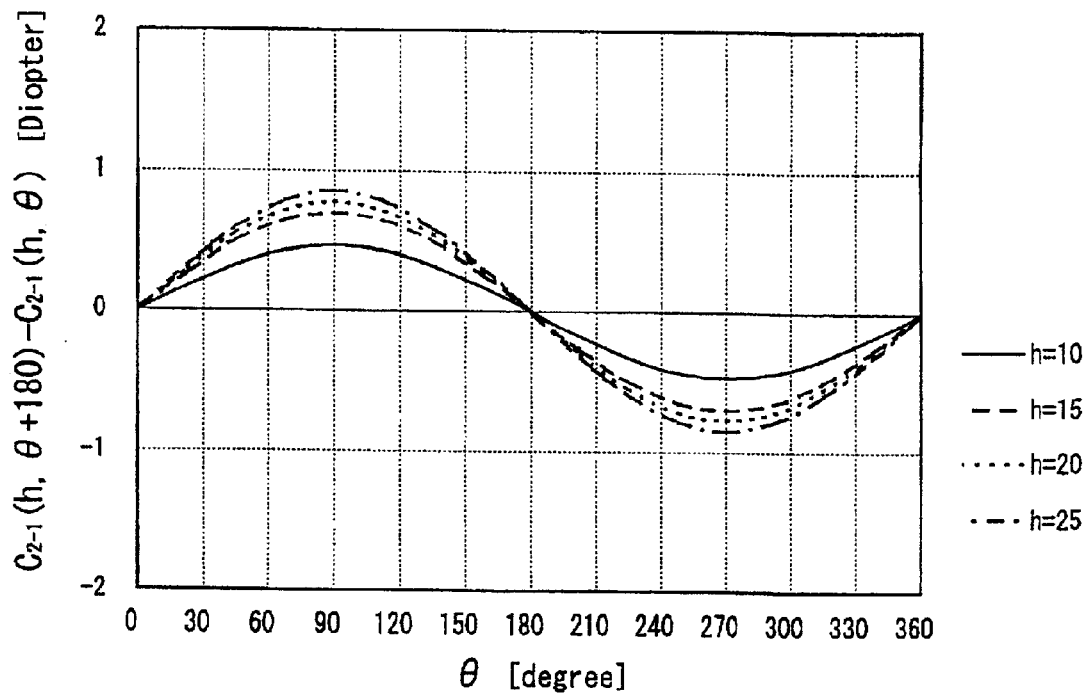

FIG. 12 is a graph showing variation of $C_{2-1}(h, \theta+180) - C_{2-1}(h, \theta)$ that is left side of the condition (1) with respect to variation of the angle $\theta$. In order to correct the aberration caused by adding the prismatic power, the values of the left side of the condition (1) rise to maximums at $\theta=90°$ and are reduced to minimums at $\theta=270°$ for all of the distances h=10, 15, 20 and 25 mm. The amplitude of the variation increases as the distance h becomes larger. FIG. 12 shows that the values indicated in the graph are larger than zero in the range of $30 \leq \theta \leq 150$ for all of the distances h=10, 15, 20 and 25 mm. Namely, the aspherical spectacle lens of the second embodiment satisfies the condition (1).

Figure 13:
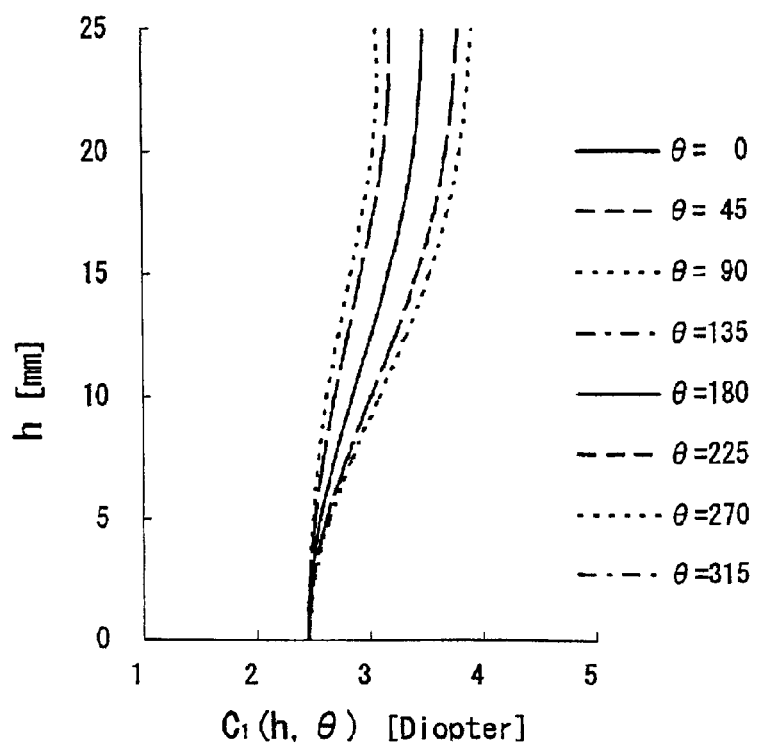
Figure 13:
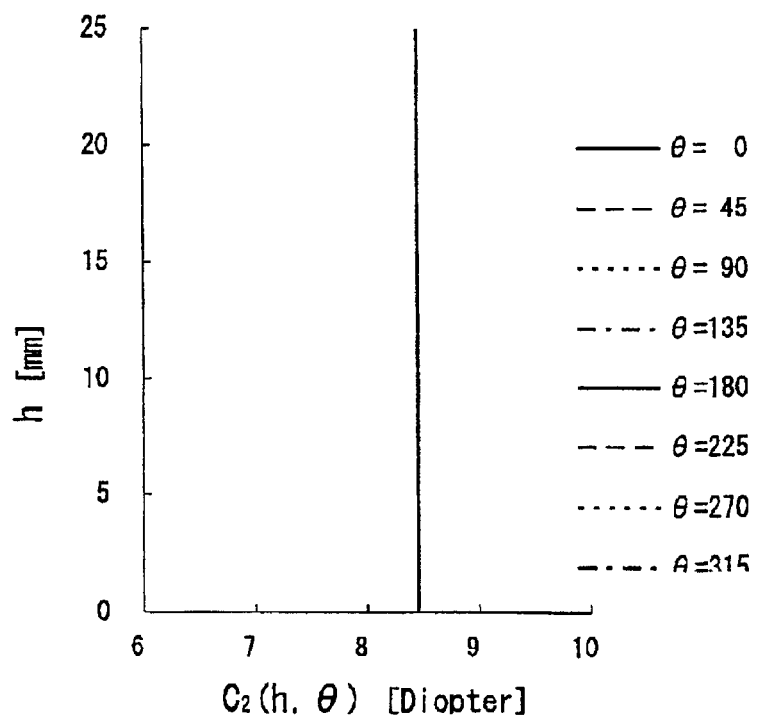

FIGS. 13A and 13B are graphs showing variations of curvatures $C_1(h, \theta)$ and $C_2(h, \theta)$ of the front and back surfaces, respectively, with respect to variation of the distance h from the framing reference point. Since the front surface is rotationally-asymmetrical, the curvature $C_1(h, \theta)$ varies according to variations of the distance h and the angle $\theta$. In the graph of FIG. 13A, the curve of $\theta=270°$, the overlapped curves of $\theta=225°$ and $315°$, the overlapped curves of $\theta=0°$ and $180°$, the overlapped curves of $\theta=45°$ and $135°$ and the curve of $\theta=90°$ are arranged in increasing order of curvature. Since the back surface is spherical, the curvature does not vary according to variations of the distance h and the angle $\theta$, the graph of FIG. 13B shows the straight lines overlapped to each other.

Figure 14:
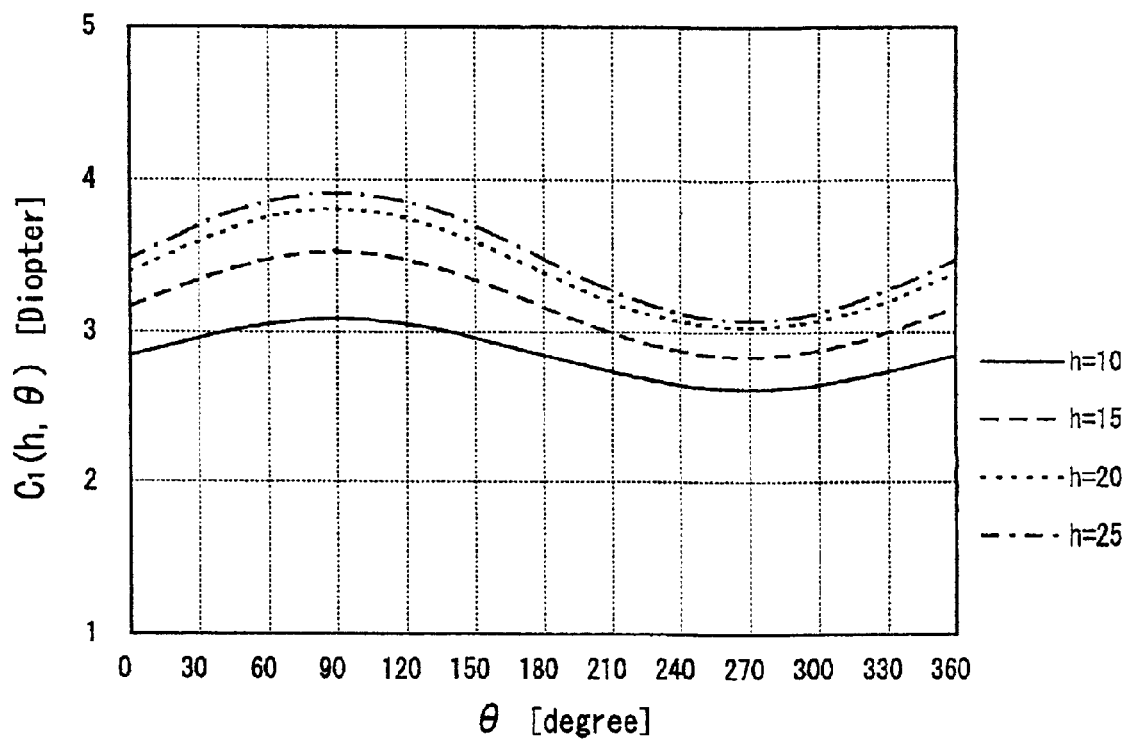
Figure 14:
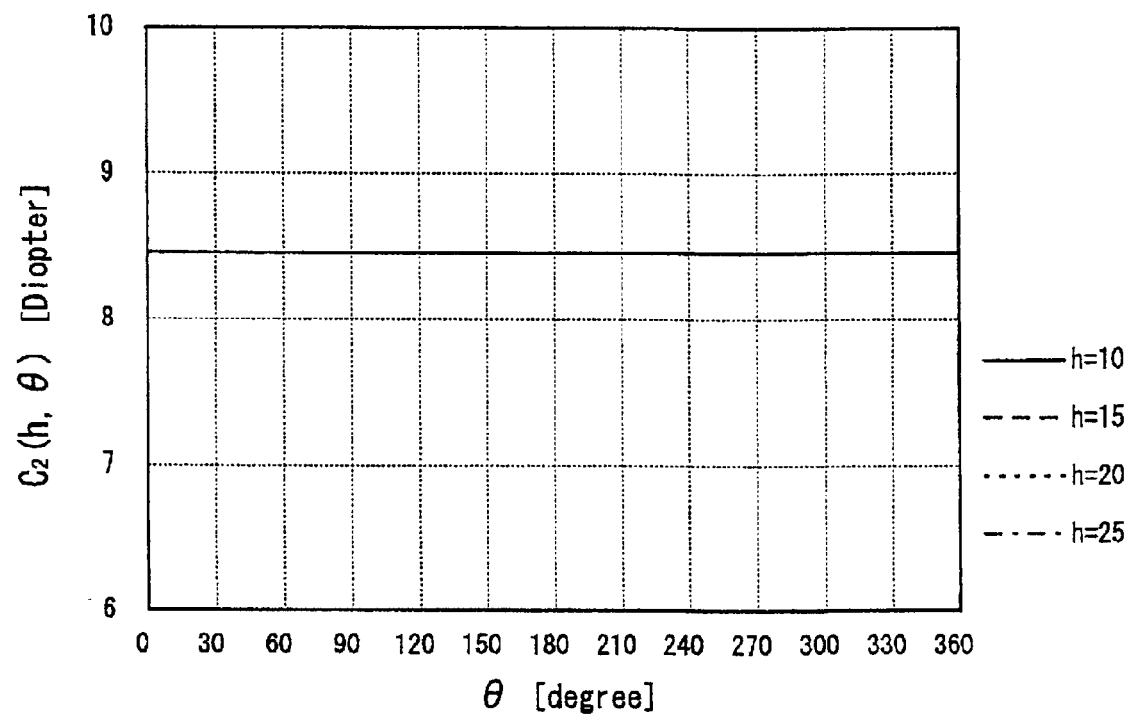

FIGS. 14A and 14B are graphs showing variations of curvatures $C_1(h, \theta)$ and $C_2(h, \theta)$ of the front and back surfaces, respectively, with respect to variation of the angle $\theta$. In order to correct the aberration caused by adding the base-down prismatic power, the curvatures $C_1(h, \theta)$ of the front surface rise to maximums at $\theta=90°$ and are reduced to minimums at $\theta=270°$ for all of the distances h=10, 15, 20 and 25 mm as shown in FIG. 14A. The longer the distance h is, the larger the curvature $C_1(h, \theta)$ is. Since the back surface is spherical, the curvature $C_2(h, \theta)$ does not vary according to variations of the distance h and the angle $\theta$, the graph of FIG. 14B shows the straight lines overlapped to each other.

Figure 15:
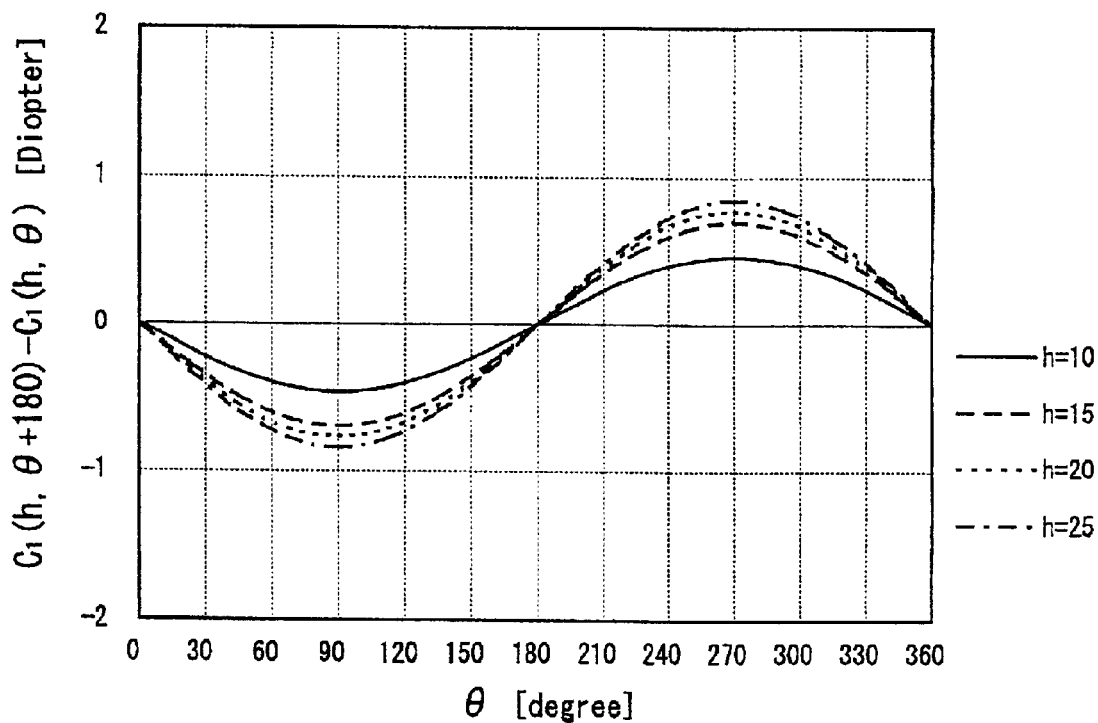
Figure 15:
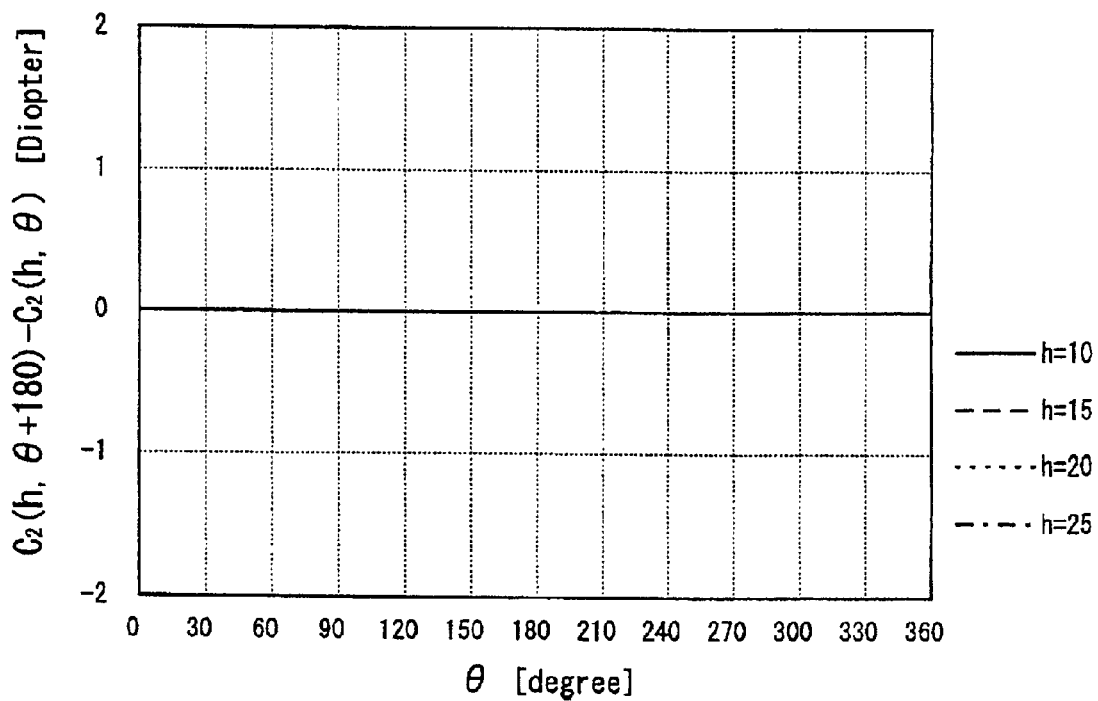

Further, FIGS. 15A and 15B are graphs showing variations of $C_1(h, \theta+180) - C_1(h, \theta)$ that is the left side of the condition (3) and $C_2(h, \theta+180) - C_2(h, \theta)$ that is the left side of the condition (2), respectively, with respect to variation of the angle $\theta$. The values of the left side of the condition (3) vary according to variations of the angle $\theta$ and the distance h. FIG. 15A shows that the values indicated in the graph are smaller than zero in the range of $30 \leq \theta \leq 150$ for all of the distances h=10, 15, 20 and 25 mm. Namely, the aspherical spectacle lens of the second embodiment satisfies the condition (3). Since the back surface is spherical, the values of the left side of the condition (2) remain constant.

Figure 16A:
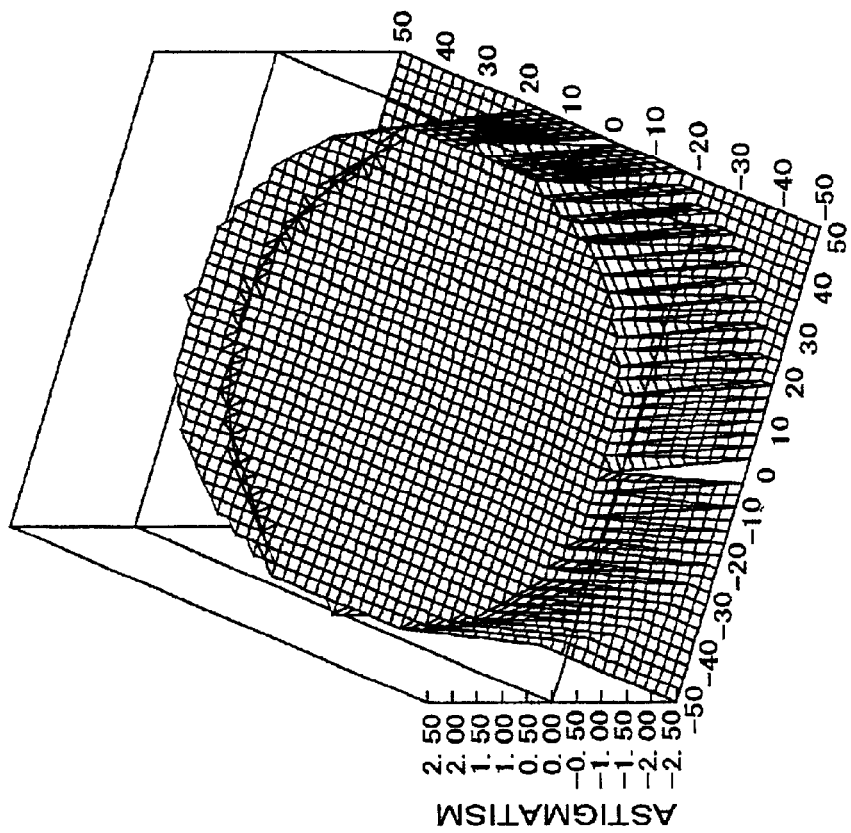
Figure 16B:
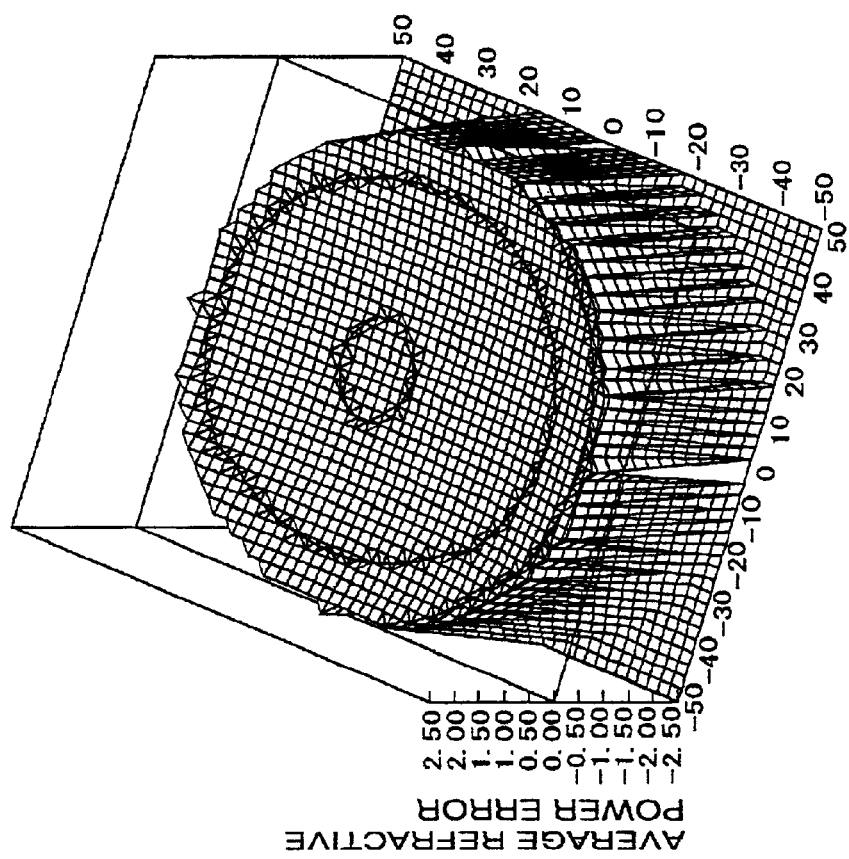

FIGS. 16A and 16B are three-dimension graphs showing transmitting optical performances of the aspherical spectacle lens of the second embodiment; FIG. 16A shows an average refractive power error and FIG. 16B shows astigmatism.

FIRST COMPARATIVE EXAMPLE

In the same manner as the first and second embodiments, the aspherical spectacle lens of the first comparative example satisfies the specification of TABLE 1, the front surface is a rotationally-symmetrical aspherical surface whose curvature at the framing reference point is 2.44 Diopter as shown in FIG. 17A, and the back surface is a spherical surface that has a uniform curvature 8.46 Diopter as shown in FIG. 17B. The center thickness of the lens of the first comparative example is 1.10 mm.

Figures 17, 18:
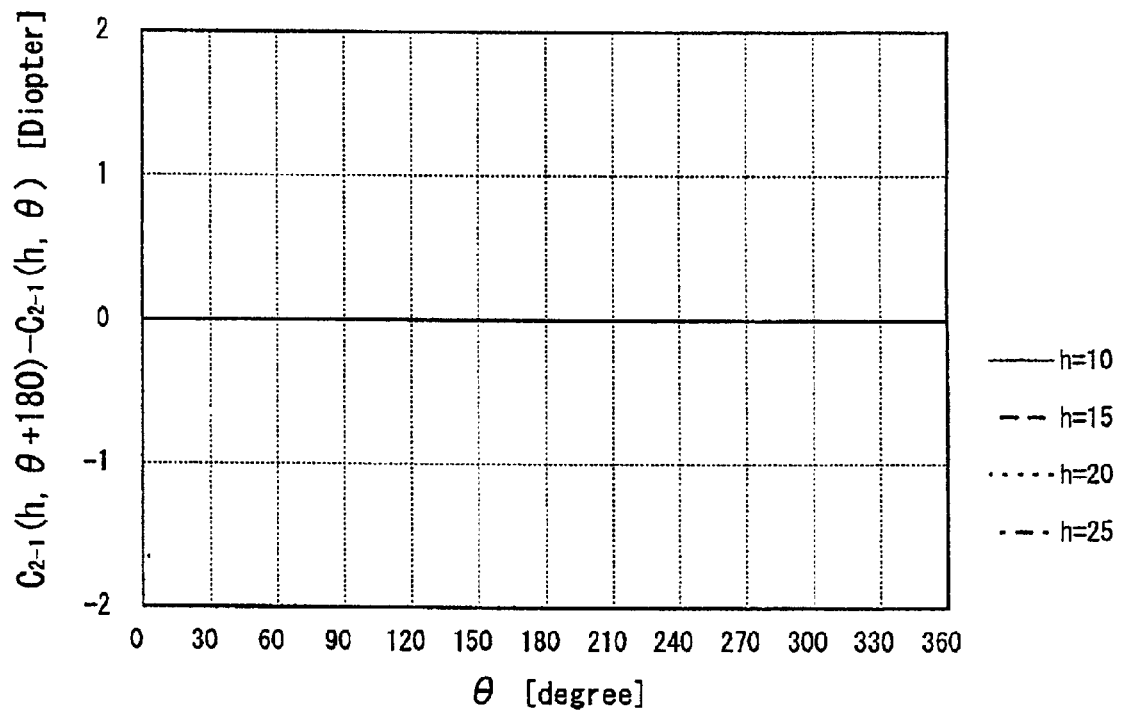

FIG. 18 is a graph showing variation of $C_{2-1}(h, \theta+180) - C_{2-1}(h, \theta)$ that is left side of the condition (1) with respect to variation of the angle $\theta$. Since the front and back surfaces are rotationally-symmetrical, the value of the left side of the condition (1) remains constant. Namely, the aspherical spectacle lens of the first comparative example does not satisfy the condition (1).

Figure 19:
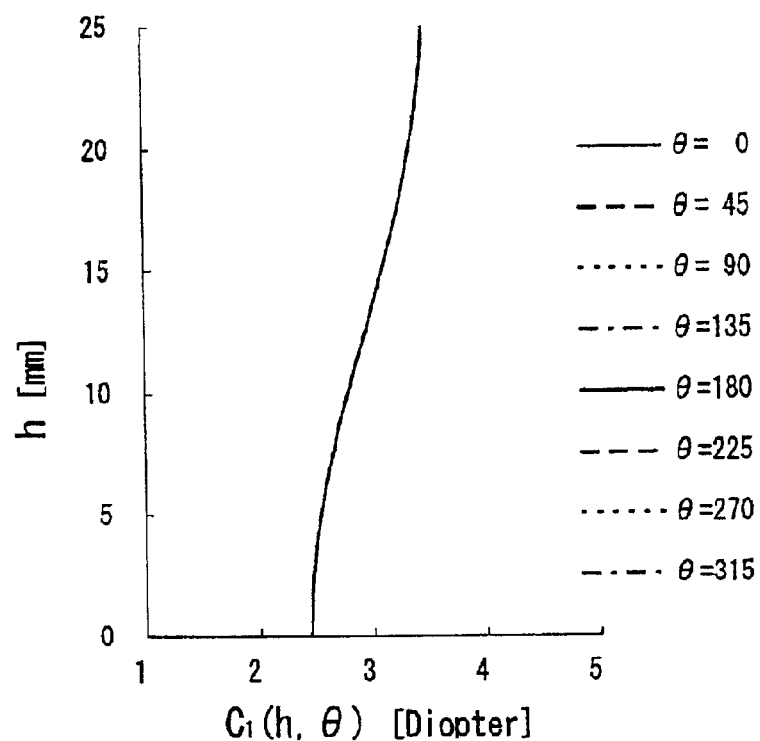
Figure 19:
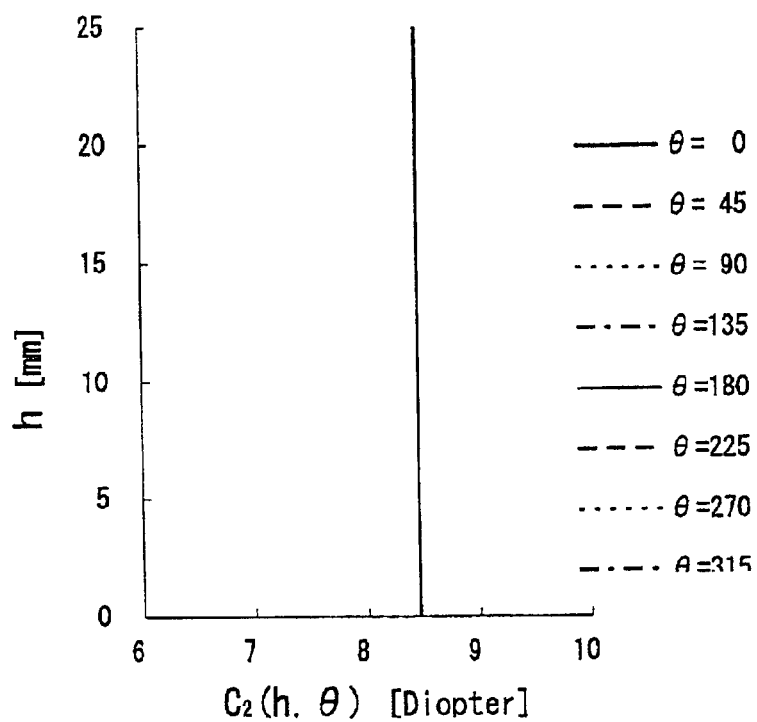

FIGS. 19A and 19B are graphs showing variations of curvatures $C_1(h, \theta)$ and $C_2(h, \theta)$ of the front and back surfaces, respectively, with respect to variation of the distance h from the framing reference point. Since the front surface is a rotationally-symmetrical aspherical surface, the curvature varies according to variation of the distance h while the variation of the angle $\theta$ does not change the curvature. In the graph of FIG. 19A, the curves of all of the angles are overlapped. Since the back surface is spherical, the curvature does not vary according to variations of the distance h and the angle $\theta$, the graph of FIG. 19B shows the straight lines overlapped to each other.

Figure 20:
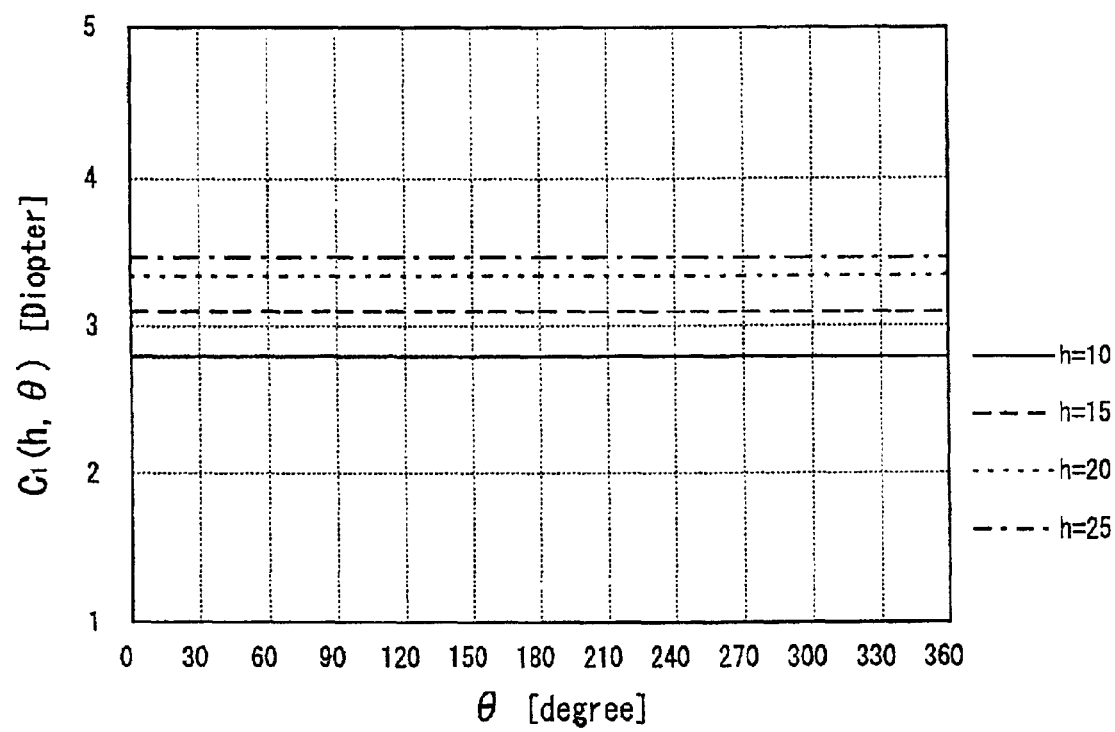
Figure 20:
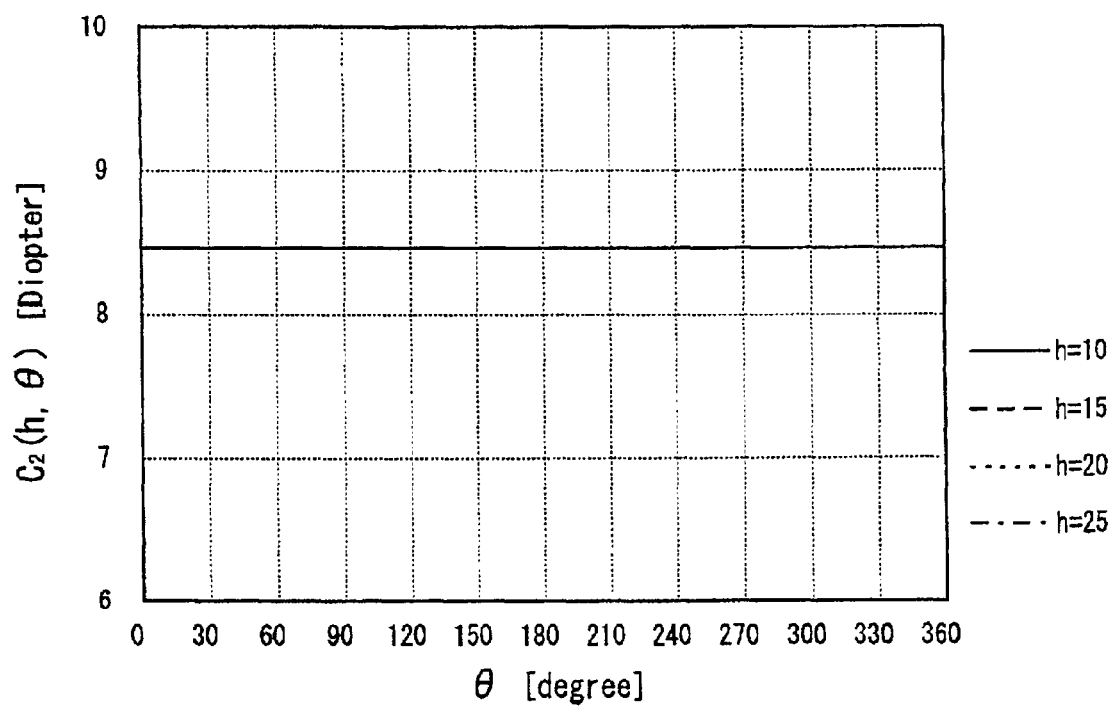

FIGS. 20A and 20B are graphs showing variations of curvatures $C_1(h, \theta)$ and $C_2(h, \theta)$ of the front and back surfaces, respectively, with respect to variation of the angle $\theta$. Since the front surface is a rotationally-symmetrical aspherical surface, the curvatures $C_1(h, \theta)$ are different in response to the distance h and do not vary according to variation of the angle $\theta$, the curvatures are shown as independent straight lines. Since the back surface is spherical, the curvature $C_2(h, \theta)$ does not vary according to variations of the distance h and the angle $\theta$, the graph of FIG. 20B shows the straight lines overlapped to each other.

Figure 21:
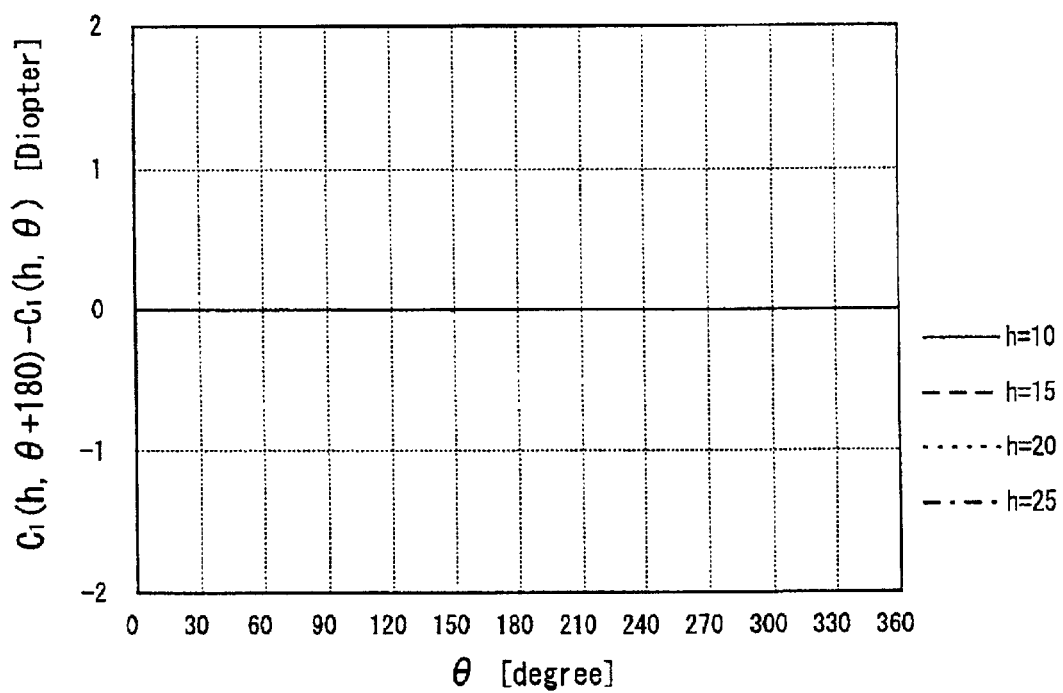
Figure 21:
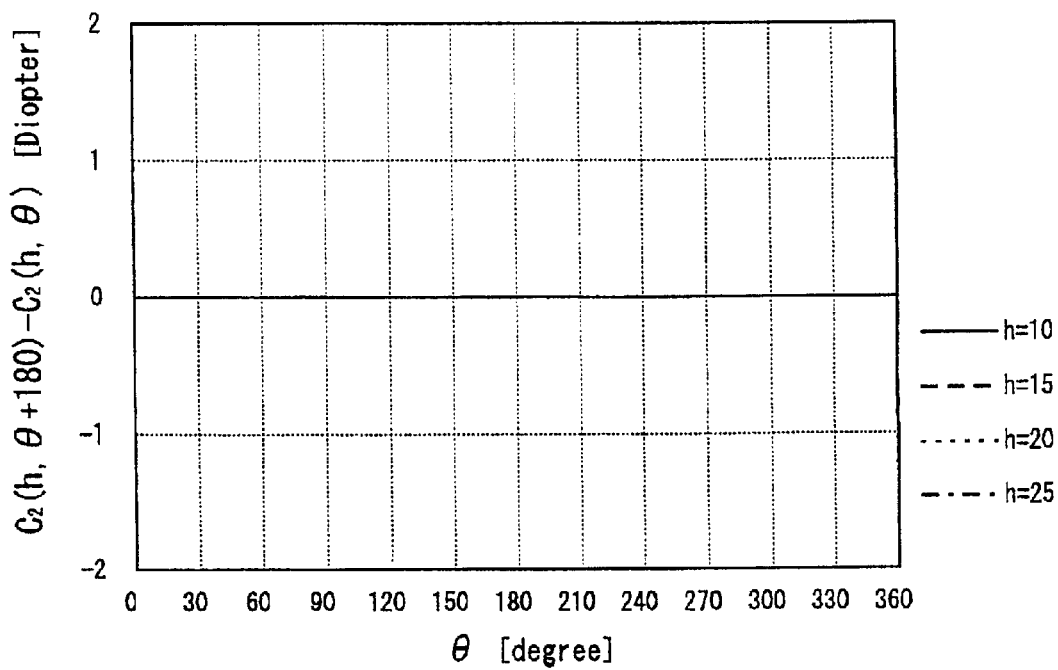

Further, FIGS. 21A and 21B are graphs showing variations of $C_1(h, \theta+180) - C_1(h, \theta)$ that is the left side of the condition (3) and $C_2(h, \theta+180) - C_2(h, \theta)$ that is the left side of the condition (2), respectively, with respect to variation of the angle $\theta$. Since the front surface is a rotationally-symmetrical aspherical surface, the value of the left side of the condition (3) remains constant. Further, since the back surface is spherical, the value of the left side of the condition (2) remains constant. Namely, the spectacle lens of the first comparative example does not satisfy the conditions (2) and (3).

FIGS. 22A and 22B are three-dimension graphs showing transmitting optical performances of the aspherical spectacle lens of the first comparative example; FIG. 22A shows an average refractive power error and FIG. 22B shows astigmatism. As compared with the graphs of the first and second embodiments (FIGS. 10A, 10B, 16A and 16B) designed for the same specification, a number of contour lines in either graph of the first comparative example is larger than that of the embodiments, which shows that the optical performance of the embodiments is better than the comparative example. That is, when the rotationally-asymmetrical component is introduced into the back surface or the front surface as in the first and second embodiment, the aberration is more sufficiently corrected as compared with the spectacle lens that merely tilts the front surface with respect to the back surface for adding a prismatic power as in the first comparative example.

Third Embodiment

The spectacle lenses of the third and fourth embodiments and the second comparative example are designed for satisfying the specification shown in TABLE 2. Each of these lenses has a prismatic power to correct hereophoria and a cylindrical power to correct astigmatism.

TABLE 2

| | |
|---|---|
| SPH | −4.00 Diopter |
| CYL | −4.00 Diopter |
| AX | 0 |
| PRS | 3.00 Δ |
| BASE | 270° Base Down |

The aspherical spectacle lens of the third embodiment satisfies the specification of TABLE 2, the front surface is a spherical surface that has a uniform curvature 1.35 Diopter as shown in FIG. 23A, and the back surface is a rotationally-asymmetrical aspherical surface whose curvature at the framing reference point is distributed among 7.36 to 13.36 Diopter as shown in FIG. 23B. The center thickness of the lens of the third embodiment is 1.10 mm. The back surface contains a first rotationally-asymmetrical component to correct the aberration caused by adding a prismatic power and a second rotationally-asymmetrical component to add a cylindrical power. Therefore, any rotationally-asymmetrical component is not required for the front surface, which allows the front surface to be formed as a spherical surface.

Figures 23, 24:
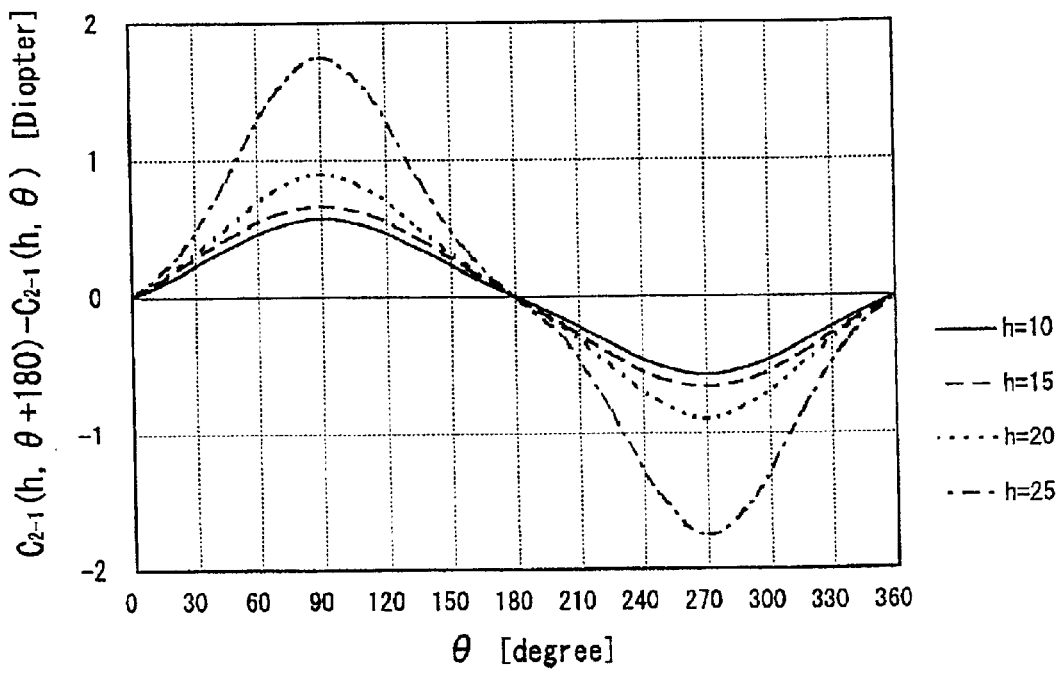

FIG. 24 is a graph showing variation of $C_{2-1}(h, \theta+180) - C_{2-1}(h, \theta)$ that is left side of the condition (1) with respect to variation of the angle $\theta$. In order to correct the aberration caused by adding the prismatic power, the values of the left side of the condition (1) rise to maximums at $\theta=90°$ and are reduced to minimums at $\theta=270°$ for all of the distances h=10, 15, 20 and 25 mm. The amplitude of the variation increases as the distance h becomes larger. FIG. 24 shows that the values indicated in the graph are larger than zero in the range of $30 \leq \theta \leq 150$ for all of the distances h=10, 15, 20 and 25 mm. Namely, the aspherical spectacle lens of the third embodiment satisfies the condition (1).

Figure 25:
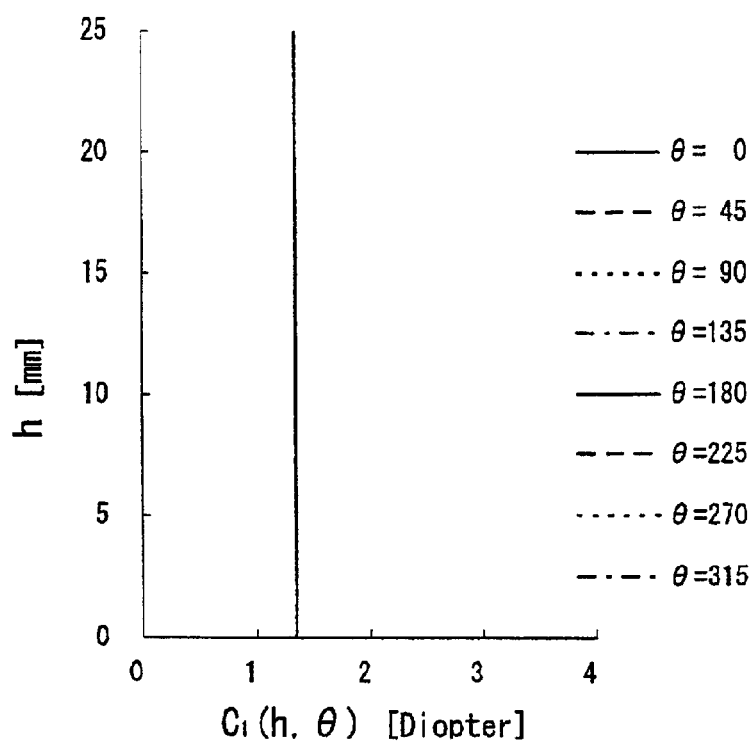
Figure 25:
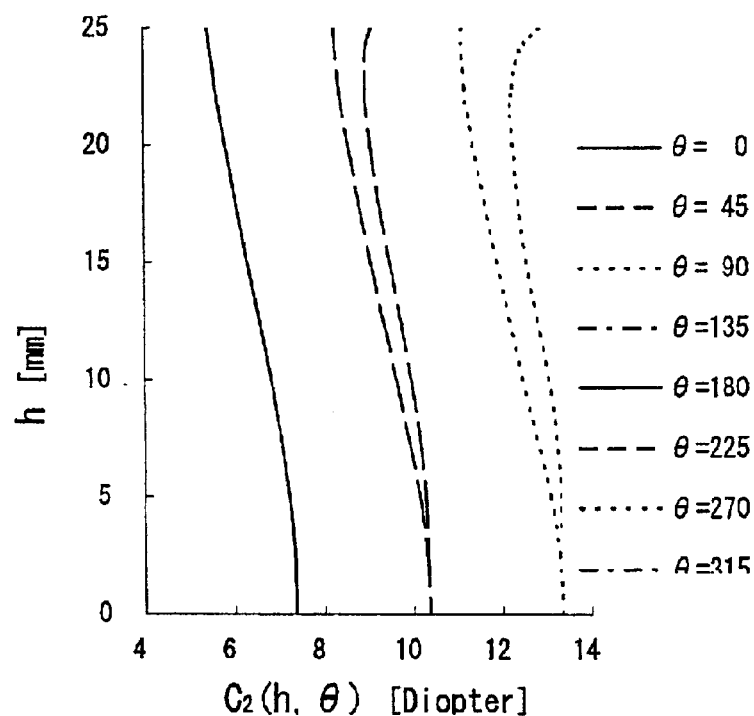

FIGS. 25A and 25B are graphs showing variations of curvatures $C_1(h, \theta)$ and $C_2(h, \theta)$ of the front and back surfaces, respectively, with respect to variation of the distance h from the framing reference point. Since the front surface is spherical, the curvature $C_1(h, \theta)$ does not vary according to variations of the distance h and the angle $\theta$, the graph of FIG. 25A shows the straight lines overlapped to each other. Since the back surface is rotationally-asymmetrical, the curvature $C_2(h, \theta)$ varies according to variations of the distance h and the angle $\theta$. In the graph of FIG. 25B, the overlapped curves of $\theta=0°$ and 180°, the overlapped curves of $\theta=45°$ and 135°, the overlapped curves of $\theta=225°$ and 315°, the curve of $\theta=90°$ and the curve of $\theta=270°$ are arranged in increasing order of curvature.

Figure 26:
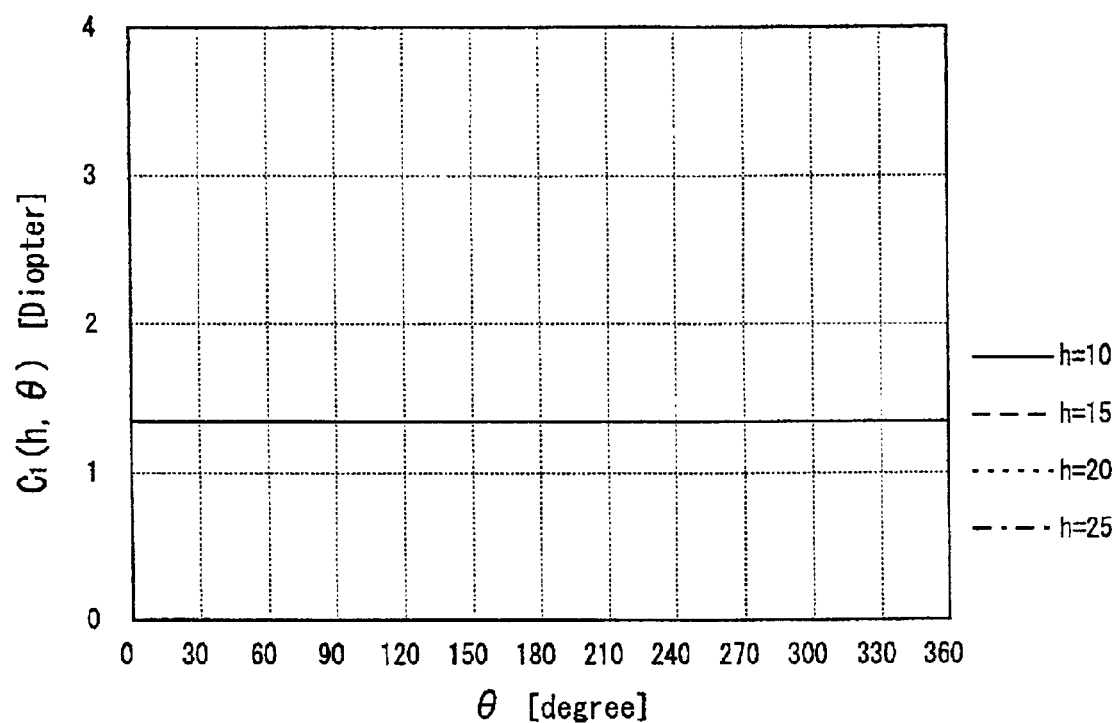
Figure 26:
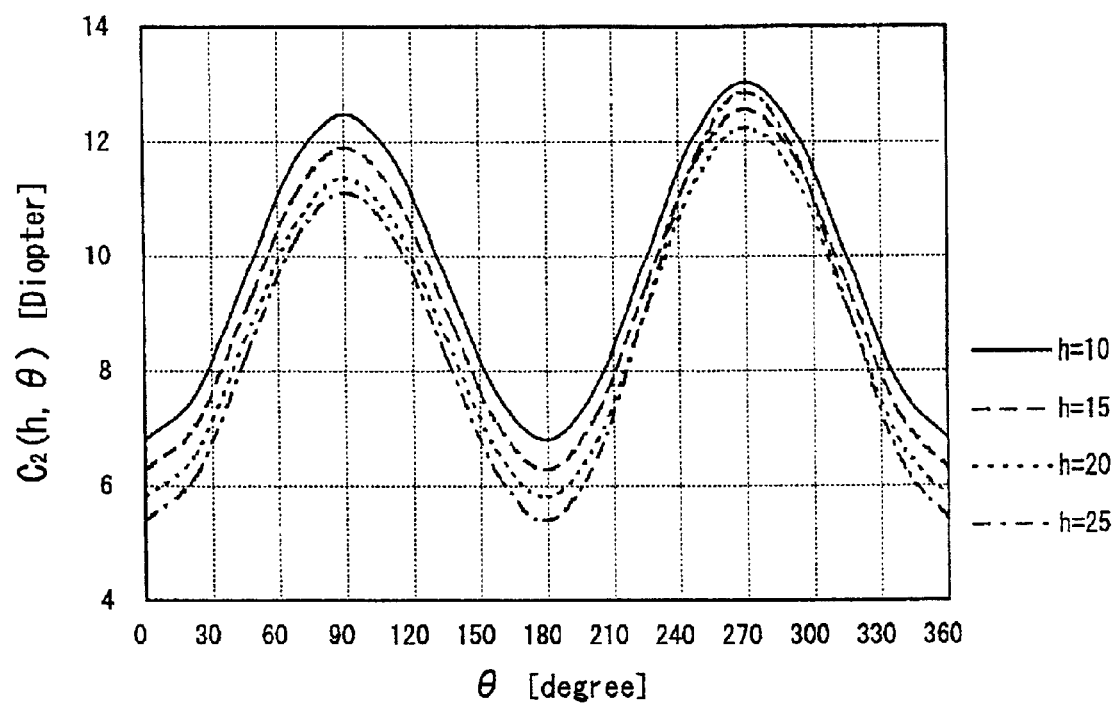

FIGS. 26A and 26B are graphs showing variations of curvatures $C_1(h, \theta)$ and $C_2(h, \theta)$ of the front and back surfaces, respectively, with respect to variation of the angle θ for the distances h=10, 15, 20 and 25 mm. Since the front surface is spherical, the curvature $C_1(h, \theta)$ does not vary according to variations of the distance h and the angle θ, the graph of FIG. 26A shows the straight lines overlapped to each other. The curvature of the back surface becomes small at θ=0° and 180° and becomes large at θ=90° and 270° due to the added cylindrical power, in general. However, the curvature at the side of the prism base (θ=270°) is larger than that at the side of the apex (θ=90°) in order to correct the aberration caused by adding the base-down prismatic power.

Figure 27:
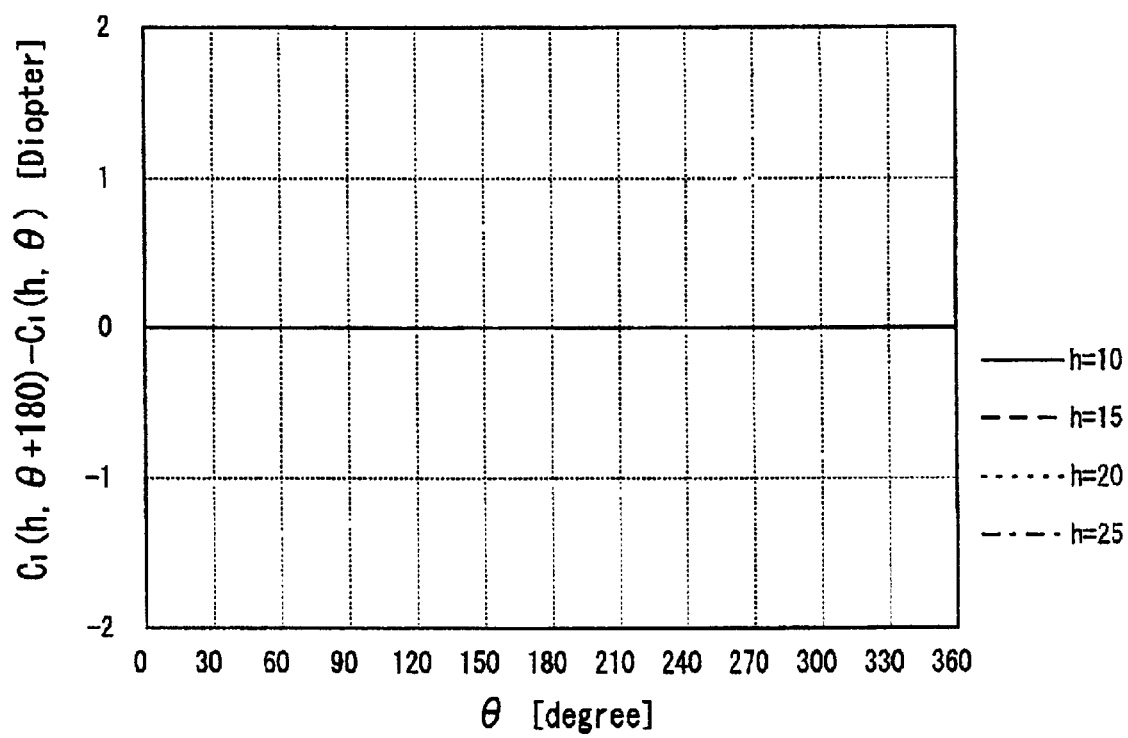
Figure 27:
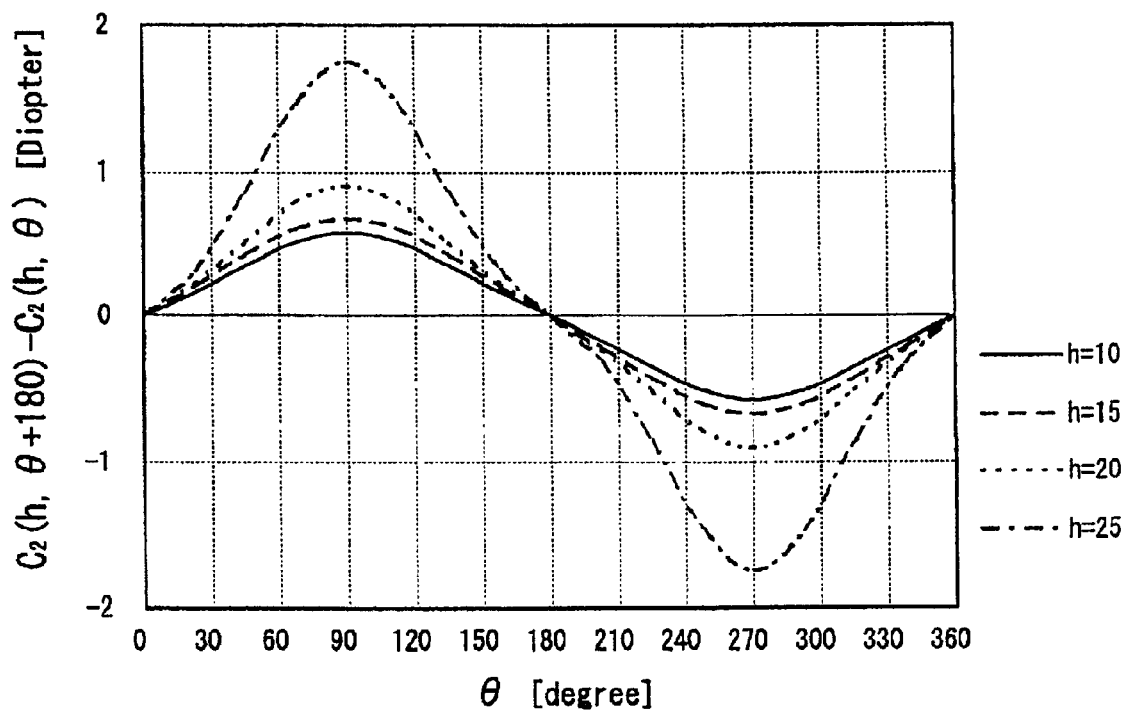

Further, FIGS. 27A and 27B are graphs showing variations of $C_1(h, \theta+180)-C_1(h, \theta)$ that is the left side of the condition (3) and $C_2(h, \theta+180)-C_2(h, \theta)$ that is the left side of the condition (2), respectively, with respect to variation of the angle θ. Since the front surface is spherical, the value of the left side of the condition (3) remains constant. The value of the left side of the condition (2) varies according to variations of the angle θ and the distance h. FIG. 27B shows that the values indicated in the graph are larger than zero in the range of $30 \leq \theta \leq 150$ for all of the distances h=10, 15, 20 and 25 mm. Namely, the aspherical spectacle lens of the third embodiment satisfies the condition (2).

Figure 28B:
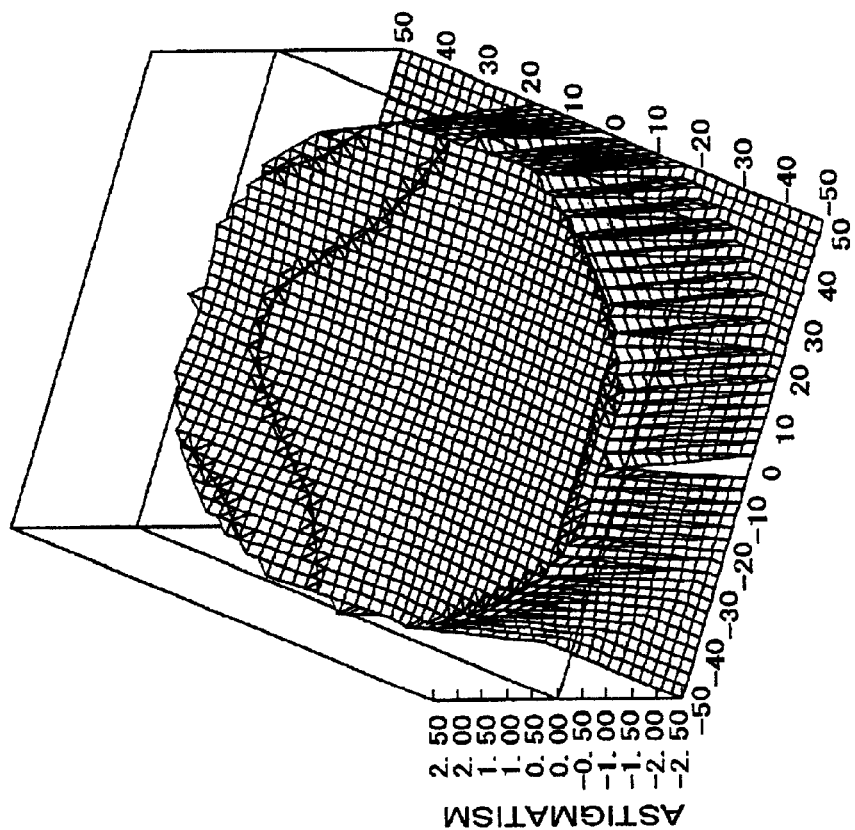
Figure 28A:
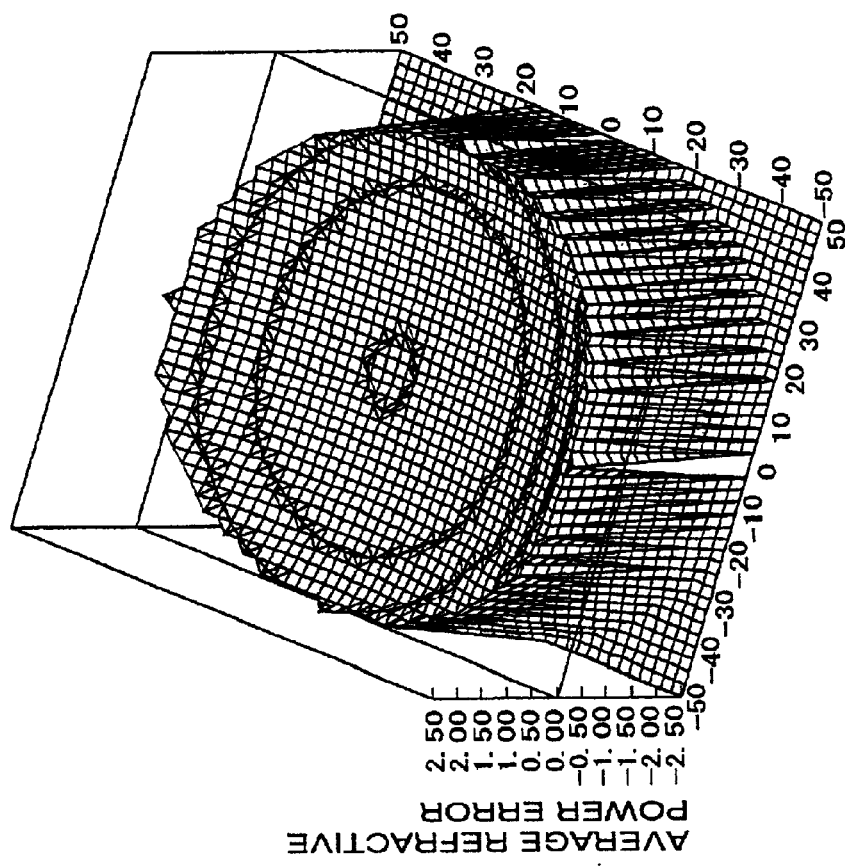

FIGS. 28A and 28B are three-dimension graphs showing transmitting optical performances of the aspherical spectacle lens of the third embodiment; FIG. 28A shows an average refractive power error and FIG. 28B shows astigmatism.

Fourth Embodiment

In the same manner as the third embodiment, the aspherical spectacle lens of the fourth embodiment satisfies the specification of TABLE 2, the front surface is a rotationally-asymmetrical aspherical surface whose curvature at the framing reference point is distributed among 2.44 to 2.46 Diopter as shown in FIG. 29A, and the back surface is a toric surface whose curvature is distributed among 8.46 to 14.47 Diopter as shown in FIG. 29B. The center thickness of the lens of the fourth embodiment is 1.10 mm.

Figures 29, 30:
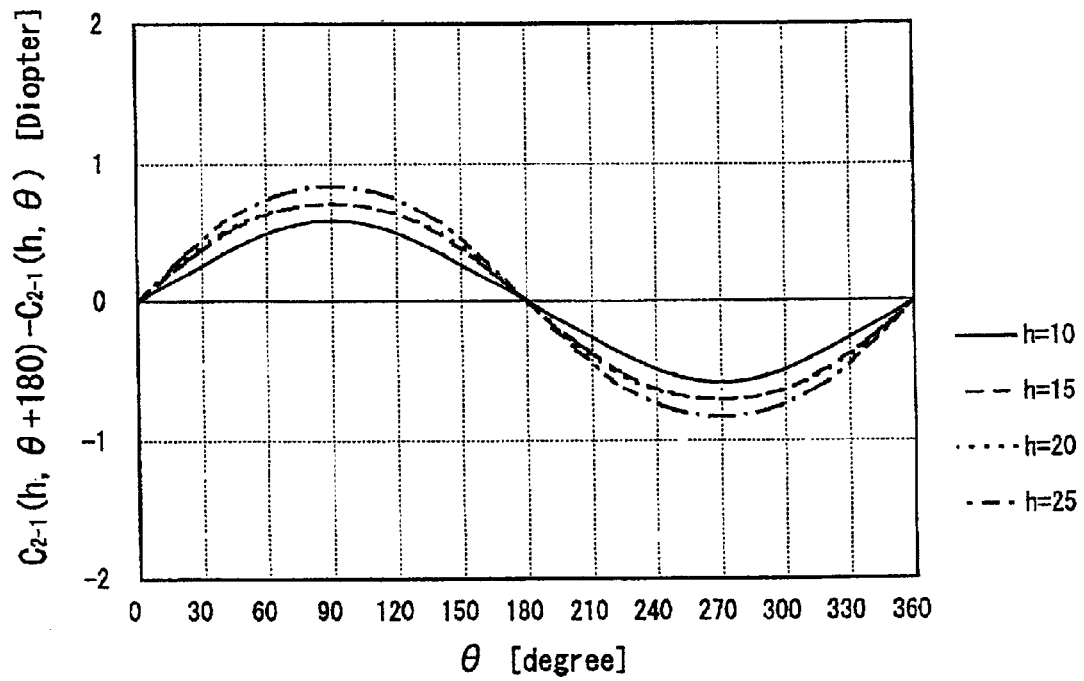

FIG. 30 is a graph showing variation of $C_{2-1}(h, \theta+180)-C_{2-1}(h, \theta)$ that is left side of the condition (1) with respect to variation of the angle θ. In order to correct the aberration caused by adding the prismatic power, the values of the left side of the condition (1) rise to maximums at θ=90° and are reduced to minimums at θ=270° for all of the distances h=10, 15, 20 and 25 mm. The amplitude of the variation increases as the distance h becomes larger. FIG. 30 shows that the values indicated in the graph are larger than zero in the range of $30 \leq \theta \leq 150$ for all of the distances h=10, 15, 20 and 25 mm. Namely, the aspherical spectacle lens of the fourth embodiment satisfies the condition (1).

Figure 31:
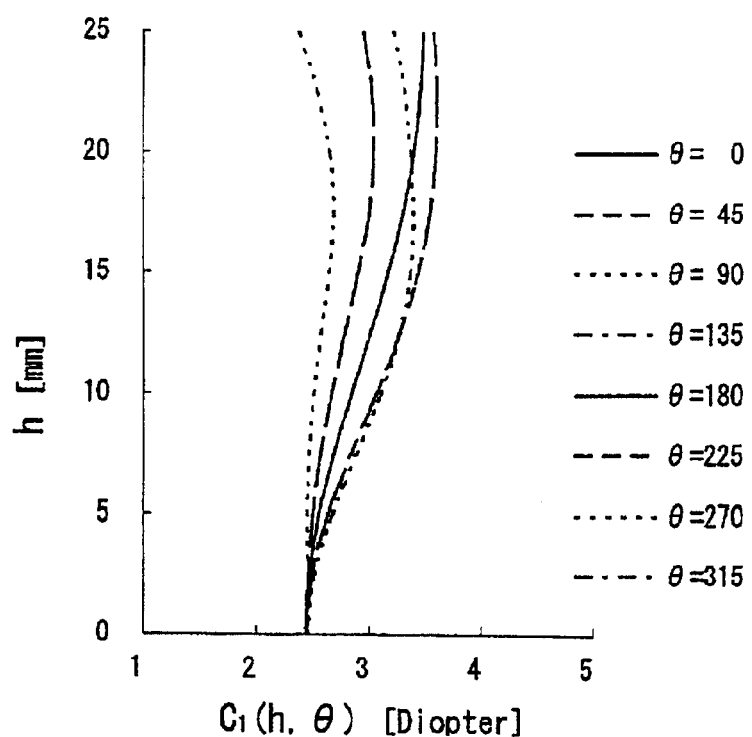
Figure 31:
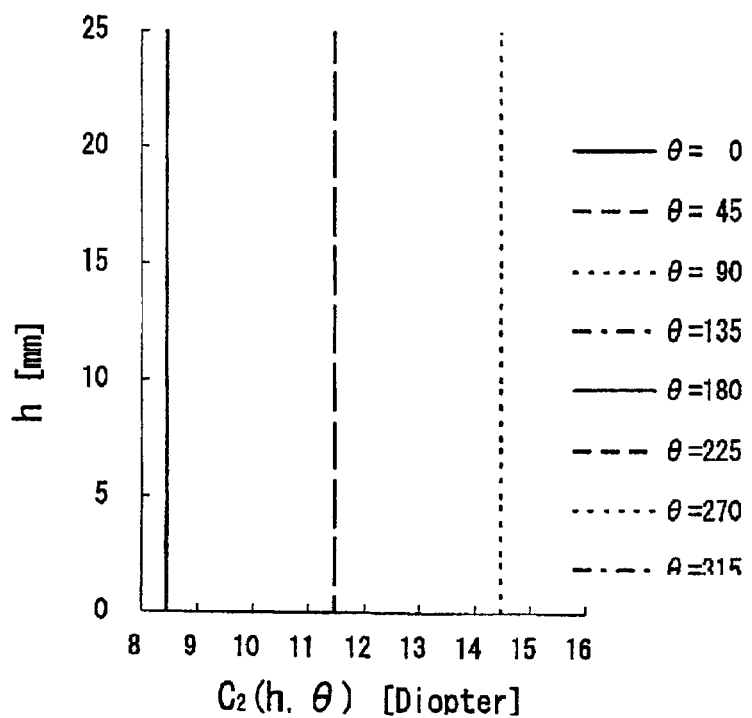

FIGS. 31A and 31B are graphs showing variations of curvatures $C_1(h, \theta)$ and $C_2(h, \theta)$ of the front and back surfaces, respectively, with respect to variation of the distance h from the framing reference point. Since the front surface is rotationally-asymmetrical, the curvature $C_1(h, \theta)$ varies according to variations of the distance h and the angle θ. In the graph of FIG. 31A, the curve of θ=270°, the overlapped curves of θ=225° and 315°, the curve of θ=90°, the overlapped curves of θ=0° and 180° and the overlapped curves of θ=45° and 135° are arranged in increasing order of curvature. Since the back surface is toric, the curvature varies according to variation of the angle θ. However, the curvature of the toric surface does not vary according to variation of the distance h. Therefore, in the graph of FIG. 31B, the overlapped straight lines of θ=0° and 180°, the overlapped straight lines of θ=45°, 135°, 225° and 315°, the overlapped straight lines of θ=90° and 270° are arranged in increasing order of the curvature.

Figure 32:
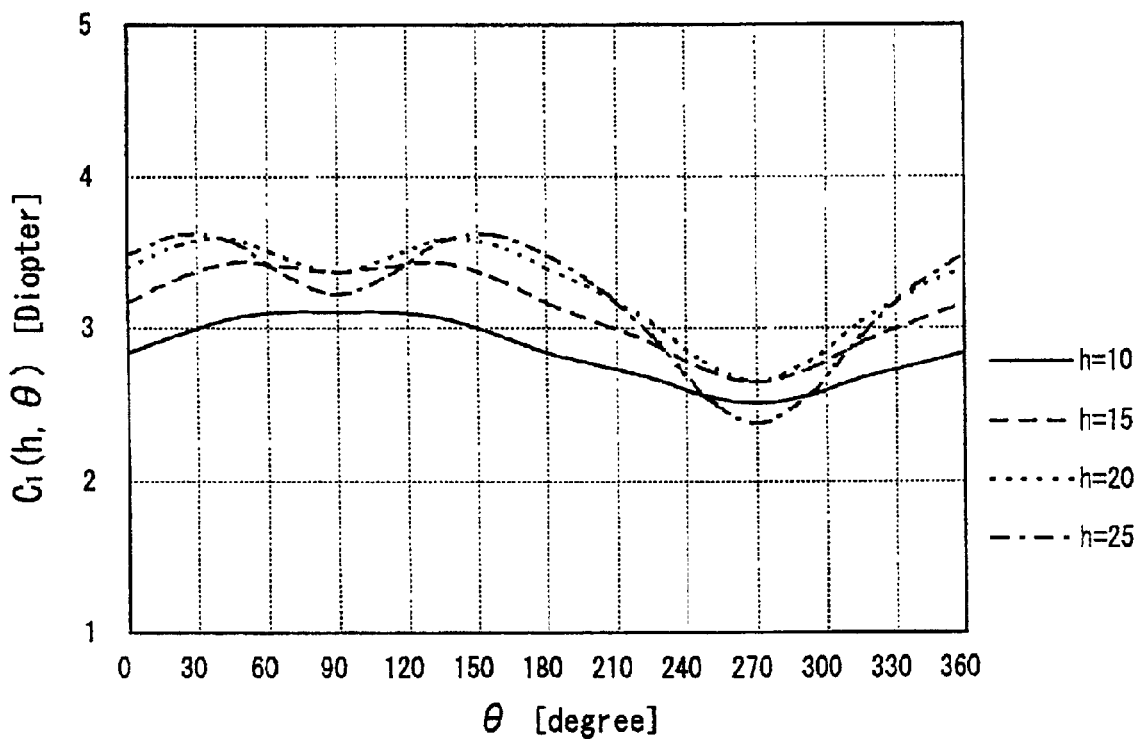
Figure 32:
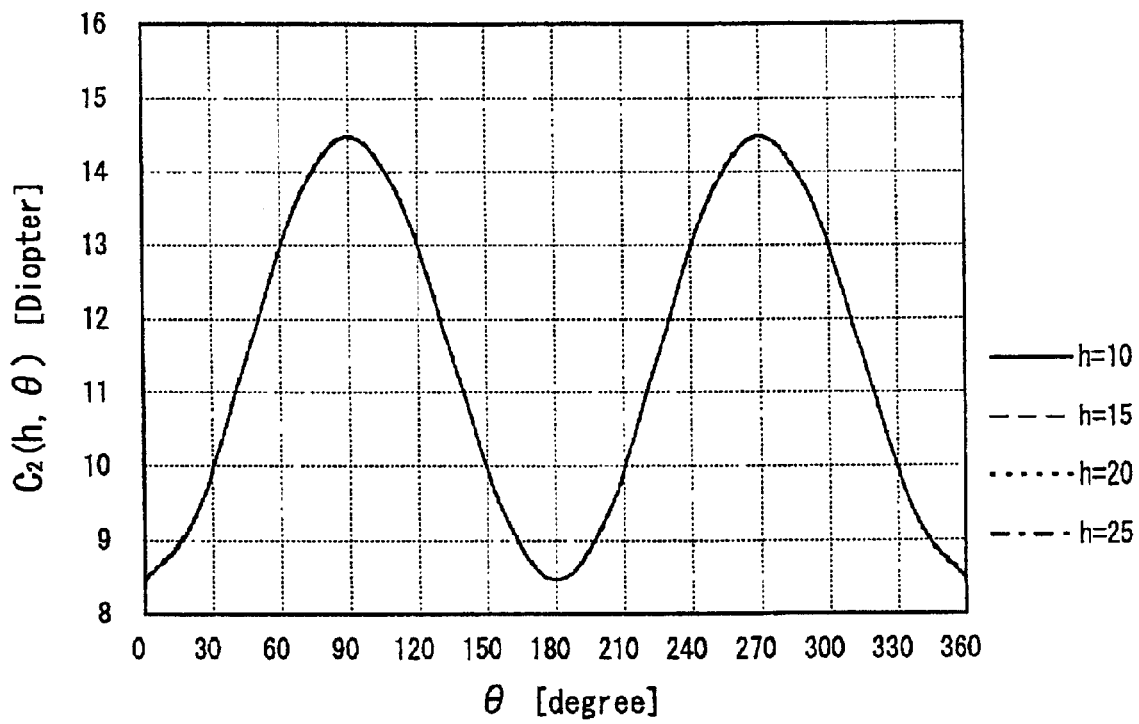

FIGS. 32A and 32B are graphs showing variations of curvatures $C_1(h, \theta)$ and $C_2(h, \theta)$ of the front and back surfaces, respectively, with respect to variation of the angle θ. For the rotationally-asymmetrical front surface, the curvature $C_1(h, \theta)$ at the side of the prism base (θ=270°) is smaller than that at the side of the apex (θ=90°) for all of the distances h=10, 15, 20 and 25 mm as shown in FIG. 32A in order to correct the aberration caused by adding the base-down prismatic power. The curvature $C_2(h, \theta)$ of the toric back surface rises to a maximum at θ=90° and 270° and is reduced to a minimum at θ=0° and 180°.

Figure 33:
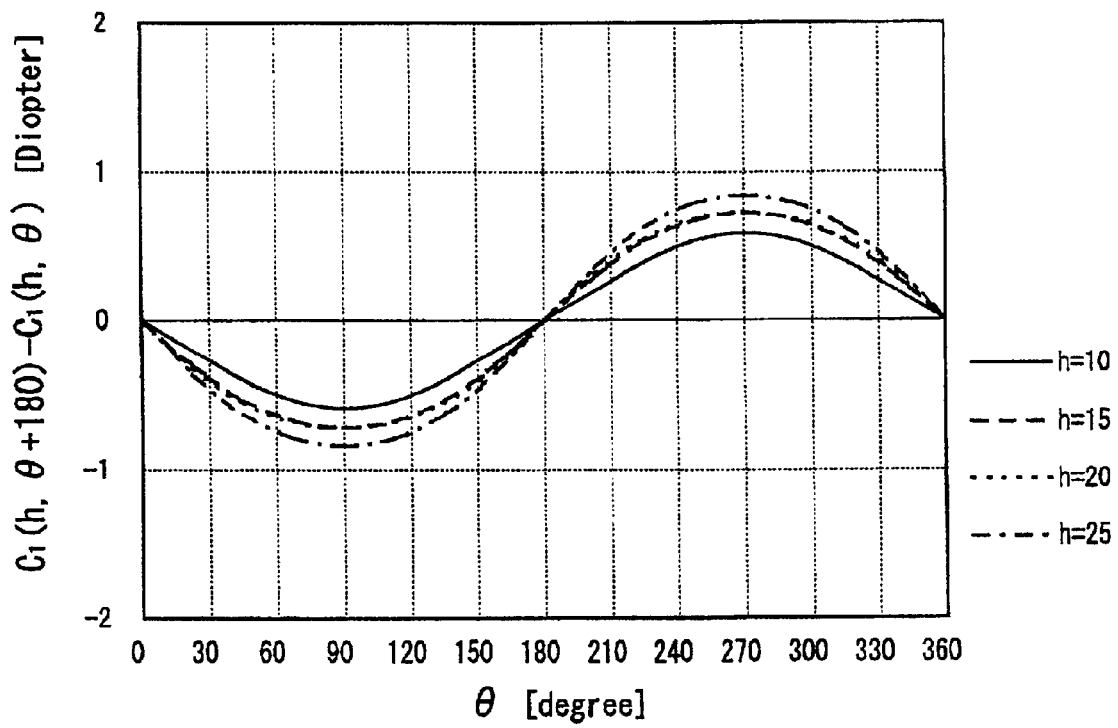
Figure 33:
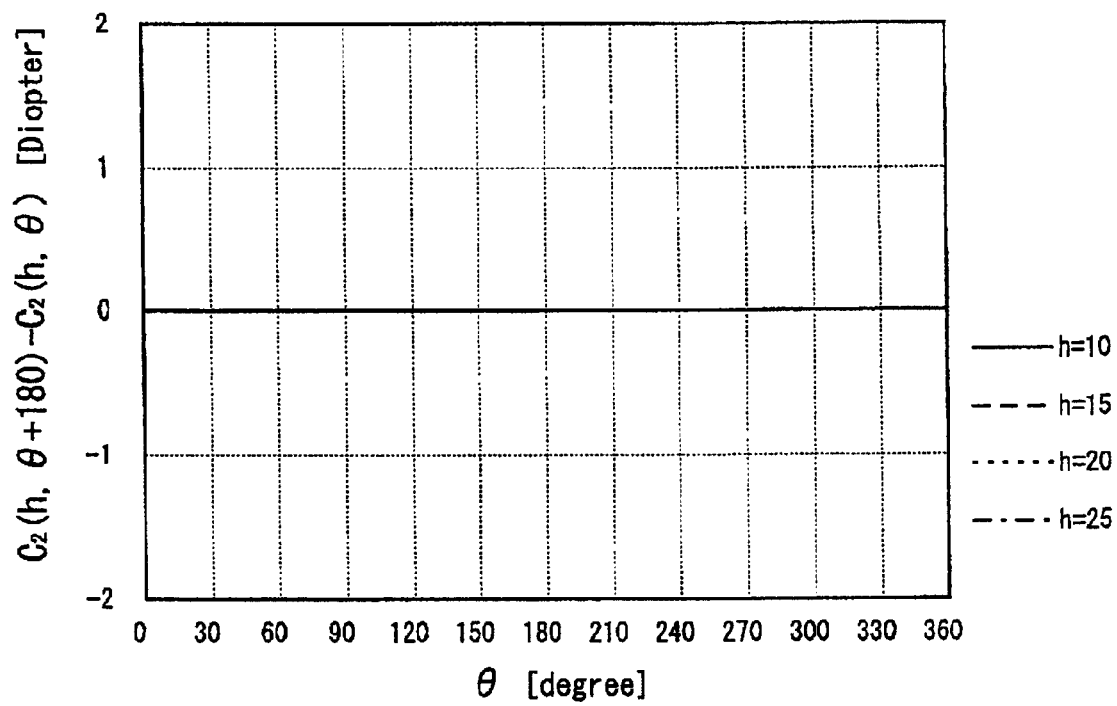

Further, FIGS. 33A and 33B are graphs showing variations of $C_1(h, \theta+180)-C_1(h, \theta)$ that is the left side of the condition (3) and $C_2(h, \theta+180)-C_2(h, \theta)$ that is the left side of the condition (2), respectively, with respect to variation of the angle θ. The values of the left side of the condition (3) vary according to variations of the angle θ and the distance h. FIG. 33A shows that the values indicated in the graph are smaller than zero in the range of $30 \leq \theta \leq 150$ for all of the distances h=10, 15, 20 and 25 mm. Namely, the aspherical spectacle lens of the fourth embodiment satisfies the condition (3). Since the back surface is toric, the values of the left side of the condition (2) remain constant.

Figure 34B:
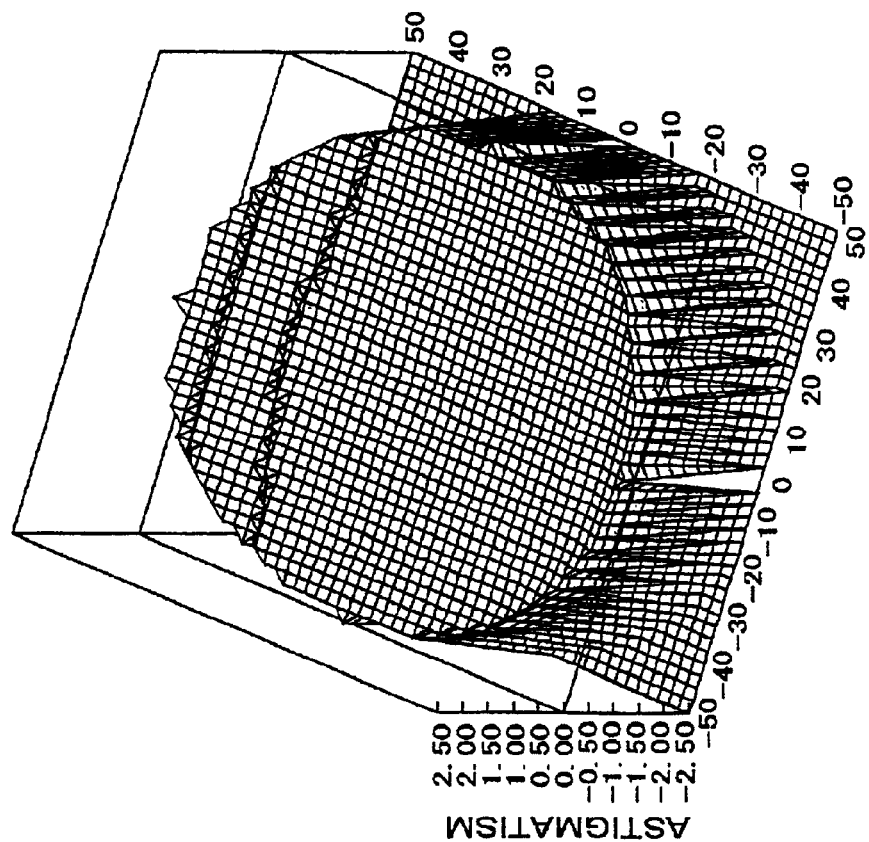
Figure 34A:
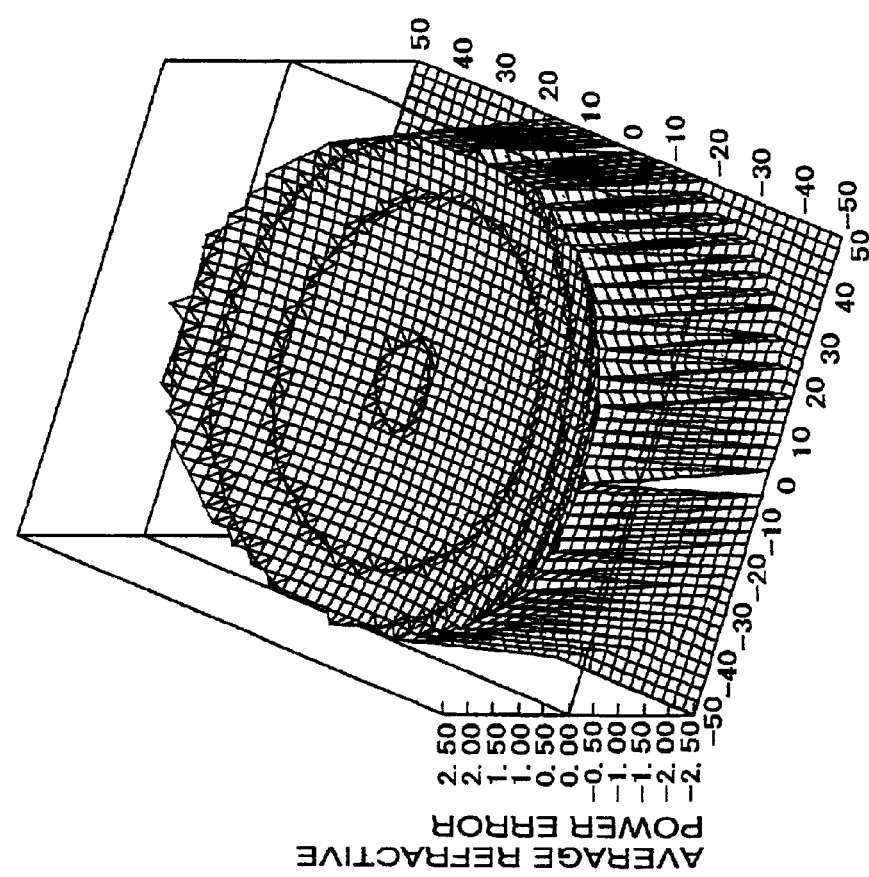

FIGS. 34A and 34B are three-dimension graphs showing transmitting optical performances of the aspherical spectacle lens of the fourth embodiment; FIG. 34A shows an average refractive power error and FIG. 34B shows astigmatism.

SECOND COMPARATIVE EXAMPLE

In the same manner as the third and fourth embodiments, the aspherical spectacle lens of the second comparative example satisfies the specification of TABLE 2, the front surface is a rotationally-symmetrical aspherical surface whose curvature at the framing reference point is 2.44 Diopter as shown in FIG. 35A, and the back surface is a toric surface whose curvature is distributed among 8.46 to 14.47 Diopter as shown in FIG. 35B. The center thickness of the lens of the second comparative example is 1.10 mm.

Figures 35, 36:
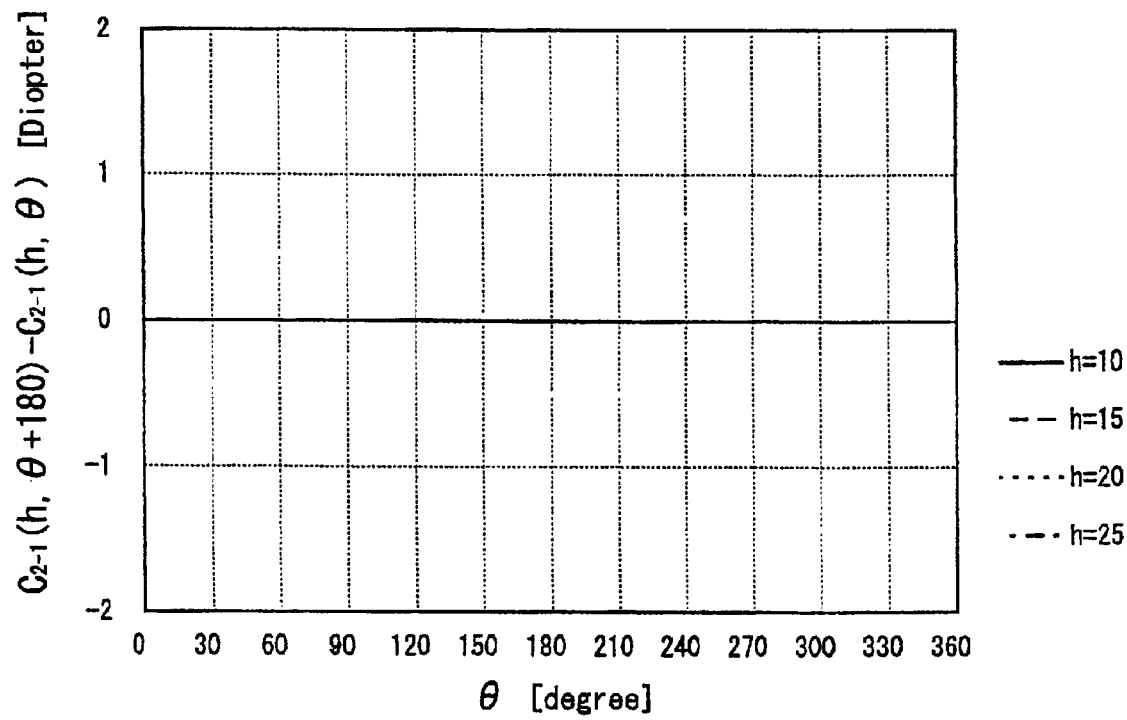

FIG. 36 is a graph showing variation of $C_{2-1}(h, \theta+180)-C_{2-1}(h, \theta)$ that is left side of the condition (1) with respect to variation of the angle θ. Since the front surface is rotationally-symmetrical and the back surface is symmetric with respect to the framing reference point, the value of the left side of the condition (1) remains constant. Namely, the aspherical spectacle lens of the second comparative example does not satisfy the condition (1).

Figure 37:
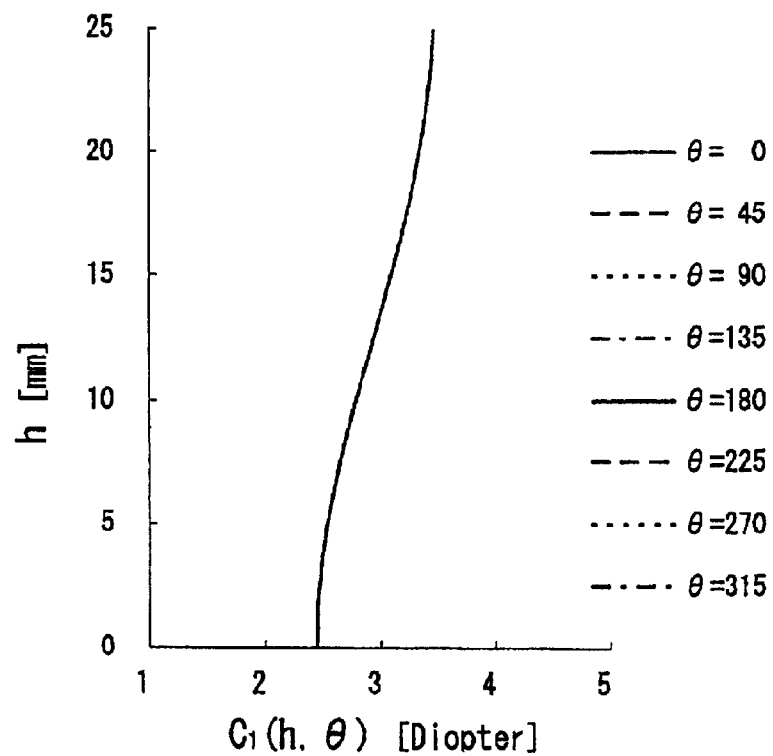
Figure 37:
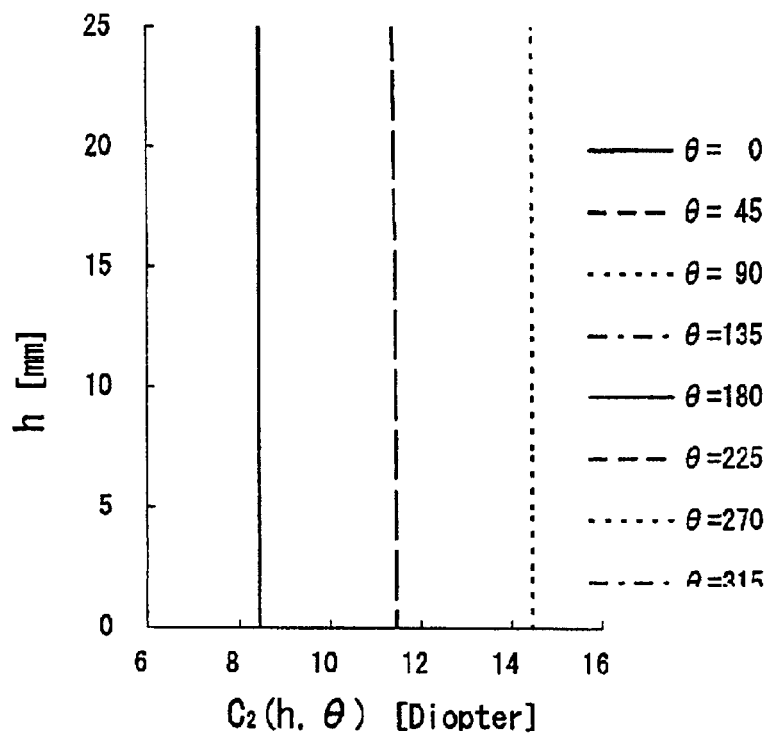

FIGS. 37A and 37B are graphs showing variations of curvatures $C_1(h, \theta)$ and $C_2(h, \theta)$ of the front and back surfaces, respectively, with respect to variation of the distance h from the framing reference point. Since the front surface is a rotationally-symmetrical aspherical surface, the curvature varies according to variation of the distance h while the variation of the angle θ does not change the curvature. In the graph of FIG. 37A, the curves of all of the angles are overlapped. Since the back surface is toric, the curvature varies according to variation of the angle θ. However, the curvature of the toric surface does not vary according to variation of the distance h. Therefore, in the graph of FIG. 37B, the overlapped straight lines of θ=0° and 180°, the overlapped straight lines of θ=45°, 135°, 225° and 315°, the overlapped straight lines of θ=90° and 270° are arranged in increasing order of the curvature.

Figure 38:
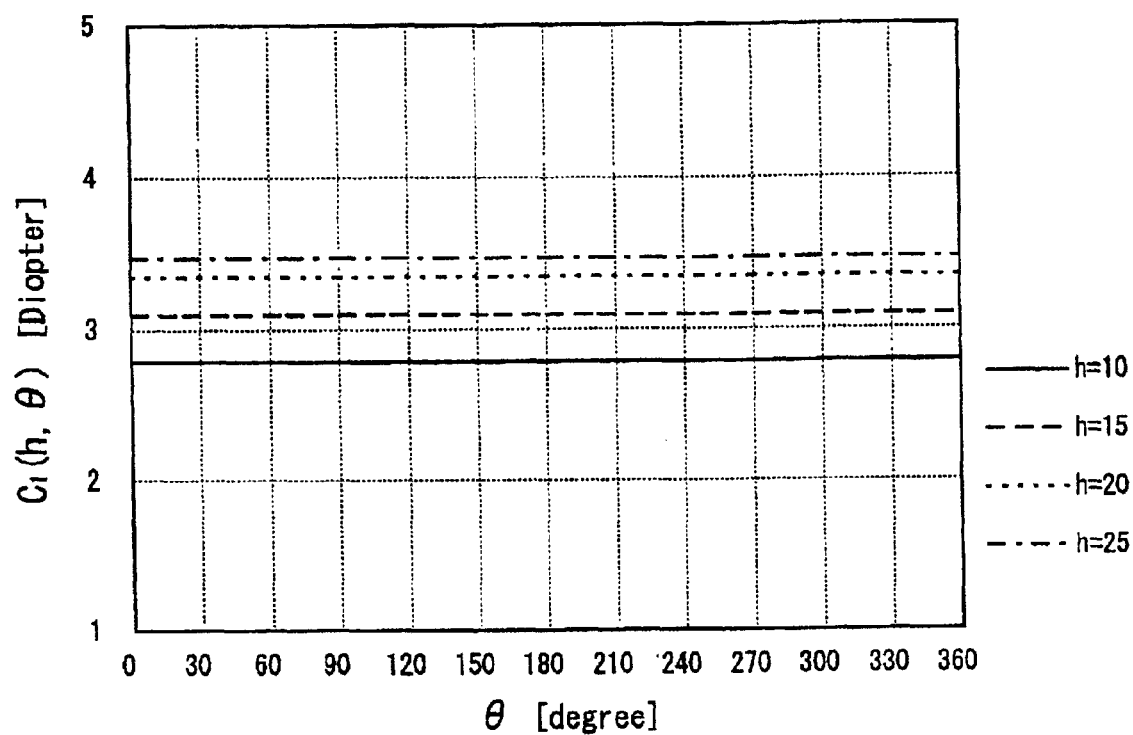
Figure 38:
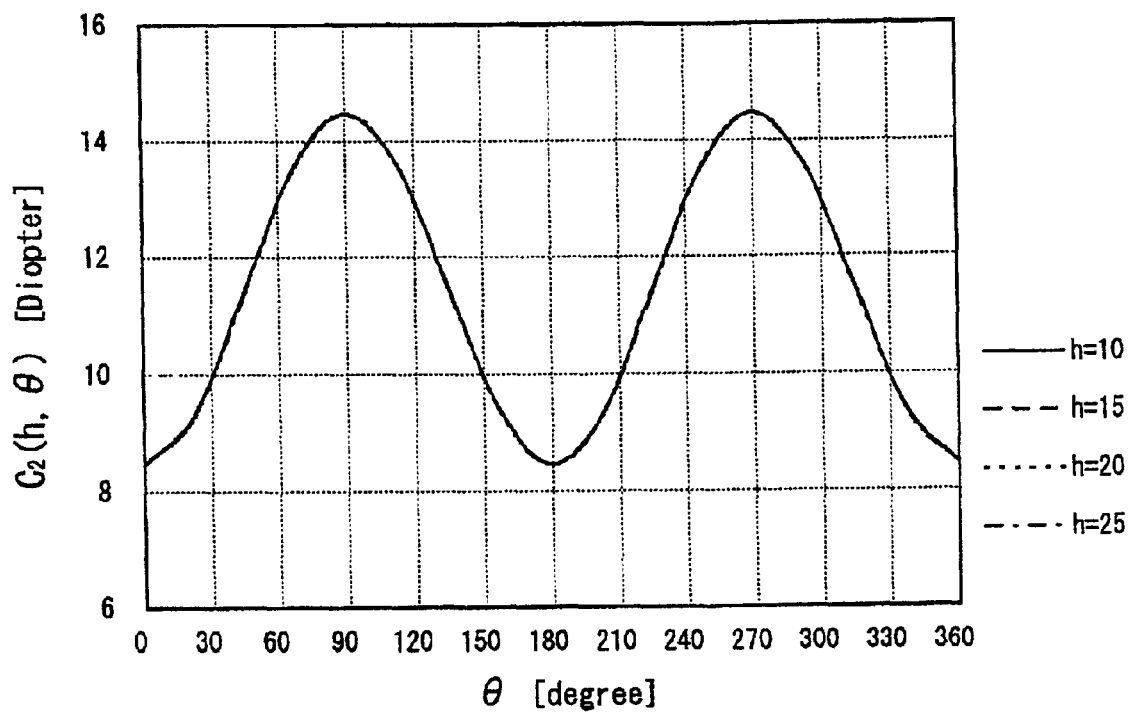

FIGS. 38A and 38B are graphs showing variations of curvatures $C_1(h, \theta)$ and $C_2(h, \theta)$ of the front and back surfaces, respectively, with respect to variation of the angle θ. Since the front surface is a rotationally-symmetrical aspherical surface, the curvatures $C_1(h, \theta)$ are different in response to the distance h and do not vary according to variation of the angle $\theta$, the curvatures are shown as independent straight lines. The curvature $C_2(h, \theta)$ of the toric back surface rises to a maximum at $\theta=90°$ and $270°$ and is reduced to a minimum at $\theta=0°$ and $180°$.

Figure 39:
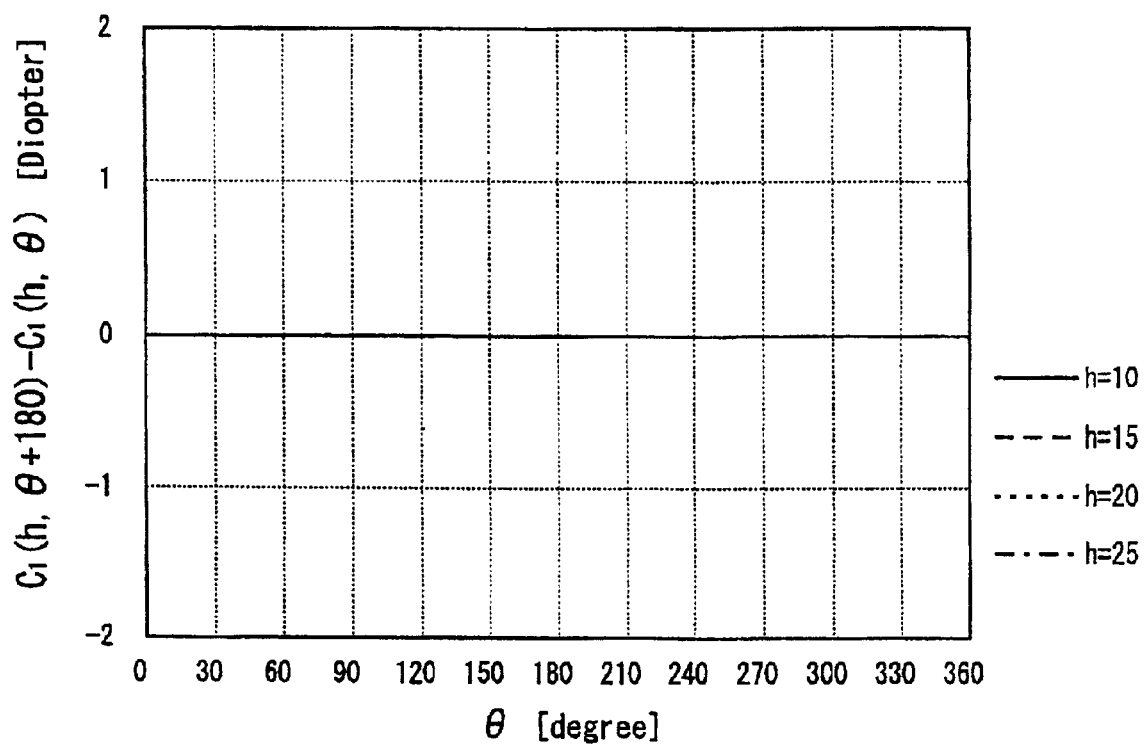
Figure 39:
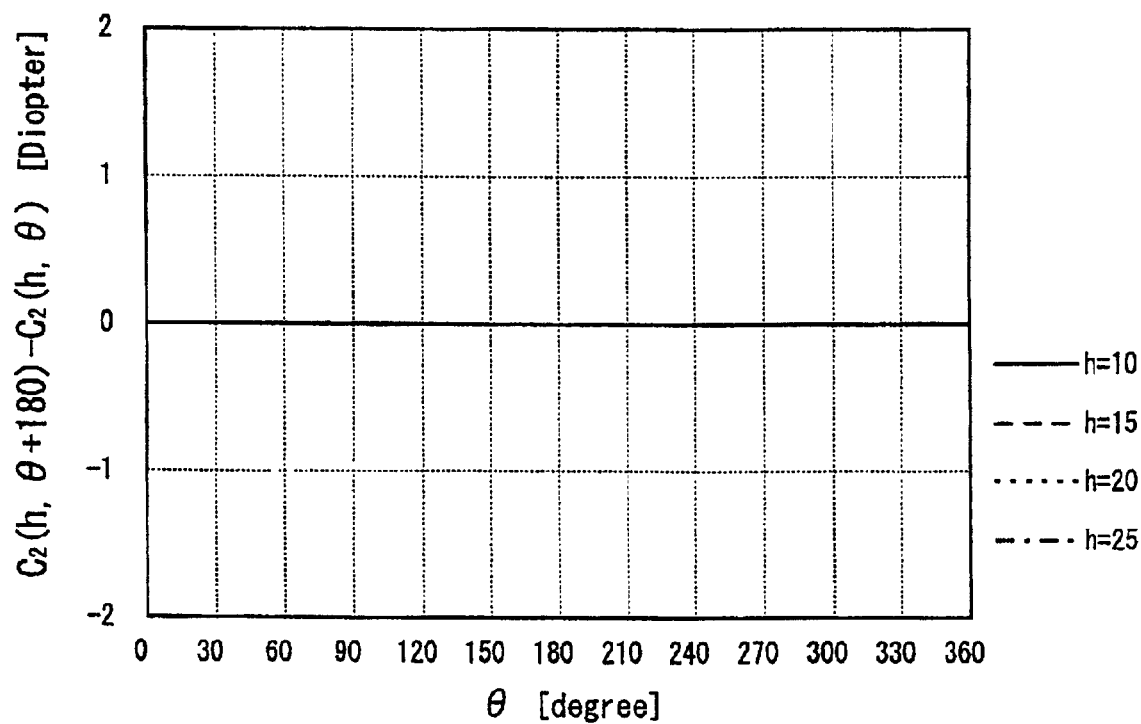

Further, FIGS. 39A and 39B are graphs showing variations of $C_1(h, \theta+180)-C_1(h, \theta)$ that is the left side of the condition (3) and $C_2(h, \theta+180)-C_2(h, \theta)$ that is the left side of the condition (2), respectively, with respect to variation of the angle $\theta$. Since the front surface is a rotationally-symmetrical aspherical surface, the value of the left side of the condition (3) remains constant. Further, since the back surface is toric, the value of the left side of the condition (2) remains constant. Namely, the spectacle lens of the second comparative example does not satisfy the conditions (2) and (3).

Figure 40A:
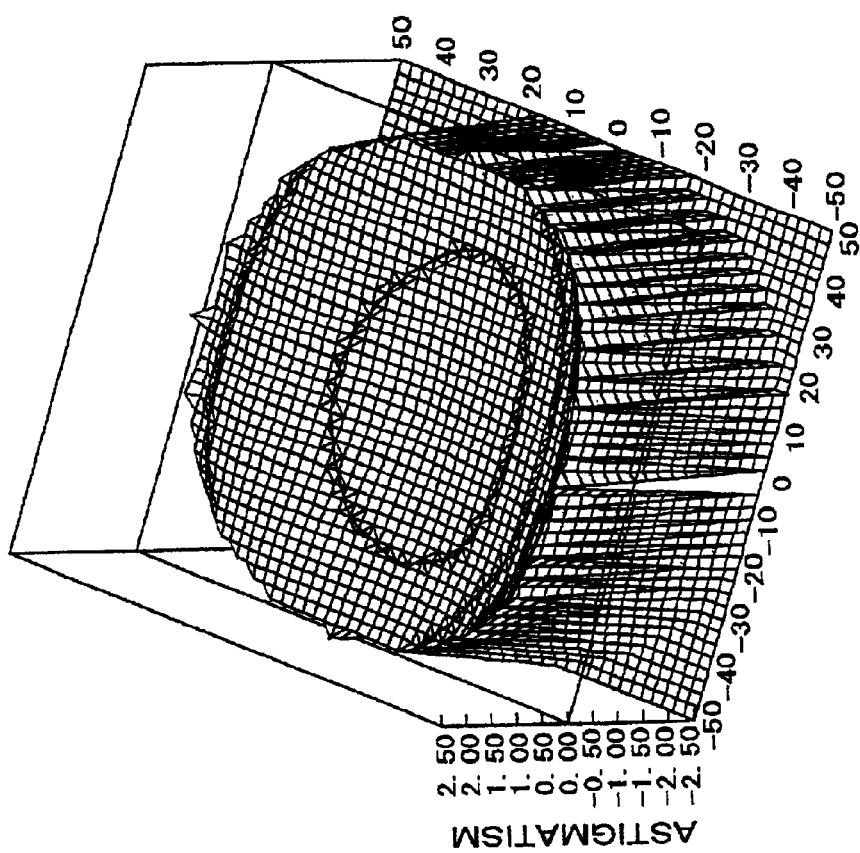
Figure 40B:
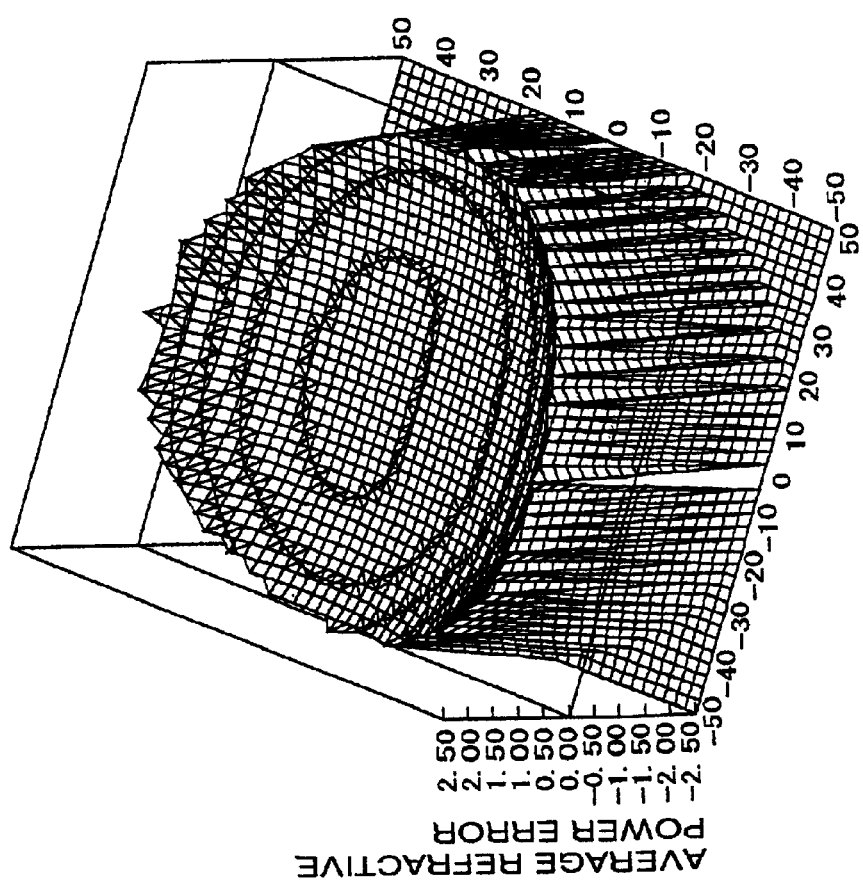

FIGS. 40A and 40B are three-dimension graphs showing transmitting optical performances of the aspherical spectacle lens of the second comparative example; FIG. 40A shows an average refractive power error and FIG. 40B shows astigmatism. As compared with the graphs of the third and fourth embodiments (FIGS. 28A, 28B, 34A and 34B) designed for the same specification, a number of contour lines in either graph of the second comparative example is larger than that of the embodiments, which shows that the optical performance of the embodiments is better than the comparative example.

Fifth Embodiment

The spectacle lenses of the fifth and sixth embodiments and the third comparative example are designed for satisfying the specification shown in TABLE 3. Each of these lenses has a prismatic power to correct hereophoria while they do not have a cylindrical power to correct astigmatism.

TABLE 3

| | |
|---|---|
| SPH | −8.00 Diopter |
| CYL | 0.00 Diopter |
| AX | — |
| PRS | 3.00 Δ |
| BASE | 270° Base Down |

The aspherical spectacle lens of the fifth embodiment satisfies the specification of TABLE 3, the front surface is a spherical surface that has a uniform curvature 0.68 Diopter as shown in FIG. 41A, and the back surface is a rotationally-asymmetrical aspherical surface whose curvature at the framing reference point is distributed among 12.69 to 12.71 Diopter as shown in FIG. 41B. The center thickness of the lens of the fifth embodiment is 1.10 mm.

Figures 41, 42:
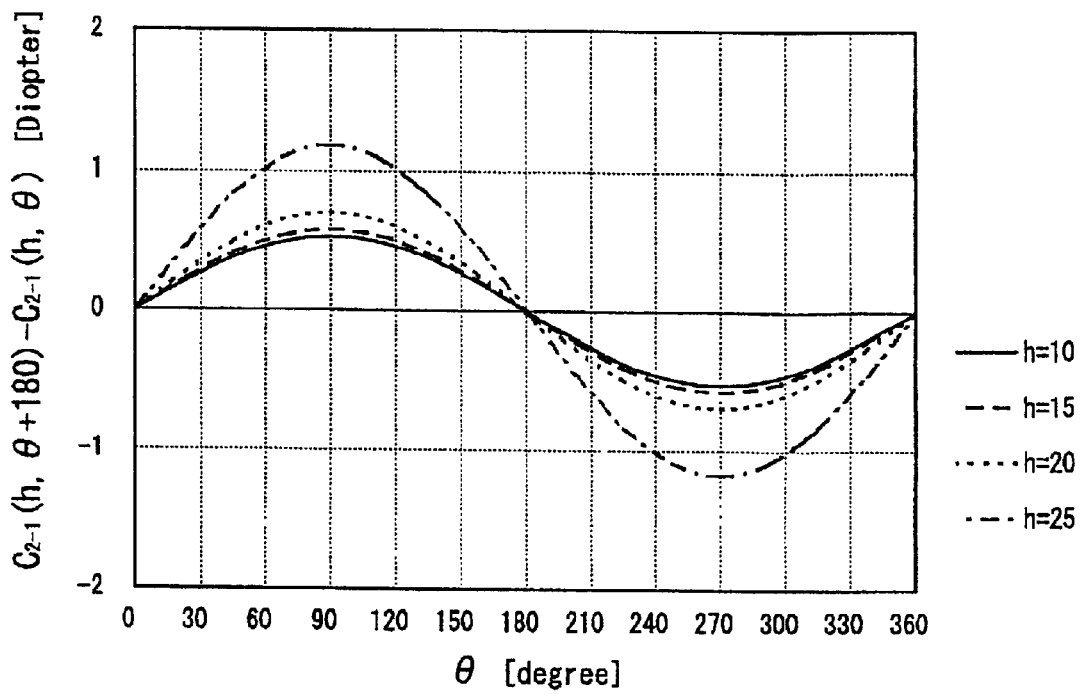

FIG. 42 is a graph showing variation of $C_{2-1}(h, \theta+180)-C_{2-1}(h, \theta)$ that is left side of the condition (1) with respect to variation of the angle $\theta$. In order to correct the aberration caused by adding the prismatic power, the values of the left side of the condition (1) rise to maximums at $\theta=90°$ and are reduced to minimums at $\theta=270°$ for all of the distances h=10, 15, 20 and 25 mm. The amplitude of the variation increases as the distance h becomes larger. FIG. 42 shows that the values indicated in the graph are larger than zero in the range of $30 \leq \theta \leq 150$ for all of the distances h=10, 15, 20 and 25 mm. Namely, the aspherical spectacle lens of the fifth embodiment satisfies the condition (1).

Figure 43:
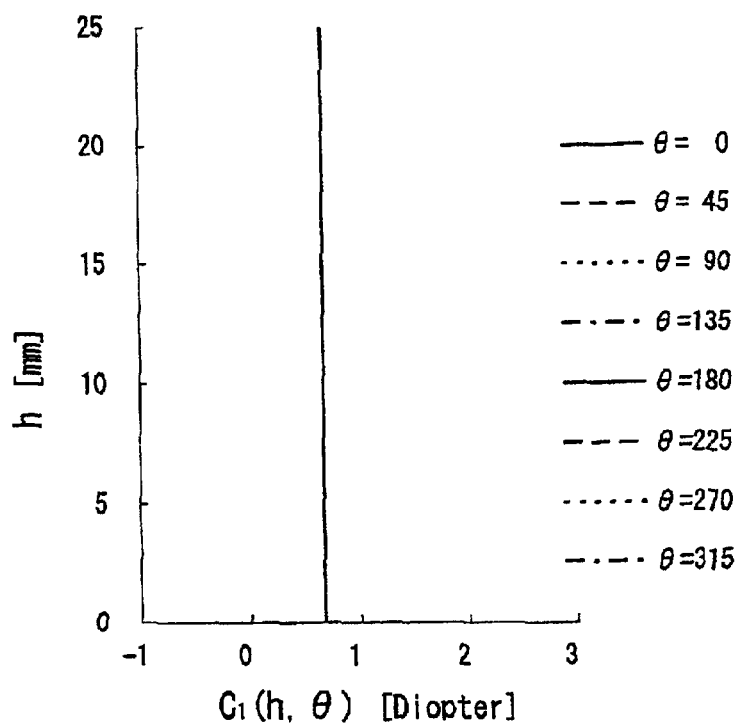
Figure 43:
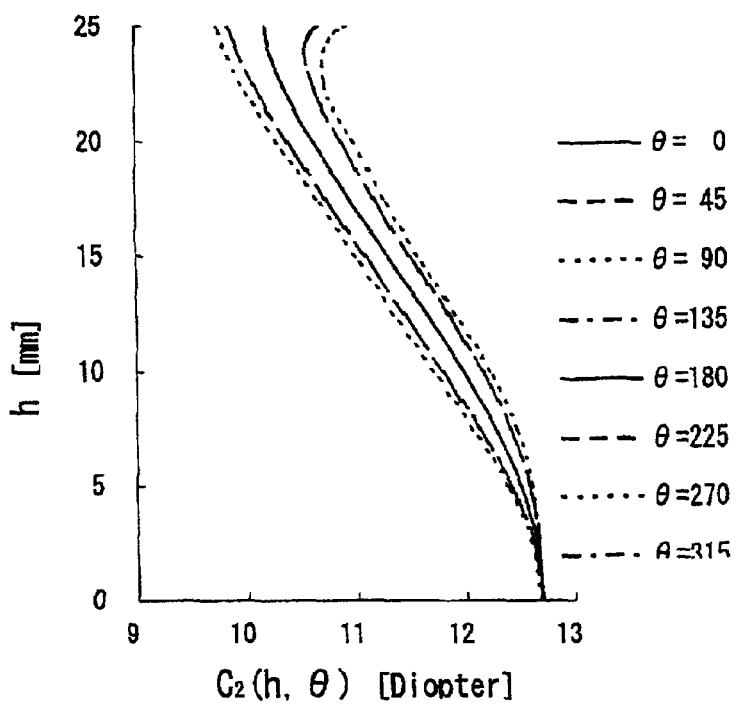

FIGS. 43A and 43B are graphs showing variations of curvatures $C_1(h, \theta)$ and $C_2(h, \theta)$ of the front and back surfaces, respectively, with respect to variation of the distance h from the framing reference point. Since the front surface is spherical, the curvature $C_1(h, \theta)$ does not vary according to variations of the distance h and the angle $\theta$, the graph of FIG. 43A shows the straight lines overlapped to each other. Since the back surface is rotationally-asymmetrical, the curvature $C_2(h, \theta)$ varies according to variations of the distance h and the angle $\theta$. In the graph of FIG. 43B, the curve of $\theta=90°$, the overlapped curves of $\theta=45°$ and $135°$, the overlapped curves of $\theta=0°$ and $180°$, the overlapped curves of $\theta=225°$ and $315°$ and the curve of $\theta=270°$ are arranged in increasing order of curvature.

Figure 44:
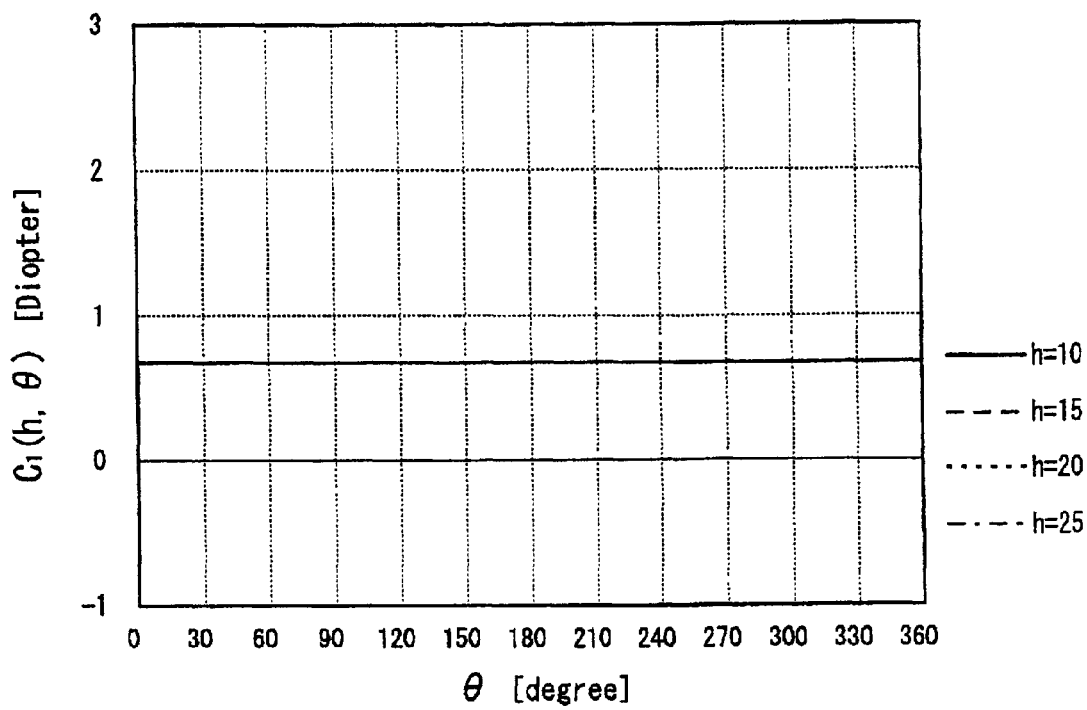
Figure 44:
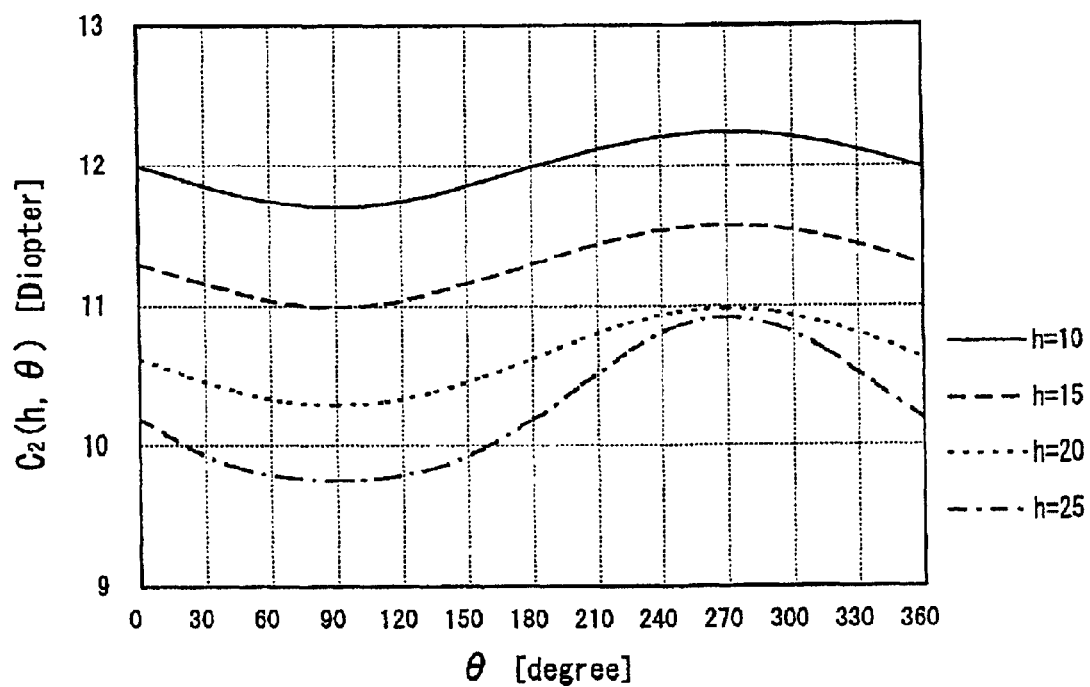

FIGS. 44A and 44B are graphs showing variations of curvatures $C_1(h, \theta)$ and $C_2(h, \theta)$ of the front and back surfaces, respectively, with respect to variation of the angle $\theta$. Since the front surface is spherical, the curvature $C_1(h, \theta)$ does not vary according to variations of the distance h and the angle $\theta$, the graph of FIG. 44A shows the straight lines overlapped to each other. In order to correct the aberration caused by adding the base-down prismatic power, the curvatures $C_2(h, \theta)$ of the back surface are reduced to minimums at $\theta=90°$ and rise to maximums at $\theta=270°$ for all of the distances h=10, 15, 20 and 25 mm as shown in FIG. 44B. The longer the distance h is, the smaller the curvature $C_2(h, \theta)$ is.

Figure 45:
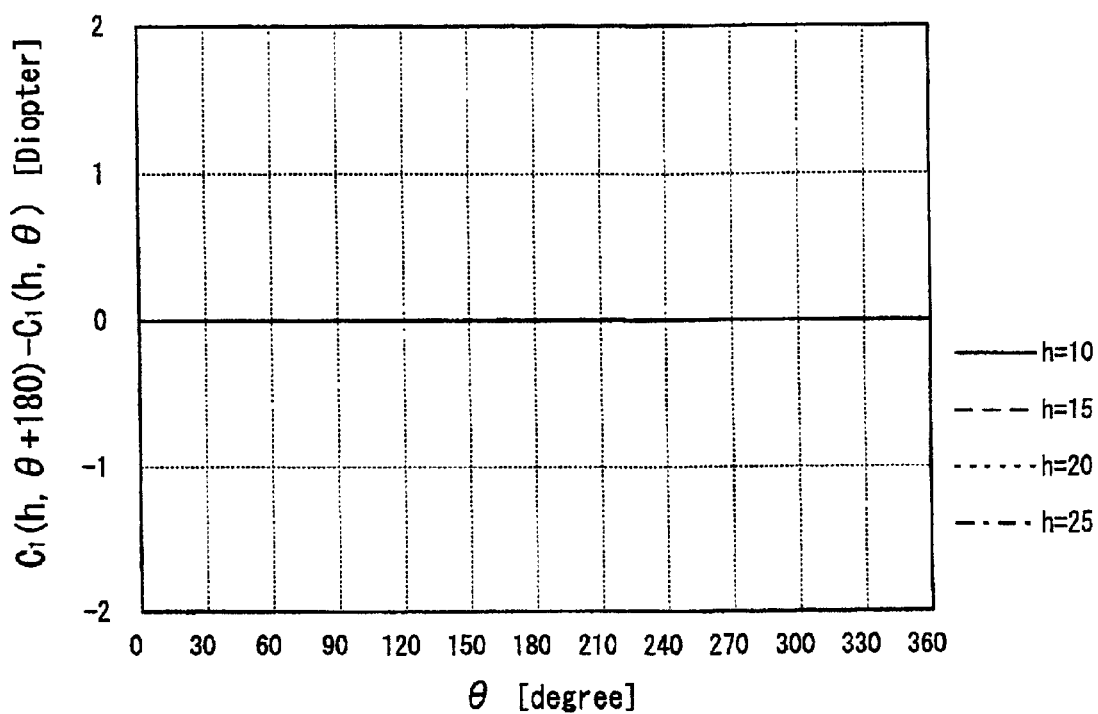
Figure 45:
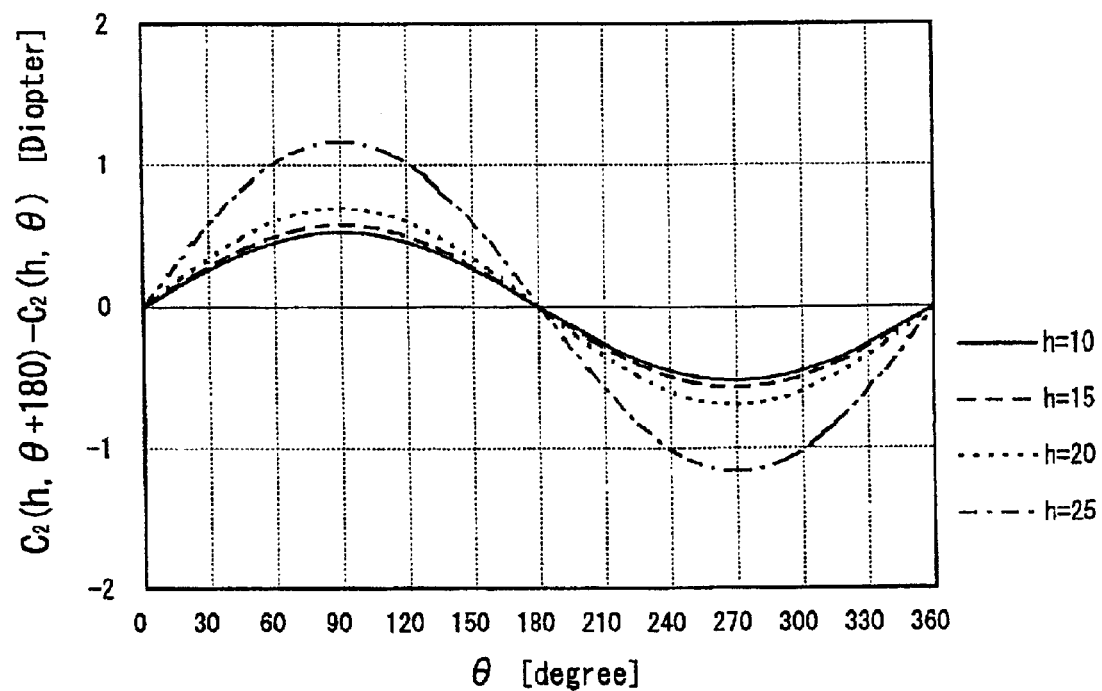

Further, FIGS. 45A and 45B are graphs showing variations of $C_1(h, \theta+180)-C_1(h, \theta)$ that is the left side of the condition (3) and $C_2(h, \theta+180)-C_2(h, \theta)$ that is the left side of the condition (2), respectively, with respect to variation of the angle $\theta$. Since the front surface is spherical, the value of the left side of the condition (3) remains constant. The value of the left side of the condition (2) varies according to variations of the angle $\theta$ and the distance h. FIG. 45B shows that the values indicated in the graph are larger than zero in the range of $30 \leq \theta \leq 150$ for all of the distances h=10, 15, 20 and 25 mm. Namely, the aspherical spectacle lens of the fifth embodiment satisfies the condition (2).

Figure 46B:
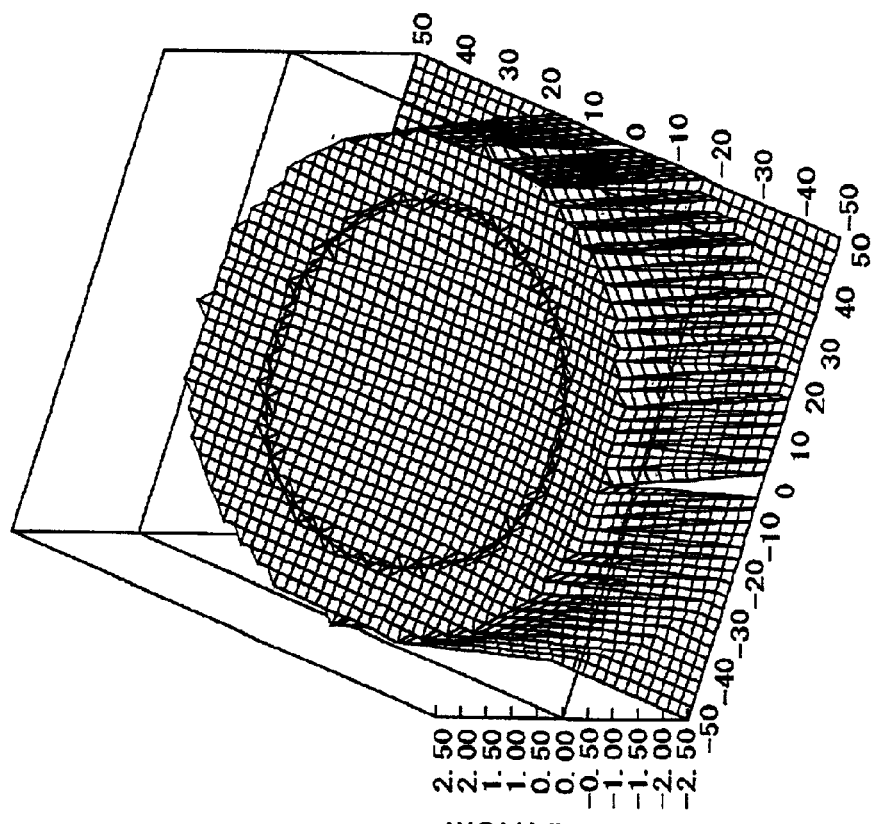
Figure 46A:
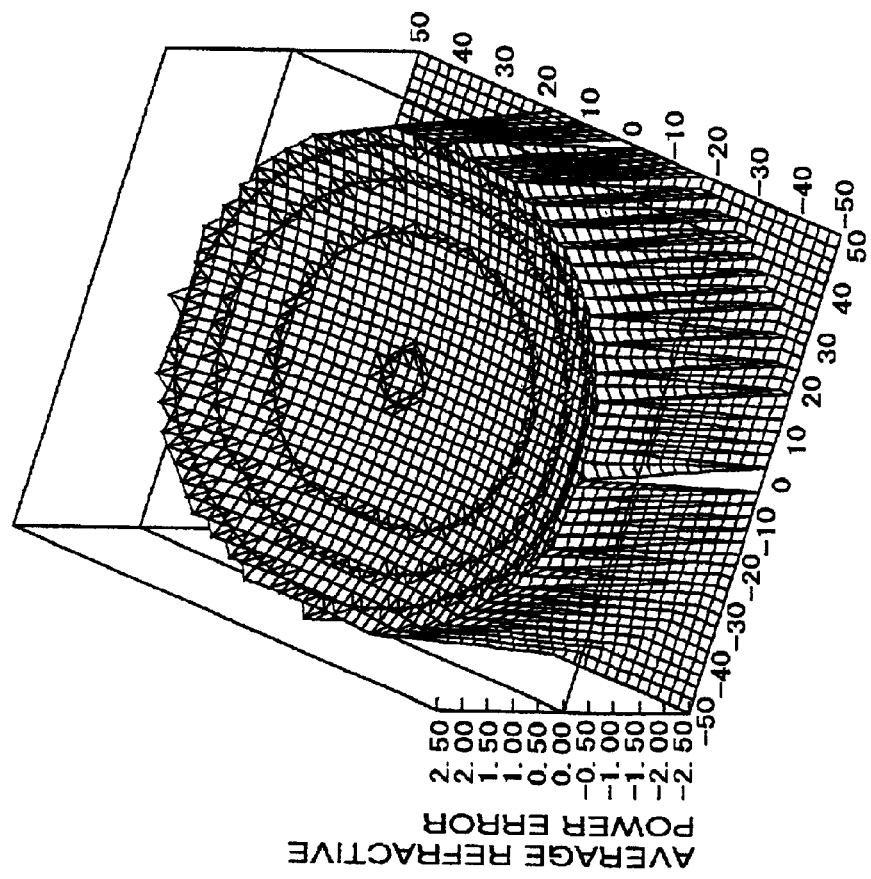

FIGS. 46A and 46B are three-dimension graphs showing transmitting optical performances of the aspherical spectacle lens of the fifth embodiment; FIG. 46A shows an average refractive power error and FIG. 46B shows astigmatism.

Sixth Embodiment

In the same manner as the fifth embodiment, the aspherical spectacle lens of the sixth embodiment satisfies the specification of TABLE 3, the front surface is a rotationally-symmetrical aspherical surface whose curvature at the framing reference point is 1.73 Diopter as shown in FIG. 47A, and the back surface is a rotationally-asymmetrical aspherical surface whose curvature at the framing reference point is distributed among 13.74 to 13.76 Diopter as shown in FIG. 47B. The center thickness of the lens of the sixth embodiment is 1.10 mm.

Figures 47, 48:
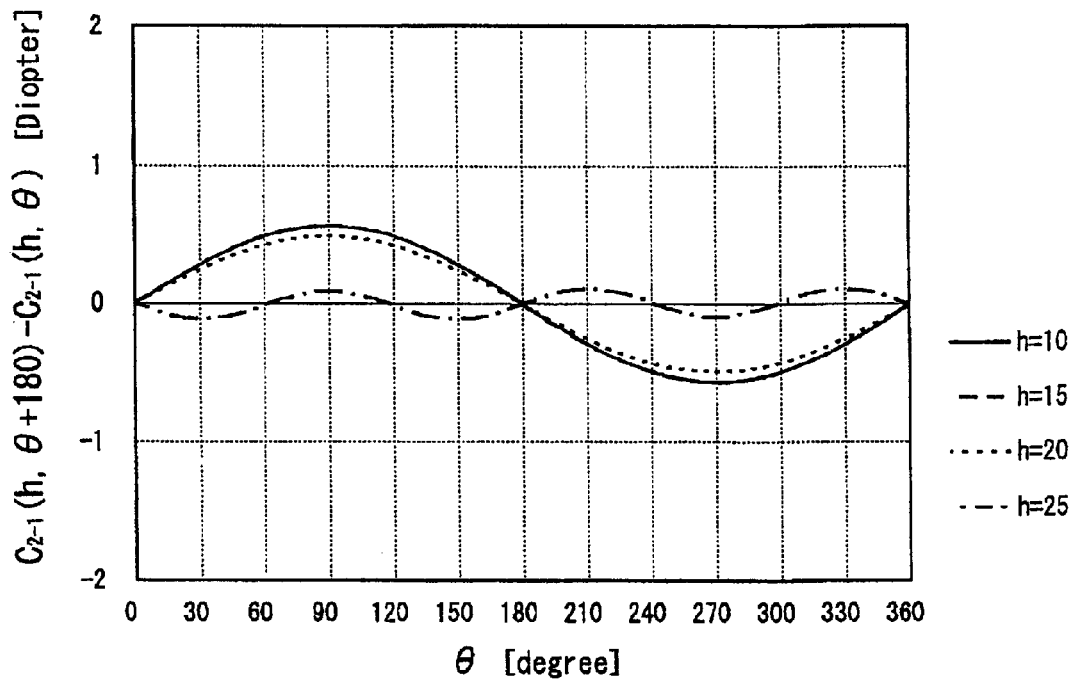

FIG. 48 is a graph showing variation of $C_{2-1}(h, \theta+180)-C_{2-1}(h, \theta)$ that is left side of the condition (1) with respect to variation of the angle $\theta$. In order to correct the aberration caused by adding the prismatic power, the values of the left side of the condition (1) rise to maximums at $\theta=90°$ and are reduced to minimums at $\theta=270°$ for the distances h=10, 15 and 20 mm. FIG. 48 shows that the values indicated in the graph are larger than zero in the range of $30 \leq \theta \leq 150$ and $10 \leq h \leq 20$. Namely, the aspherical spectacle lens of the sixth embodiment satisfies the condition (1).

Figure 49:
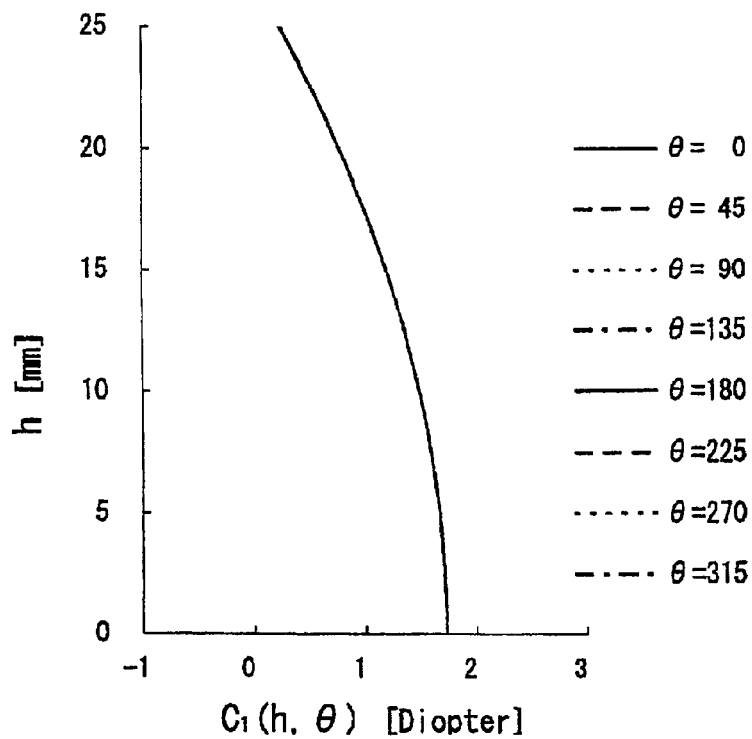
Figure 49:
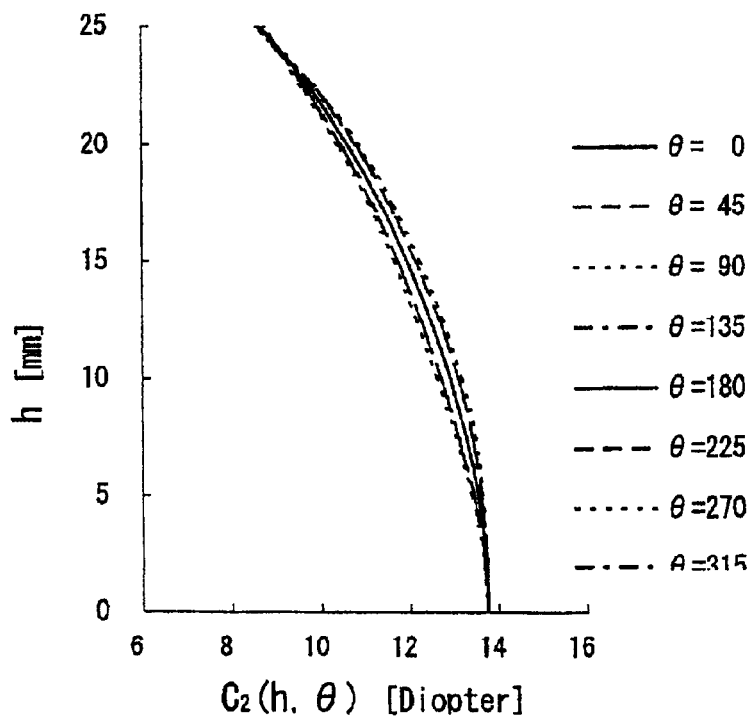

FIGS. 49A and 49B are graphs showing variations of curvatures $C_1(h, \theta)$ and $C_2(h, \theta)$ of the front and back surfaces, respectively, with respect to variation of the distance h from the framing reference point. Since the front surface is a rotationally-symmetrical aspherical surface, the curvature varies according to variation of the distance h while the variation of the angle $\theta$ does not change the curvature. In the graph of FIG. 49A, the curves of all of the angles are overlapped. Since the back surface is rotationally-asymmetrical, the curvature $C_2(h, \theta)$ varies according to variations of the distance h and the angle θ. In the graph of FIG. 49B, the curve of θ=90°, the overlapped curves of θ=45° and 135°, the overlapped curves of θ=0° and 180°, the overlapped curves of θ=225° and 315° and the curve of θ=270° are arranged in increasing order of curvature.

Figure 50:
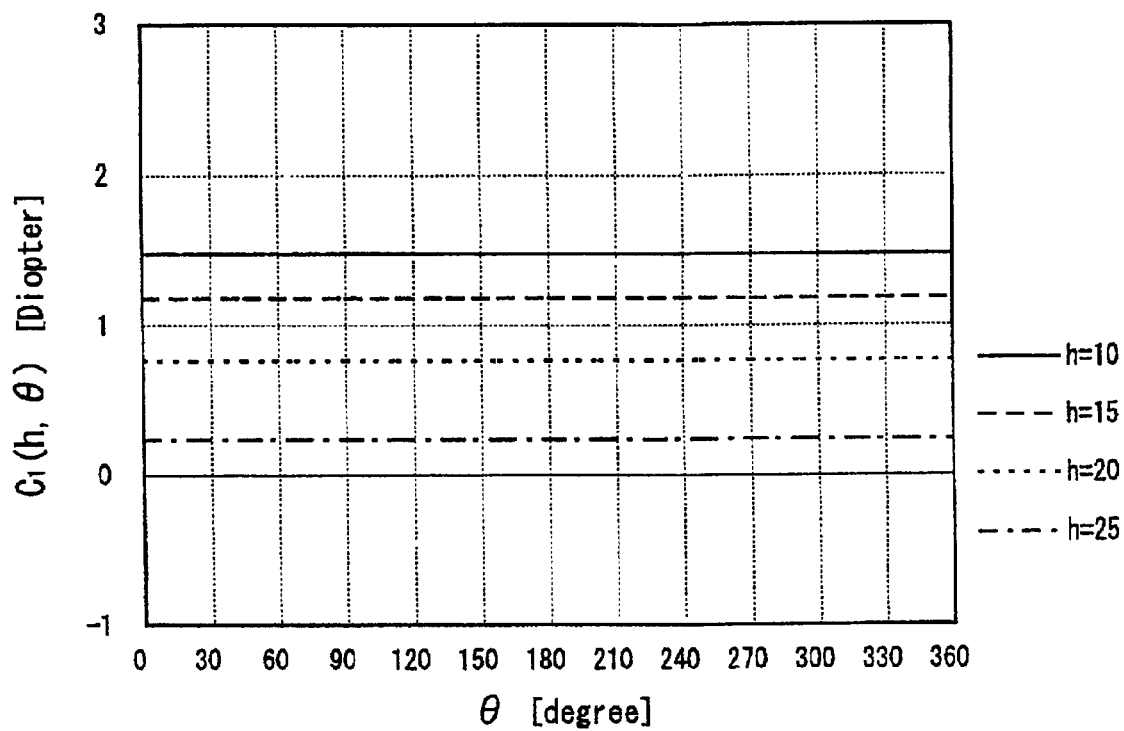
Figure 50:
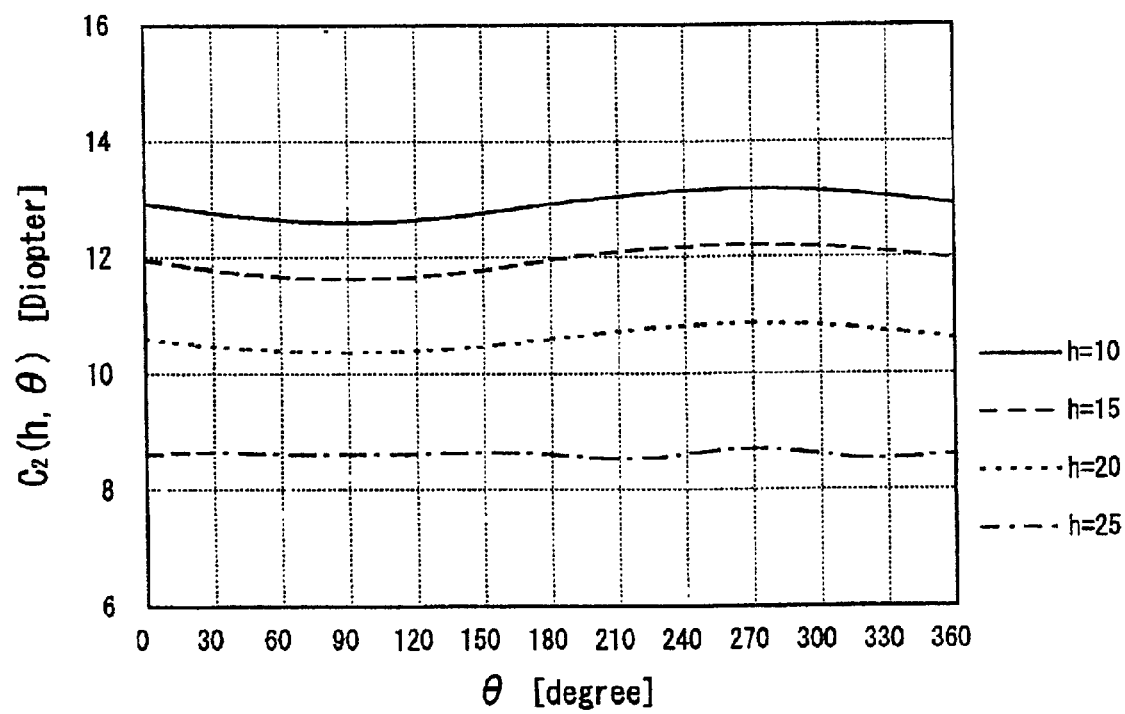

FIGS. 50A and 50B are graphs showing variations of curvatures $C_1(h, \theta)$ and $C_2(h, \theta)$ of the front and back surfaces, respectively, with respect to variation of the angle θ. Since the front surface is a rotationally-symmetrical aspherical surface, the curvatures $C_1(h, \theta)$ are different in response to the distance h and do not vary according to variation of the angle θ, the curvatures are shown as independent straight lines. In order to correct the aberration caused by adding the base-down prismatic power, the curvatures $C_2(h, \theta)$ of the back surface rise to maximums at θ=90° and are reduced to minimums at θ=270° for the distances h=10, 15 and 20 mm as shown in FIG. 50B. The longer the distance h is, the smaller the curvature $C_2(h, \theta)$ is.

Figure 51:
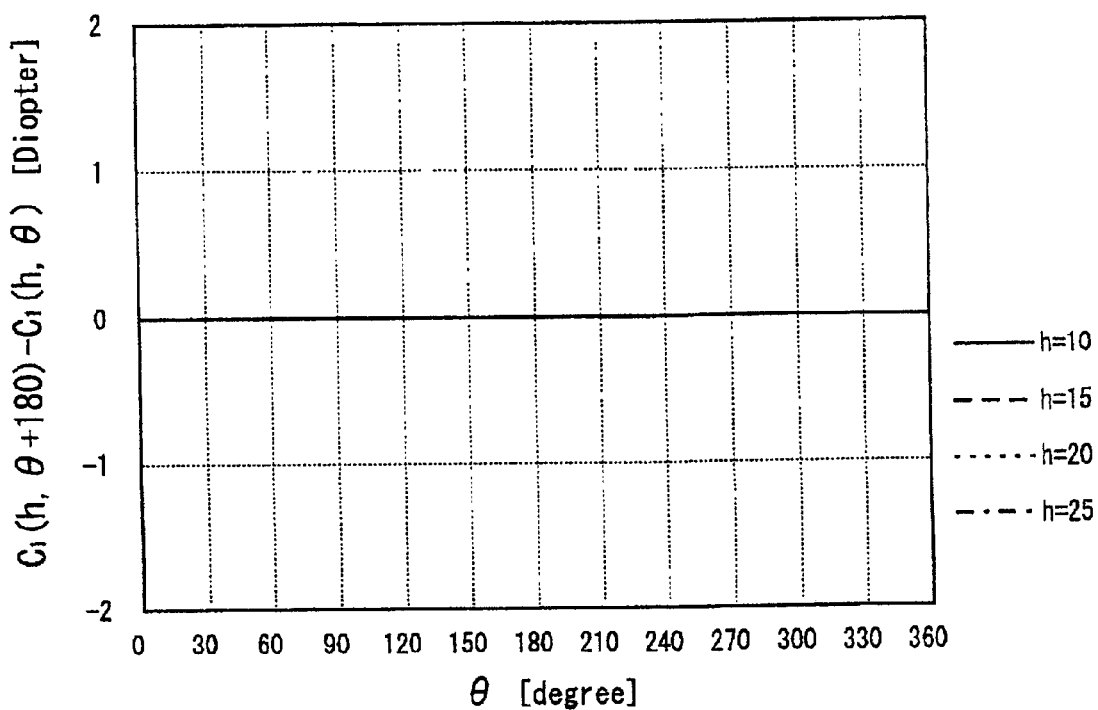
Figure 51:
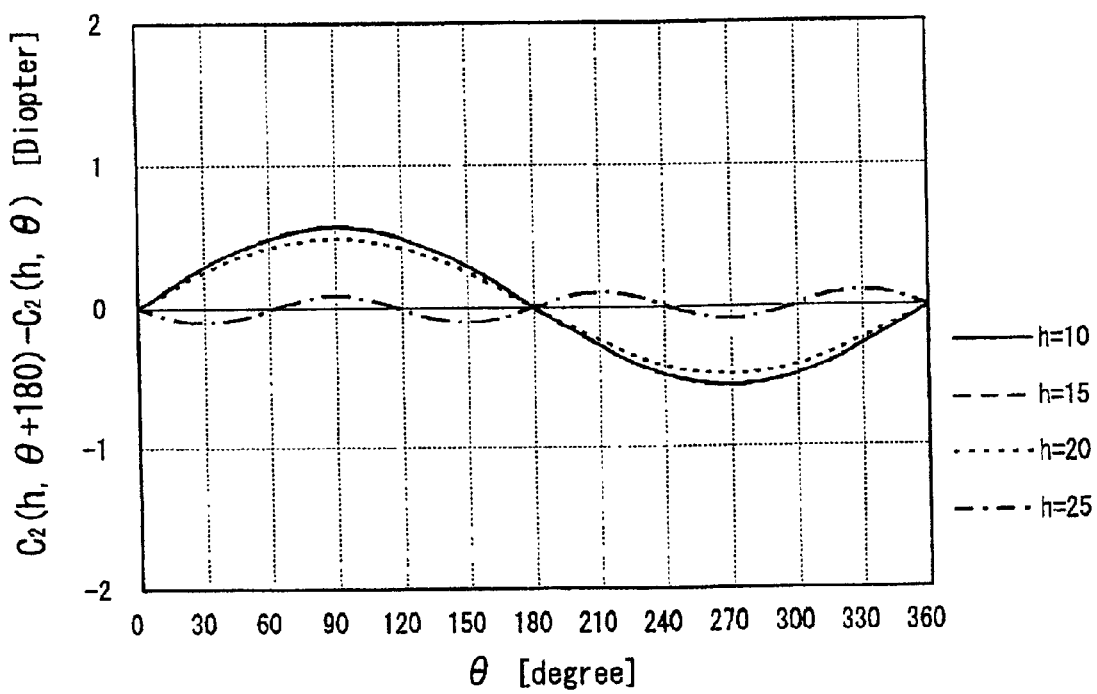

Further, FIGS. 51A and 51B are graphs showing variations of $C_1(h, \theta+180)-C_1(h, \theta)$ that is the left side of the condition (3) and $C_2(h, \theta+180)-C_2(h, \theta)$ that is the left side of the condition (2), respectively, with respect to variation of the angle θ. Since the front surface is rotationally-symmetrical, the value of the left side of the condition (3) remains constant. The value of the left side of the condition (2) varies according to variations of the angle θ and the distance h. FIG. 51B shows that the values indicated in the graph are larger than zero in the range of 30≦θ≦150 and 10≦h≦20. Namely, the aspherical spectacle lens of the sixth embodiment satisfies the condition (2).

Figure 52B:
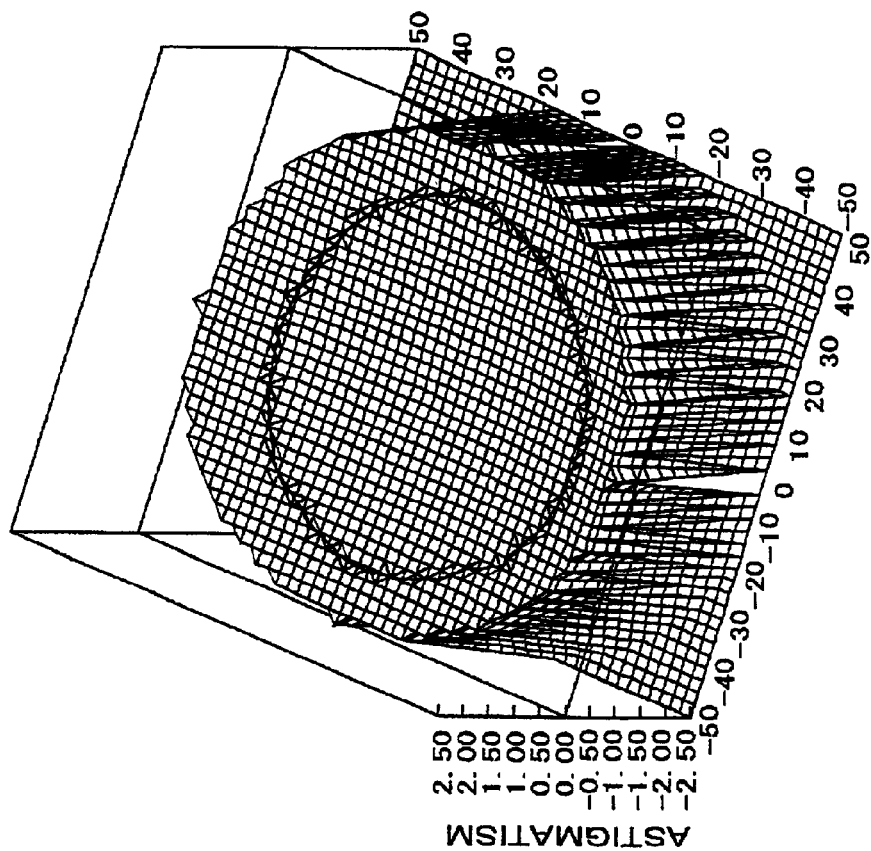
Figure 52A:
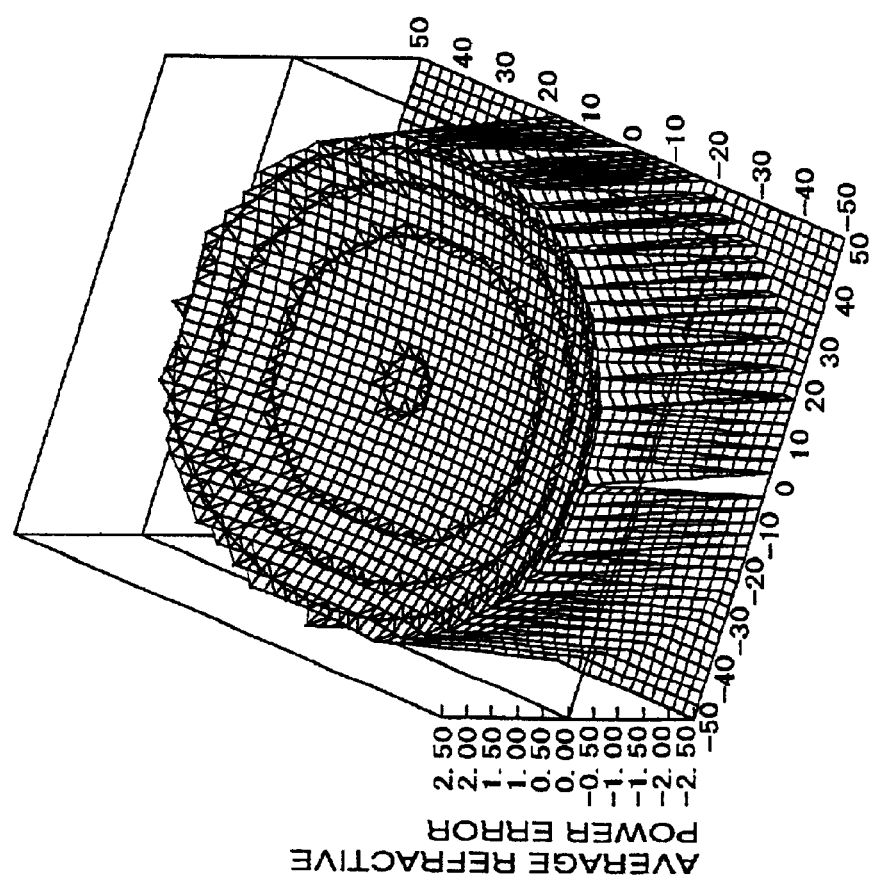

FIGS. 52A and 52B are three-dimension graphs showing transmitting optical performances of the aspherical spectacle lens of the sixth embodiment; FIG. 52A shows an average refractive power error and FIG. 52B shows astigmatism.

THIRD COMPARATIVE EXAMPLE

In the same manner as the fifth and sixth embodiments, the aspherical spectacle lens of the third comparative example satisfies the specification of TABLE 3, the front surface is a rotationally-symmetrical aspherical surface whose curvature at the framing reference point is 1.73 Diopter as shown in FIG. 53A, and the back surface is a spherical surface that has a uniform curvature 13.76 Diopter as shown in FIG. 53B. The center thickness of the lens of the third comparative example is 1.10 m.

Figures 53, 54:
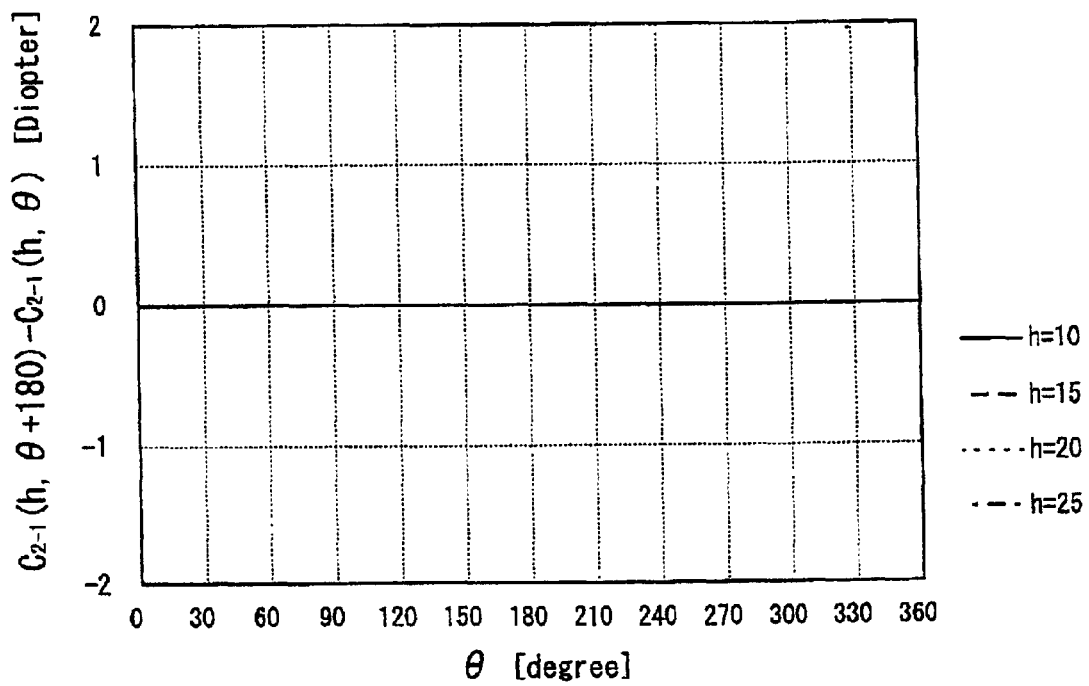

FIG. 54 is a graph showing variation of $C_{2-1}(h, \theta+180)-C_{2-1}(h, \theta)$ that is left side of the condition (1) with respect to variation of the angle θ. Since the front and back surfaces are rotationally-symmetrical, the value of the left side of the condition (1) remains constant. Namely, the aspherical spectacle lens of the third comparative example does not satisfy the condition (1).

Figure 55:
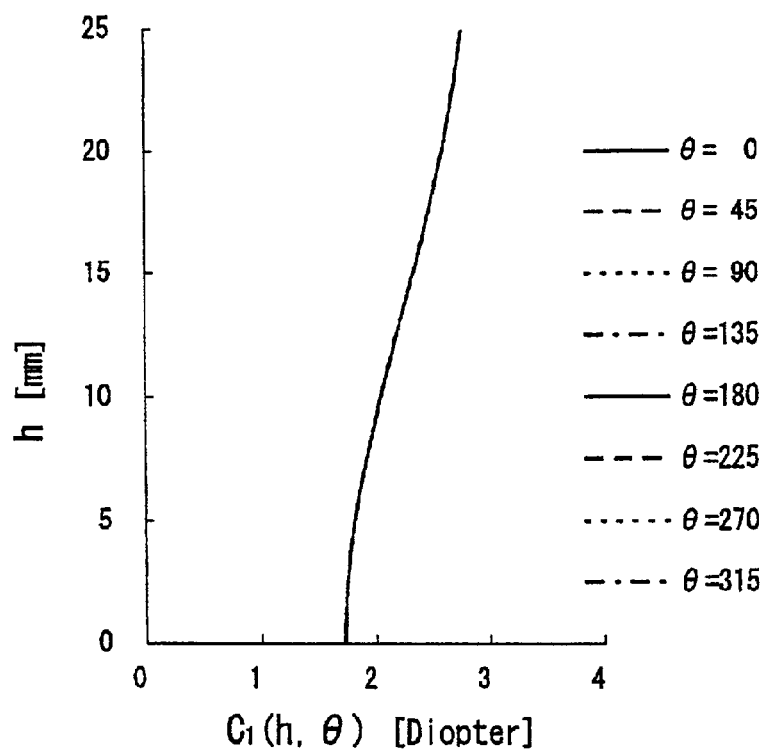
Figure 55:
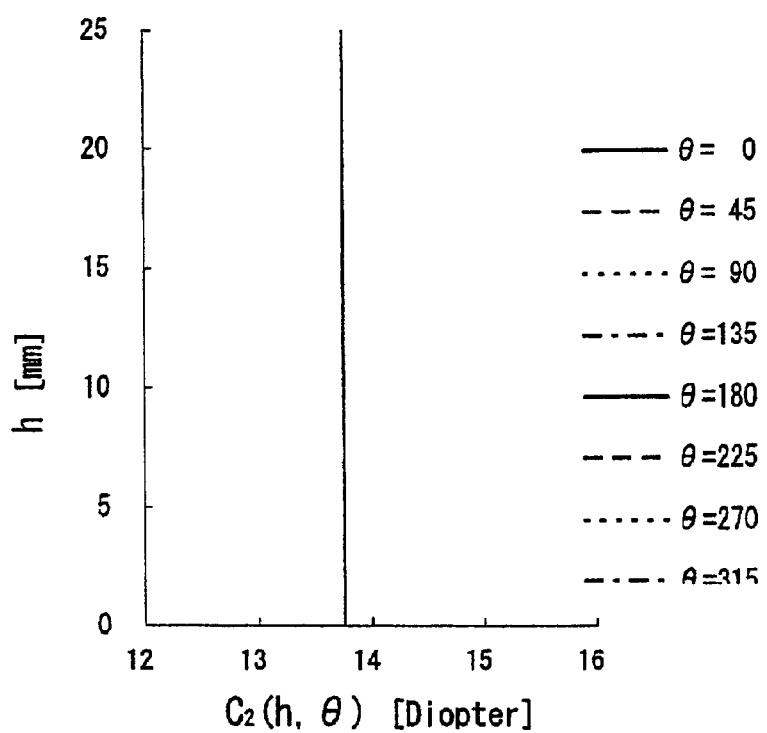

FIGS. 55A and 55B are graphs showing variations of curvatures $C_1(h, \theta)$ and $C_2(h, \theta)$ of the front and back surfaces, respectively, with respect to variation of the distance h from the framing reference point. Since the front surface is a rotationally-symmetrical aspherical surface, the curvature varies according to variation of the distance h while the variation of the angle θ does not change the curvature. In the graph of FIG. 55A, the curves of all of the angles are overlapped. Since the back surface is spherical, the curvature does not vary according to variations of the distance h and the angle θ, the graph of FIG. 55B shows the straight lines overlapped to each other.

Figure 56:
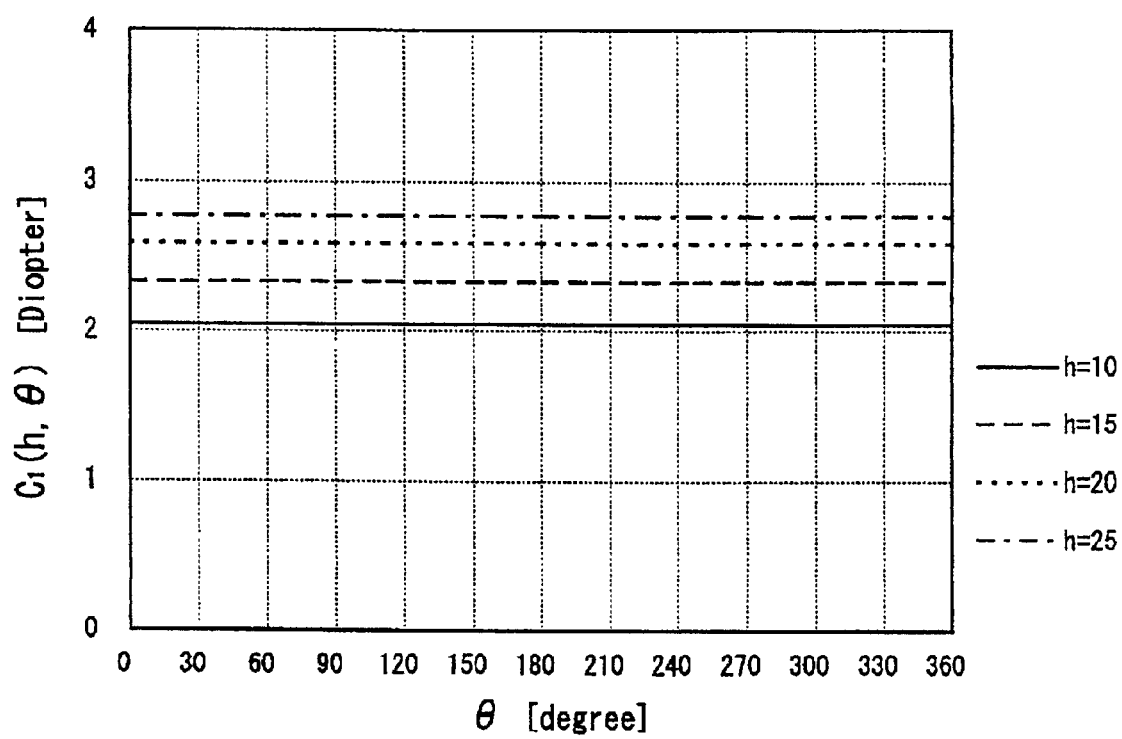
Figure 56:
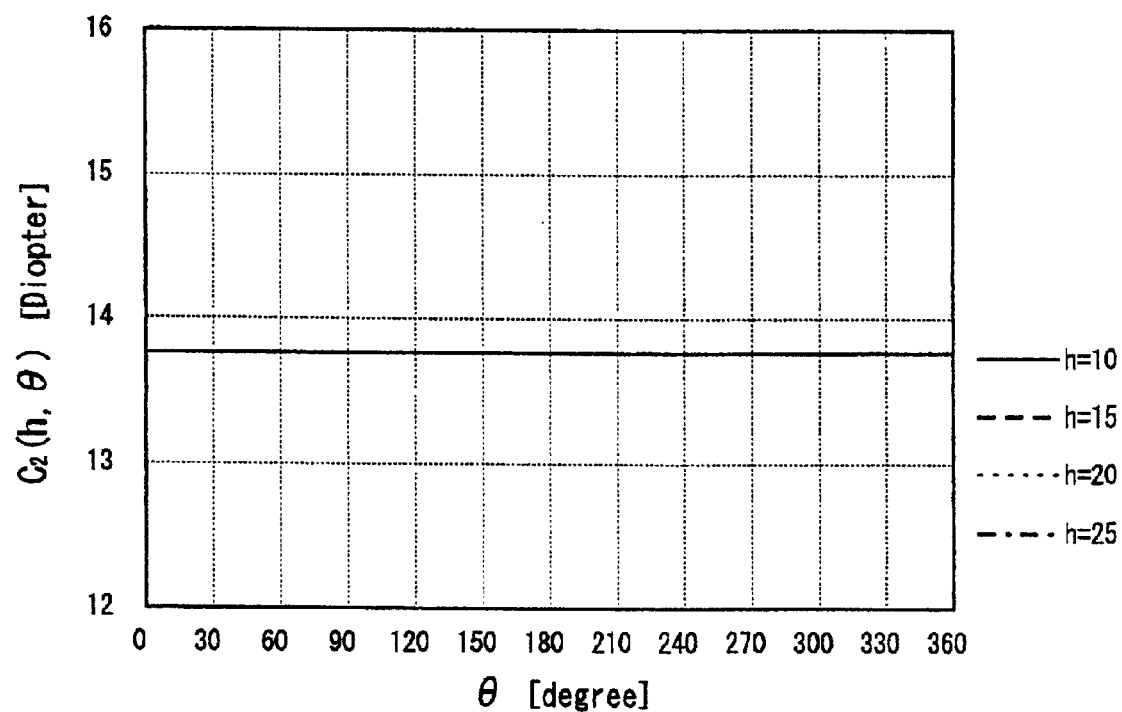

FIGS. 56A and 56B are graphs showing variations of curvatures $C_1(h, \theta)$ and $C_2(h, \theta)$ of the front and back surfaces, respectively, with respect to variation of the angle θ. Since the front surface is a rotationally-symmetrical aspherical surface, the curvatures $C_1(h, \theta)$ are different in response to the distance h and do not vary according to variation of the angle θ, the curvatures are shown as independent straight lines. Since the back surface is spherical, the curvature $C_2(h, \theta)$ does not vary according to variations of the distance h and the angle θ, the graph of FIG. 56B shows the straight lines overlapped to each other.

Figure 57:
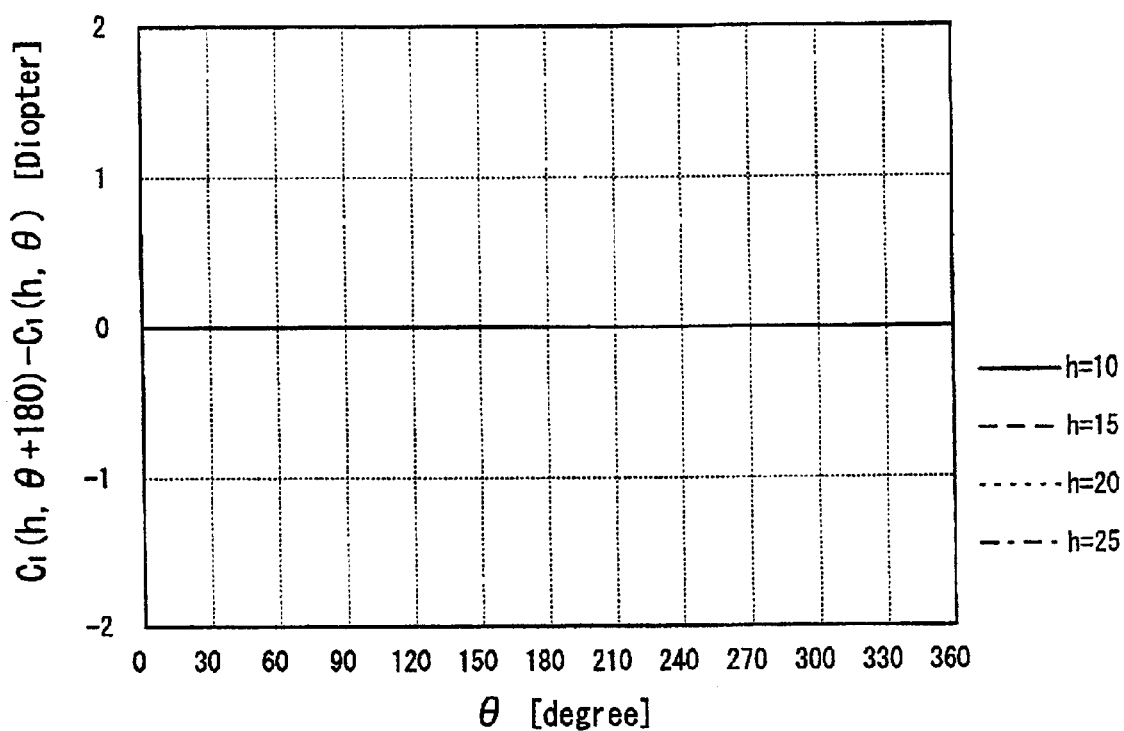
Figure 57:
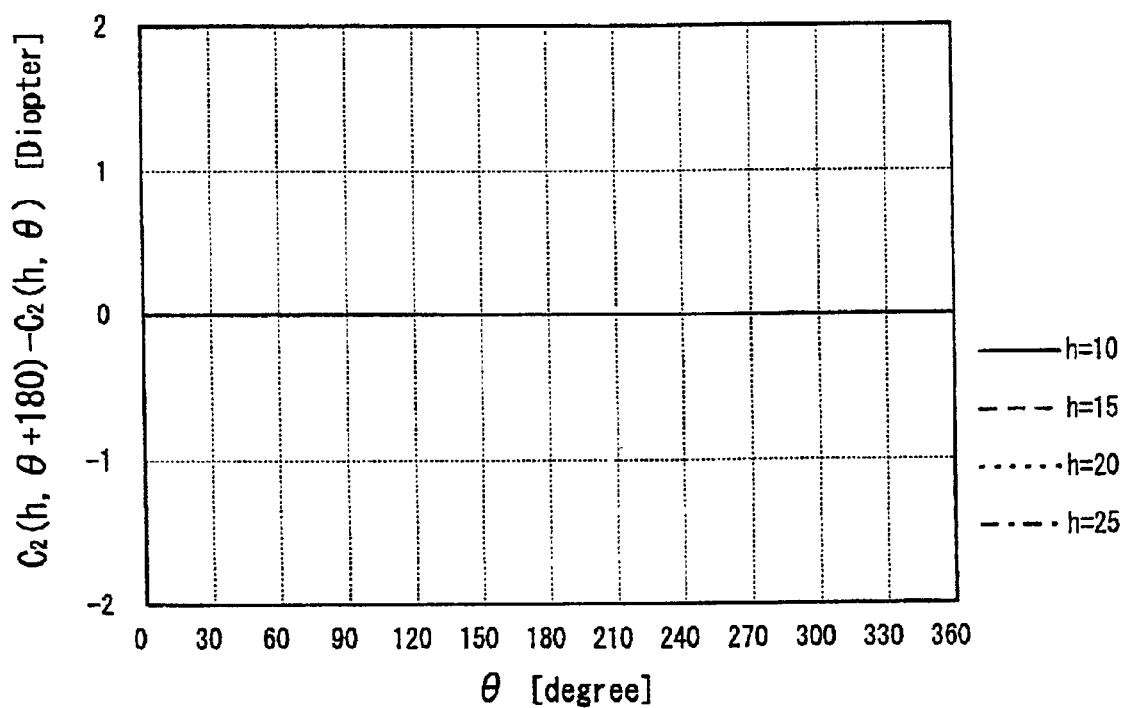

Further, FIGS. 57A and 57B are graphs showing variations of $C_1(h, \theta+180)-C_1(h, \theta)$ that is the left side of the condition (3) and $C_2(h, \theta+180)-C_2(h, \theta)$ that is the left side of the condition (2), respectively, with respect to variation of the angle θ. Since the front surface is a rotationally-symmetrical aspherical surface, the value of the left side of the condition (3) remains constant. Further, since the back surface is spherical, the value of the left side of the condition (2) remains constant. Namely, the spectacle lens of the third comparative example does not satisfy the conditions (2) and (3).

Figure 58B:
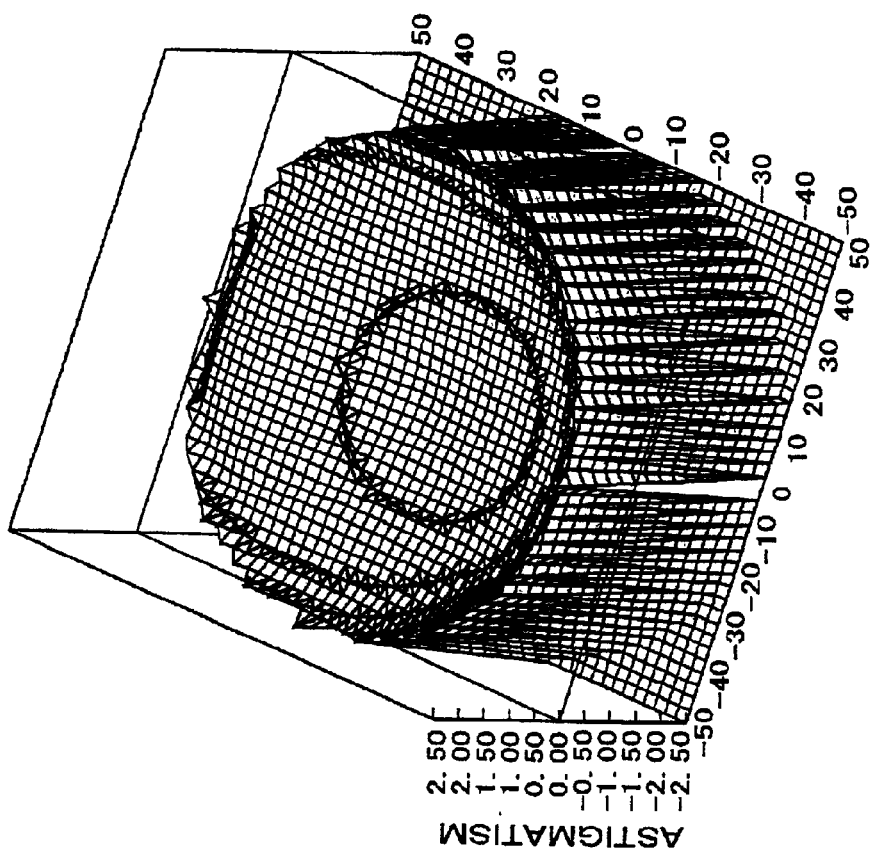
Figure 58A:
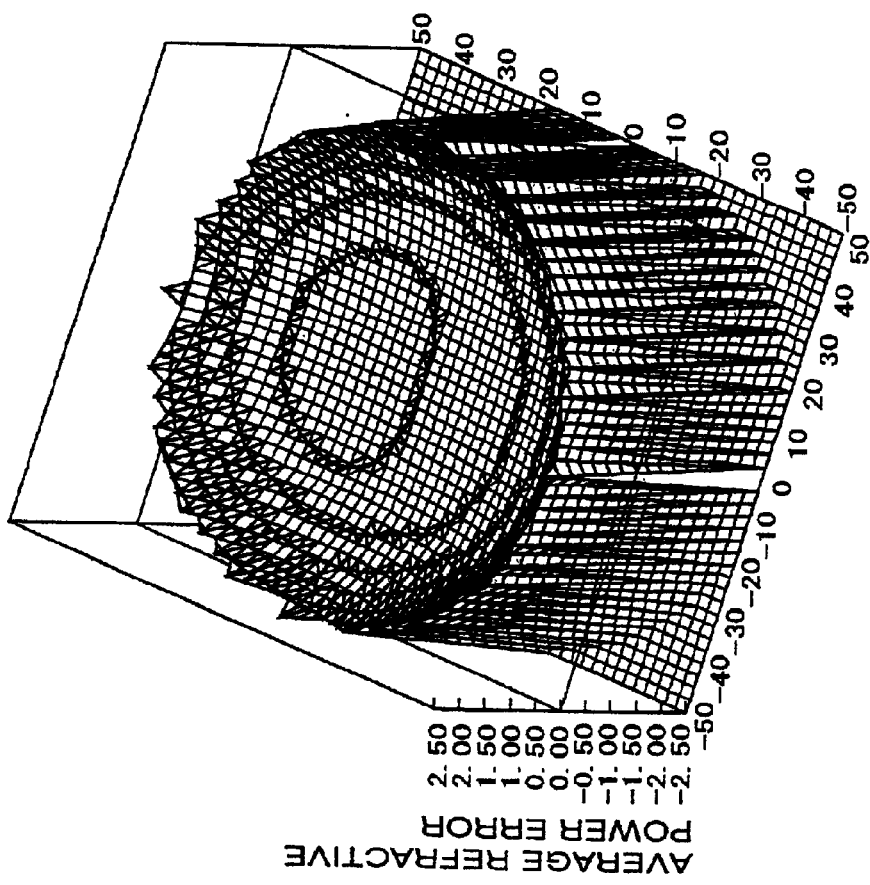

FIGS. 58A and 58B are three-dimension graphs showing transmitting optical performances of the aspherical spectacle lens of the third comparative example; FIG. 58A shows an average refractive power error and FIG. 58B shows astigmatism. As compared with the graphs of the fifth and sixth embodiments (FIGS. 46A, 46B, 52A and 52B) designed for the same specification, a number of contour lines in either graph of the third comparative example is larger than that of the embodiments, which shows that the optical performance of the embodiments is better than the comparative example.

Seventh Embodiment

The spectacle lenses of the seventh and eighth embodiments and the fourth comparative example are designed for satisfying the specification shown in TABLE 4. Each of these lenses has a prismatic power to correct hereophoria and a cylindrical power to correct astigmatism.

TABLE 4

| | |
|---|---|
| SPH | −8.00 Diopter |
| CYL | −4.00 Diopter |
| AX | 90° |
| PRS | 3.00 Δ |
| BASE | 270° Base Down |

The aspherical spectacle lens of the seventh embodiment satisfies the specification of TABLE 4, the front surface is a spherical surface that has a uniform curvature 0.68 Diopter as shown in FIG. 59A, and the back surface is a rotationally-asymmetrical aspherical surface whose curvature at the framing reference point is distributed among 12.69 to 18.72 Diopter as shown in FIG. 59B. The center thickness of the lens of the seventh embodiment is 1.10 mm. The back surface contains a first rotationally-asymmetrical component to correct the aberration caused by adding a prismatic power and a second rotationally-asymmetrical component to add a cylindrical power. Therefore, any rotationally-asymmetrical component is not required for the front surface, which allows the front surface to be formed as a spherical surface.

Figures 59, 60:
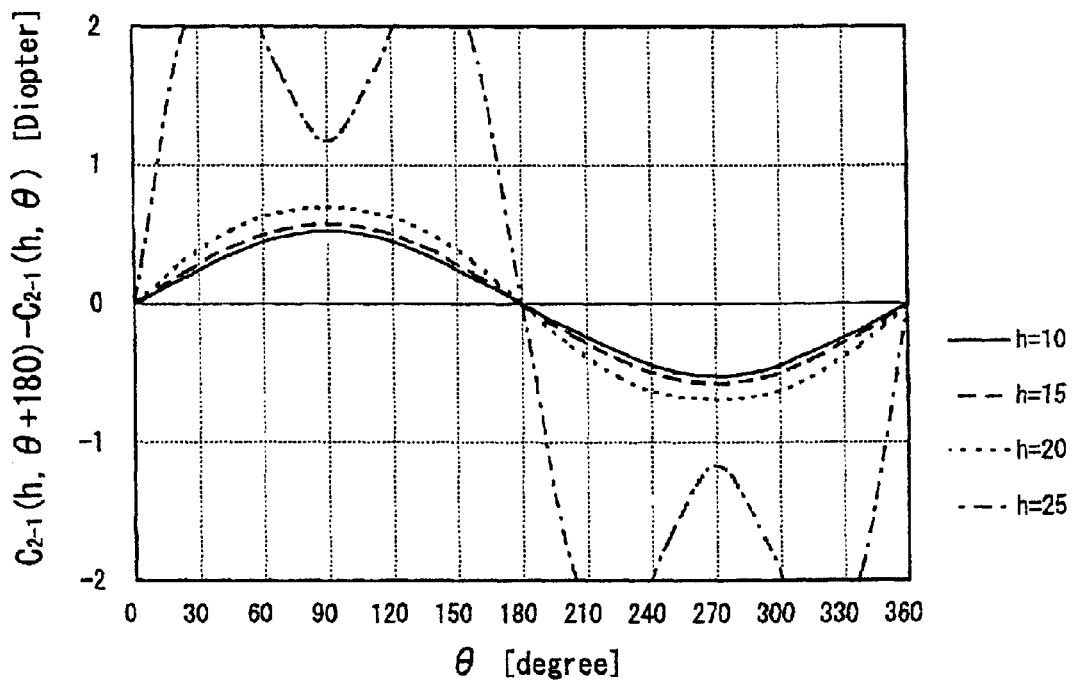

FIG. 60 is a graph showing variation of $C_{2-1}(h, \theta+180)-C_{2-1}(h, \theta)$ that is left side of the condition (1) with respect to variation of the angle θ. In order to correct the aberration caused by adding the prismatic power, the values of the left side of the condition (1) rise to maximums at θ=90° and are reduced to minimums at θ=270° for the distances h=10, 15 and 20. The amplitude of the variation increases as the distance h becomes larger. FIG. 60 shows that the values indicated in the graph are larger than zero in the range of $30 \leq \theta \leq 150$ for all of the distances h=10, 15, 20 and 25 mm. Namely, the aspherical spectacle lens of the seventh embodiment satisfies the condition (1).

Figure 61:
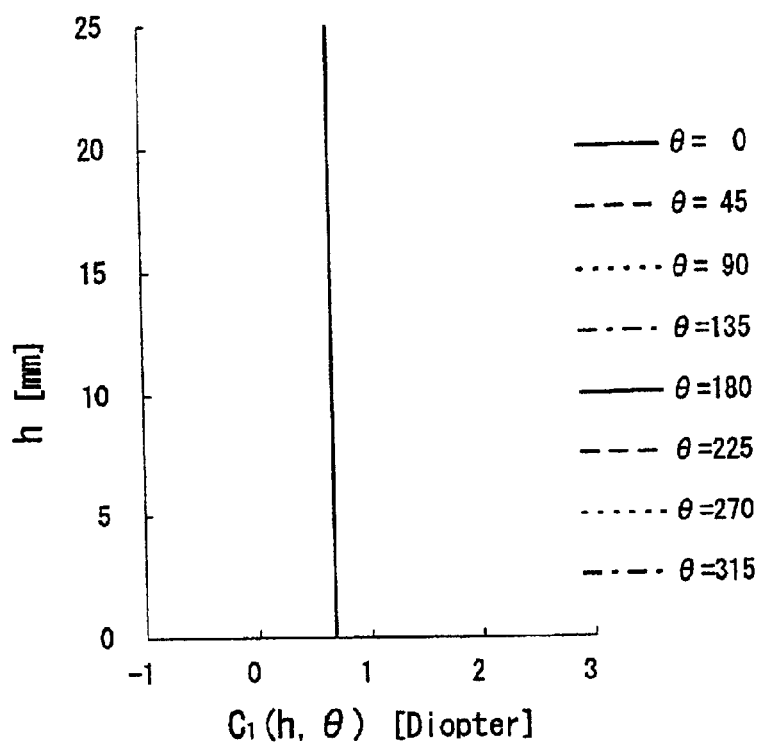
Figure 61:
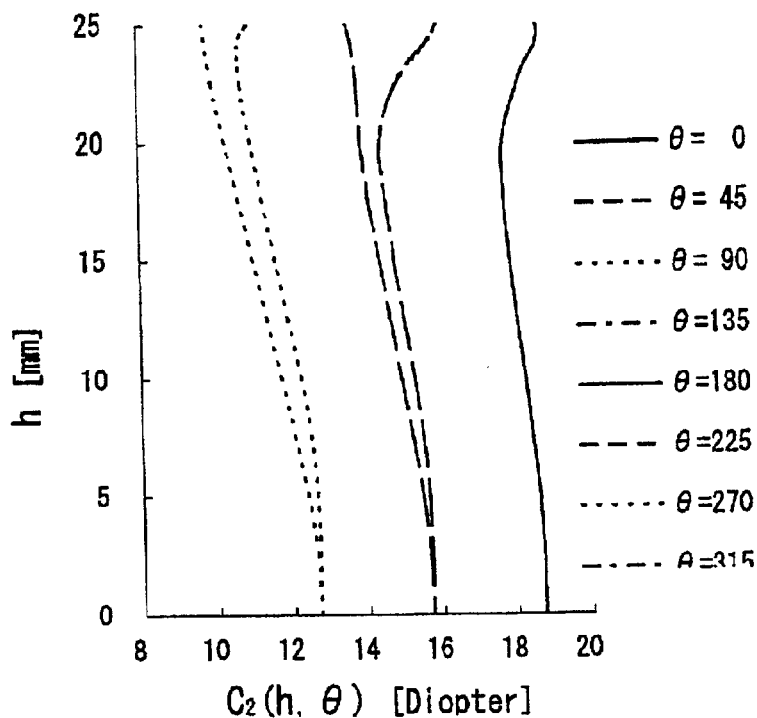

FIGS. 61A and 61B are graphs showing variations of curvatures $C_1(h, \theta)$ and $C_2(h, \theta)$ of the front and back surfaces, respectively, with respect to variation of the distance h from the framing reference point. Since the front surface is spherical, the curvature $C_1(h, \theta)$ does not vary according to variations of the distance h and the angle $\theta$, the graph of FIG. 61A shows the straight lines overlapped to each other. Since the back surface is rotationally-asymmetrical, the curvature $C_2(h, \theta)$ varies according to variations of the distance h and the angle $\theta$. In the graph of FIG. 61B, the curve of $\theta=90°$, the curve of $\theta=270°$, the overlapped curves of $\theta=45°$ and $135°$, the overlapped curves of $\theta=225°$ and $315°$, the overlapped curves of $\theta=0°$ and $180°$ are arranged in increasing order of curvature.

Figure 62:
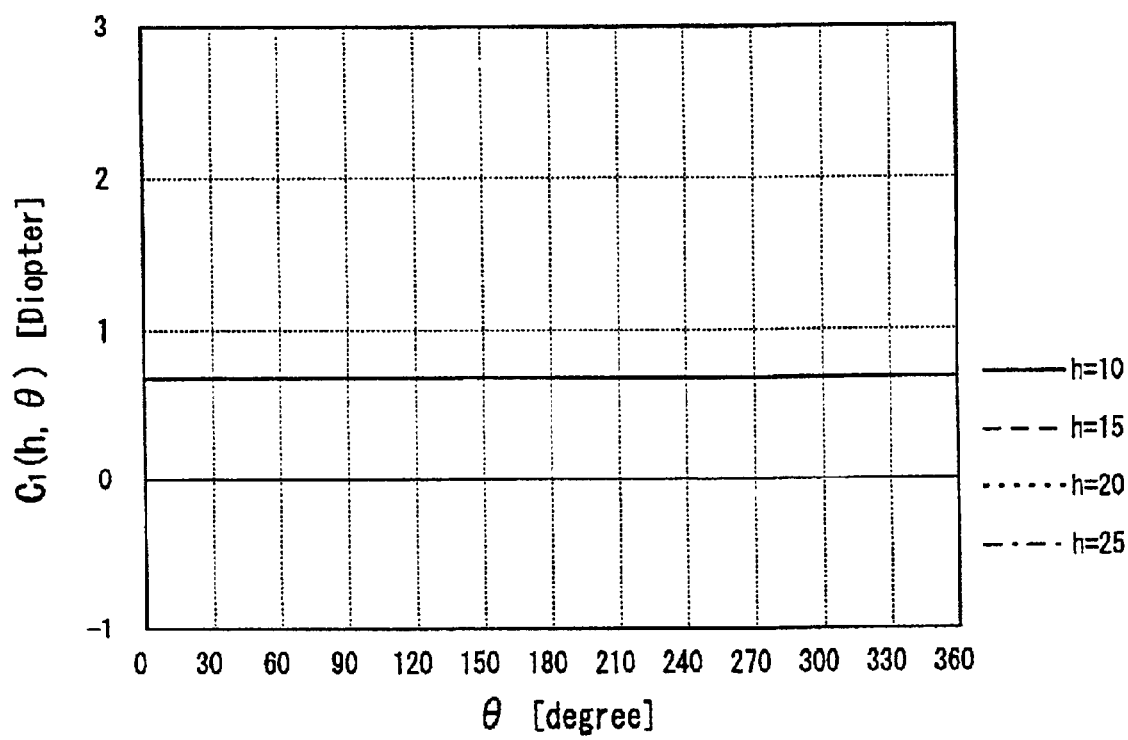
Figure 62:
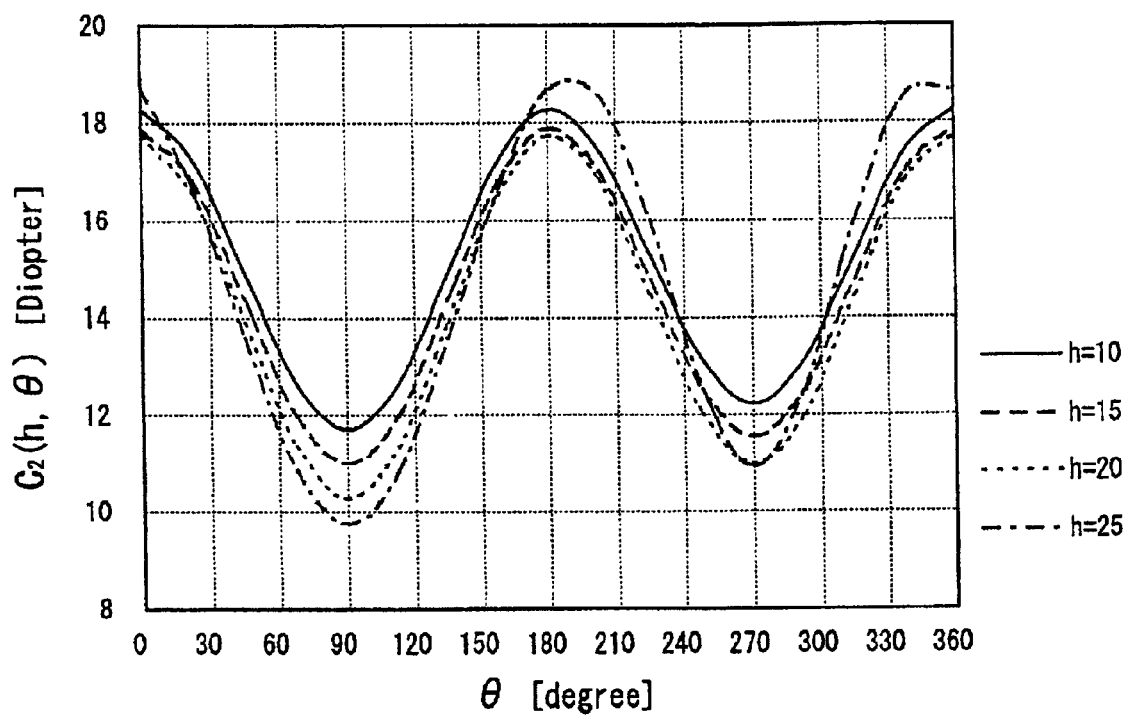

FIGS. 62A and 62B are graphs showing variations of curvatures $C_1(h, \theta)$ and $C_2(h, \theta)$ of the front and back surfaces, respectively, with respect to variation of the angle $\theta$. Since the front surface is spherical, the curvature $C_1(h, \theta)$ does not vary according to variations of the distance h and the angle $\theta$, the graph of FIG. 62A shows the straight lines overlapped to each other. The curvature of the back surface becomes large at $\theta=0°$ and $180°$ and becomes small at $\theta=90°$ and $270°$ due to the added cylindrical power, in general. However, the curvature at the side of the prism base ($\theta=270°$) is larger than that at the side of the apex ($\theta=90°$) in order to correct the aberration caused by adding the base-down prismatic power.

Figure 63:
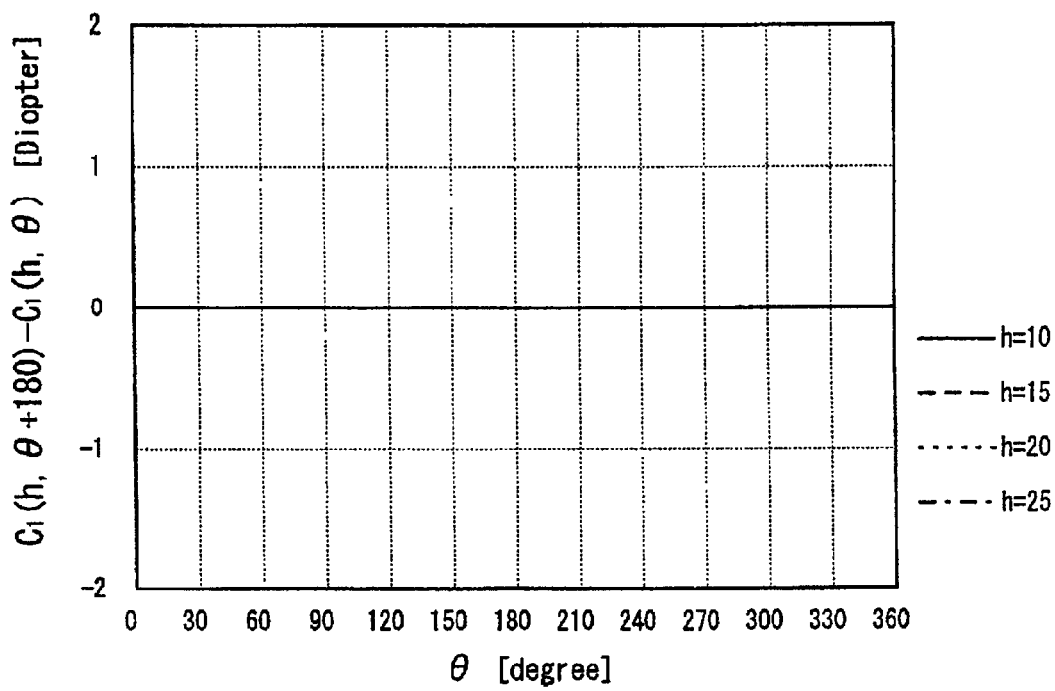
Figure 63:
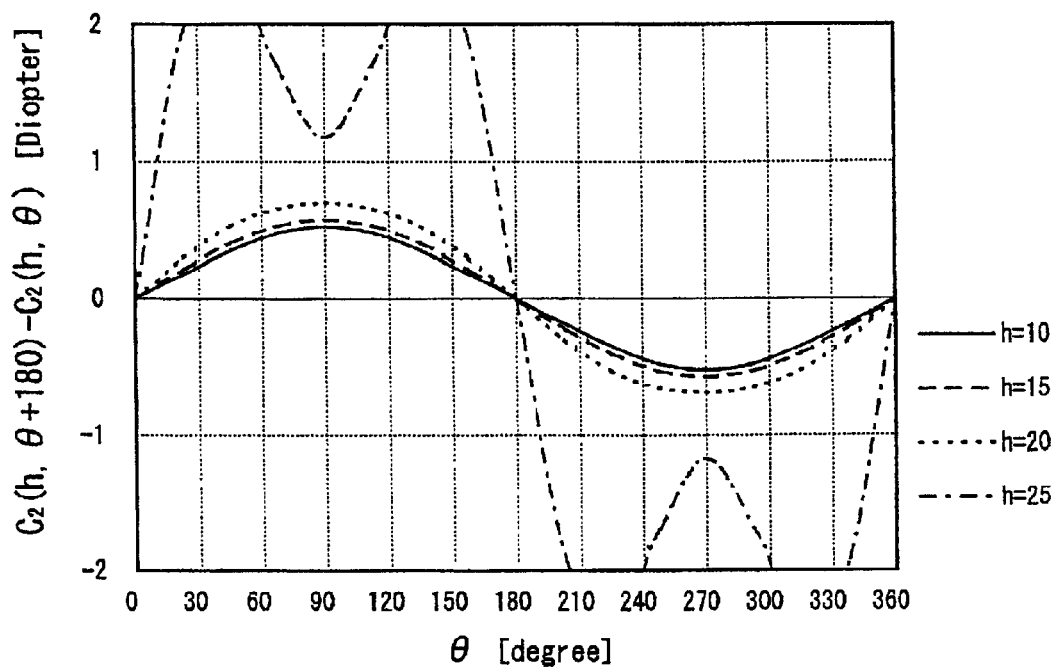

Further, FIGS. 63A and 63B are graphs showing variations of $C_1(h, \theta+180)-C_1(h, \theta)$ that is the left side of the condition (3) and $C_2(h, \theta+180)-C_2(h, \theta)$ that is the left side of the condition (2), respectively, with respect to variation of the angle $\theta$. Since the front surface is spherical, the value of the left side of the condition (3) remains constant. The value of the left side of the condition (2) varies according to variations of the angle $\theta$ and the distance h. FIG. 63B shows that the values indicated in the graph are larger than zero in the range of $30 \leq \theta \leq 150$ for all of the distances h=10, 15, 20 and 25 mm. Namely, the aspherical spectacle lens of the seventh embodiment satisfies the condition (2).

Figure 64B:
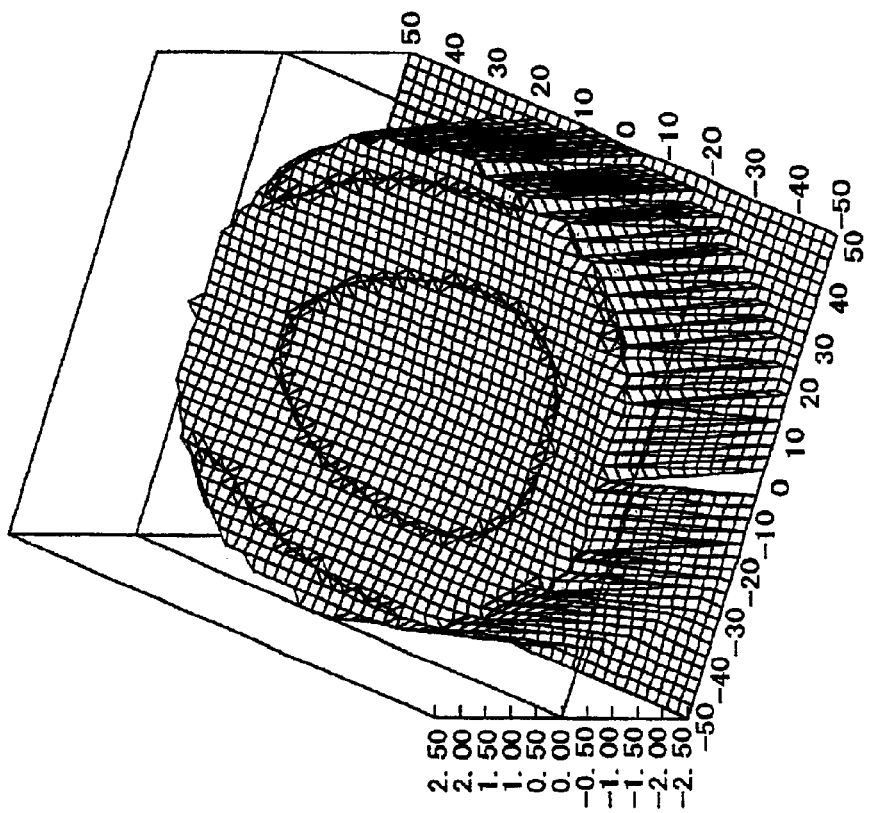
Figure 64A:
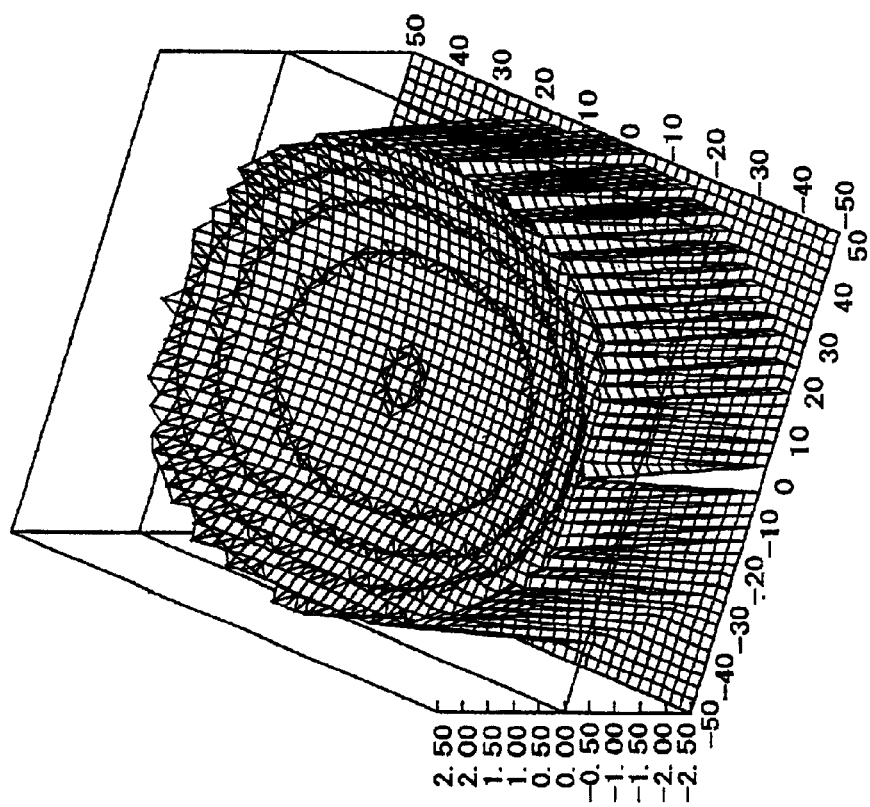

FIGS. 64A and 64B are three-dimension graphs showing transmitting optical performances of the aspherical spectacle lens of the seventh embodiment; FIG. 64A shows an average refractive power error and FIG. 64B shows astigmatism.

Eighth Embodiment

In the same manner as the seventh embodiment, the aspherical spectacle lens of the eighth embodiment satisfies the specification of TABLE 4, the front surface is a rotationally-symmetrical aspherical surface whose curvature at the framing reference point is 1.01 Diopter as shown in FIG. 65A, and the back surface is a rotationally-asymmetrical aspherical surface whose curvature is distributed among 13.02 to 19.05 Diopter as shown in FIG. 65B. The center thickness of the lens of the eighth embodiment is 1.10 mm.

Figures 65, 66:
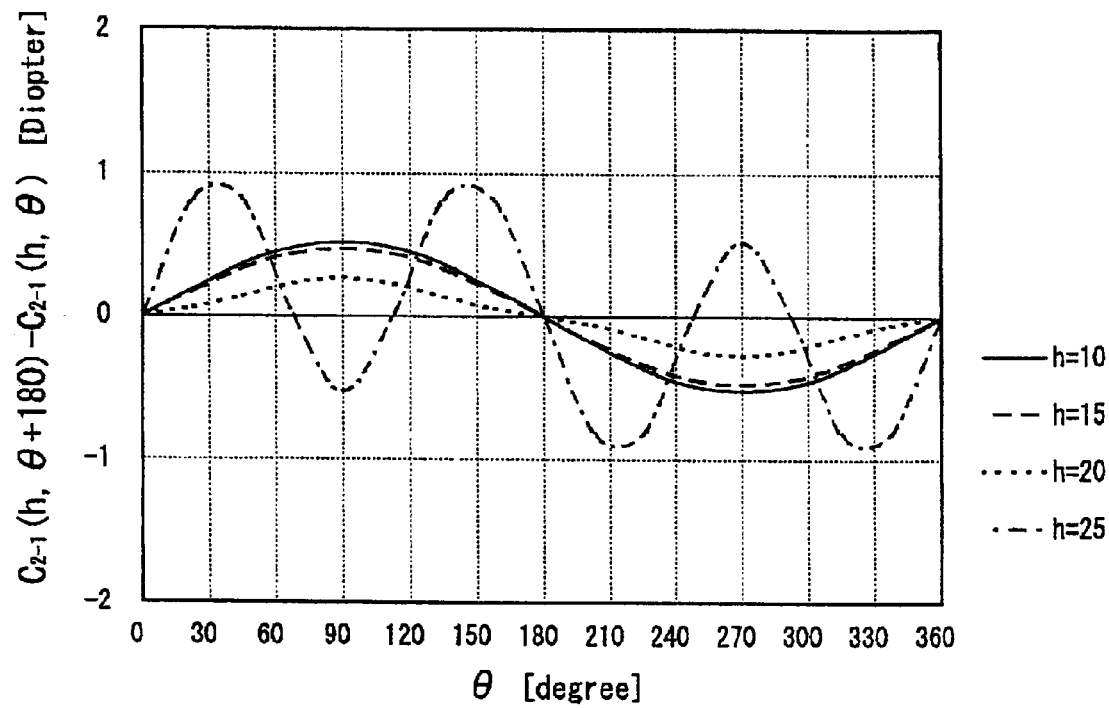

FIG. 66 is a graph showing variation of $C_{2-1}(h, \theta+180)-C_{2-1}(h, \theta)$ that is left side of the condition (1) with respect to variation of the angle $\theta$. The values of the left side of the condition (1) rise to maximums at $\theta=90°$ and are reduced to minimums at $\theta=270°$ for the distances h=10, 15 and 20 mm. FIG. 66 shows that the values indicated in the graph are larger than zero in the range of $30 \leq \theta \leq 150$ and $10 \leq h \leq 20$. Namely, the aspherical spectacle lens of the eighth embodiment satisfies the condition (1).

Figure 67:
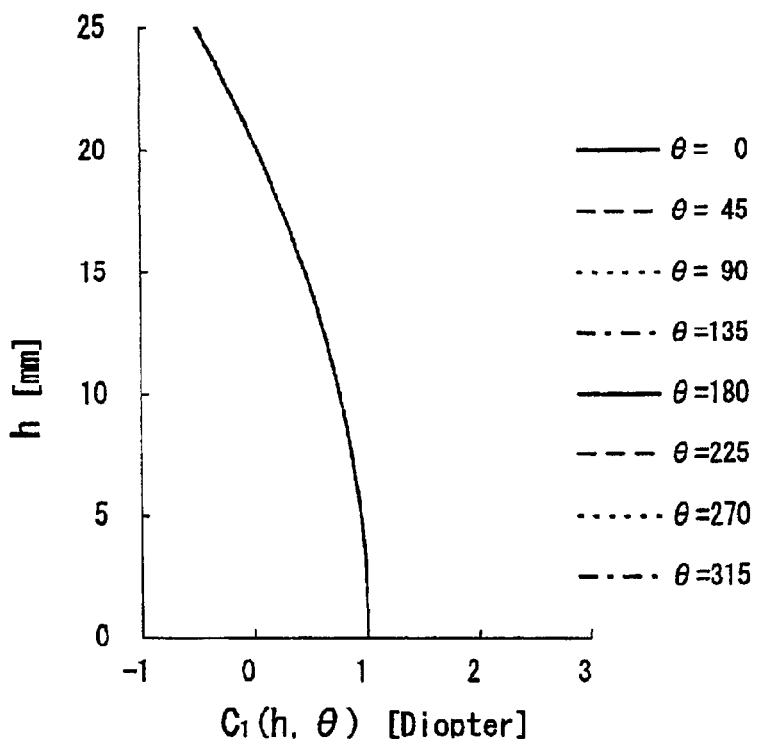
Figure 67:
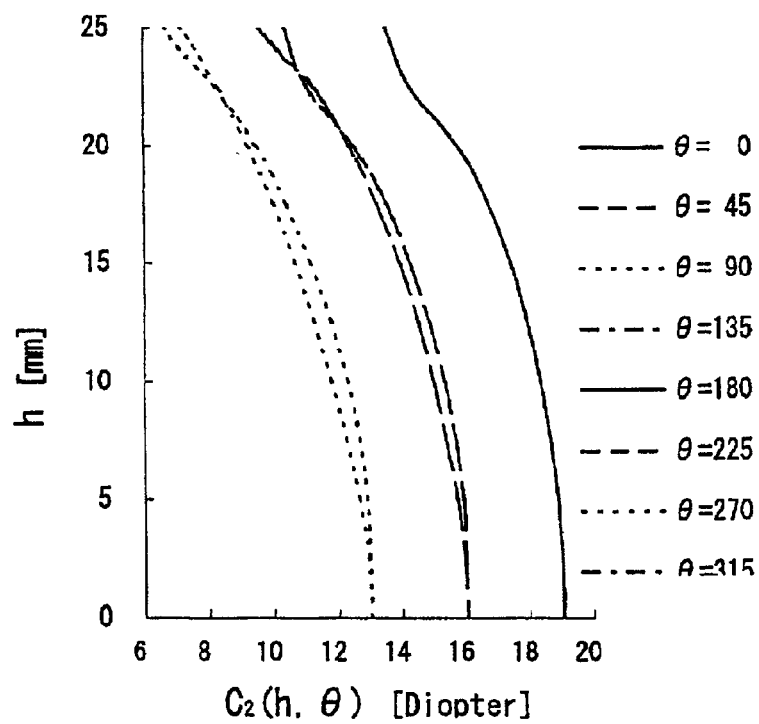

FIGS. 67A and 67B are graphs showing variations of curvatures $C_1(h, \theta)$ and $C_2(h, \theta)$ of the front and back surfaces, respectively, with respect to variation of the distance h from the framing reference point. Since the front surface is a rotationally-symmetrical aspherical surface, the curvature varies according to variation of the distance h while the variation of the angle $\theta$ does not change the curvature. In the graph of FIG. 67A, the curves of all of the angles are overlapped. Since the back surface is rotationally-asymmetrical, the curvature $C_2(h, \theta)$ varies according to variations of the distance h and the angle $\theta$. In the graph of FIG. 67B, the curve of $\theta=90°$, the curve of $\theta=270°$, the overlapped curves of $\theta=45°$ and $135°$, the overlapped curves of $\theta=225°$ and $315°$, the overlapped curves of $\theta=0°$ and $180°$ are arranged in increasing order of curvature.

Figure 68:
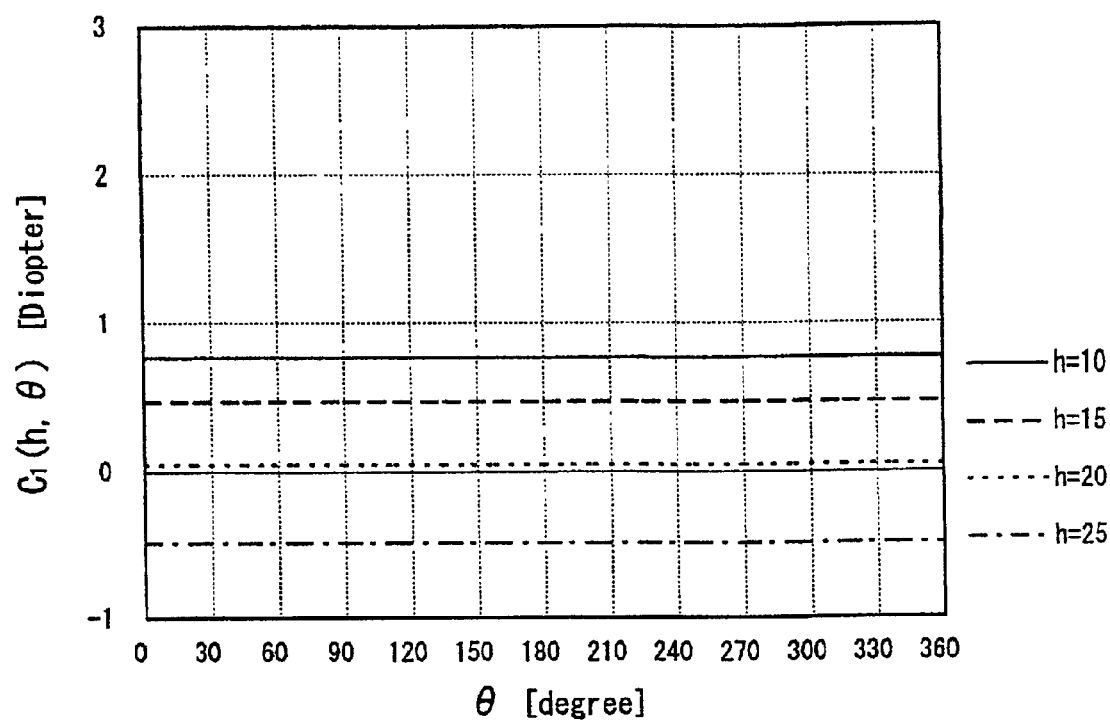
Figure 68:
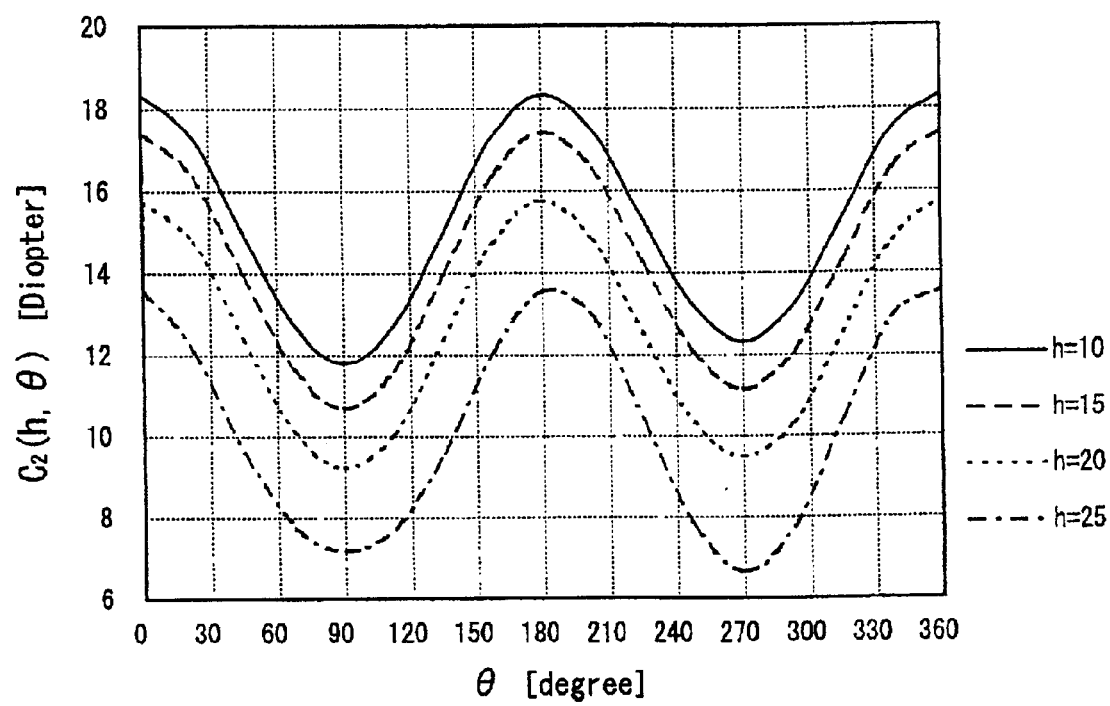

FIGS. 68A and 68B are graphs showing variations of curvatures $C_1(h, \theta)$ and $C_2(h, \theta)$ of the front and back surfaces, respectively, with respect to variation of the angle $\theta$. Since the front surface is a rotationally-symmetrical aspherical surface, the curvatures $C_1(h, \theta)$ are different in response to the distance h and do not vary according to variation of the angle $\theta$, the curvatures are shown as independent straight lines. The curvature of the back surface becomes large at $\theta=0°$ and $180°$ and becomes small at $\theta=90°$ and $270°$ due to the added cylindrical power, in general. However, the curvature at the side of the prism base ($\theta=270°$) is larger than that at the side of the apex ($\theta=90°$) in order to correct the aberration caused by adding the base-down prismatic power.

Figure 69:
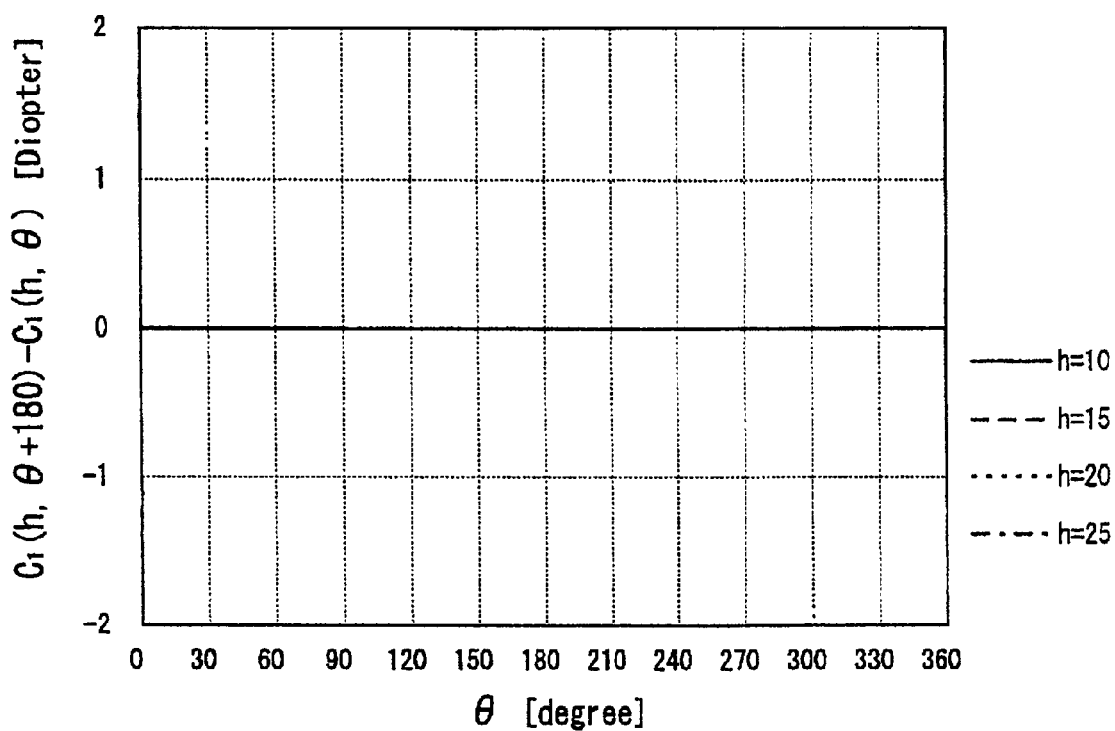
Figure 69:
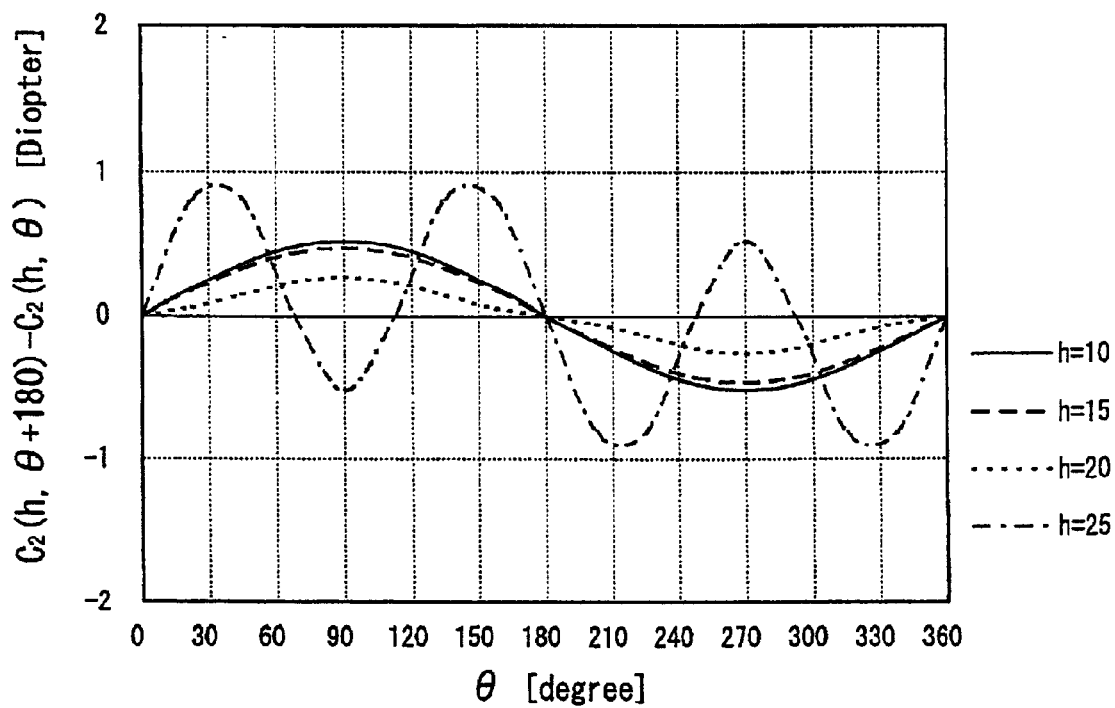

Further, FIGS. 69A and 69B are graphs showing variations of $C_1(h, \theta+180)-C_1(h, \theta)$ that is the left side of the condition (3) and $C_2(h, \theta+180)-C_2(h, \theta)$ that is the left side of the condition (2), respectively, with respect to variation of the angle $\theta$. Since the front surface is rotationaly-symmetrical, the value of the left side of the condition (3) remains constant. The value of the left side of the condition (2) varies according to variations of the angle $\theta$ and the distance h. FIG. 69B shows that the values indicated in the graph are larger than zero in the range of $30 \leq \theta \leq 150$ and $10 \leq h \leq 20$. Namely, the aspherical spectacle lens of the eighth embodiment satisfies the condition (2).

Figure 70B:
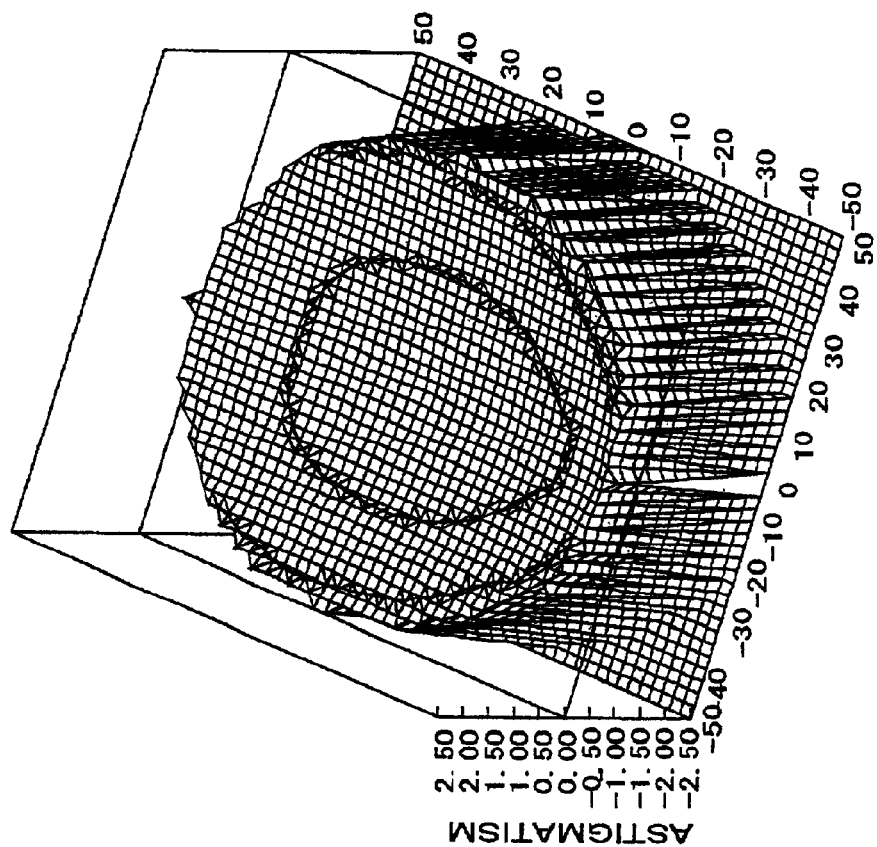
Figure 70A:
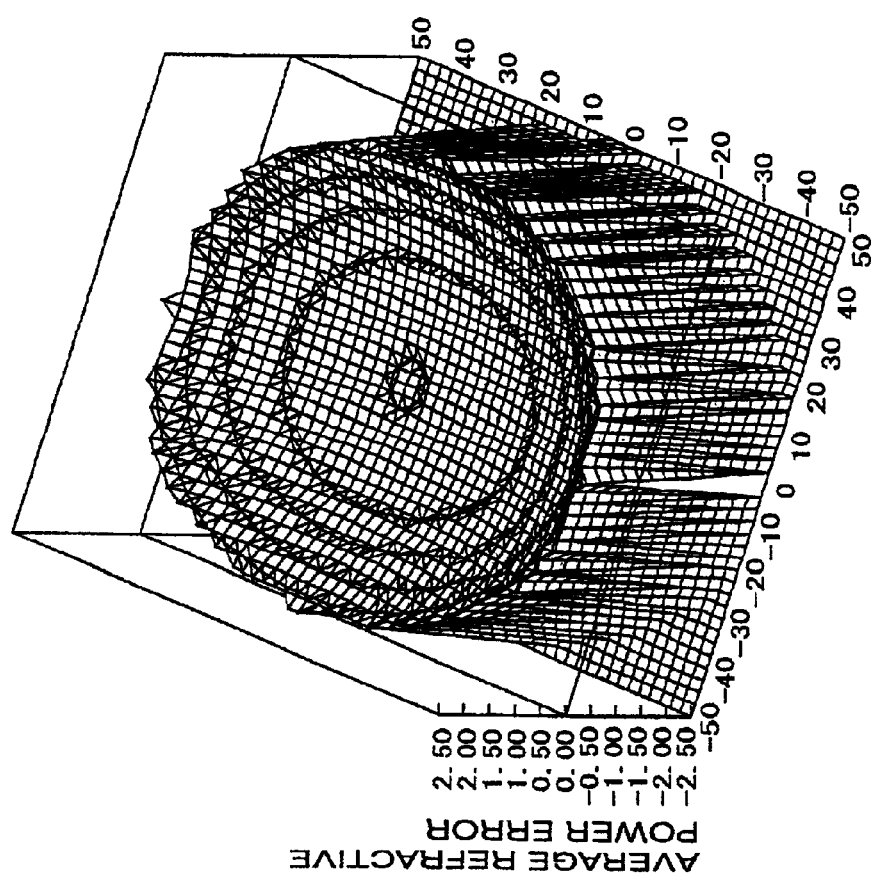

FIGS. 70A and 70B are three-dimension graphs showing transmitting optical performances of the aspherical spectacle lens of the eighth embodiment; FIG. 70A shows an average refractive power error and FIG. 70B shows astigmatism.

FOURTH COMPARATIVE EXAMPLE

In the same manner as the seventh and eighth embodiments, the aspherical spectacle lens of the fourth comparative example satisfies the specification of TABLE 4, the front surface is a rotationally-symmetrical aspherical surface whose curvature at the framing reference point is 1.01 Diopter as shown in FIG. 71A, and the back surface is a toric surface whose curvature is distributed among 13.04 to 19.05 Diopter as shown in FIG. 71B. The center thickness of the lens of the fourth comparative example is 1.10 mm.

Figures 71, 72:
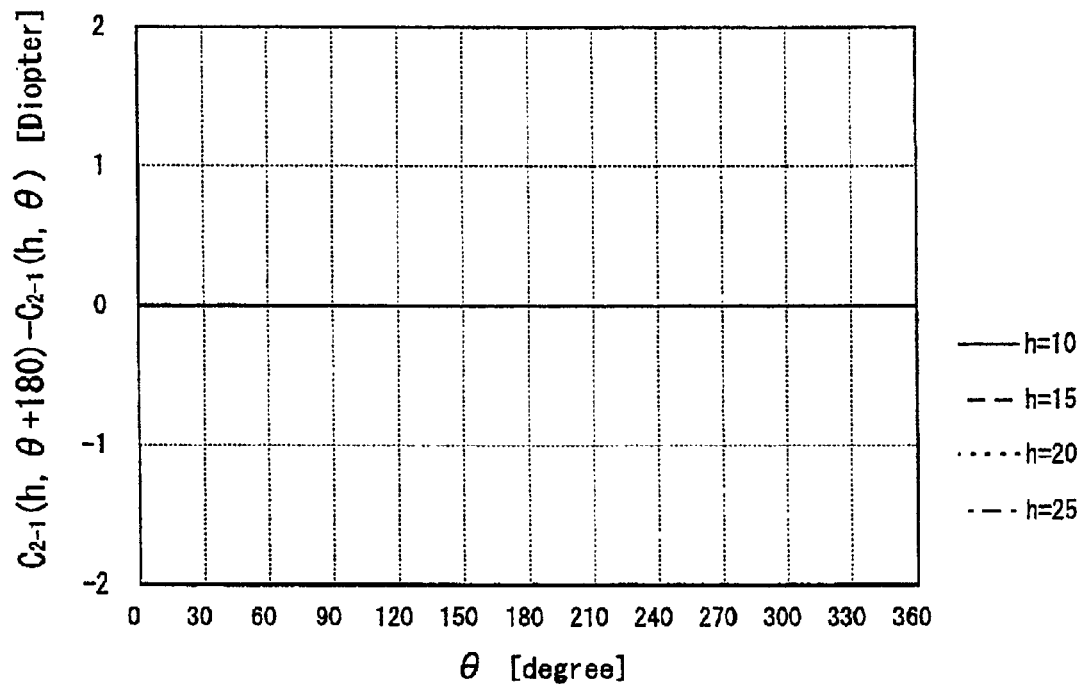

FIG. 72 is a graph showing variation of $C_{2-1}(h, \theta+180)-C_{2-1}(h, \theta)$ that is left side of the condition (1) with respect to variation of the angle $\theta$. Since the front surface is rotationally-symmetrical and the back surface is symmetric with respect to the framing reference point, the value of the left side of the condition (1) remains constant. Namely, the aspherical spectacle lens of the fourth comparative example does not satisfy the condition (1).

Figure 73:
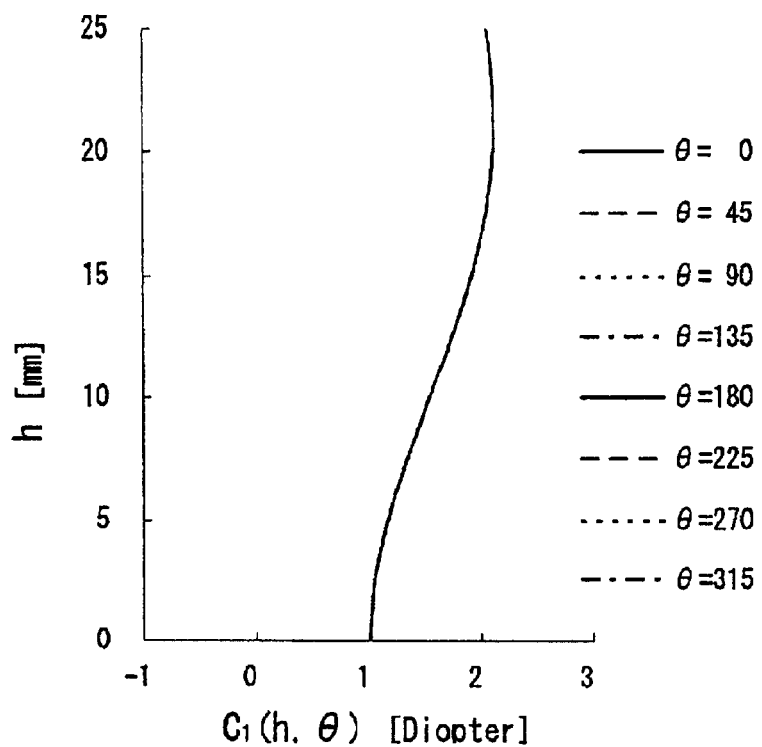
Figure 73:
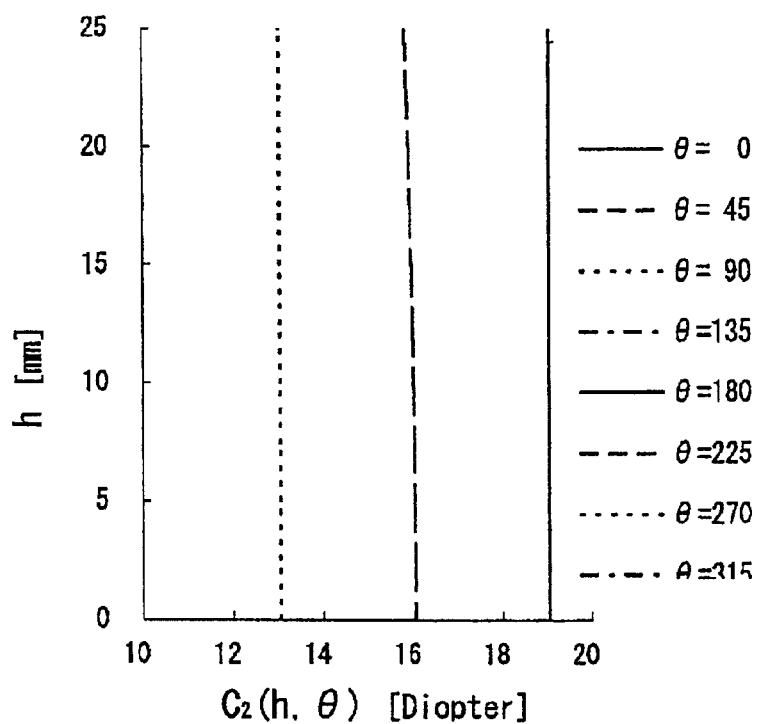

FIGS. 73A and 73B are graphs showing variations of curvatures $C_1(h, \theta)$ and $C_2(h, \theta)$ of the front and back surfaces, respectively, with respect to variation of the distance h from the framing reference point. Since the front surface is a rotationally-symmetrical aspherical surface, the curvature varies according to variation of the distance h while the variation of the angle θ does not change the curvature. In the graph of FIG. 73A, the curves of all of the angles are overlapped. Since the back surface is toric, the curvature varies according to variation of the angle θ. However, the curvature of the toric surface does not vary according to variation of the distance h. Therefore, in the graph of FIG. 73B, the overlapped straight lines of θ=90° and 270°, the overlapped straight lines of θ=45°, 135°, 225° and 315°, the overlapped straight lines of θ=0° and 180° are arranged in increasing order of the curvature.

Figure 74:
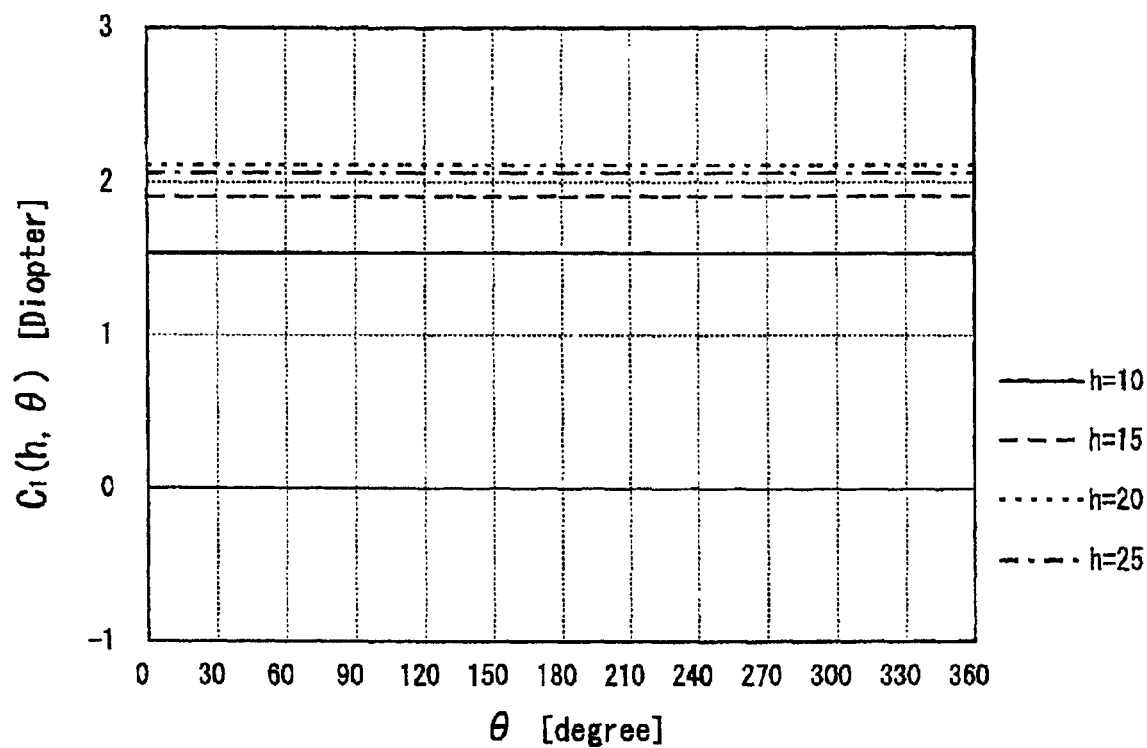
Figure 74:
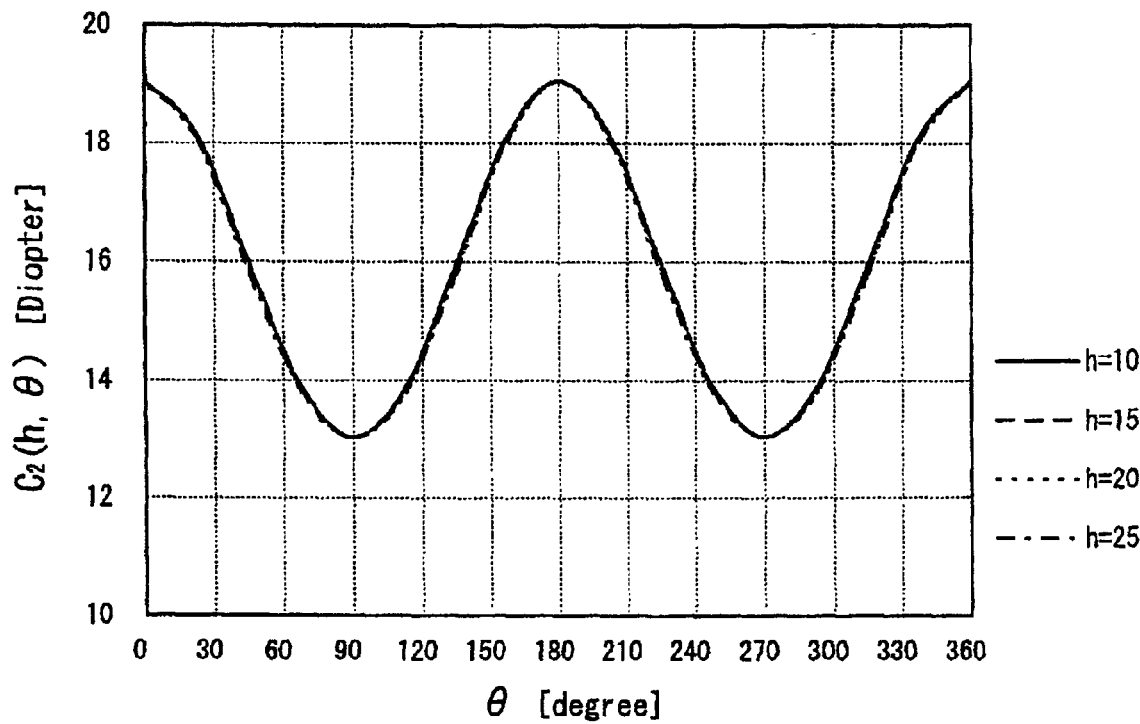

FIGS. 74A and 74B are graphs showing variations of curvatures $C_1(h, \theta)$ and $C_2(h, \theta)$ of the front and back surfaces, respectively, with respect to variation of the angle θ. Since the front surface is a rotationally-symmetrical aspherical surface, the curvatures $C_1(h, \theta)$ are different in response to the distance h and do not vary according to variation of the angle θ, the curvatures are shown as independent straight lines. The curvature $C_2(h, \theta)$ of the toric back surface is reduced to a minimum at θ=90° and 270° and rises to a minimum at θ=0° and 180° as shown in FIG. 74B.

Figure 75:
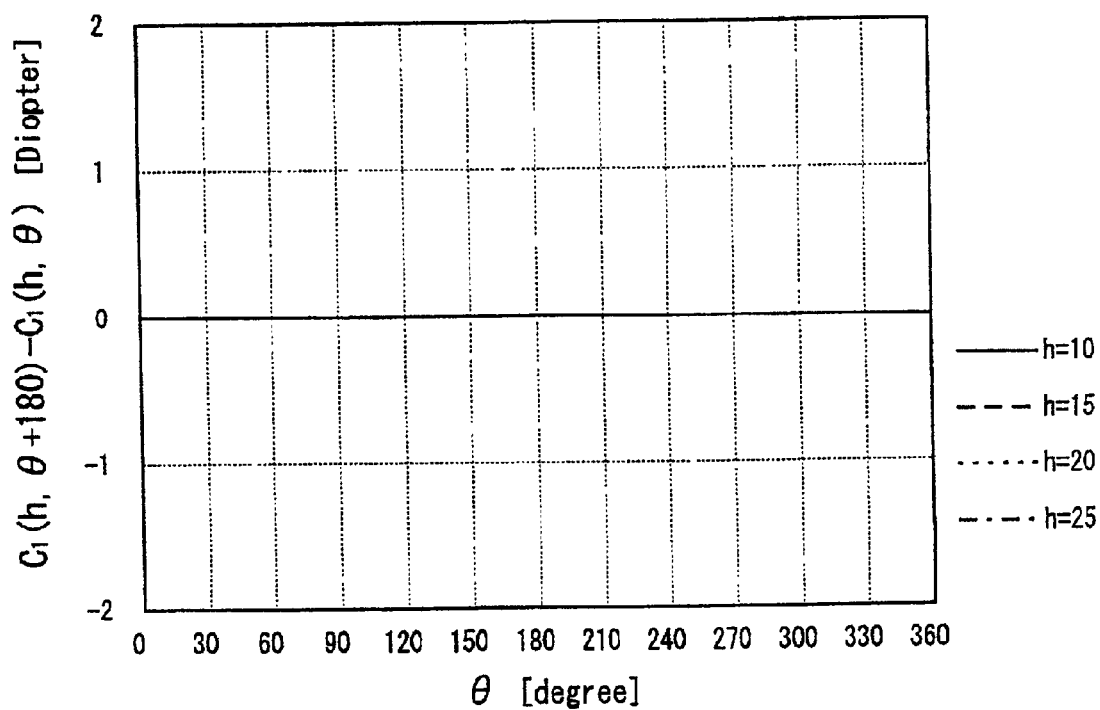
Figure 75:
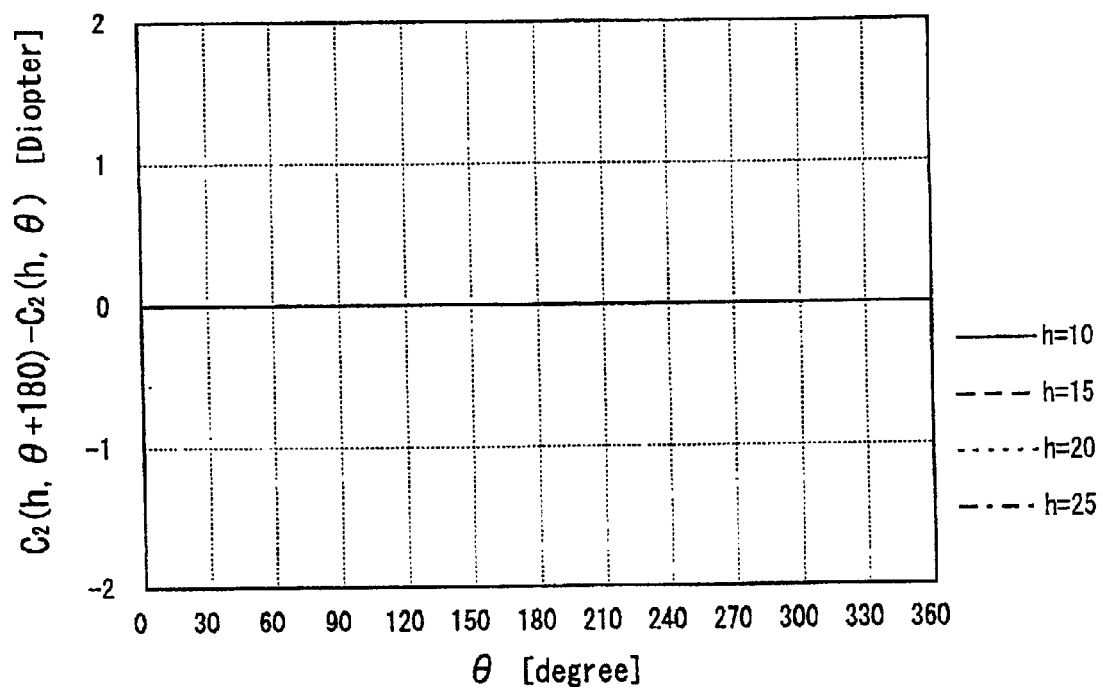

Further, FIGS. 75A and 75B are graphs showing variations of $C_1(h, \theta+180) - C_1(h, \theta)$ that is the left side of the condition (3) and $C_2(h, \theta+180) - C_2(h, \theta)$ that is the left side of the condition (2), respectively, with respect to variation of the angle θ. Since the front surface is a rotationally-symmetrical aspherical surface, the value of the left side of the condition (3) remains constant. Further, since the back surface is toric, the value of the left side of the condition (2) remains constant. Namely, the spectacle lens of the fourth comparative example does not satisfy the conditions (2) and (3).

Figure 76A:
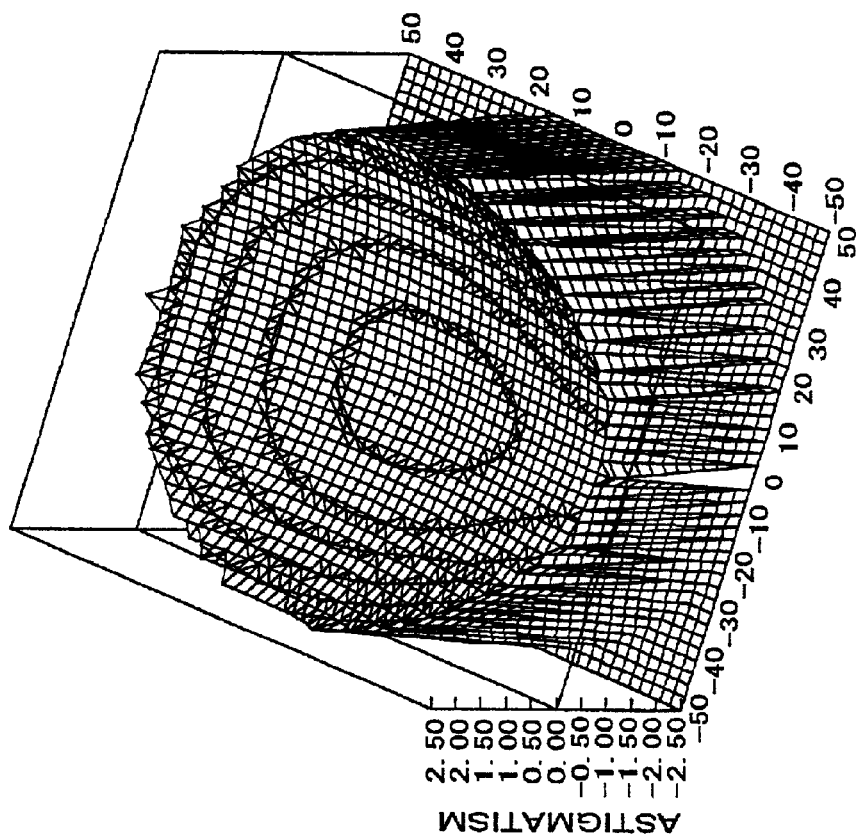
Figure 76B:
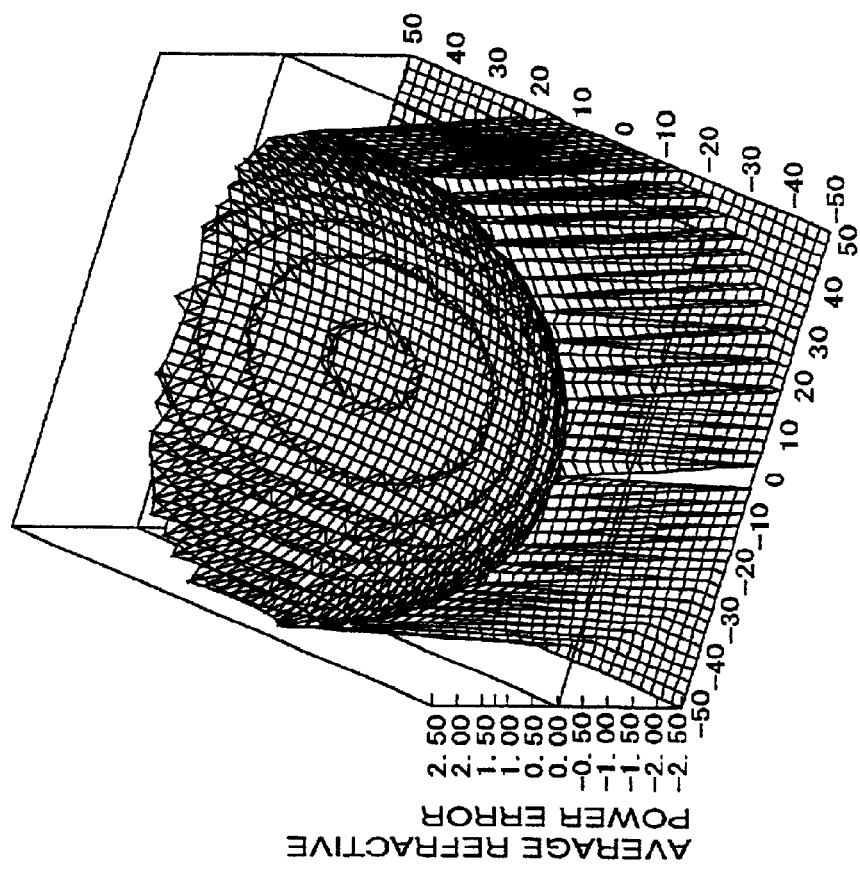

FIGS. 76A and 76B are three-dimension graphs showing transmitting optical performances of the aspherical spectacle lens of the fourth comparative example; FIG. 76A shows an average refractive power error and FIG. 76B shows astigmatism. As compared with the graphs of the seventh and eighth embodiments (FIGS. 64A, 64B, 70A and 70B) designed for the same specification, a number of contour lines in either graph of the fourth comparative example is larger than that of the embodiments, which shows that the optical performance of the embodiments is better than the comparative example.

Ninth Embodiment

The spectacle lenses of the ninth and tenth embodiments and the fifth comparative example are designed for satisfying the specification shown in TABLE 5. Each of these lenses has a prismatic power to correct hereophoria while they do not have a cylindrical power to correct astigmatism.

TABLE 5

| SPH | 4.00 Diopter |
|---|---|
| CYL | 0.00 Diopter |
| AX | — |
| PRS | 3.00 Δ |
| BASE | 270° Base Down |

The aspherical spectacle lens of the ninth embodiment satisfies the specification of TABLE 5, the front surface is a spherical surface that has a uniform curvature 6.96 Diopter as shown in FIG. 77A, and the back surface is a rotationally-asymmetrical aspherical surface whose curvature at the framing reference point is distributed among 1.05 to 1.06 Diopter as shown in FIG. 77B. The center thickness of the lens of the fifth embodiment is 5.29 mm.

Figures 77, 78:
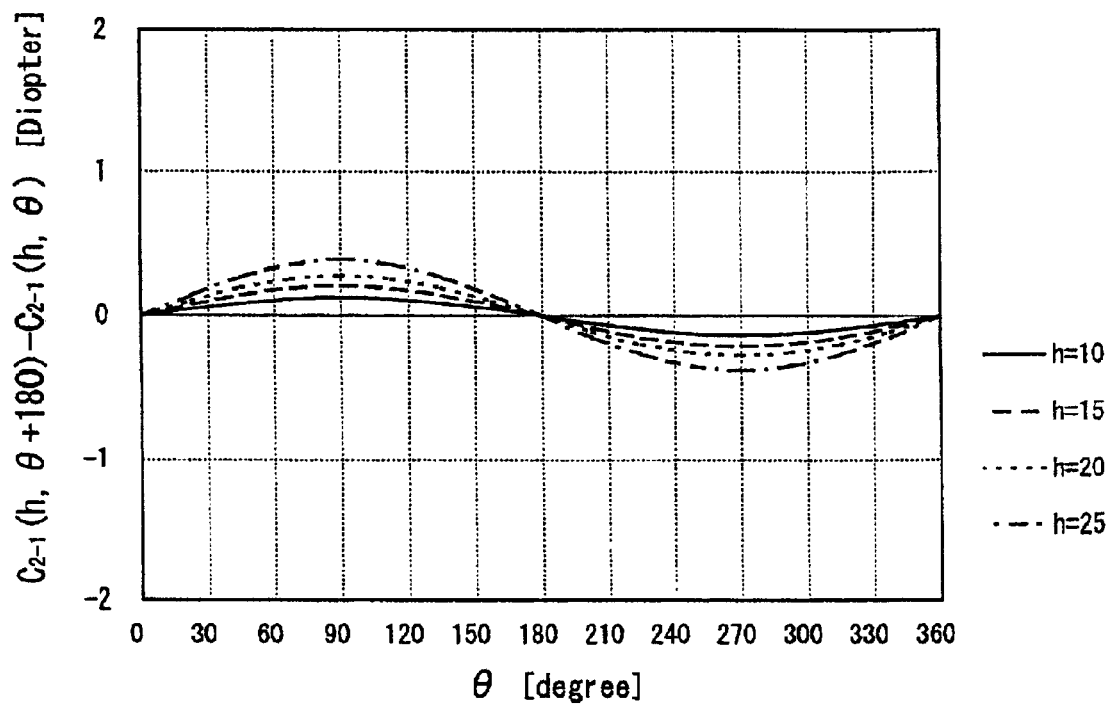

FIG. 78 is a graph showing variation of $C_{2-1}(h, \theta+180) - C_{2-1}(h, \theta)$ that is left side of the condition (1) with respect to variation of the angle θ. In order to correct the aberration caused by adding the prismatic power, the values of the left side of the condition (1) rise to maximums at θ=90° and are reduced to minimums at θ=270° for all of the distances h=10, 15, 20 and 25 mm. The amplitude of the variation increases as the distance h becomes larger. FIG. 78 shows that the values indicated in the graph are larger than zero in the range of 30≦θ≦150 for all of the distances h=10, 15, 20 and 25 mm. Namely, the aspherical spectacle lens of the ninth embodiment satisfies the condition (1).

Figure 79:
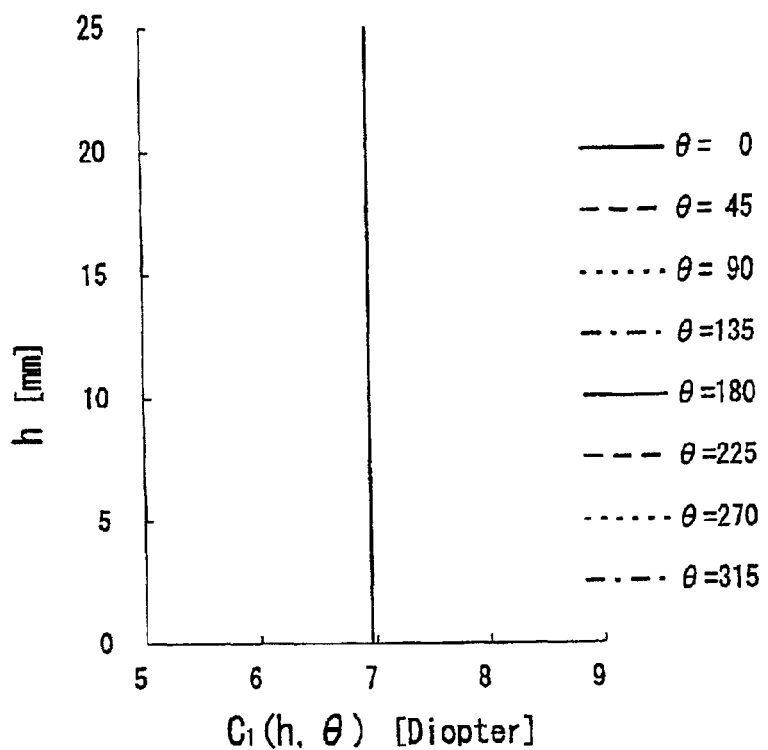
Figure 79:
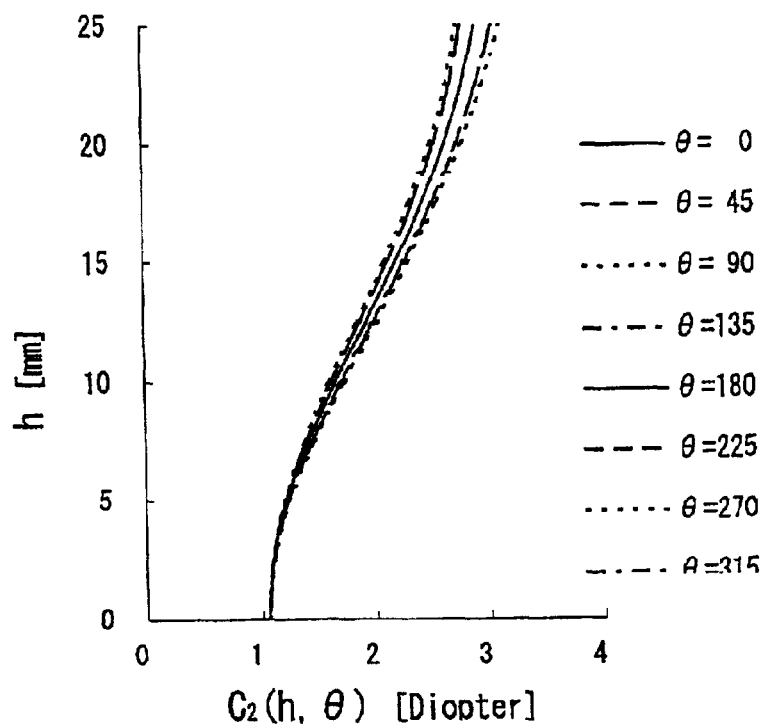

FIGS. 79A and 79B are graphs showing variations of curvatures $C_1(h, \theta)$ and $C_2(h, \theta)$ of the front and back surfaces, respectively, with respect to variation of the distance h from the framing reference point. Since the front surface is spherical, the curvature $C_1(h, \theta)$ does not vary according to variations of the distance h and the angle θ, the graph of FIG. 79A shows the straight lines overlapped to each other. Since the back surface is rotationally-asymmetrical, the curvature $C_2(h, \theta)$ varies according to variations of the distance h and the angle θ. In the graph of FIG. 79B, the curve of θ=90°, the overlapped curves of θ=45° and 135°, the overlapped curves of θ=0° and 180°, the overlapped curves of θ=225° and 315° and the curve of θ=270° are arranged in increasing order of curvature.

Figure 80:
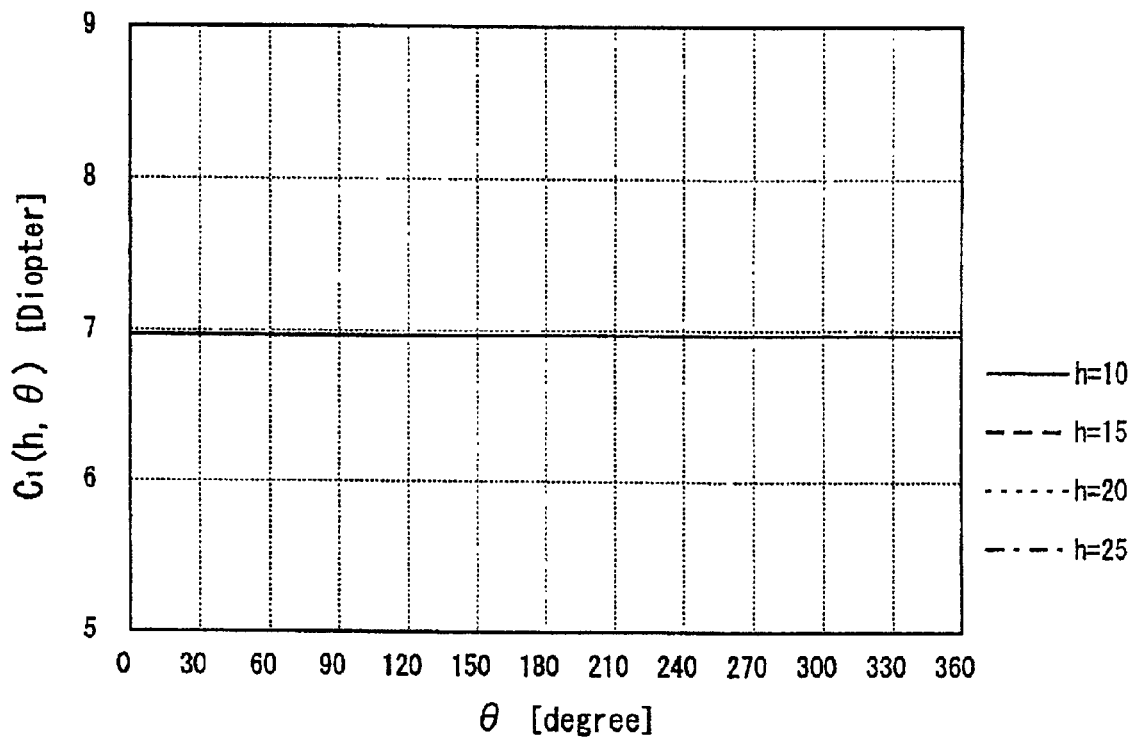
Figure 80:
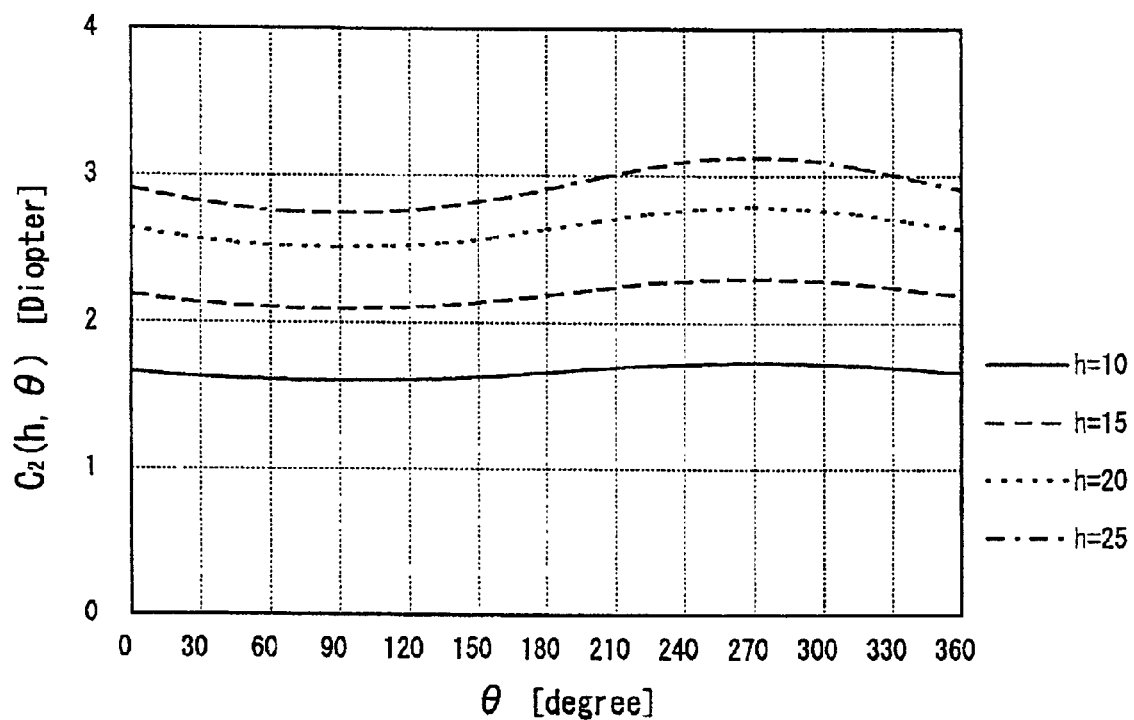

FIGS. 80A and 80B are graphs showing variations of curvatures $C_1(h, \theta)$ and $C_2(h, \theta)$ of the front and back surfaces, respectively, with respect to variation of the angle θ. Since the front surface is spherical, the curvature $C_1(h, \theta)$ does not vary according to variations of the distance h and the angle θ, the graph of FIG. 80A shows the straight lines overlapped to each other. In order to correct the aberration caused by adding the base-down prismatic power, the curvatures $C_2(h, \theta)$ of the back surface are reduced to minimums at θ=90° and rise to maximums at θ=270° for all of the distances h=10, 15, 20 and 25 mm as shown in FIG. 80B. The longer the distance h is, the larger the curvature $C_2(h, \theta)$ is.

Figure 81:
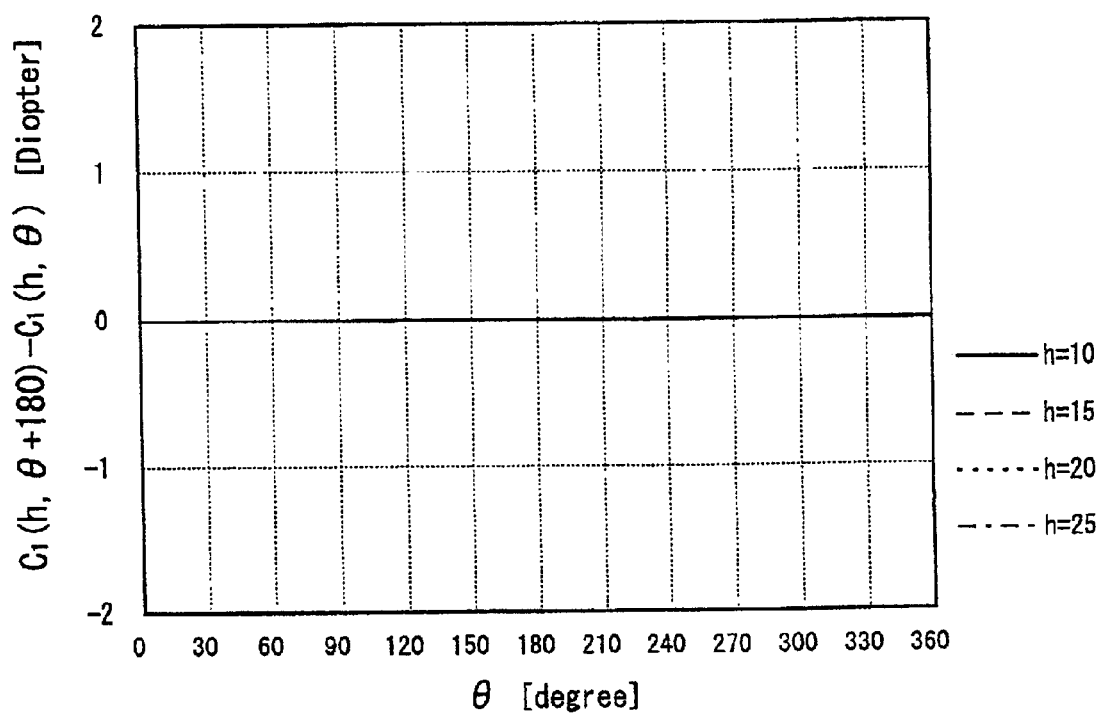
Figure 81:
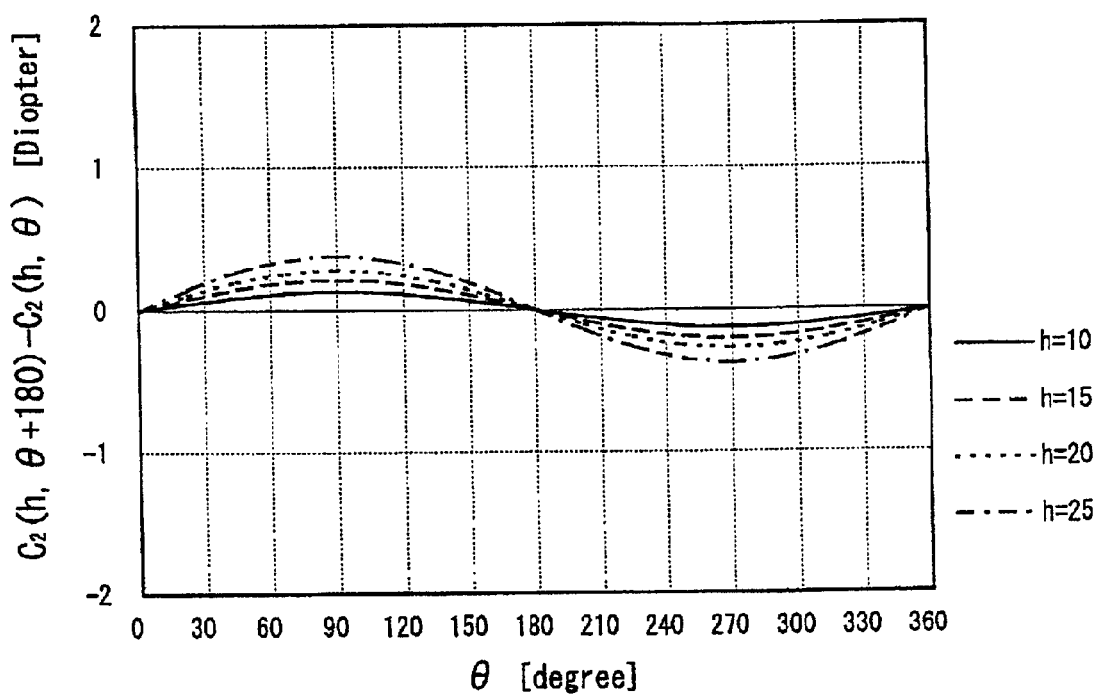

Further, FIGS. 81A and 81B are graphs showing variations of $C_1(h, \theta+180) - C_1(h, \theta)$ that is the left side of the condition (3) and $C_2(h, \theta+180) - C_2(h, \theta)$ that is the left side of the condition (2), respectively, with respect to variation of the angle θ. Since the front surface is spherical, the value of the left side of the condition (3) remains constant. The value of the left side of the condition (2) varies according to variations of the angle θ and the distance h. FIG. 81B shows that the values indicated in the graph are larger than zero in the range of 30≦θ≦150 for all of the distances h=10, 15, 20 and 25 mm. Namely, the aspherical spectacle lens of the ninth embodiment satisfies the condition (2).

Figure 82B:
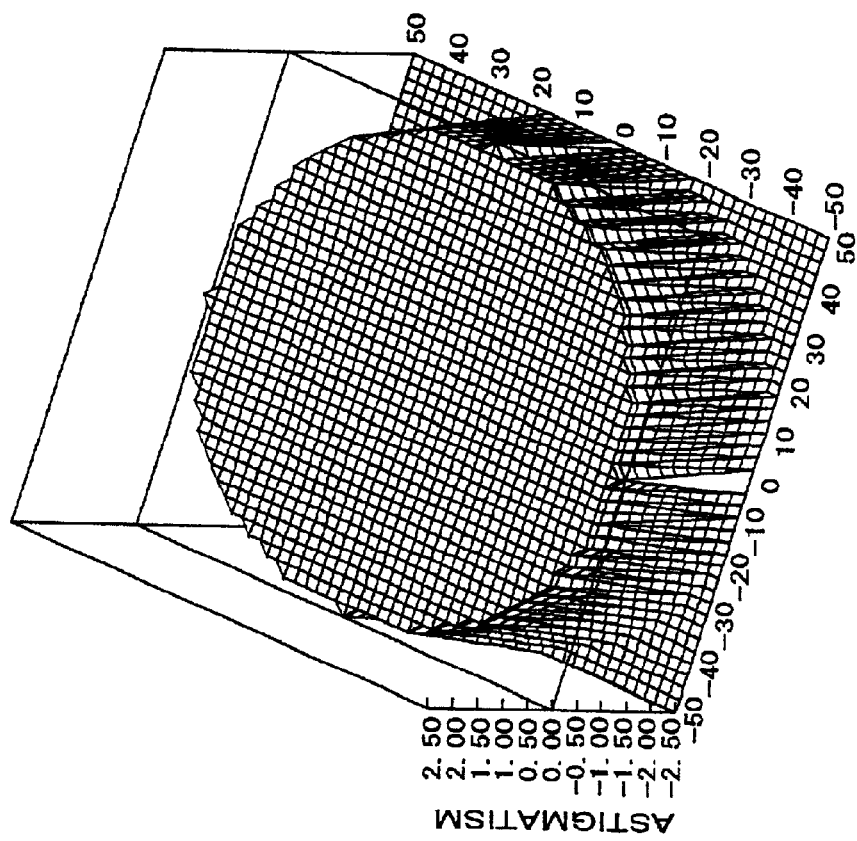
Figure 82A:
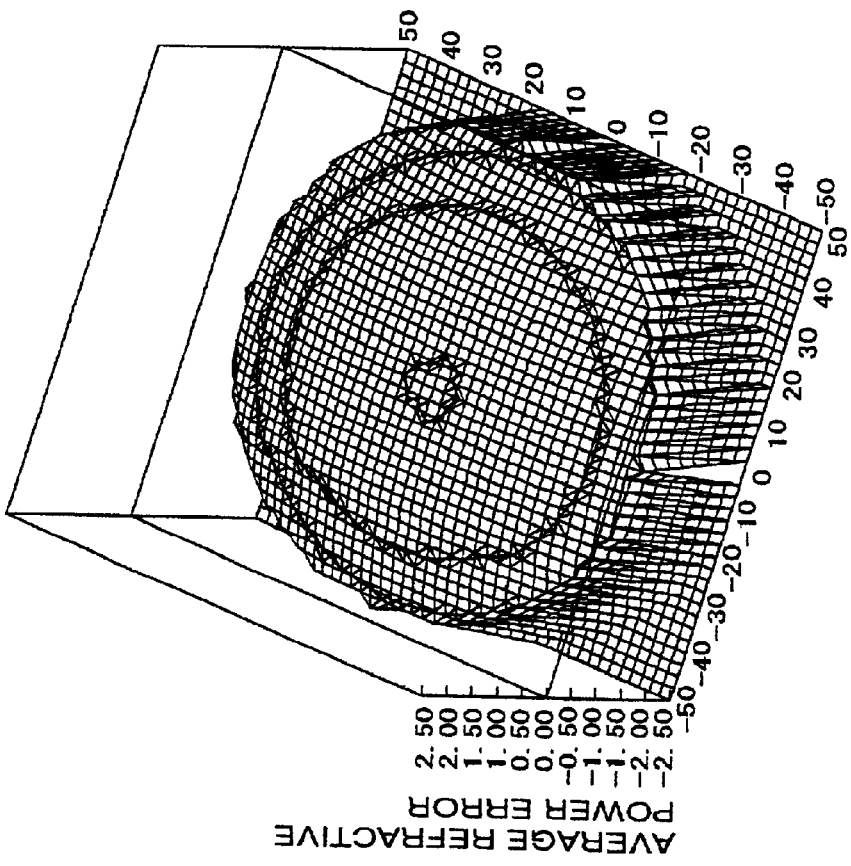

FIGS. 82A and 82B are three-dimension graphs showing transmitting optical performances of the aspherical spectacle lens of the ninth embodiment; FIG. 82A shows an average refractive power error and FIG. 82B shows astigmatism.

Tenth Embodiment

In the same manner as the ninth embodiment, the aspherical spectacle lens of the tenth embodiment satisfies the specification of TABLE 5, the front surface is a rotationally-asymmetrical aspherical surface whose curvature at the framing reference point is 7.16 Diopter as shown in FIG. 83A, and the back surface is a rotationally-symmetrical aspherical surface whose curvature at the framing reference point is 1.26 Diopter as shown in FIG. 83B. The center thickness of the lens of the second embodiment is 5.30 mm.

Figures 83, 84:
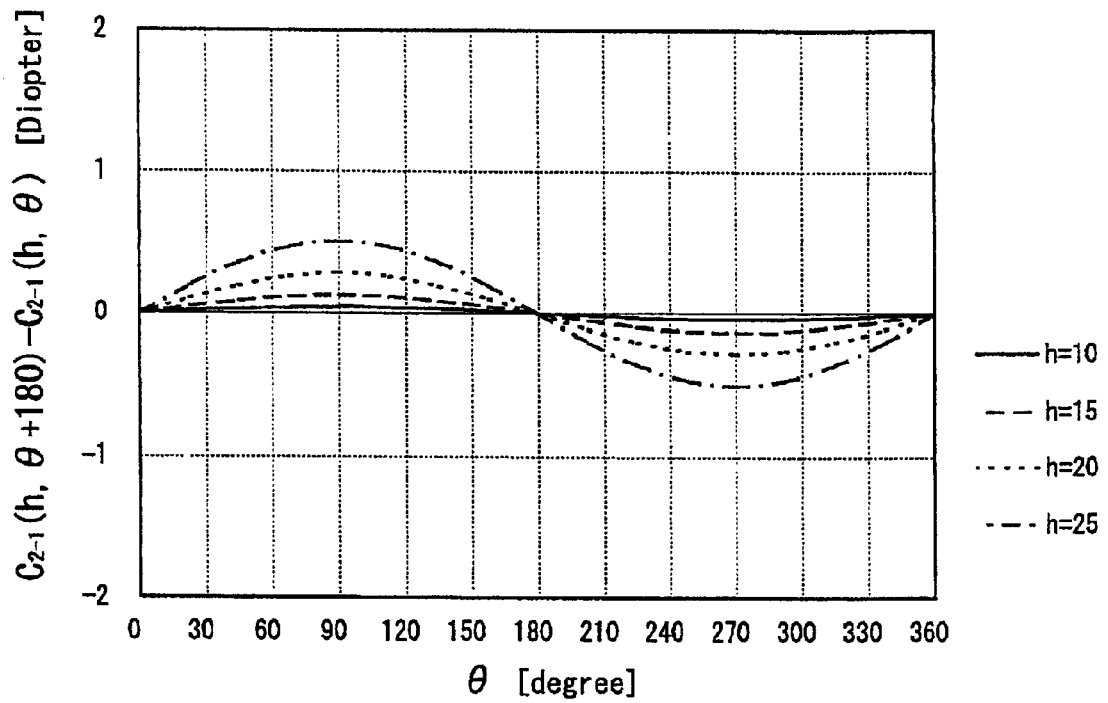

FIG. 84 is a graph showing variation of $C_{2-1}(h, \theta+180) - C_{2-1}(h, \theta)$ that is left side of the condition (1) with respect to variation of the angle θ. In order to correct the aberration caused by adding the prismatic power, the values of the left side of the condition (1) rise to maximums at θ=90° and are reduced to minimums at θ=270° for all of the distances h=10, 15, 20 and 25 mm. The amplitude of the variation increases as the distance h becomes larger. FIG. 84 shows that the values indicated in the graph are larger than zero in the range of 30≦θ≦150 for all of the distances h=10, 15, 20 and 25 mm. Namely, the aspherical spectacle lens of the tenth embodiment satisfies the condition (1).

Figure 85:
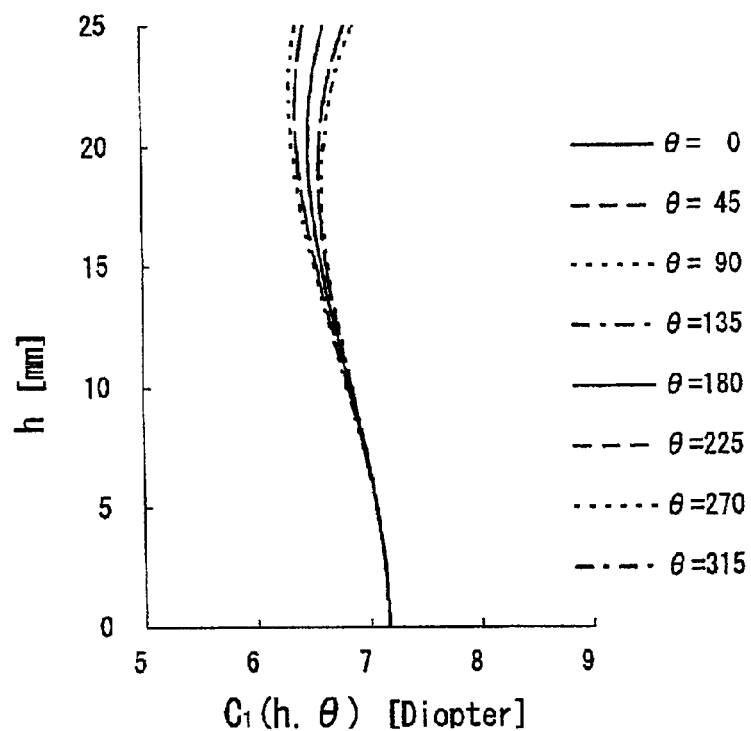
Figure 85:
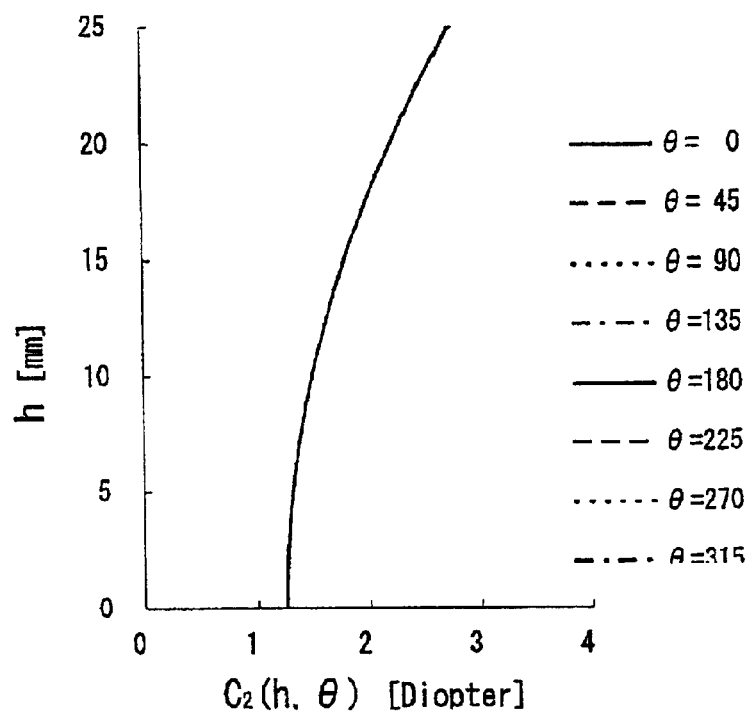

FIGS. 85A and 85B are graphs showing variations of curvatures $C_1(h, θ)$ and $C_2(h, θ)$ of the front and back surfaces, respectively, with respect to variation of the distance h from the framing reference point. Since the front surface is rotationally-asymmetrical, the curvature $C_1(h, θ)$ varies according to variations of the distance h and the angle θ. In the graph of FIG. 85A, the curve of θ=270°, the overlapped curves of θ=225° and 315°, the overlapped curves of θ=0° and 180°, the overlapped curves of θ=45° and 135° and the curve of θ=90° are arranged in increasing order of curvature. Since the back surface is a rotationally-symmetrical aspherical surface, the curvature varies according to variation of the distance h while the variation of the angle θ does not change the curvature. In the graph of FIG. 85B, the curves of all of the angles are overlapped.

Figure 86:
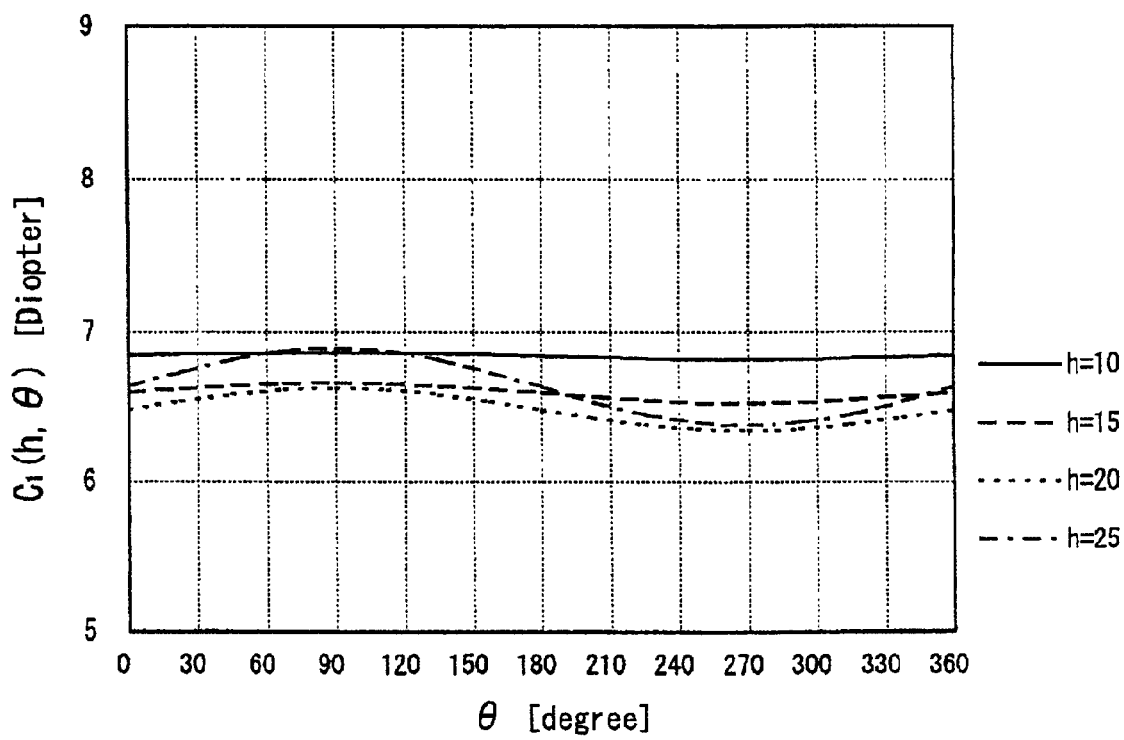
Figure 86:
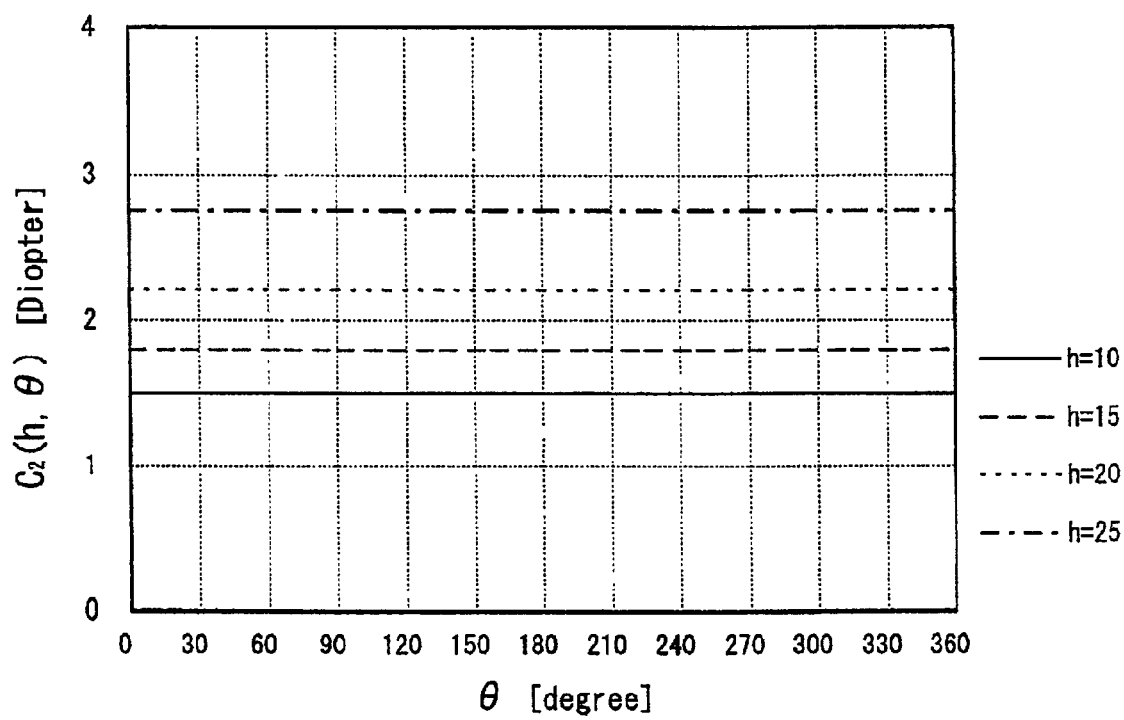

FIGS. 86A and 86B are graphs showing variations of curvatures $C_1(h, θ)$ and $C_2(h, θ)$ of the front and back surfaces, respectively, with respect to variation of the angle θ. In order to correct the aberration caused by adding the base-down prismatic power, the curvatures $C_1(h, θ)$ of the front surface rise to maximums at θ=90° and are reduced to minimums at θ=270° for all of the distances h=15, 20 and 25 mm as shown in FIG. 86A. Since the back surface is a rotationally-symmetrical aspherical surface, the curvatures $C_2(h, θ)$ are different in response to the distance h and do not vary according to variation of the angle θ, the curvatures are shown as independent straight lines in FIG. 86B.

Figure 87:
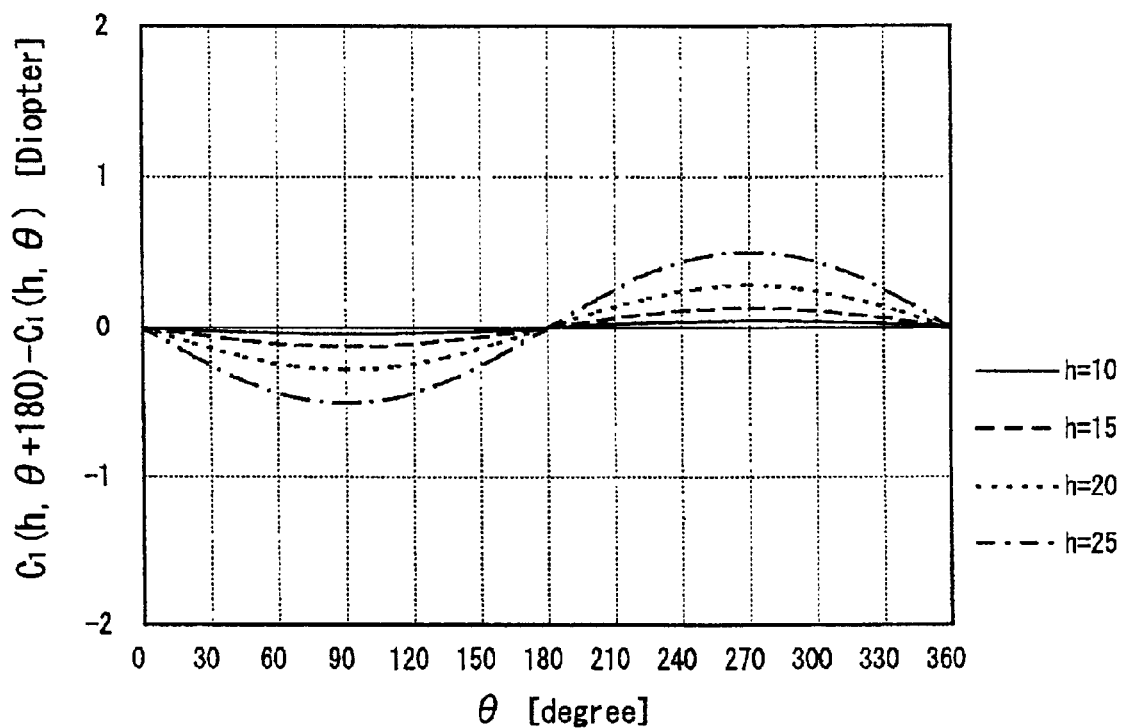
Figure 87:
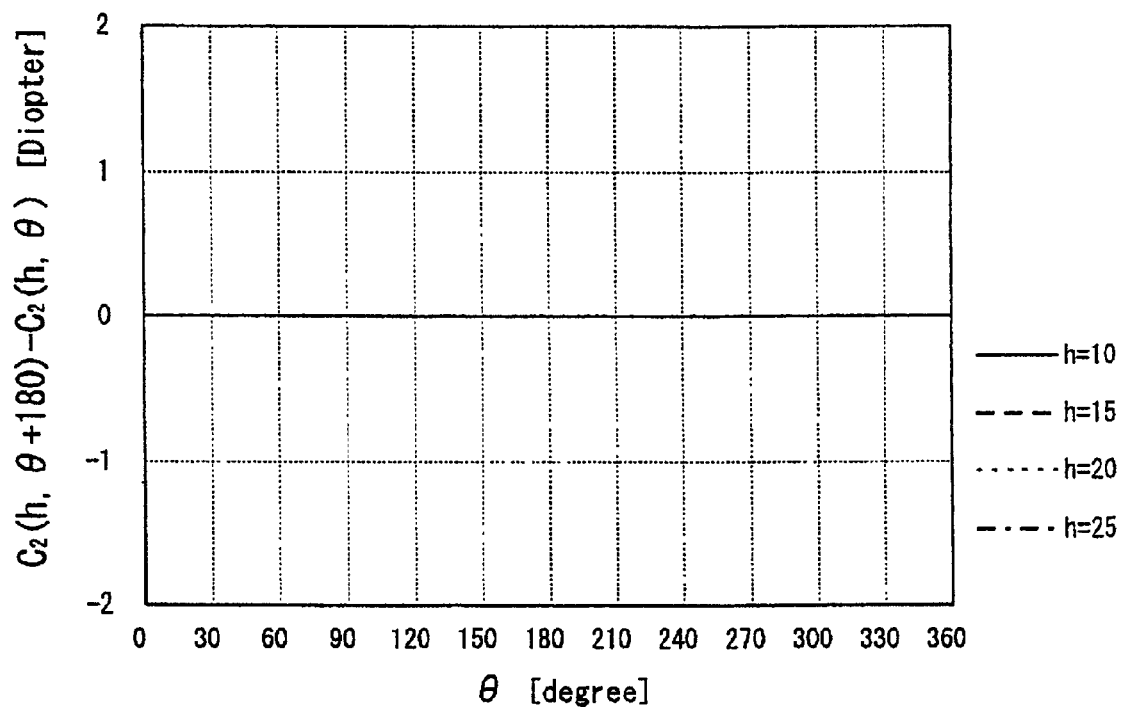

Further, FIGS. 87A and 87B are graphs showing variations of $C_1(h, θ+180)-C_1(h, θ)$ that is the left side of the condition (3) and $C_2(h, θ+180)-C_2(h, θ)$ that is the left side of the condition (2), respectively, with respect to variation of the angle θ. The values of the left side of the condition (3) vary according to variations of the angle θ and the distance h. FIG. 87A shows that the values indicated in the graph are smaller than zero in the range of 30≦θ≦150 and 10≦h≦20 mm. Namely, the aspherical spectacle lens of the tenth embodiment satisfies the condition (3). Since the back surface is rotationally-symmetrical, the values of the left side of the condition (2) remain constant.

Figure 88B:
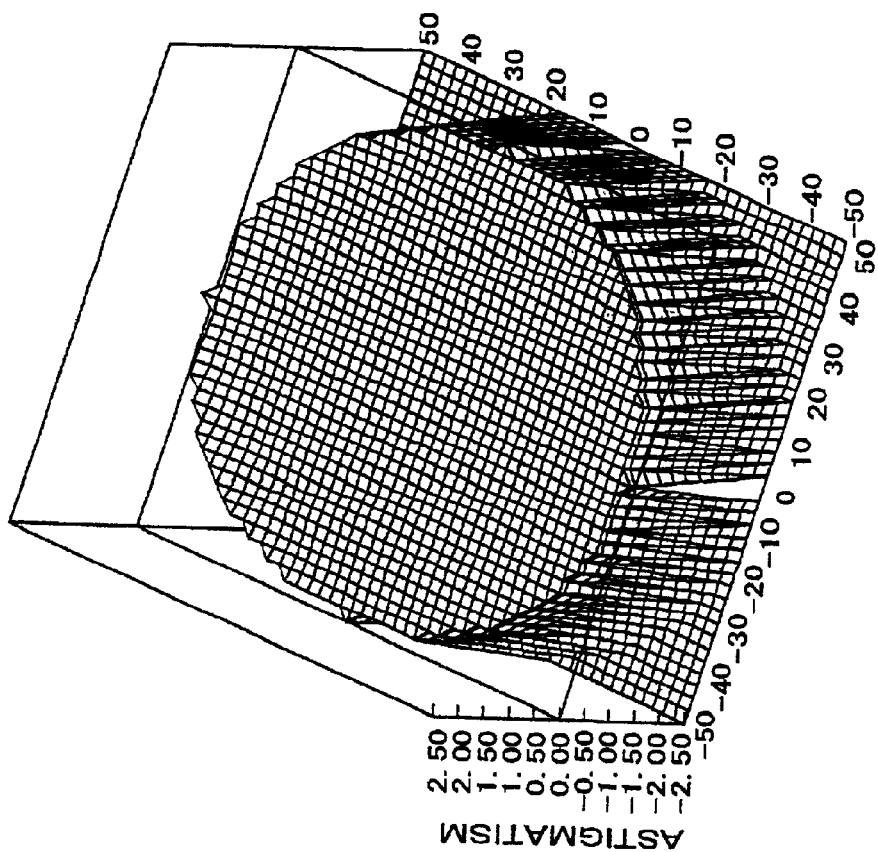
Figure 88A:
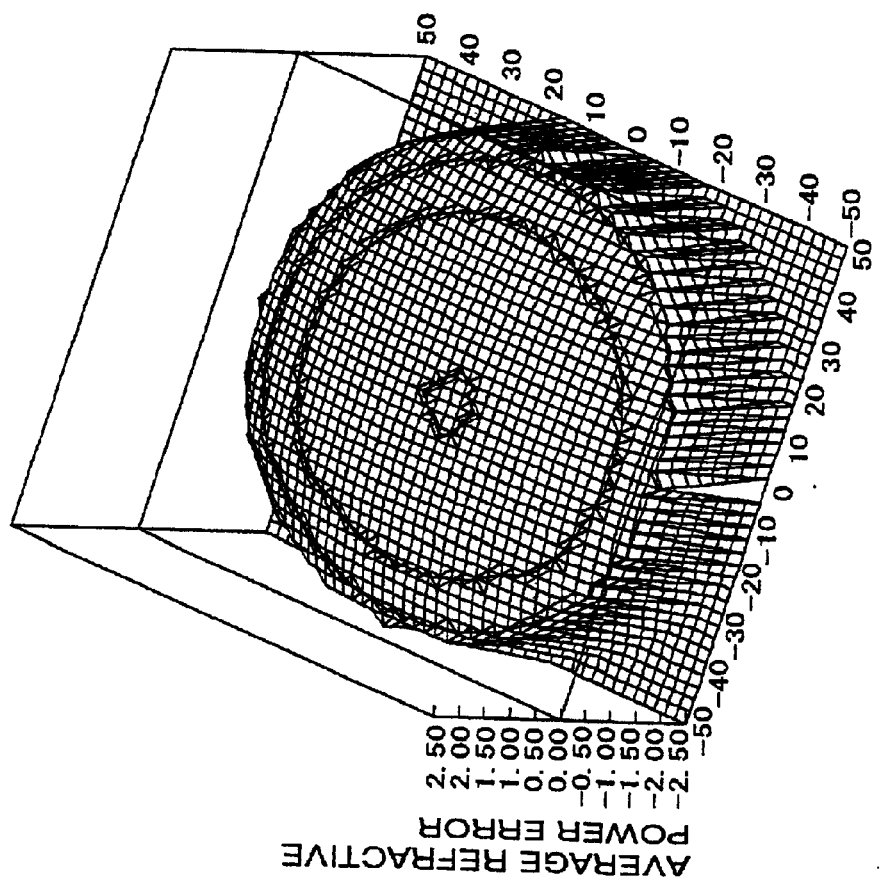

FIGS. 88A and 88B are three-dimension graphs showing transmitting optical performances of the aspherical spectacle lens of the tenth embodiment; FIG. 88A shows an average refractive power error and FIG. 88B shows astigmatism.

FIFTH COMPARATIVE EXAMPLE

In the same manner as the ninth and tenth embodiments, the aspherical spectacle lens of the fifth comparative example satisfies the specification of TABLE 5, the front surface is a rotationally-symmetrical aspherical surface whose curvature at the framing reference point is 7.17 Diopter as shown in FIG. 89A, and the back surface is a spherical surface that has a uniform curvature 1.26 Diopter as shown in FIG. 89B. The center thickness of the lens of the first comparative example is 5.29 mm.

Figures 89, 90:
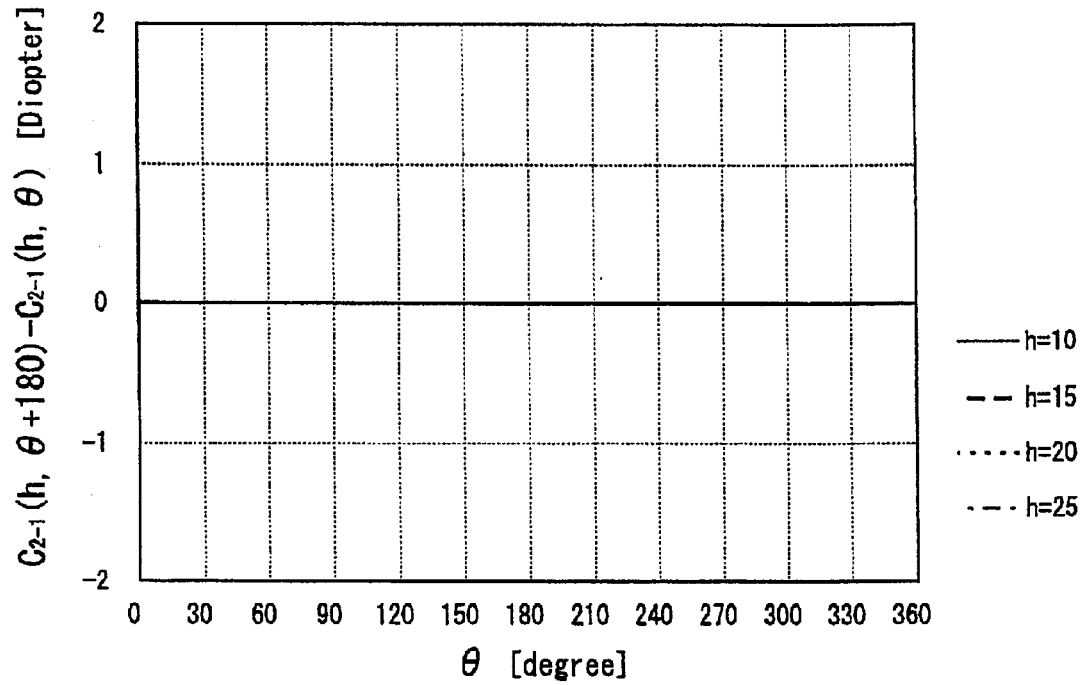

FIG. 90 is a graph showing variation of $C_{2-1}(h, θ+180)-C_{2-1}(h, θ)$ that is left side of the condition (1) with respect to variation of the angle θ. Since the front and back surfaces are rotationally-symmetrical, the value of the left side of the condition (1) remains constant. Namely, the aspherical spectacle lens of the fifth comparative example does not satisfy the condition (1).

Figure 91:
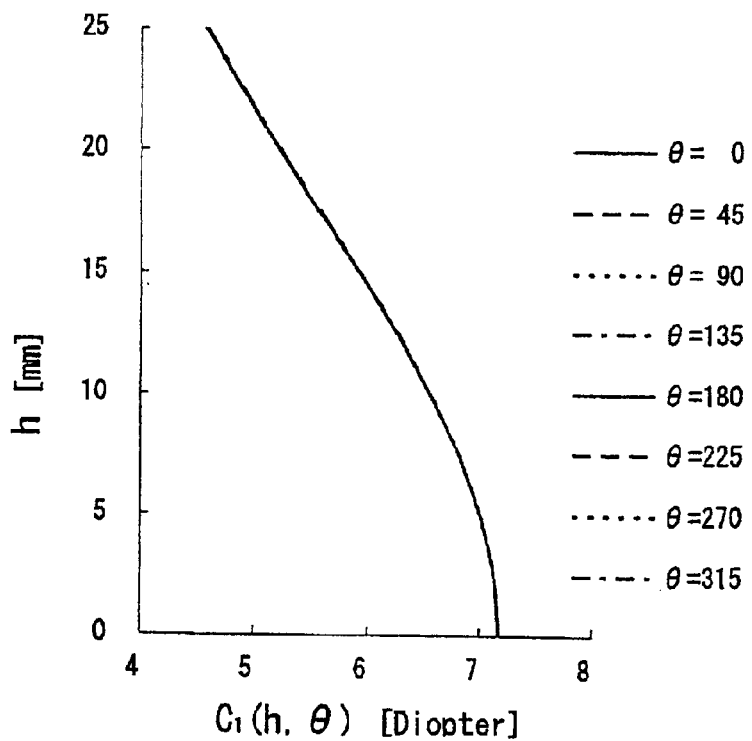
Figure 91:
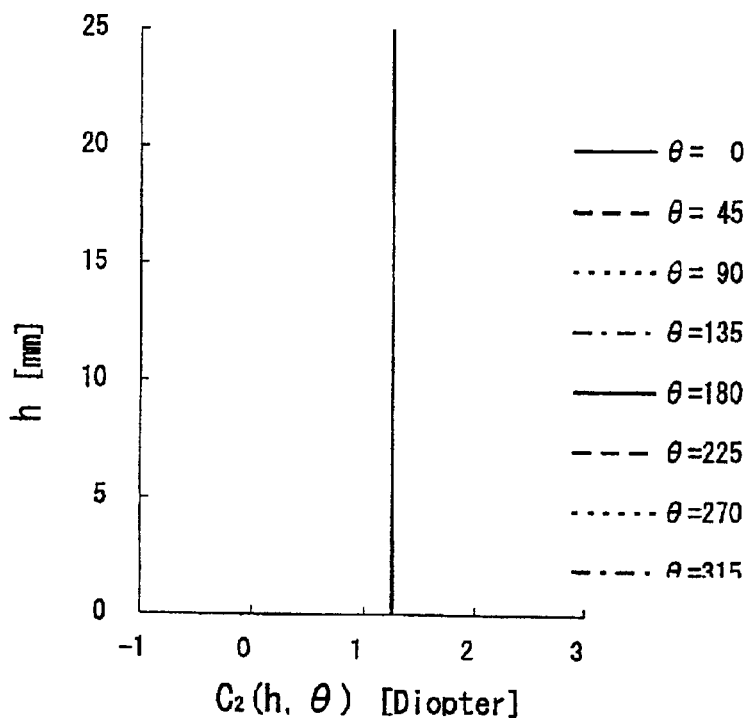

FIGS. 91A and 91B are graphs showing variations of curvatures $C_1(h, θ)$ and $C_2(h, θ)$ of the front and back surfaces, respectively, with respect to variation of the distance h from the framing reference point. Since the front surface is a rotationally-symmetrical aspherical surface, the curvature varies according to variation of the distance h while the variation of the angle θ does not change the curvature. In the graph of FIG. 91A, the curves of all of the angles are overlapped. Since the back surface is spherical, the curvature does not vary according to variations of the distance h and the angle θ, the graph of FIG. 91B shows the straight lines overlapped to each other.

Figure 92:
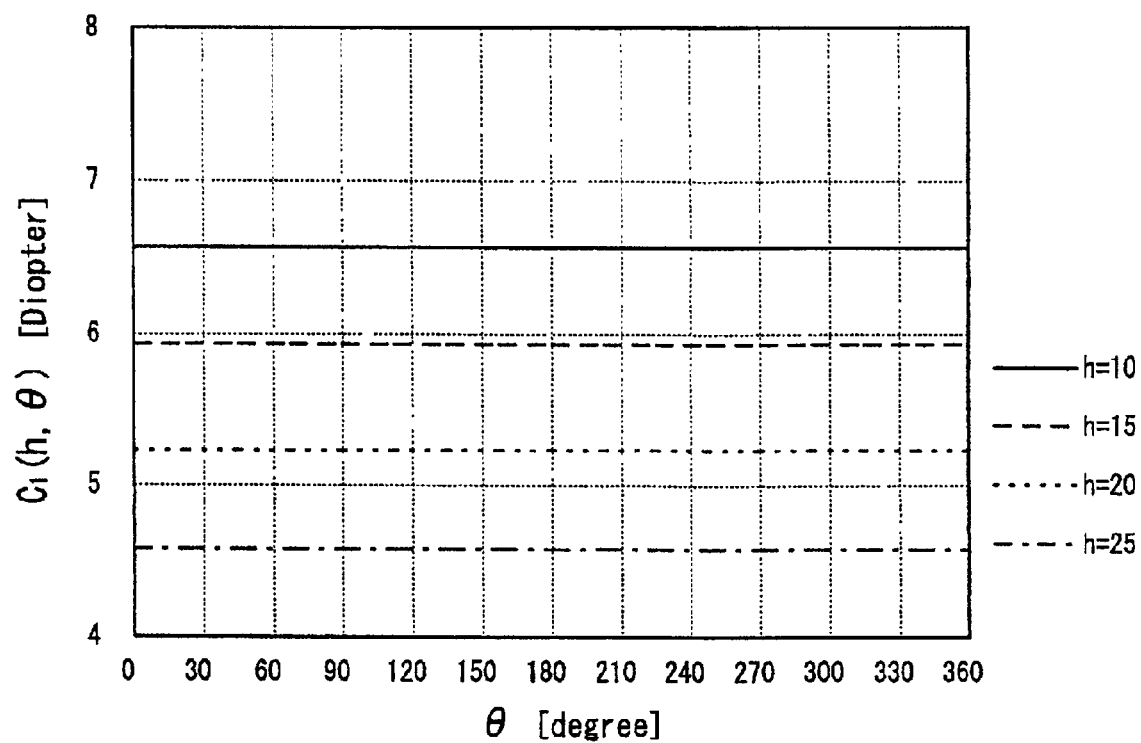
Figure 92:
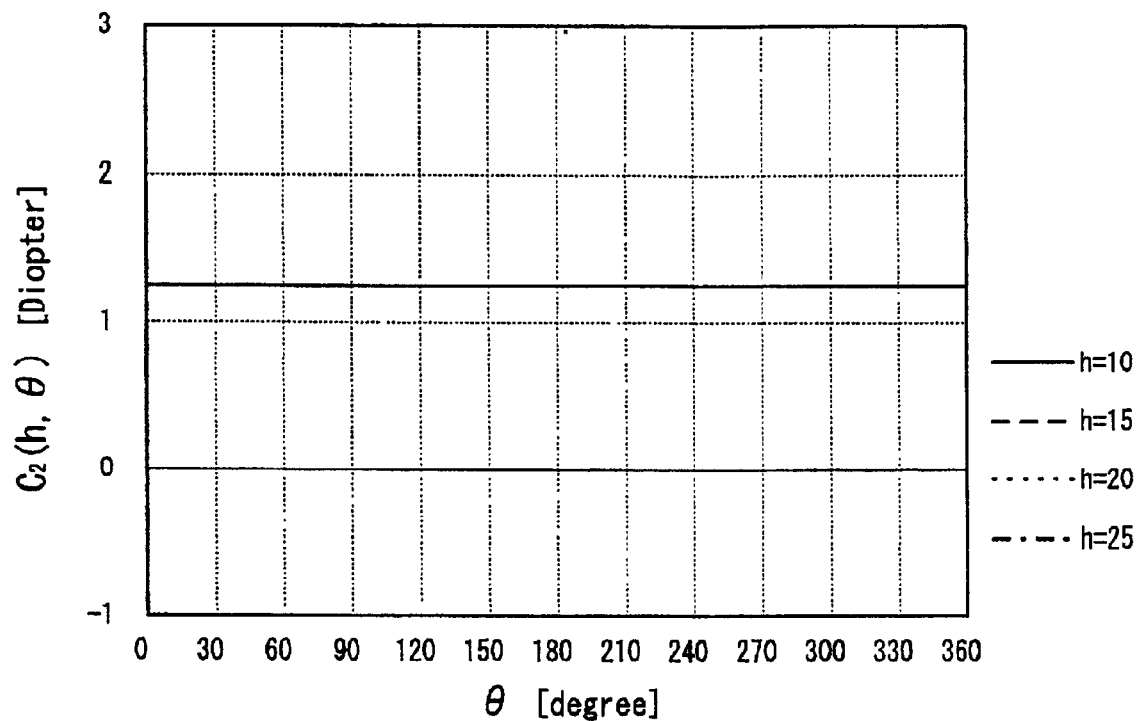

FIGS. 92A and 92B are graphs showing variations of curvatures $C_1(h, θ)$ and $C_2(h, θ)$ of the front and back surfaces, respectively, with respect to variation of the angle θ. Since the front surface is a rotationally-symmetrical aspherical surface, the curvatures $C_1(h, θ)$ are different in response to the distance h and do not vary according to variation of the angle θ, the curvatures are shown as independent straight lines in FIG. 92A. Since the back surface is spherical, the curvature $C_2(h, θ)$ does not vary according to variations of the distance h and the angle θ, the graph of FIG. 92B shows the straight lines overlapped to each other.

Figure 93:
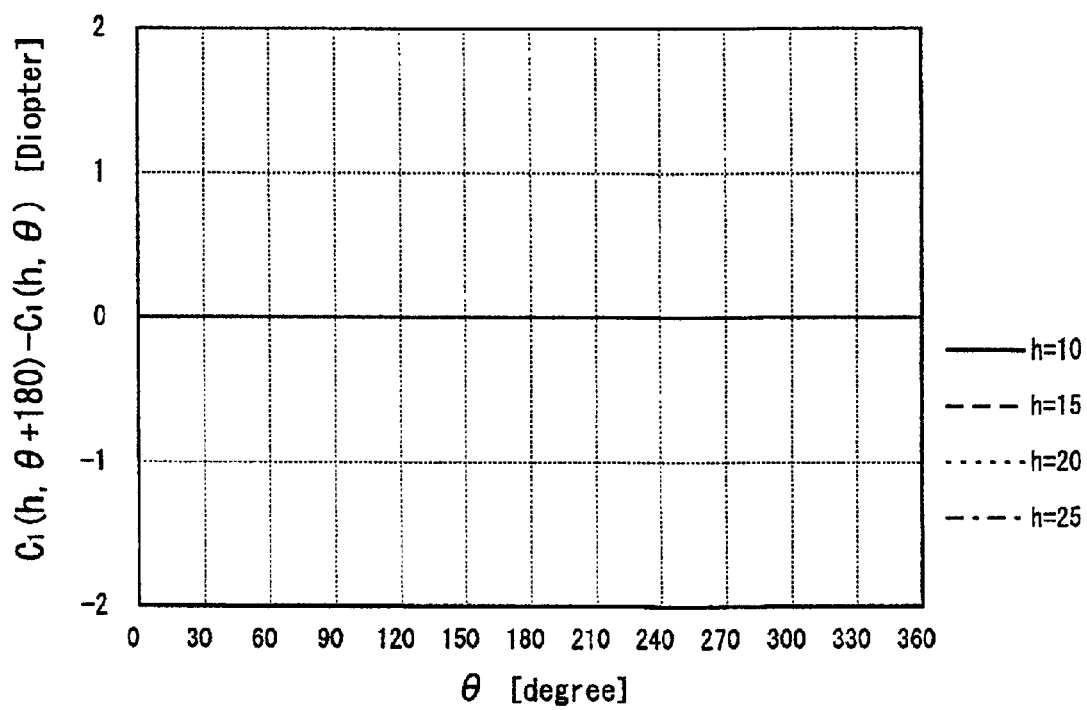
Figure 93:
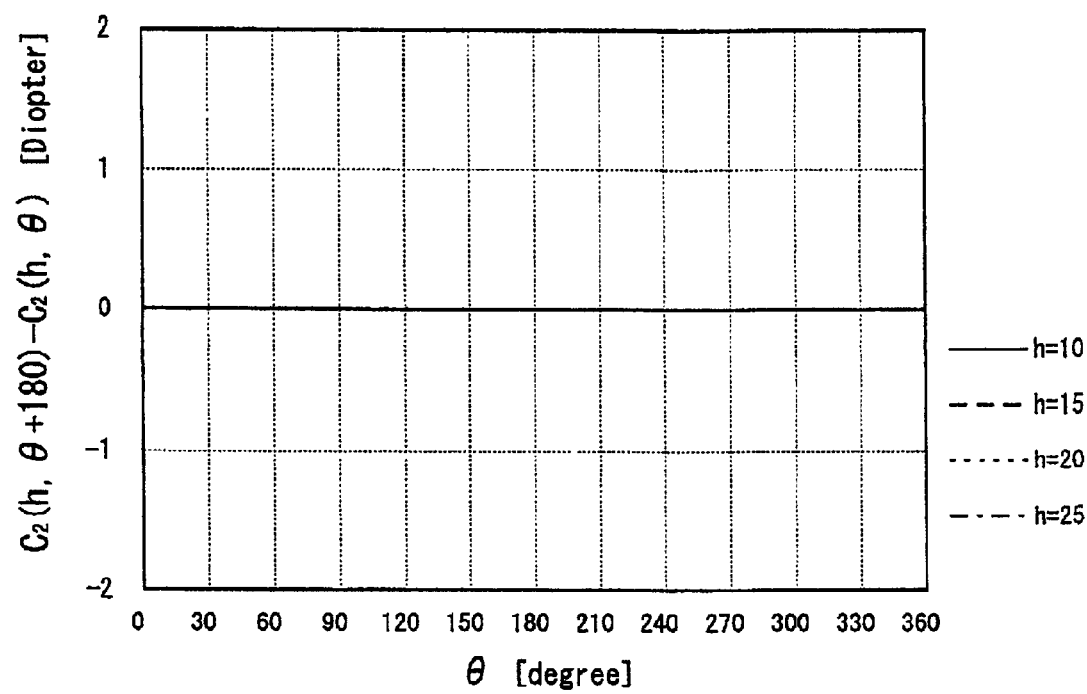

Further, FIGS. 93A and 93B are graphs showing variations of $C_1(h, θ+180)-C_1(h, θ)$ that is the left side of the condition (3) and $C_2(h, θ+180)-C_2(h, θ)$ that is the left side of the condition (2), respectively, with respect to variation of the angle θ. Since the front surface is a rotationally-symmetrical aspherical surface, the value of the left side of the condition (3) remains constant. Further, since the back surface is spherical, the value of the left side of the condition (2) remains constant. Namely, the spectacle lens of the fifth comparative example does not satisfy the conditions (2) and (3).

Figure 94A:
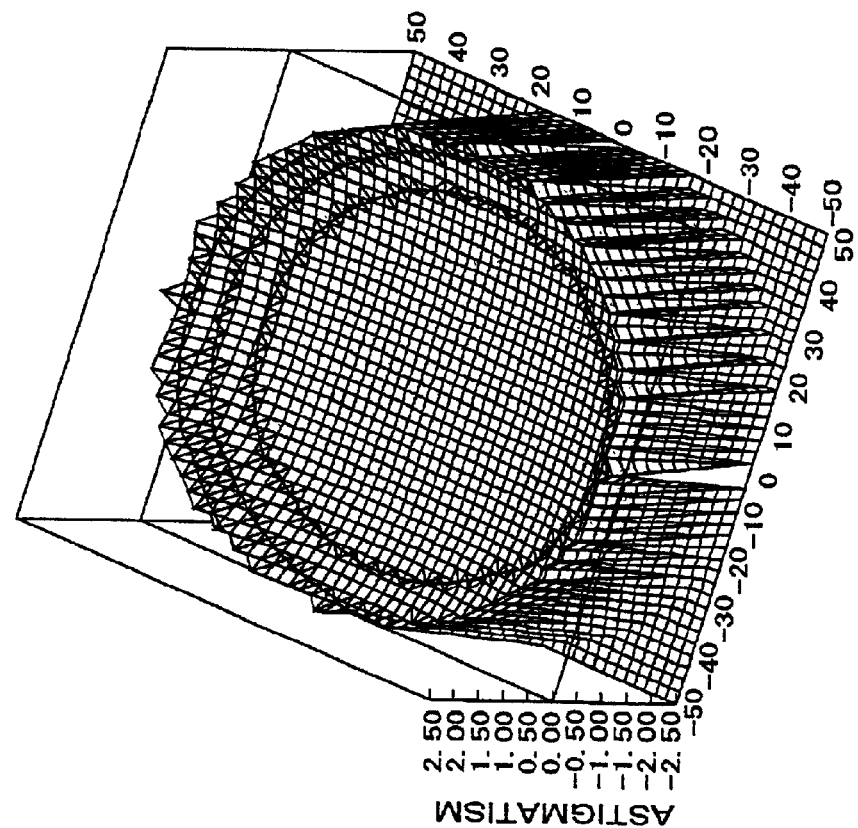
Figure 94B:
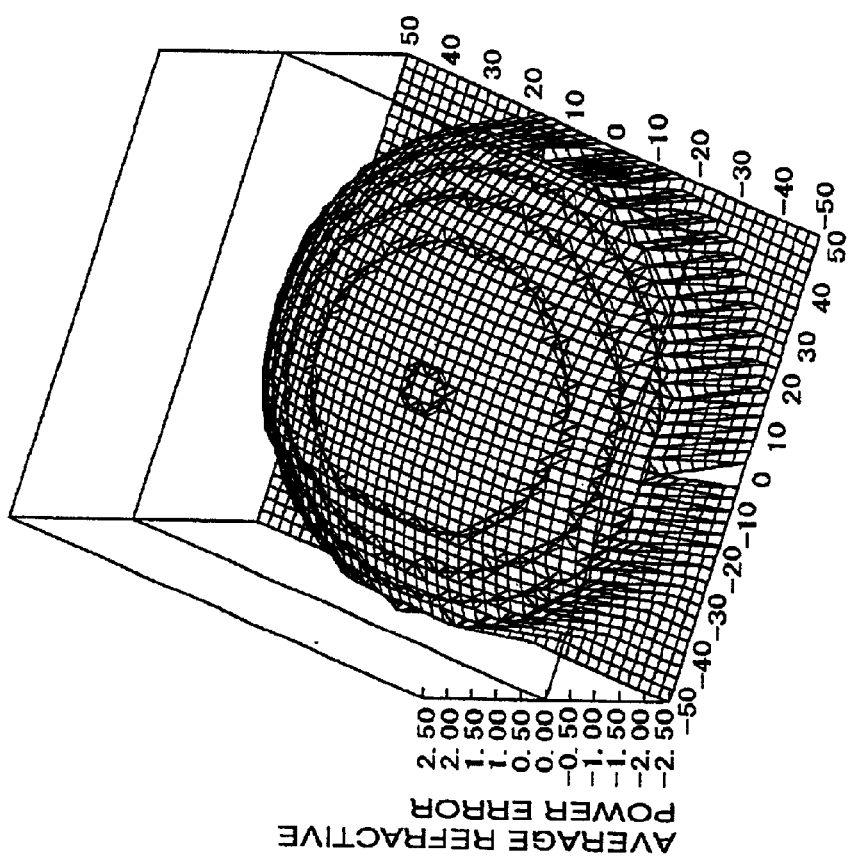

FIGS. 94A and 94B are three-dimension graphs showing transmitting optical performances of the aspherical spectacle lens of the fifth comparative example; FIG. 94A shows an average refractive power error and FIG. 94B shows astigmatism. As compared with the graphs of the ninth and tenth embodiments (FIGS. 82A, 82B, 88A and 88B) designed for the same specification, a number of contour lines in either graph of the fifth comparative example is larger than that of the embodiments, which shows that the optical performance of the embodiments is better than the comparative example.

Eleventh Embodiment

The spectacle lenses of the eleventh and twelfth embodiments and the sixth comparative example are designed for satisfying the specification shown in TABLE 6. Each of these lenses has a prismatic power to correct hereophoria and a cylindrical power to correct astigmatism.

TABLE 6

| | |
|---|---|
| SPH | 4.00 Diopter |
| CYL | −4.00 Diopter |
| AX | 45° |
| PRS | 3.00 Δ |
| BASE | 270° Base Down |

The aspherical spectacle lens of the eleventh embodiment satisfies the specification of TABLE 6, the front surface is a spherical surface that has a uniform curvature 6.96 Diopter as shown in FIG. 95A, and the back surface is a rotationally-asymmetrical aspherical surface whose curvature at the framing reference point is distributed among 1.06 to 7.07

Diopter as shown in FIG. 95B. The center thickness of the lens of the eleventh embodiment is 5.29 mm. The back surface contains a first rotationally-asymmetrical component to correct the aberration caused by adding a prismatic power and a second rotationally-asymmetrical component to add a cylindrical power. Therefore, any rotationally-asymmetrical component is not required for the front surface, which allows the front surface to be formed as a spherical surface.

Figures 95, 96:
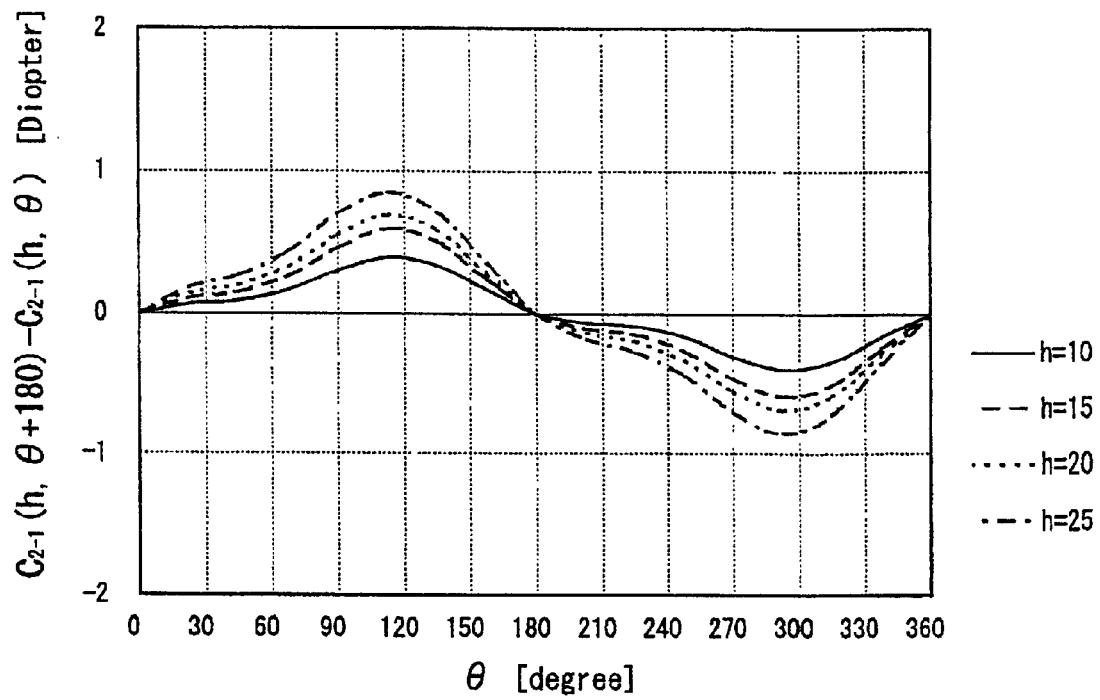

FIG. 96 is a graph showing variation of $C_{2-1}(h, \theta+180)-C_{2-1}(h, \theta)$ that is left side of the condition (1) with respect to variation of the angle $\theta$. The values of the left side of the condition (1) rise to maximums at $\theta=110°$ and are reduced to minimums at $\theta=290°$ for the distances h=10, 15, 20 and 25 mm. The amplitude of the variation increases as the distance h becomes larger. FIG. 96 shows that the values indicated in the graph are larger than zero in the range of $30 \leq \theta \leq 150$ for all of the distances h=10, 15, 20 and 25 mm. Namely, the aspherical spectacle lens of the eleventh embodiment satisfies the condition (1).

Figure 97:
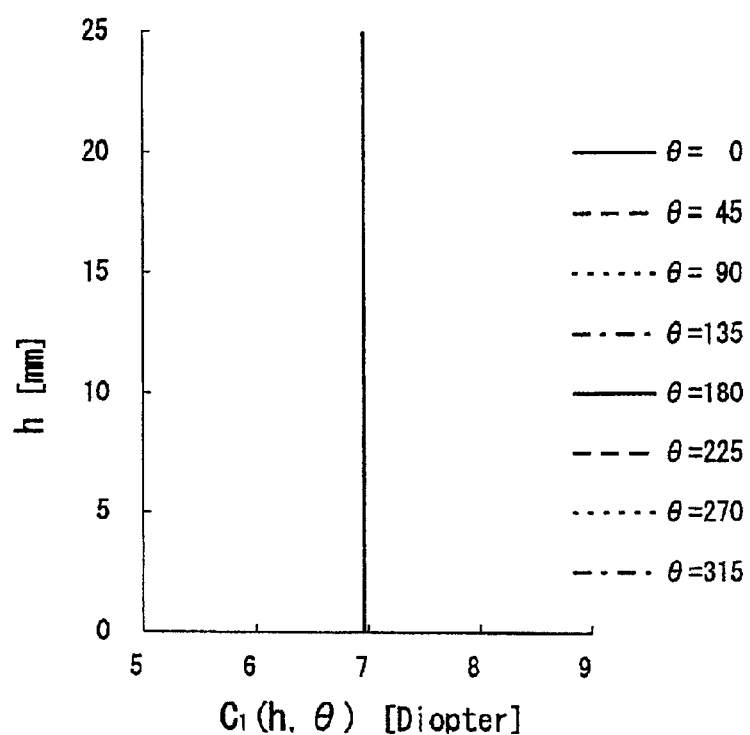
Figure 97:
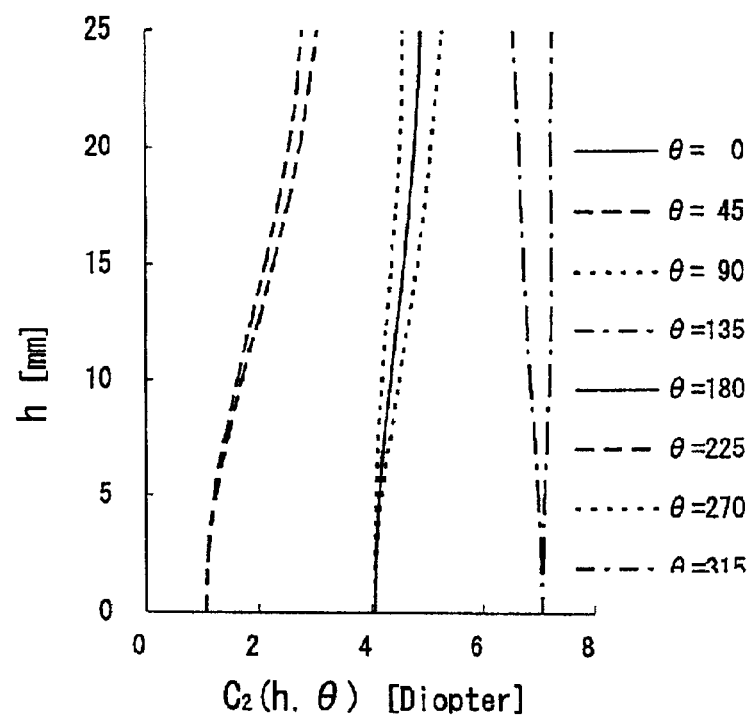

FIGS. 97A and 97B are graphs showing variations of curvatures $C_1(h, \theta)$ and $C_2(h, \theta)$ of the front and back surfaces, respectively, with respect to variation of the distance h from the framing reference point. Since the front surface is spherical, the curvature $C_1(h, \theta)$ does not vary according to variations of the distance h and the angle $\theta$, the graph of FIG. 97A shows the straight lines overlapped to each other. Since the back surface is rotationally-asymmetrical, the curvature $C_2(h, \theta)$ varies according to variations of the distance h and the angle $\theta$. In the graph of FIG. 97B, the curve of $\theta=45°$, the curve of $\theta=225°$, the curve of $\theta=90°$, the curve of $\theta=0°$, the curve of $\theta=270°$, the curve of $\theta=315°$ and the curve of $\theta=315°$ are arranged in increasing order of curvature.

Figure 98:
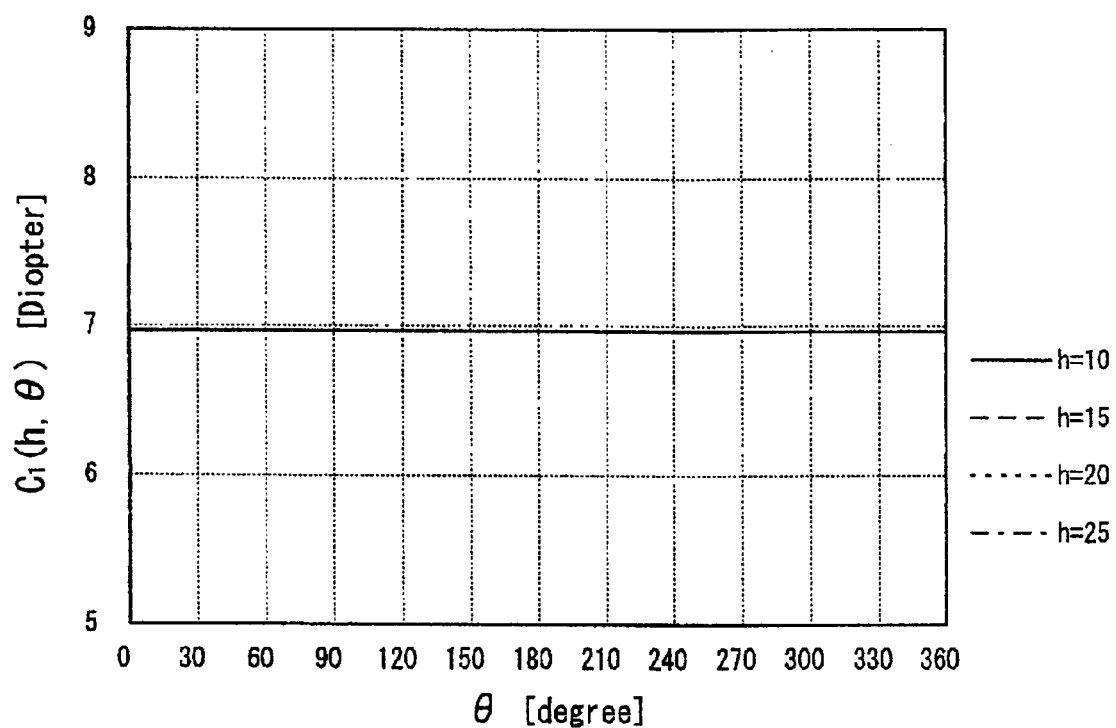
Figure 98:
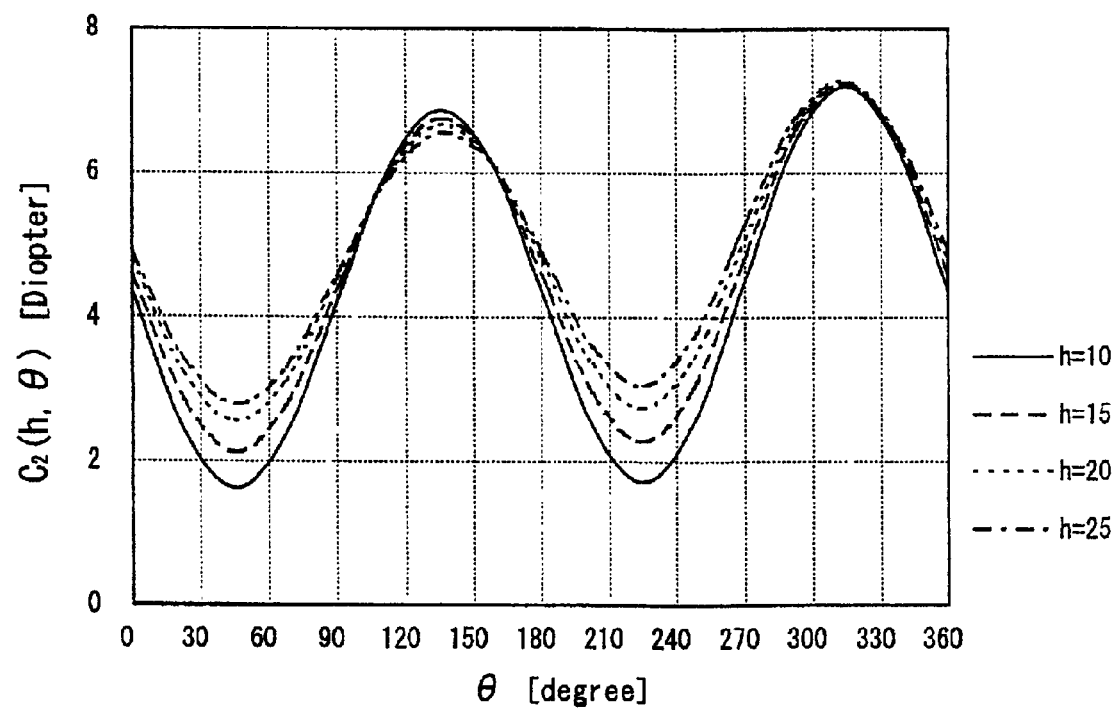

FIGS. 98A and 98B are graphs showing variations of curvatures $C_1(h, \theta)$ and $C_2(h, \theta)$ of the front and back surfaces, respectively, with respect to variation of the angle $\theta$. Since the front surface is spherical, the curvature $C_1(h, \theta)$ does not vary according to variations of the distance h and the angle $\theta$, the graph of FIG. 98A shows the straight lines overlapped to each other. The curvature of the back surface becomes large at $\theta=135°$ and $315°$ and becomes small at $\theta=45°$ and $225°$ due to the added cylindrical power, in general. However, the curvature at the side of the prism base ($\theta=270°$) is larger than that at the side of the apex ($\theta=90°$) in order to correct the aberration caused by adding the base-down prismatic power.

Figure 99:
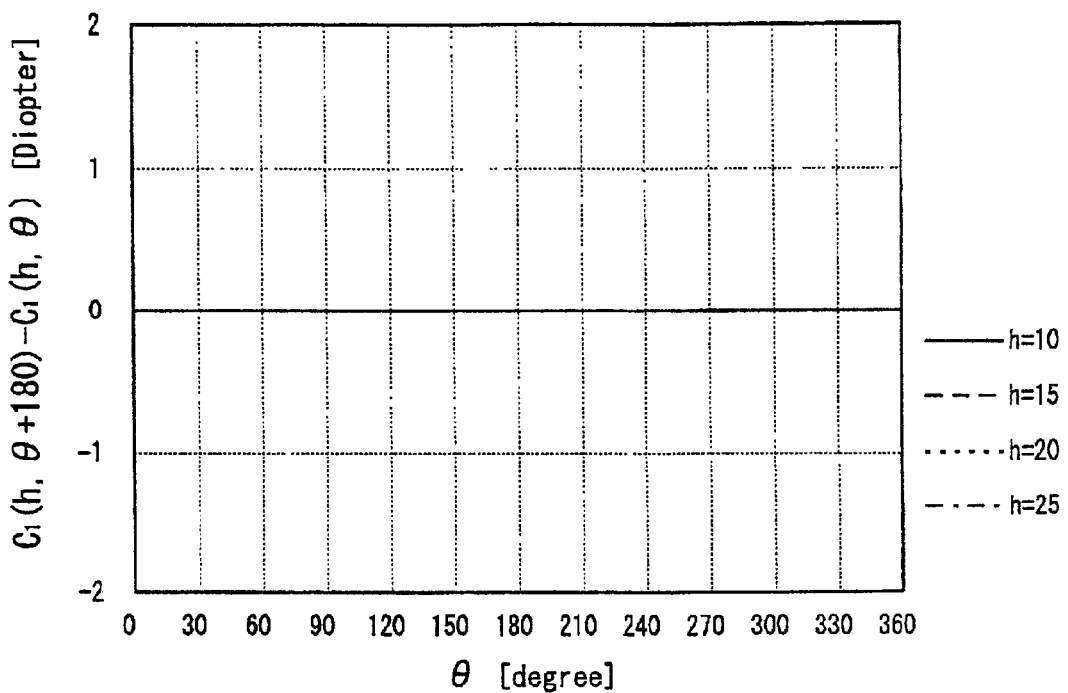
Figure 99:
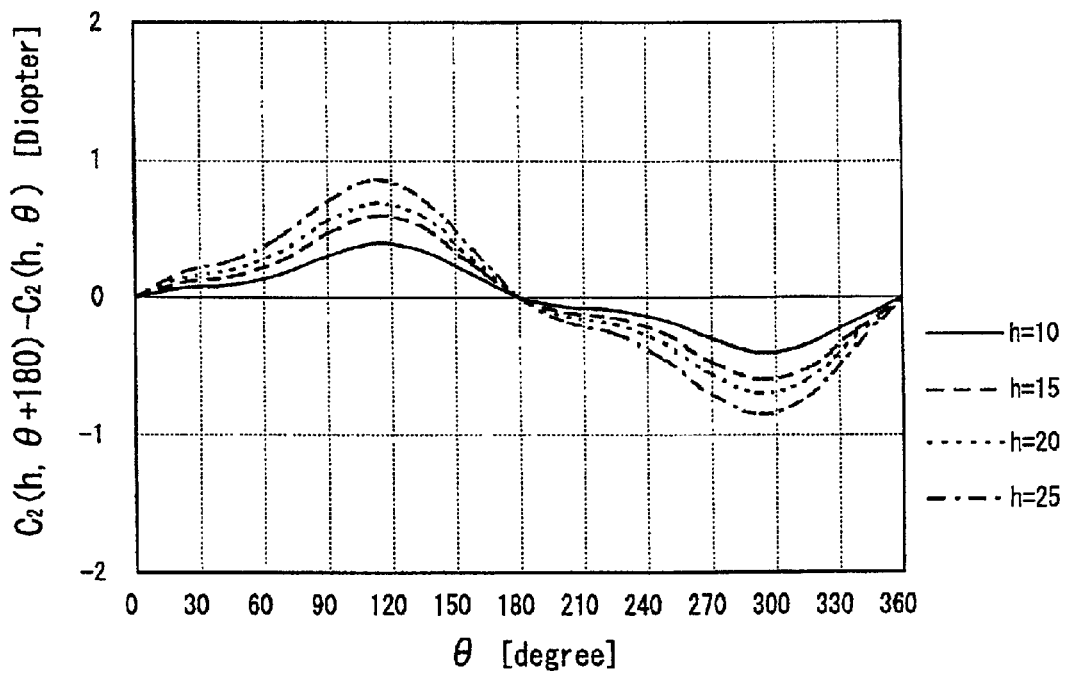

Further, FIGS. 99A and 99B are graphs showing variations of $C_1(h, \theta+180)-C_1(h, \theta)$ that is the left side of the condition (3) and $C_2(h, \theta+180)-C_2(h, \theta)$ that is the left side of the condition (2), respectively, with respect to variation of the angle $\theta$. Since the front surface is spherical, the value of the left side of the condition (3) remains constant. The value of the left side of the condition (2) varies according to variations of the angle $\theta$ and the distance h. FIG. 99B shows that the values indicated in the graph are larger than zero in the range of $30 \leq \theta < 150$ for all of the distances h=10, 15, 20 and 25 mm. Namely, the aspherical spectacle lens of the eleventh embodiment satisfies the condition (2).

Figure 100A:
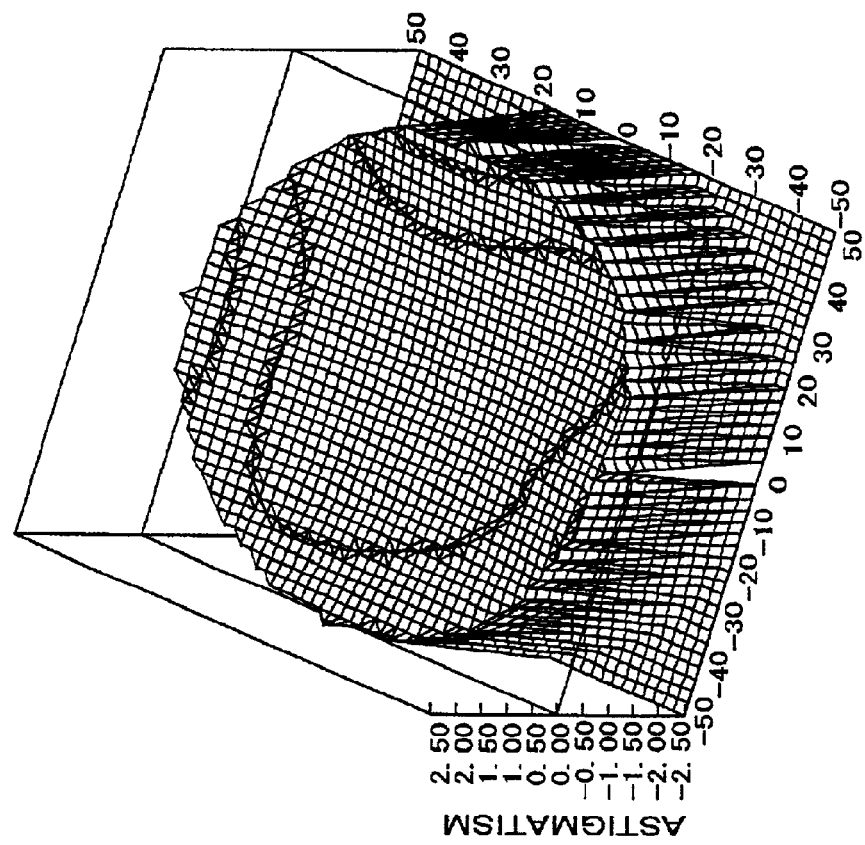
Figure 100B:
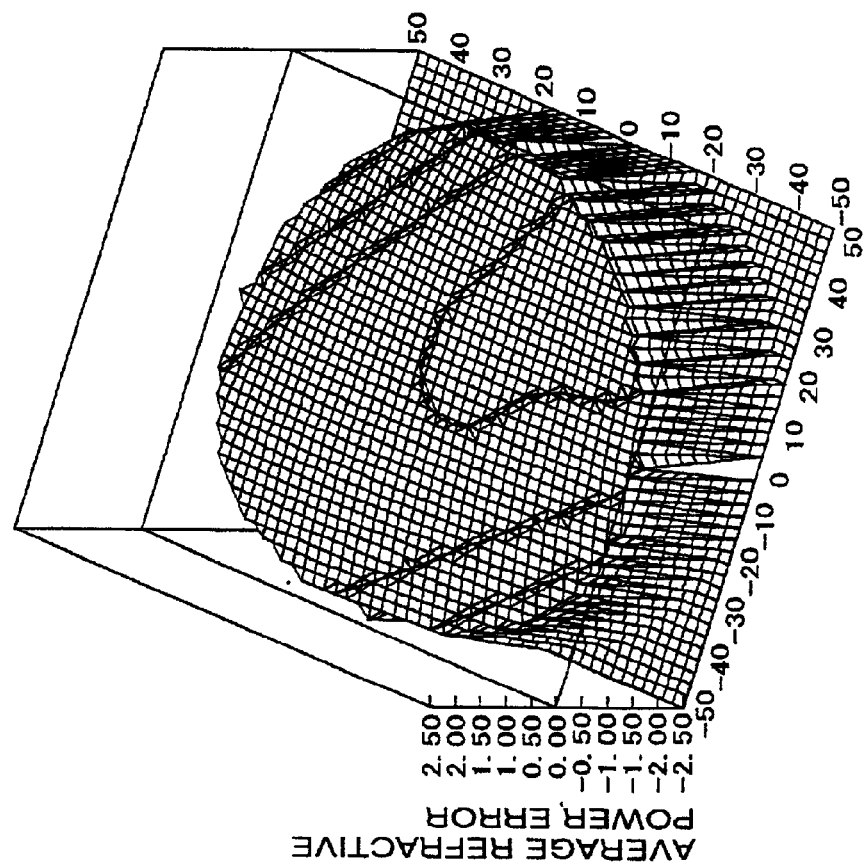

FIGS. 100A and 100B are three-dimension graphs showing transmitting optical performances of the aspherical spectacle lens of the eleventh embodiment; FIG. 100A shows an average refractive power error and FIG. 100B shows astigmatism.

Twelfth Embodiment

In the same manner as the eleventh embodiment, the aspherical spectacle lens of the twelfth embodiment satisfies the specification of TABLE 6, the front surface is a rotationally-asymmetrical aspherical surface whose curvature at the framing reference point is distributed among 4.23 to 7.16 Diopter as shown in FIG. 101A, and the back surface is an a toric surface whose curvature at the framing reference point is distributed among 1.26 to 4.27 Diopter as shown in FIG. 101B. The center thickness of the lens of the second embodiment is 5.30 mm. The rotationally-asymmetrical front surface contains the first rotationally-asymmetrical component to correct the aberration caused by adding the prismatic power, and the a toric back surface contains the second rotationally-asymmetrical component to add the cylindrical power.

Figures 101, 102:
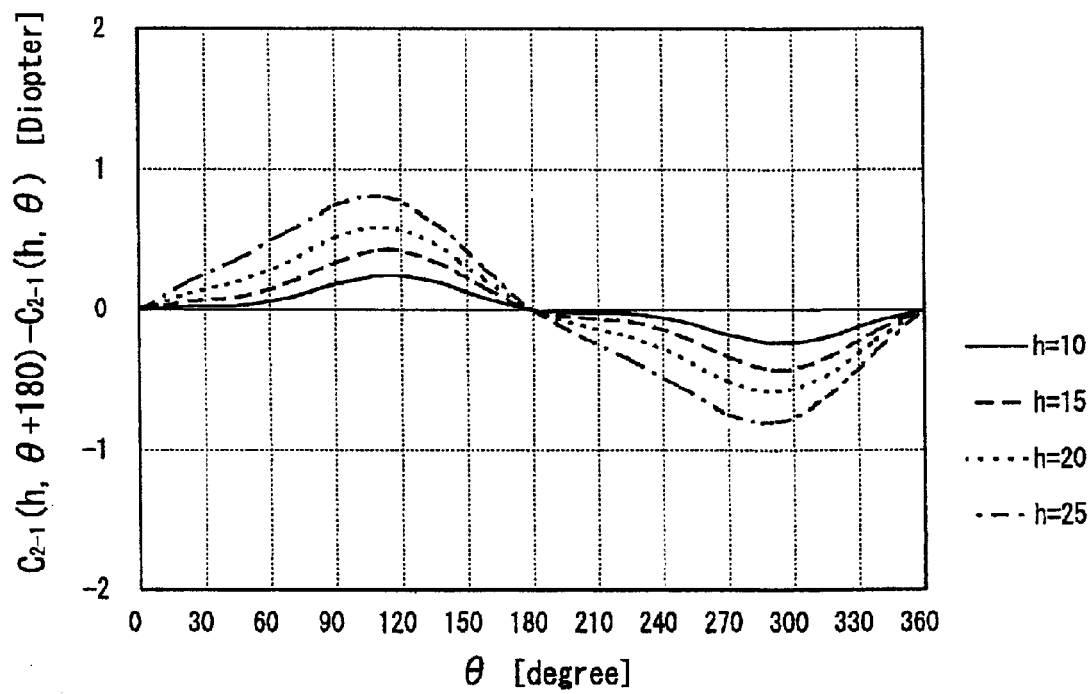

FIG. 102 is a graph showing variation of $C_{2-1}(h, \theta+180)-C_{2-1}(h, \theta)$ that is left side of the condition (1) with respect to variation of the angle $\theta$. The values of the left side of the condition (1) rise to maximums at $\theta=105°$ and are reduced to minimums at $\theta=285°$ for all of the distances h=10, 15, 20 and 25 mm.

FIG. 102 shows that the values indicated in the graph are larger than zero in the range of $30 \leq \theta \leq 150$ for all of the distances h=10, 15, 20 and 25 mm. Namely, the aspherical spectacle lens of the twelfth embodiment satisfies the condition (1).

Figure 103:
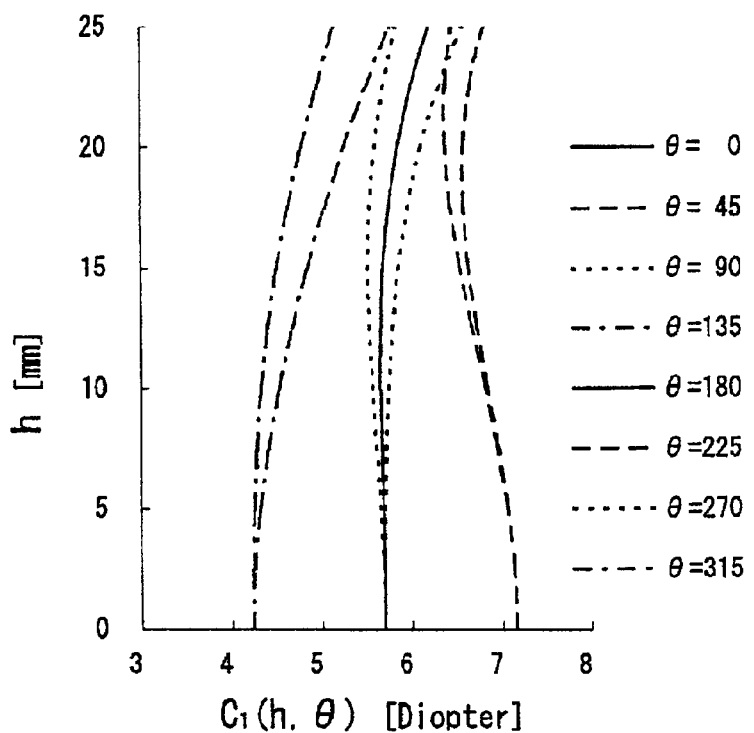
Figure 103:
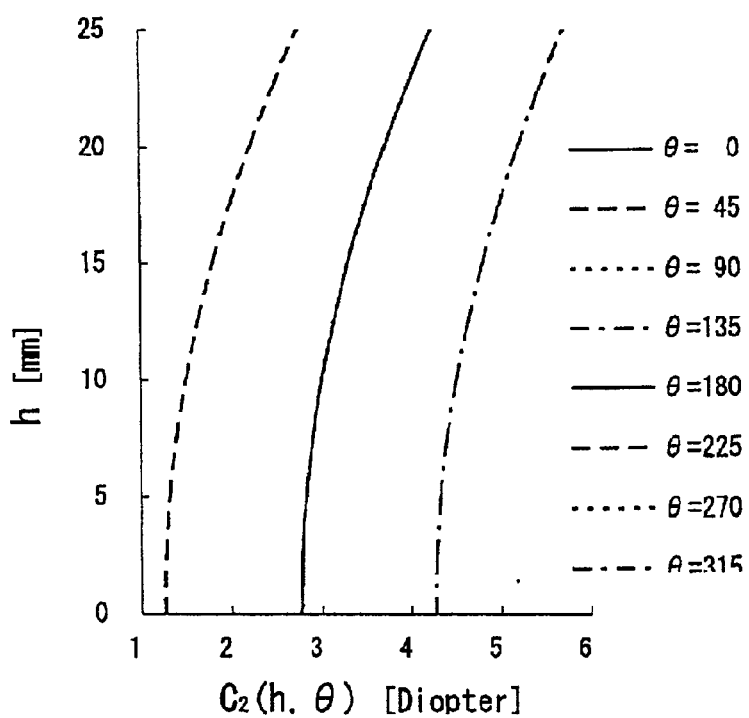

FIGS. 103A and 103B are graphs showing variations of curvatures $C_1(h, \theta)$ and $C_2(h, \theta)$ of the front and back surfaces, respectively, with respect to variation of the distance h from the framing reference point. Since the front and back surfaces are rotationally-asymmetrical, the curvatures $C_1(h, \theta)$ and $C_2(h, \theta)$ vary according to variations of the distance h and the angle $\theta$. In the graph of FIG. 103A, the curve of $\theta=315°$, the curve of $\theta=135°$, the curve of $\theta=270°$, the overlapped curves of $\theta=0°$ and $180°$, the curve of $\theta=90°$, the curve of $\theta=225°$ and the curve of $\theta=45°$ are arranged in increasing order of curvature within the range of $10 \leq h \leq 20$. In the graph of FIG. 103B, the overlapped curves of $\theta=45°$ and $225°$, the overlapped curves of $\theta=0°$, $90°$, $180°$ and $270°$, the overlapped curves of $\theta=135°$ and $315°$ are arranged in increasing order of curvature.

Figure 104:
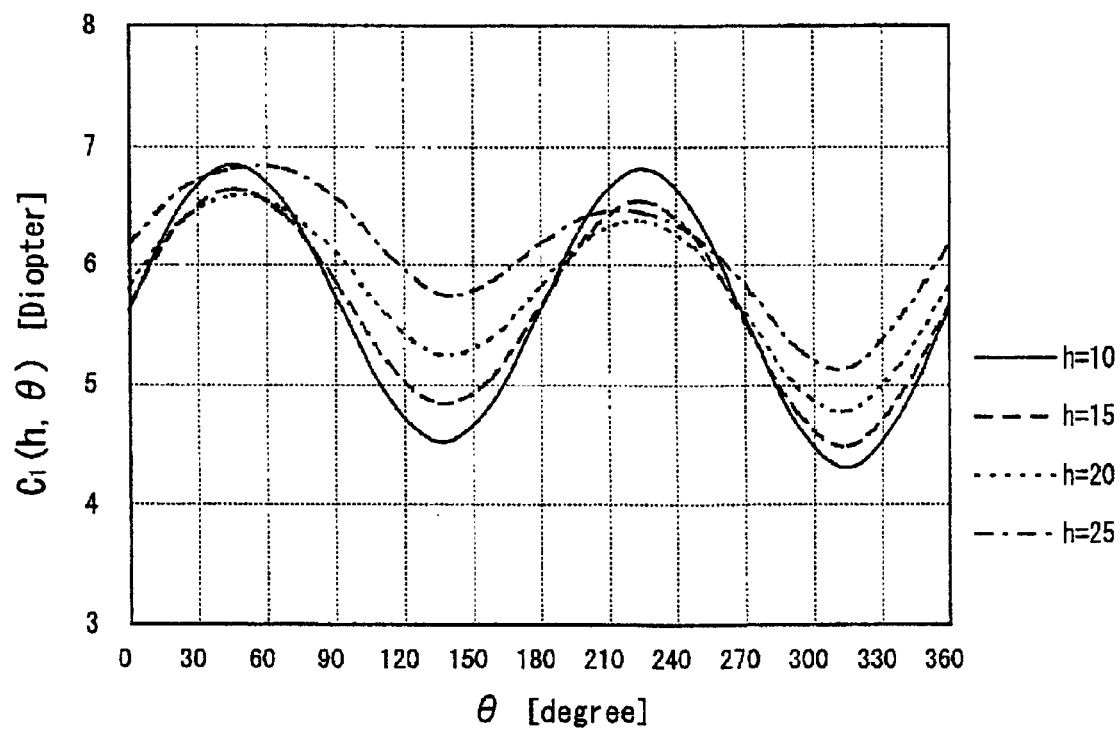
Figure 104:
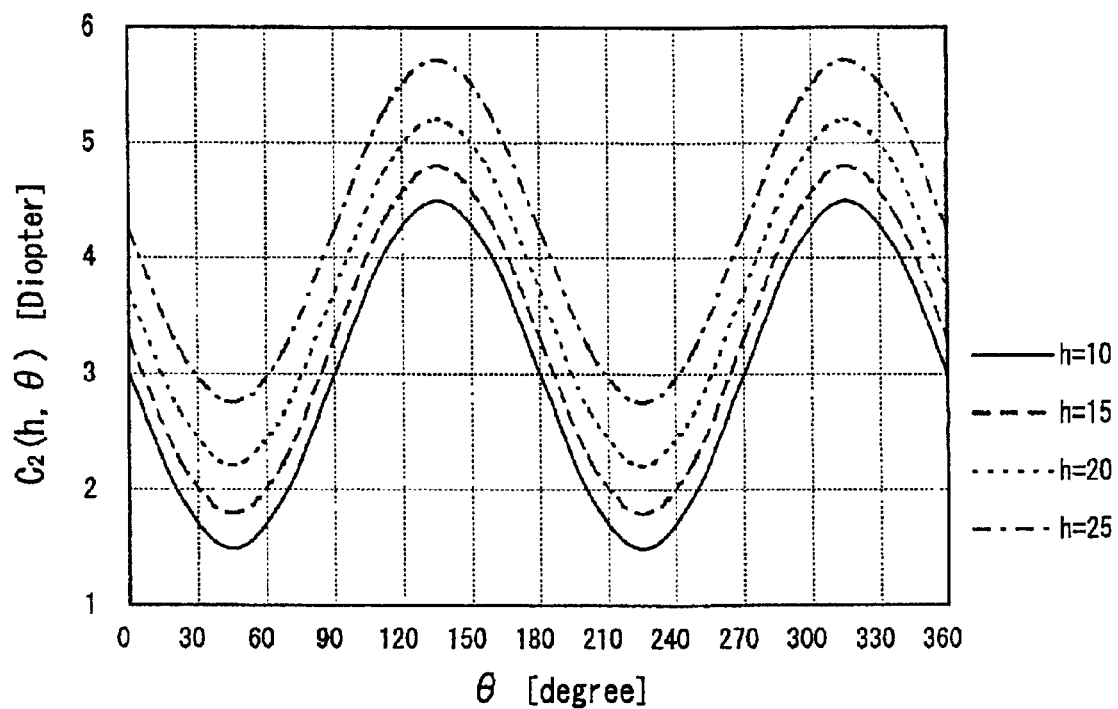

FIGS. 104A and 104B are graphs showing variations of curvatures $C_1(h, \theta)$ and $C_2(h, \theta)$ of the front and back surfaces, respectively, with respect to variation of the angle $\theta$. In order to correct the aberration caused by adding the base-down prismatic power, the curvature $C_1(h, \theta)$ of the front surface at the side of the prism base ($\theta=270°$) is larger than that at the side of the apex ($\theta=90°$). The curvature of the a toric back surface becomes large at $\theta=135°$ and $315°$ and becomes small at $\theta=45°$ and $225°$ due to the added cylindrical power.

Figure 105:
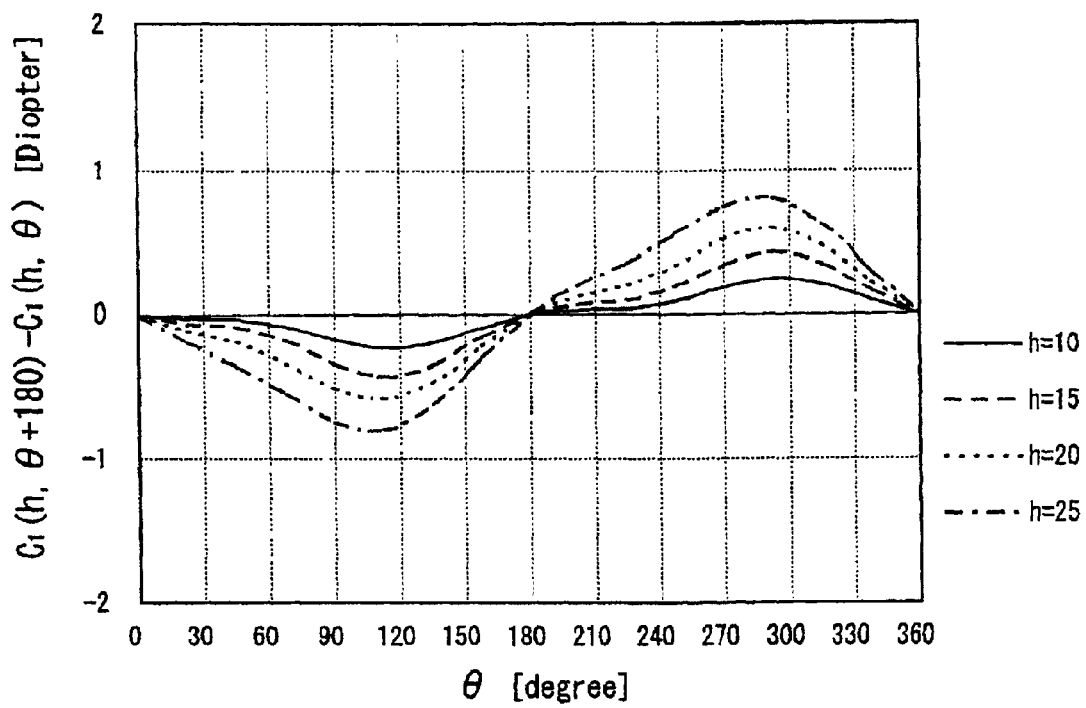
Figure 105:
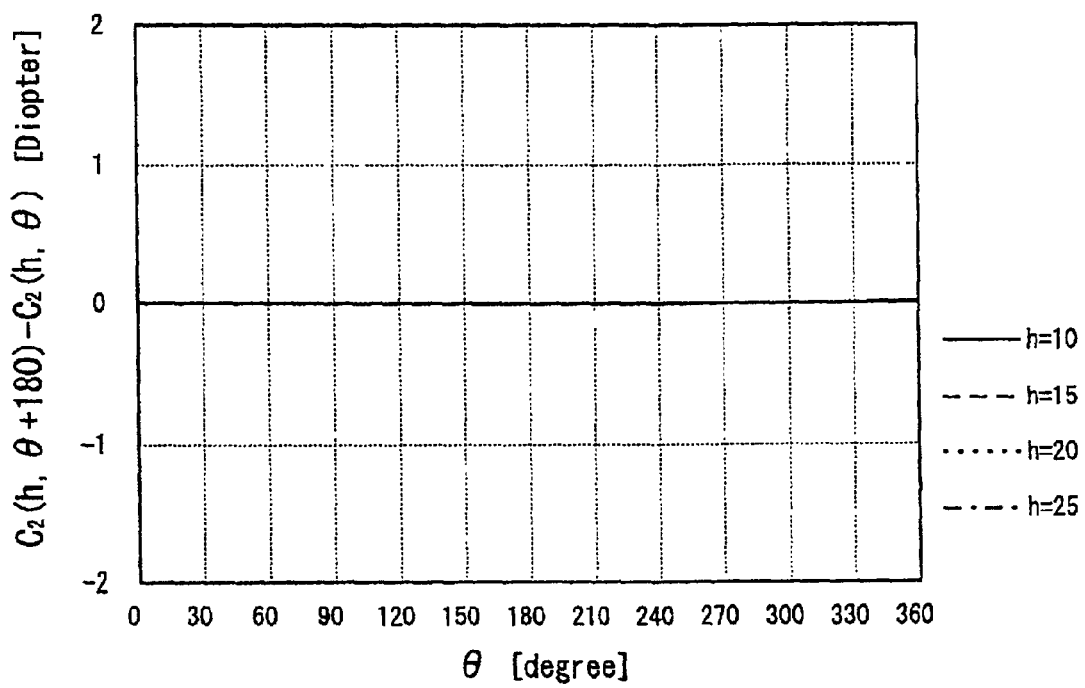

Further, FIGS. 105A and 105B are graphs showing variations of $C_1(h, \theta+180)-C_1(h, \theta)$ that is the left side of the condition (3) and $C_2(h, \theta+180)-C_2(h, \theta)$ that is the left side of the condition (2), respectively, with respect to variation of the angle $\theta$. The values of the left side of the condition (3) vary according to variations of the angle $\theta$ and the distance h. FIG. 105A shows that the values indicated in the graph are smaller than zero in the range of $30 \leq \theta \leq 150$ for all of the distances h=10, 15, 20 and 25 mm. Namely, the aspherical spectacle lens of the twelfth embodiment satisfies the condition (3). Since the back surface is an a toric surface whose variation of curvature is symmetric with respect to the framing reference point, the values of the left side of the condition (2) remain constant.

FIGS. 106A and 106B are three-dimension graphs showing transmitting optical performances of the aspherical spectacle lens of the twelfth embodiment; FIG. 106A shows an average refractive power error and FIG. 106B shows astigmatism.

SIXTH COMPARATIVE EXAMPLE

In the same manner as the eleventh and twelfth embodiments, the aspherical spectacle lens of the sixth comparative example satisfies the specification of TABLE 6, the front surface is a rotationally-symmetrical aspherical surface whose curvature at the framing reference point is 7.17 Diopter as shown in FIG. 107A, and the back surface is a toric surface whose curvature is distributed among 1.26 to 7.27 Diopter as shown in FIG. 71B. The center thickness of the lens of the fourth comparative example is 5.29 mm.

Figures 107, 108:
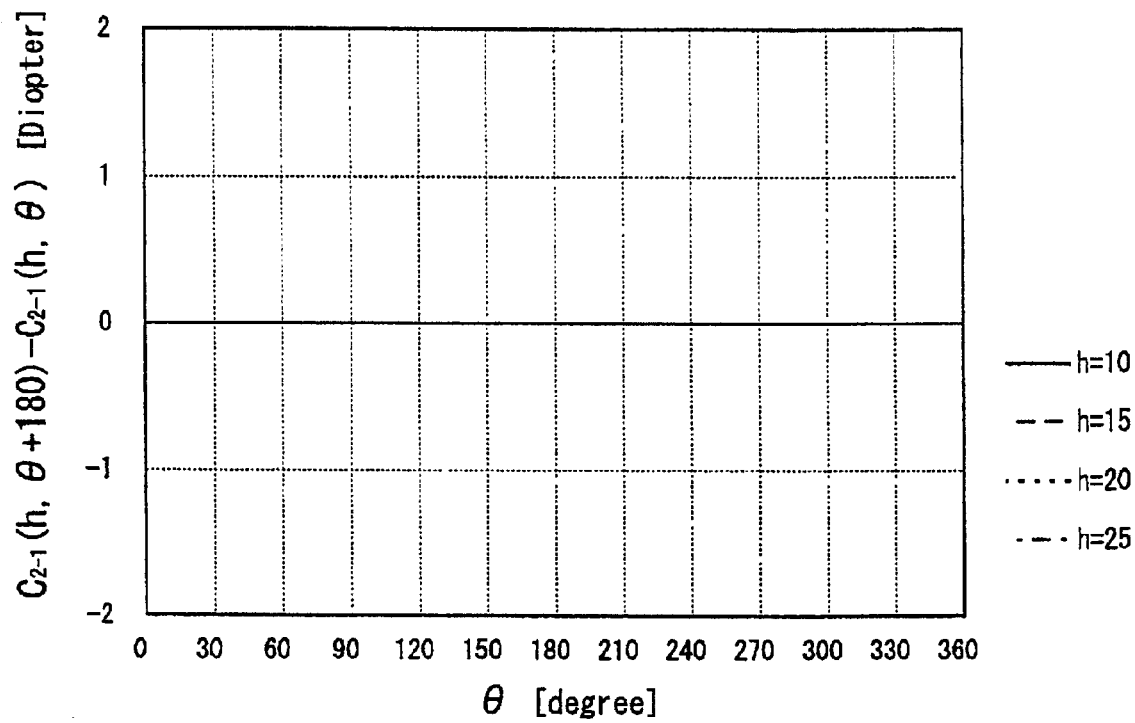

FIG. 108 is a graph showing variation of $C_{2-1}(h, \theta+180)-C_{2-1}(h, \theta)$ that is left side of the condition (1) with respect to variation of the angle $\theta$. Since the front surface is rotationally-symmetrical and the back surface is symmetric with respect to the framing reference point, the value of the left side of the condition (1) remains constant. Namely, the aspherical spectacle lens of the sixth comparative example does not satisfy the condition (1).

Figure 109:
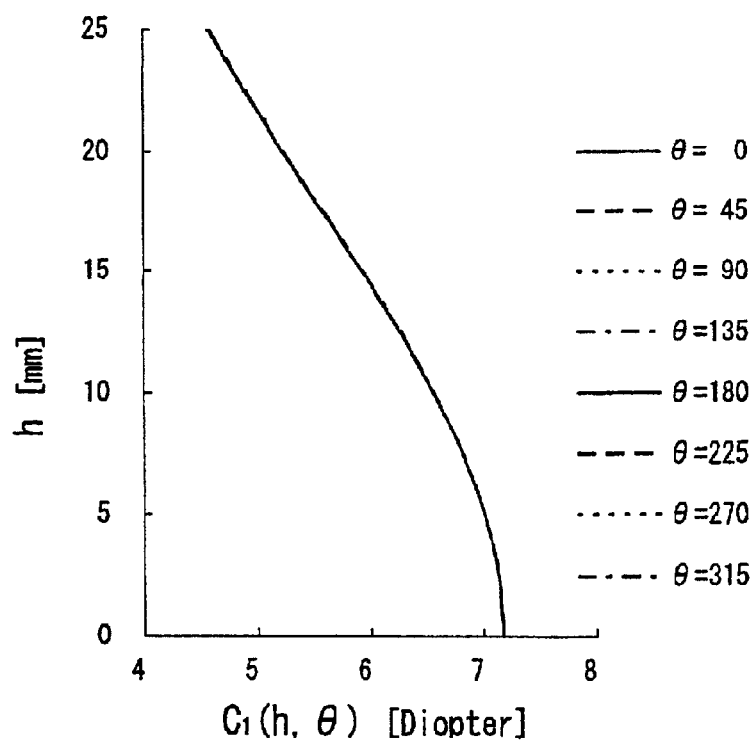
Figure 109:
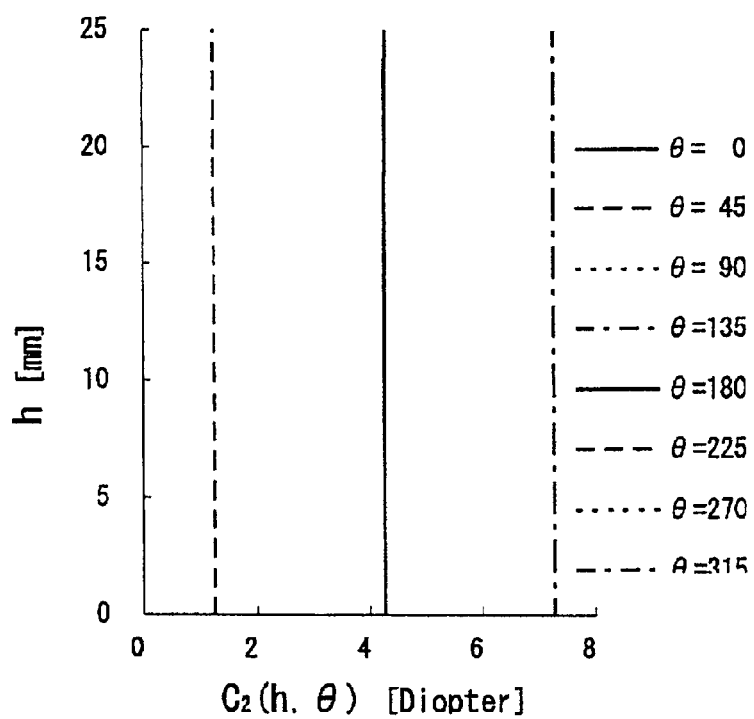

FIGS. 109A and 109B are graphs showing variations of curvatures $C_1(h, \theta)$ and $C_2(h, \theta)$ of the front and back surfaces, respectively, with respect to variation of the distance h from the framing reference point. Since the front surface is a rotationally-symmetrical aspherical surface, the curvature varies according to variation of the distance h while the variation of the angle $\theta$ does not change the curvature. In the graph of FIG. 109A, the curves of all of the angles are overlapped. Since the back surface is toric, the curvature varies according to variation of the angle $\theta$. However, the curvature of the toric surface does not vary according to variation of the distance h. Therefore, in the graph of FIG. 109B, the overlapped straight lines of $\theta=45°$ and $225°$, the overlapped straight lines of $\theta=0°$, $90°$, $180°$ and $270°$, the overlapped straight lines of $\theta=135°$ and $315°$ are arranged in increasing order of the curvature.

Figure 110:
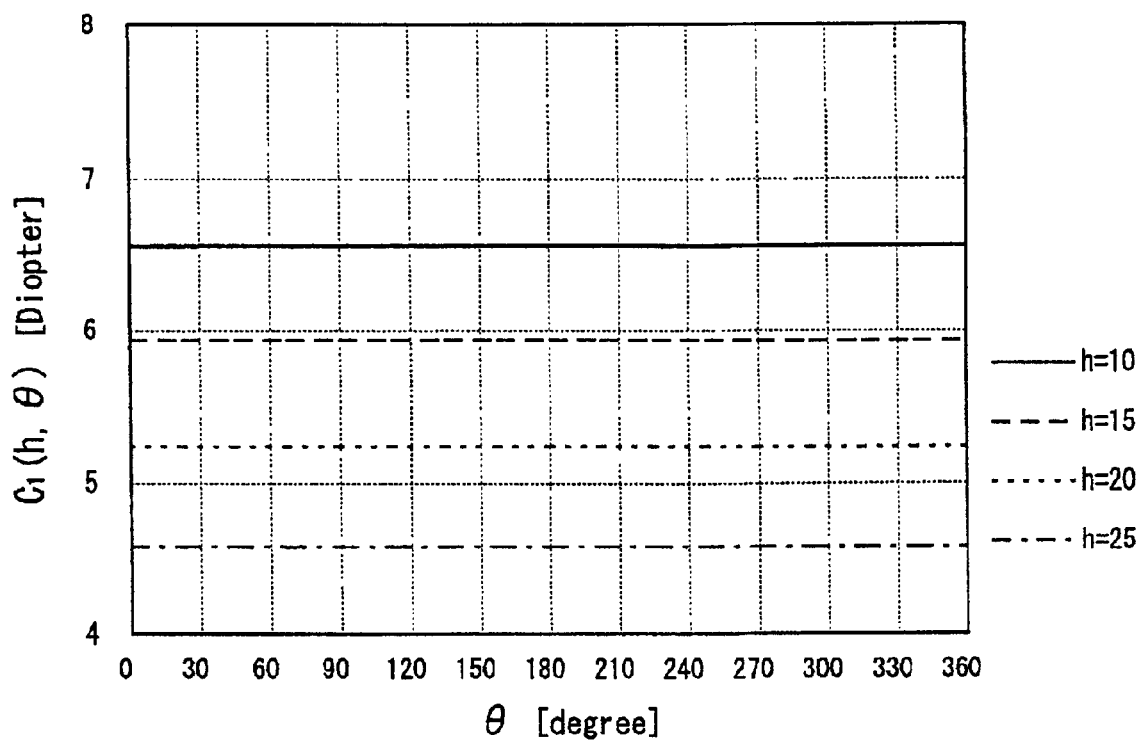
Figure 110:
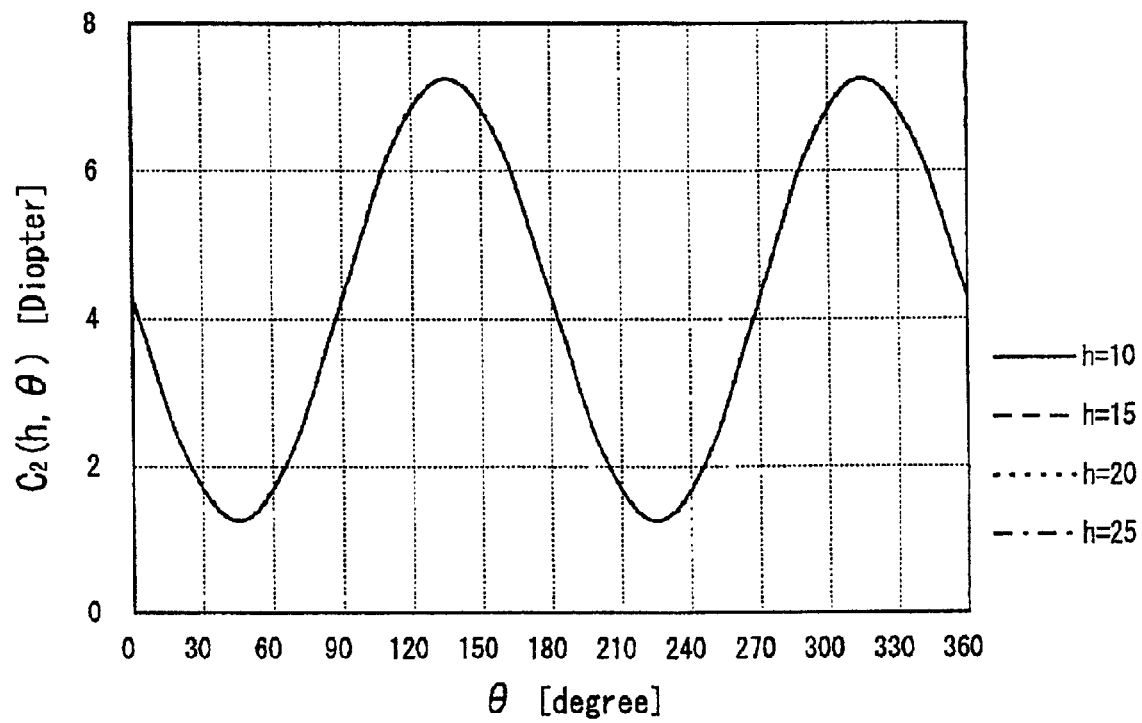

FIGS. 110A and 110B are graphs showing variations of curvatures $C_1(h, \theta)$ and $C_2(h, \theta)$ of the front and back surfaces, respectively, with respect to variation of the angle $\theta$. Since the front surface is a rotationally-symmetrical aspherical surface, the curvatures $C_1(h, \theta)$ are different in response to the distance h and do not vary according to variation of the angle $\theta$, the curvatures are shown as independent straight lines. The curvature $C_2(h, \theta)$ of the toric back surface is reduced to a minimum at $\theta=45°$ and $225°$ and rises to a maximum at $\theta=135°$ and $315°$ as shown in FIG. 110B.

Figure 111:
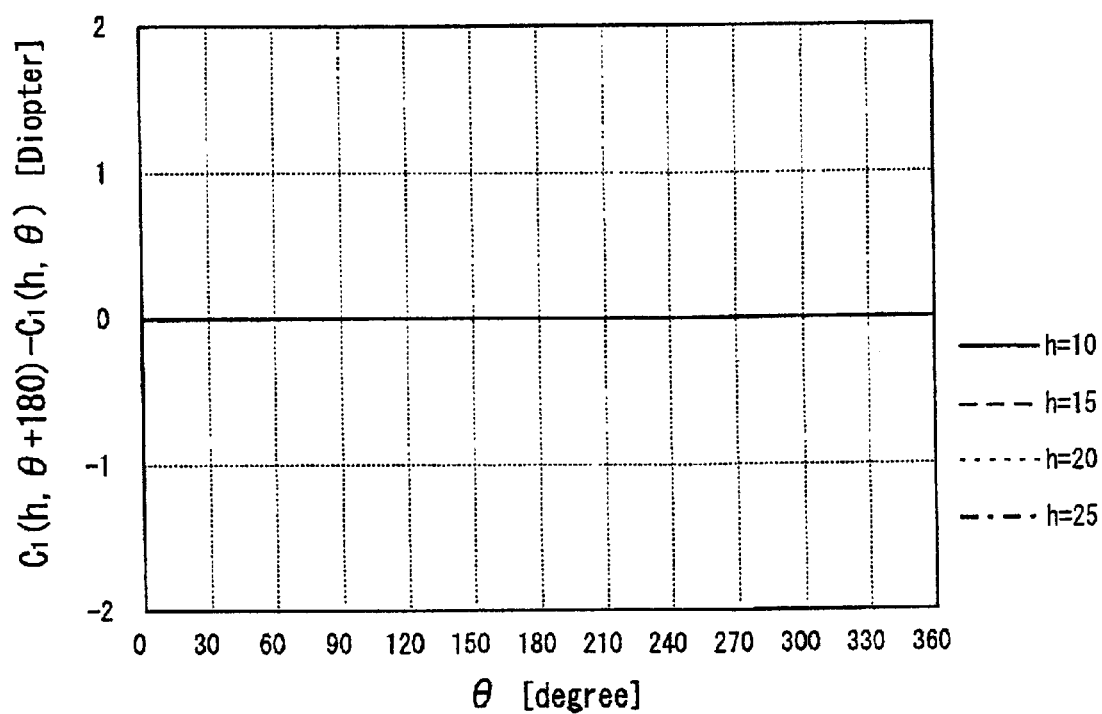
Figure 111:
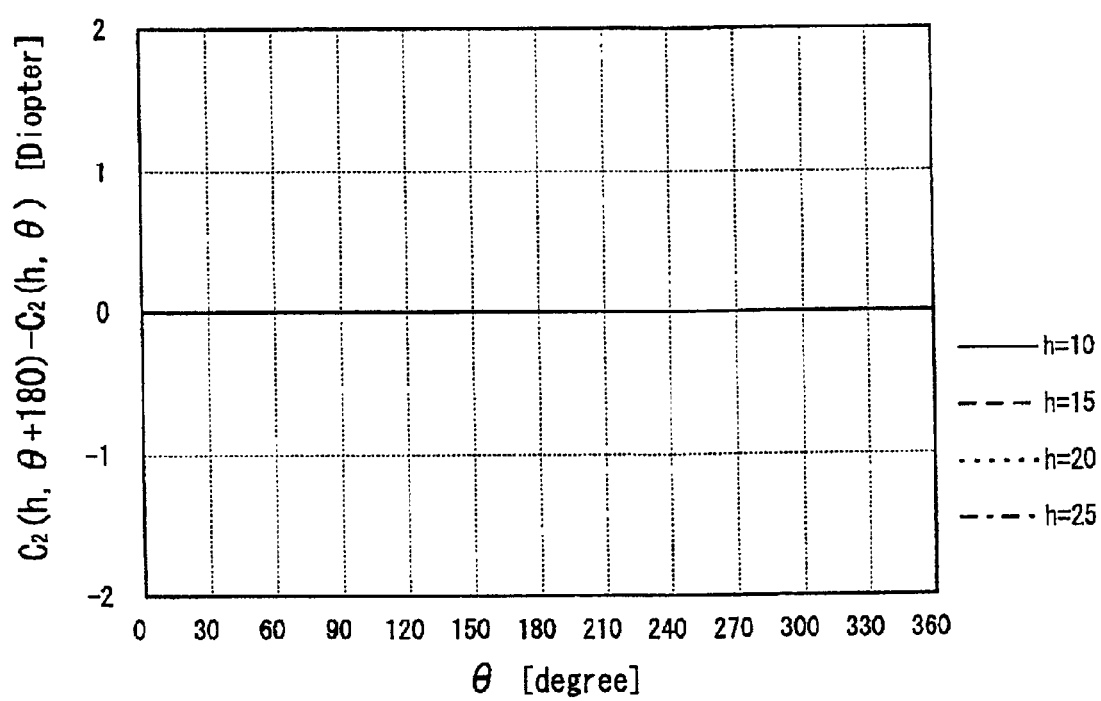

Further, FIGS. 111A and 111B are graphs showing variations of $C_1(h, \theta+180)-C_1(h, \theta)$ that is the left side of the condition (3) and $C_2(h, \theta+180)-C_2(h, \theta)$ that is the left side of the condition (2), respectively, with respect to variation of the angle $\theta$. Since the front surface is a rotationally-symmetrical aspherical surface, the value of the left side of the condition (3) remains constant. Further, since the back surface is toric, the value of the left side of the condition (2) remains constant. Namely, the spectacle lens of the sixth comparative example does not satisfy the conditions (2) and (3).

Figure 112A:
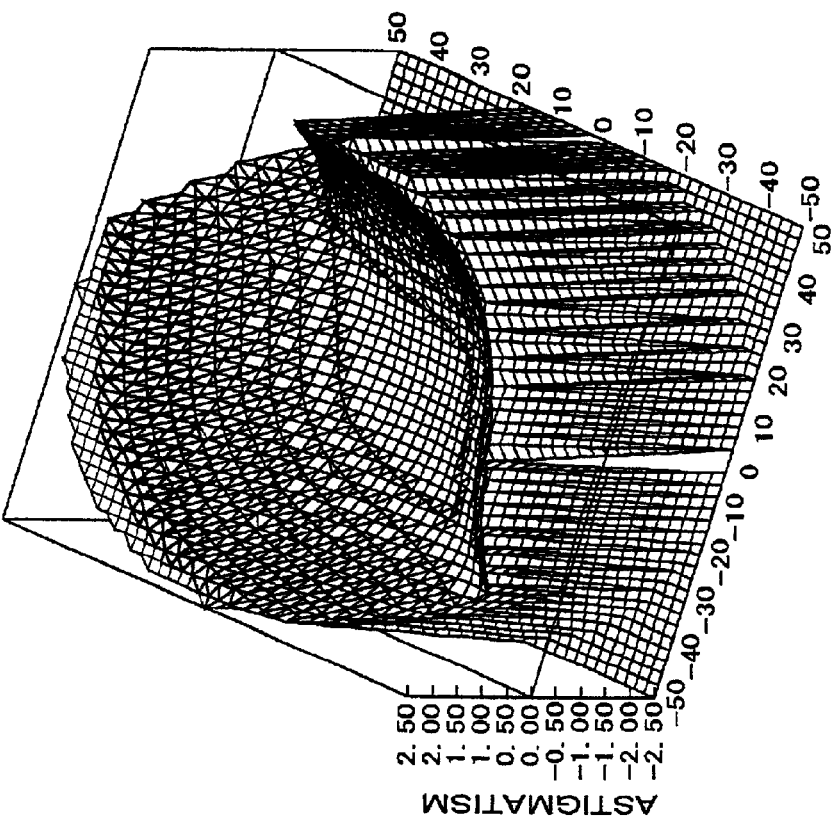
Figure 112B:
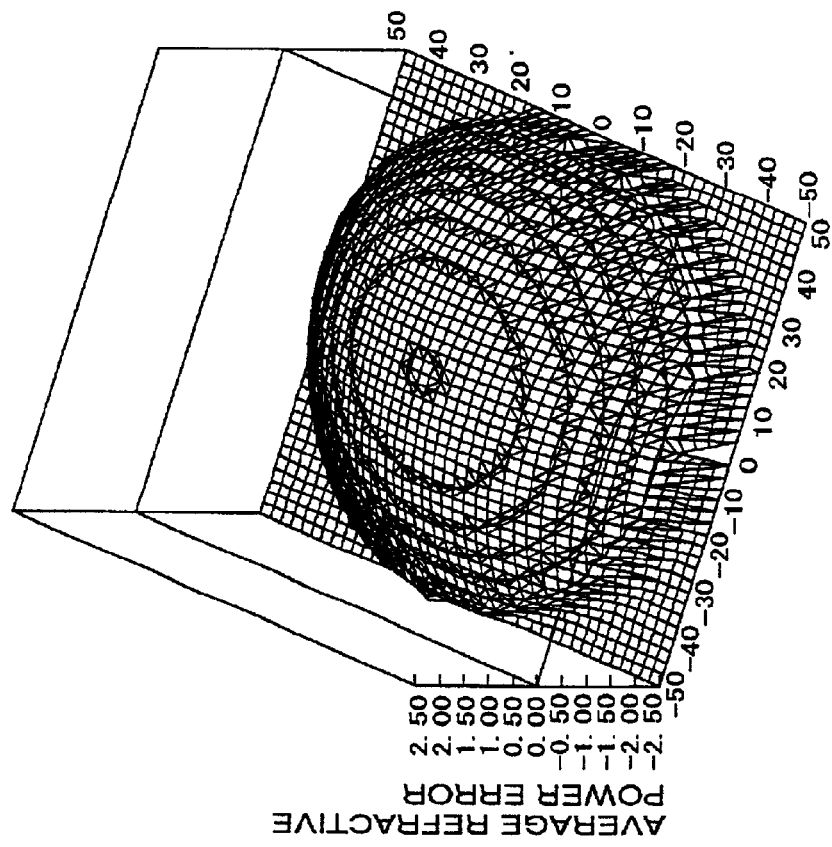
Figure 113:
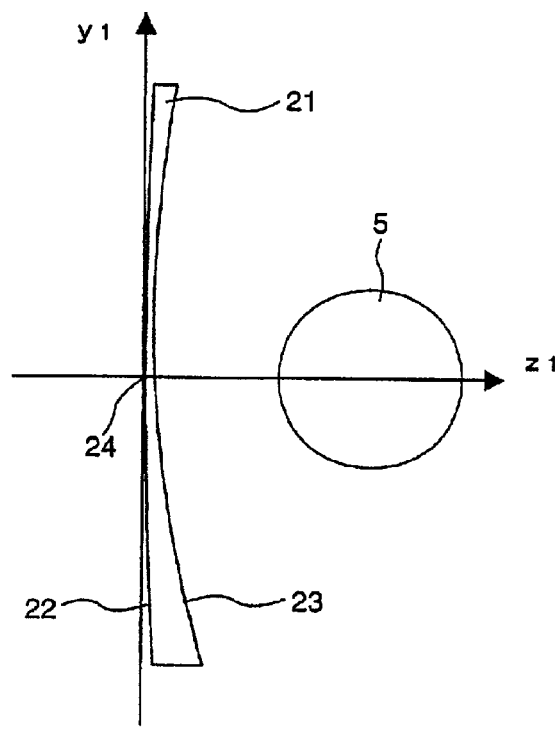
FIG. 113 is a side sectional view of a conventional spectacle lens.
Figure 114:
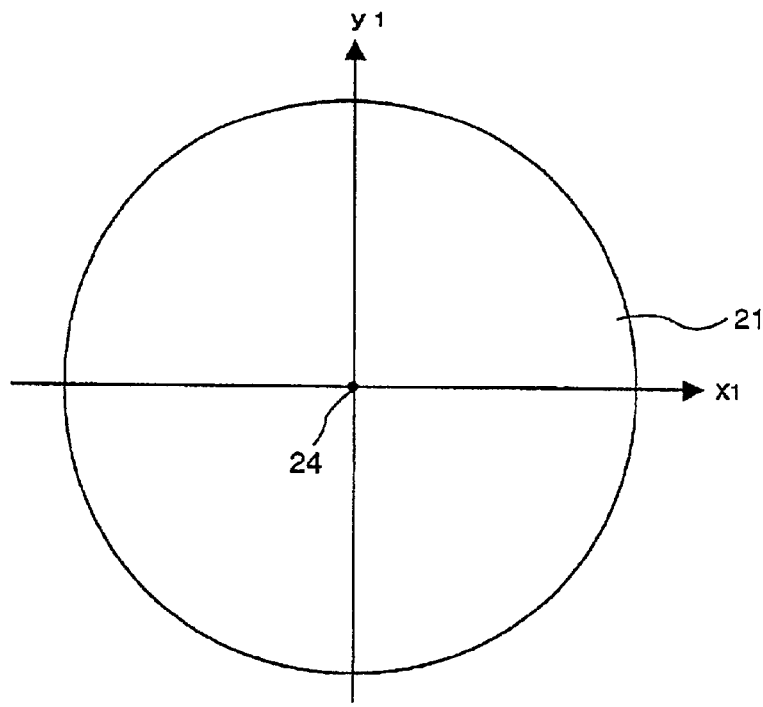
FIG. 114 is a front view of the spectacle lens of FIG. 113.

FIGS. 112A and 112B are three-dimension graphs showing transmitting optical performances of the aspherical spectacle lens of the sixth comparative example; FIG. 112A shows an average refractive power error and FIG. 112B shows astigmatism. As compared with the graphs of the eleventh and twelfth embodiments (FIGS. 100A, 100B, 106A and 106B) designed for the same specification, a number of contour lines in either graph of the sixth comparative example is larger than that of the embodiments, which shows that the optical performance of the embodiments is better than the comparative example.

The present disclosure relates to the subject matter contained in Japanese Patent Application No. 2000-317241, filed on Oct. 17, 2000, which is expressly incorporated herein by reference in its entirety.

What is claimed is:

1. An aspherical single vision spectacle lens having a prismatic power to correct heterophoria of an eye comprising:

a front surface; and a back surface, wherein at least one of said front and back surfaces is a rotationally-asymmetrical aspherical surface that has a rotationally-asymmetrical component to correct the aberrations caused by adding said prismatic power to the single vision spectacle lens.

2. The aspherical spectacle lens according to claim 1, wherein said back surface is said rotationally-asymmetrical aspherical surface, and when a framing reference point is coincident with a pupil position of a user when the spectacle lens is installed on a frame, curvature of an intersection line of a plane containing the normal to said rotationally-asymmetrical surface at said framing reference point and said rotationally-asymmetrical surface at the prism base side is larger than at the prism apex side.

3. The aspherical spectacle lens according to claim 1, wherein said front surface is said rotationally-asymmetrical aspherical surface, and when a framing reference point is coincident with a pupil position of a user when the spectacle lens is installed on a frame, curvature of an intersection line of a plane containing the normal to said rotationally-asymmetrical surface at said framing reference point and said rotationally-asymmetrical surface at the prism base side is smaller than at the prism apex side.

4. The aspherical spectacle lens according to claim 1, wherein the following condition is satisfied within the ranges of $10 \leq h \leq 20$ and $30 \leq \theta \leq 150$;

$$C_{2-1}(h, \theta+180)-C_{2-1}(h, \theta)>0$$

where $C_{2-1}(h, \theta)=C_2(h, \theta)-C_1(h, \theta)$;

$C_1(h, \theta)$ is curvature of an intersection line of a plane, which contains a $z_1$-axis and forms angle $\theta$(degree) with respect to an $x_1$-axis, and said front surface at a point whose distance from a $z_1$-axis is h (mm);

$C_2(h, \theta)$ is curvature of an intersection line of a plane, which contains a $z_2$-axis and forms angle $\theta$(degree) with respect to an $x_2$-axis, and said back surface at a point whose distance from a $z_2$-axis is h (mm);

$z_1$-axis is a normal to said front surface at a framing reference point that is coincident with a pupil position of a user when the spectacle lens is installed on a frame;

$y_1$-axis is a direction from the base to the apex in a plane perpendicular to the $z_1$-axis;

$x_1$-axis is perpendicular to both of the $y_1$- and $z_1$-axes in a left-hand coordinate system;

$z_2$-axis is a normal to said back surface at said framing reference point;

$y_2$-axis is a direction from the base to the apex in a plane perpendicular to the $z_2$-axis; and $x_2$-axis is perpendicular to both of the $y_2$- and $z_2$-axes in a left-hand coordinate system.

5. The aspherical spectacle lens according to claim 1, wherein said back surface is said rotationally-asymmetrical surface and the following condition is satisfied within the ranges of $10 \leq h \leq 20$ and $30 \leq \theta \leq 150$;

$$C_2(h, \theta+180)-C_2(h, \theta)>0$$

where $C_2(h, \theta)$ is curvature of an intersection line of a plane, which contains a $z_2$-axis and forms angle $\theta$(degree) with respect to an $x_2$-axis, and said back surface at a point whose distance from a $z_2$-axis is h (mm);

$z_2$-axis is a normal to said back surface at said framing reference point that is coincident with a pupil position of a user when the spectacle lens is installed on a frame;

$y_2$-axis is a direction from the base to the apex in a plane perpendicular to the $z_2$-axis; and $x_2$-axis is perpendicular to both of the $y_2$- and $z_2$-axes in a left-hand coordinate system.

6. The aspherical spectacle lens according to claim 1, wherein said front surface is said rotationally-asymmetrical surface and the following condition is satisfied within the ranges of $10 \leq h \leq 20$ and $30 \leq \theta \leq 150$;

$$C_1(h, \theta+180)-C_1(h, \theta)<0$$

where $C_1(h, \theta)$ is curvature of an intersection line of a plane, which contains a $z_1$-axis and forms angle 0 (degree) with respect to an $x_1$-axis, and said front surface at a point whose distance from a $z_1$-axis is h (mm);

$z_1$-axis is a normal to said front surface at a framing reference point that is coincident with a pupil position of a user when the spectacle lens is installed on a frame;

$y_1$-axis is a direction from the base to the apex in a plane perpendicular to the $z_1$-axis; and $y_1$-axis is perpendicular to both of the $y_1$- and $z_1$-axes in a left-hand coordinate system.

7. The aspherical spectacle lens according to claim 1, wherein said front surface is spherical and said back surface is rotationally-asymmetrical.

8. An aspherical spectacle lens having a prismatic power to correct heterophoria of an eye comprising:

a front surface; and a back surface, wherein at least one of said front and back surfaces is a rotationally-asymmetrical aspherical surface that has a rotationally-asymmetrical component to correct the aberrations caused by adding said prismatic power, wherein the following condition is satisfied within the ranges of $10 \leq h \leq 20$ and $30 \leq \theta \leq 150$;

$$C_{2-1}(h, \theta+180)-C_{2-1}(h, \theta)>0$$

where $$C_{2-1}(h, \theta)=C_2(h, \theta)-C_1(h, \theta);$$

$C_1(h, \theta)$ is curvature of an intersection line of a plane, which contains a $z_1$-axis and forms angle $\theta$ (degree) with respect to an $x_1$-axis, and said front surface at a point whose distance from a $z_1$-axis is h (mm);

$C_2(h, \theta)$ is curvature of an intersection line of a plane, which contains a $z_2$-axis and forms angle $\theta$(degree) with respect to an $x_2$-axis, and said back surface at a point whose distance from a $z_2$-axis is h (mm);

$z_1$-axis is a normal to said front surface at a framing reference point that is coincident with a pupil position of a user when the spectacle lens is installed on a frame;

$y_1$-axis is a direction from the base to the apex in a plane perpendicular to the $z_1$-axis; $x_1$-axis is perpendicular to both of the $y_1$- and $z_1$-axes in a left-hand coordinate system;

$z_2$-axis is a normal to said back surface at said framing reference point;

$y_2$-axis is a direction from the base to the apex in a plane perpendicular to the $z_2$-axis; and $x_2$-axis is perpendicular to both of the $y_2$- and $z_2$-axes in a left-hand coordinate system.

9. An aspherical spectacle lens having a prismatic power to correct heterophoria of an eye comprising:

a front surface; and a back surface, wherein at least one of said front and back surfaces is a rotationally-asymmetrical aspherical surface that has a rotationally-asymmetrical component to correct the aberrations caused by adding said prismatic power, wherein said back surface is said rotationally-asymmetrical surface and the following condition is satisfied within the ranges of $10 \leq h \leq 20$ and $30 \leq \Theta \leq 150$;

$$C_2(h, \theta+180)-C_2(h, \theta)>0$$

where $C_2(h, \theta)$ is curvature of an intersection line of a plane, which contains a $z_2$-axis and forms angle $\theta$(degree) with respect to an $x_2$-axis, and said back surface at a point whose distance from a $z_2$-axis is h (mm);

$z_2$-axis is a normal to said back surface at a framing reference point that is coincident with a pupil position of a user when the spectacle lens is installed on a frame;

$y_2$-axis is a direction from the base to the apex in a plane perpendicular to the $z_2$-axis; and $x_2$-axis is perpendicular to both of the $y_2$- and $z_2$-axes in a left-hand coordinate system.

10. An aspherical spectacle lens having a prismatic power to correct heterophoria of an eye comprising:

a front surface; and a back surface, wherein at least one of said front and back surfaces is a rotationally-asymmetrical aspherical surface that has a rotationally-asymmetrical component to correct the aberrations caused by adding said prismatic power, wherein said front surface is said rotationally-asymmetrical surface and the following condition is satisfied within the ranges of $10 \leq h \leq 20$ and $30 \leq \theta \leq 150$;

$$C_1(h, \theta+180)-C_1(h, \theta)<0$$

where $C_1(h, \theta)$ is curvature of an intersection line of a plane, which contains a $z_1$-axis and forms angle $\theta$(degree) with respect to an $x_1$-axis, and said front surface at a point whose distance from a $z_1$-axis is h (mm);

$z_1$-axis is a normal to said front surface at a framing reference point that is coincident with a pupil position of a user when the spectacle lens is installed on a frame;

$y_1$-axis is a direction from the base to the apex in a plane perpendicular to the $z_1$-axis; and $x_1$-axis is perpendicular to both of the $y_1$- and $z_1$-axes in a left-hand coordinate system.

* * * * *